US007817185B2

(12) United States Patent
Kurata

(10) Patent No.: US 7,817,185 B2
(45) Date of Patent: Oct. 19, 2010

(54) IMAGE PROCESSING DEVICE, IMAGE PROCESSING METHOD, IMAGE PICKUP DEVICE, AND IMAGE PICKUP METHOD FOR SUPERIMPOSING A PLURALITY OF PICTURES ON EACH OTHER

(75) Inventor: Tohru Kurata, Tokyo (JP)

(73) Assignee: Sony Corporation, Tokyo (JP)

( * ) Notice: Subject to any disclaimer, the term of this patent is extended or adjusted under 35 U.S.C. 154(b) by 656 days.

(21) Appl. No.: 11/757,134

(22) Filed: Jun. 1, 2007

(65) Prior Publication Data
US 2008/0175439 A1    Jul. 24, 2008

(30) Foreign Application Priority Data
Jun. 14, 2006    (JP)    ............... 2006-164209

(51) Int. Cl.
H04N 5/225    (2006.01)
(52) U.S. Cl. ................... 348/208.1; 348/208.6
(58) Field of Classification Search ............ 348/208.99, 348/208.1, 208.4, 208.6
See application file for complete search history.

(56) References Cited

U.S. PATENT DOCUMENTS

| 2002/0036692 | A1* | 3/2002 | Okada ............... 348/208 |
| 2005/0265453 | A1* | 12/2005 | Saito ............... 375/240.16 |
| 2006/0152590 | A1* | 7/2006 | Kage et al. ............ 348/208.1 |
| 2007/0110417 | A1* | 5/2007 | Itokawa ............... 396/52 |
| 2007/0132856 | A1* | 6/2007 | Saito et al. ............ 348/208.99 |
| 2007/0222864 | A1* | 9/2007 | Hiraga et al. ............ 348/208.4 |

| 2008/0298789 | A1* | 12/2008 | Ohki ............... 396/52 |

FOREIGN PATENT DOCUMENTS

| JP | 07-283999 | 10/1995 |
| JP | 11-086003 | 3/1999 |
| JP | 2003-078807 | 3/2003 |
| JP | 2005-038396 | 2/2005 |
| JP | 2005-321902 | 11/2005 |

* cited by examiner

Primary Examiner—Jason Whipkey
(74) Attorney, Agent, or Firm—K&L Gates LLP

(57) ABSTRACT

An image processing device is provided. The image processing device includes per-block motion vector calculating means for calculating a motion vector between two pictures of an image input in picture units sequentially, performing block matching in each of divided regions obtained by dividing one picture into a plurality of regions, and calculating a per-block motion vector for each of said divided regions. The image processing device also includes translation amount calculating means for calculating an amount of translation of the other of said two pictures with respect to one of said two pictures from a plurality of said per-block motion vectors calculated by said per-block motion vector calculating means. The image processing device also includes rotation angle calculating means for calculating a rotation angle of the other of said two pictures with respect to one of said two pictures from the plurality of said per-block motion vectors calculated by said per-block motion vector calculating means. The image processing device also includes rotation and translation adding means for superimposing a plurality of pictures on each other using the amount of translation calculated by said translation amount calculating means and the rotation angle calculated by said rotation angle calculating means.

19 Claims, 67 Drawing Sheets

FIG. 4

$$\text{SUM\_TBL}(x, y) = \sum_i \text{TBLi}(X, Y)$$

$\cdots$ (EQUATION 3)

FIG. 5

DETECTION FRAME NUMBER i

| 0 | 1 | 2 | 3 |
|---|---|---|---|
| 4 | 5 | 6 | 7 |
| 8 | 9 | 10 | 11 |
| 12 | 13 | 14 | 15 |

LETTING (Vxi, Vyi) BE THE MOTION VECTOR OF A BLOCK OF NUMBER i, AN AMOUNT OF TRANSLATION ($\alpha, \beta$) IS AS FOLLOWS.

$\alpha = \dfrac{1}{N} \Sigma \text{Vxi}$  $\cdots$ (EQUATION 4)

$\beta = \dfrac{1}{N} \Sigma \text{Vyi}$  $\cdots$ (EQUATION 5)

WHERE N IS A TOTAL NUMBER OF BLOCK FOR SUMMATION

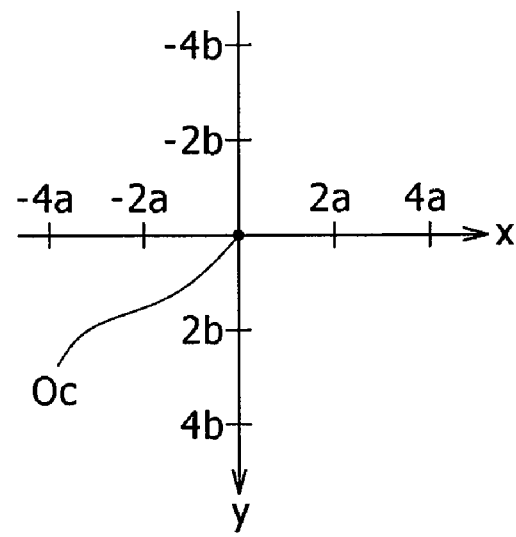

FIG. 8

(A)
$$W_i = \begin{bmatrix} \cos\gamma & -\sin\gamma \\ \sin\gamma & \cos\gamma \end{bmatrix} \begin{bmatrix} P_{yi} \cdot a \\ P_{yi} \cdot b \end{bmatrix} + \begin{bmatrix} \alpha \\ \beta \end{bmatrix} - \begin{bmatrix} P_{yi} \cdot a \\ P_{yi} \cdot b \end{bmatrix}$$

$$\doteq \begin{bmatrix} 1 & -\gamma \\ \gamma & 1 \end{bmatrix} \begin{bmatrix} P_{yi} \cdot a \\ P_{yi} \cdot b \end{bmatrix} + \begin{bmatrix} \alpha \\ \beta \end{bmatrix} - \begin{bmatrix} P_{yi} \cdot a \\ P_{yi} \cdot b \end{bmatrix}$$

$$= \begin{bmatrix} -P_{yi} \cdot b \cdot \gamma + \alpha \\ P_{yi} \cdot a \cdot \gamma + \beta \end{bmatrix} \quad \cdots \text{(EQUATION 6)}$$

(B)
$$\varepsilon_i^2 = (W_i - V_i)^2 \quad \cdots \text{(EQUATION 7)}$$

(C)
$$\frac{\delta \varepsilon_i^2}{\delta \gamma} = 2|W_i - V_i| \frac{\delta(W_i - V_i)}{\delta \gamma}$$

$$= 2 \begin{vmatrix} (-P_{yi} \cdot b \cdot \gamma + \alpha - V_{xi}) & (-P_{yi} \cdot b) \\ (-P_{yi} \cdot a \cdot \gamma + \alpha - V_{xi}) & (-P_{yi} \cdot a) \end{vmatrix}$$

$$\cdots \text{(EQUATION 8)}$$

(D)
FROM $\sum \frac{\delta \varepsilon_i^2}{\delta \gamma} = 0$ $$\gamma = \frac{\alpha \sum P_{yi} - \sum(V_{xi} \cdot P_{yi})}{b \sum (P_{yi}^2)} \text{ AND}$$

$$\gamma = -\frac{\beta \sum P_{xi} - \sum(V_{yi} \cdot P_{yi})}{a \sum (P_{yi}^2)} \quad \cdots \text{(EQUATION 9)}$$

(E)
$$\therefore \gamma = \frac{1}{2} \left[ \frac{\alpha \sum P_{yi} - \sum(V_{xi} \cdot P_{yi})}{b \sum (P_{yi}^2)} - \frac{\beta \sum P_{xi} - \sum(V_{xi} \cdot P_{yi})}{a \sum (P_{yi}^2)} \right]$$

$$\cdots \text{(EQUATION 10)}$$

FIG. 10

| CONDITIONS WITH RESPECT TO AGGREGATE SAD TABLE AND AGGREGATE MOTION VECTOR | LABEL | SCORE |
|---|---|---|
| [FIRST CONDITION]<br>BLK_Vi = SUM_V<br>COORDINATE POSITION OF MINIMUM VALUE MINi OF SAD TABLE TBLi AND COORDINATE POSITION OF MINIMUM VALUE MINs OF AGGREGATE SAD TABLE ARE EQUAL TO EACH OTHER | TOP | 4 |
| [SECOND CONDITION]<br>COORDINATE POSITION OF MINIMUM VALUE MINi OF SAD TABLE TBLi IS ADJACENT TO AND DIFFERENT BY ONE COORDINATE VALUE FROM COORDINATE POSITION OF MINIMUM VALUE MINs OF AGGREGATE SAD TABLE | NEXT_TOP | 2 |
| [THIRD CONDITION]<br>DIFFERENCE BETWEEN MINIMUM VALUE MINi AND SAD VALUE AT COORDINATE POSITION CORRESPONDING TO COORDINATE POSITION OF MINIMUM VALUE MINs OF AGGREGATE SAD TABLE IN SAD TABLE TBLi IS EQUAL TO OR SMALLER THAN THRESHOLD VALUE | NEAR_TOP | 1 |
| OTHERS | OTHERS | 0 |

VECTOR REDUCTION  1/n = 1/4

$$dx = \frac{\sum(Sxy \cdot Kx)}{4\sum Sxy - 6\sum(Sxy \cdot Kx^2)} \quad \cdots \text{(EQUATION A)}$$

$$dy = \frac{\sum(Sxy \cdot Ky)}{4\sum Sxy - 6\sum(Sxy \cdot Ky^2)} \quad \cdots \text{(EQUATION B)}$$

WHERE WHEN x = -1, Kx = -1     WHEN y = -1, Ky = -1
      WHEN x = 0, Kx = 0       WHEN y = 0, Ky = 0
      WHEN x = 1, Kx = 1       WHEN y = 0, Ky = 1

$$dx = \frac{8\sum(Sxy \cdot Kx)}{25\sum Sxy - 20\sum(Sxy \cdot Kx^2)} + \Delta x$$

... (EQUATION C)

$$dy = \frac{8\sum(Sxy \cdot Ky)}{25\sum Sxy - 20\sum(Sxy \cdot Ky^2)} + \Delta y$$

... (EQUATION D)

SECTION Ra $$u = \frac{2S_3 + 11S_2 + 16S_1 - 7S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)}$$

··· (EQUATION E)

SECTION Rb $$u = \frac{S_3 + 4S_2 + 5S_1 - 2S_0 + \sqrt{(S_3 - 5S_2 + 5S_1 + S_0)^2 + (S_2 - S_0)(S_1 - S_3)}}{3(S_3 - 3S_2 + 3S_1 - S_0)}$$

··· (EQUATION F)

SECTION Rc $$u = \frac{-4S_3 + 7S_2 - 2S_1 - S_0 + \sqrt{(4S_3 - 7S_2 + 2S_1 + S_0)^2 + 15(S_3 - 3S_2 + 3S_1 - S_0)(S_1 - S_3)}}{3(S_3 - 3S_2 + 3S_1 - S_0)}$$

··· (EQUATION G)

FIG.42

(E)
↓
CALCULATE AMOUNT OF TRANSLATION ($\alpha$, $\beta$) OF FRAME — S91
↓
CALCULATE ROTATION ANGLE $\gamma$ OF FRAME — S92
↓
CALCULATE ERROR ERRi FOR EACH BLOCK AND SUM TOTAL $\Sigma$ERRi — S93
↓
$\Sigma$ERRi < $\theta$th 8? — S94
- NO → SET MASK FLAG TO BLOCK WITH MAXIMUM ERROR ERRi — S95 → (F)
- YES → END

FIG.43

LETTING Pi BE THE CENTRAL POINT OF EACH TARGET BLOCK, C BE THE CENTRAL POINT (CENTER OF GRAVITY) OF ALL DETECTION FRAMES, AND R BE A ROTATING MATRIX, AN ERROR ERRi OF THE MOTION VECTOR Vi OF EACH BLOCK IS $$\text{ERRi} = \left| R \cdot \vec{CPi} - \vec{CPi} + \begin{bmatrix} \alpha \\ \beta \end{bmatrix} - V_n \right| \quad \cdots \text{(EQUATION H)}$$

where $R = \begin{bmatrix} \cos\gamma & -\sin\gamma \\ \sin\gamma & \cos\gamma \end{bmatrix} \doteq \begin{bmatrix} 1 & -\gamma \\ \gamma & 1 \end{bmatrix}$

PRIOR ART

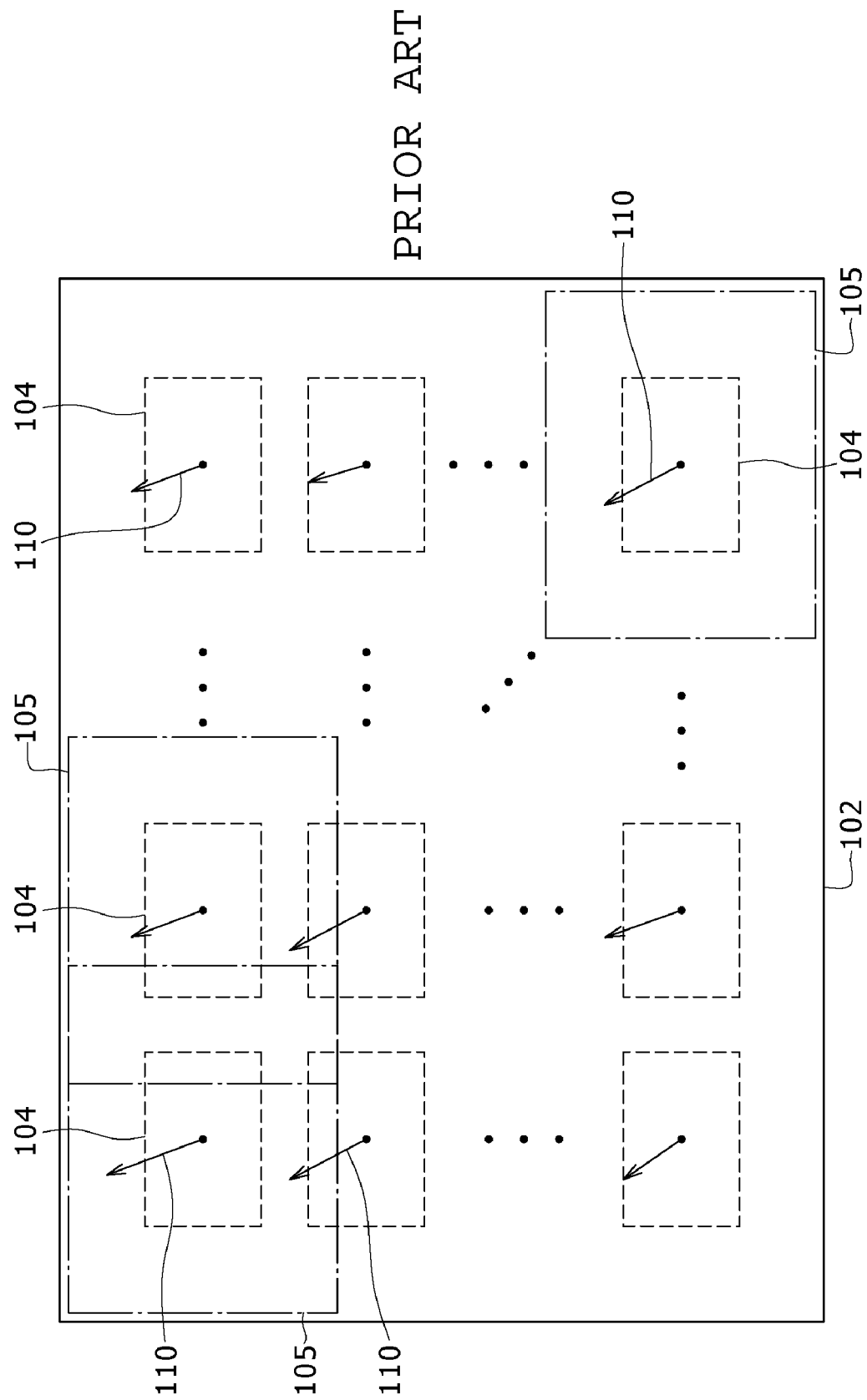

US 7,817,185 B2

IMAGE PROCESSING DEVICE, IMAGE PROCESSING METHOD, IMAGE PICKUP DEVICE, AND IMAGE PICKUP METHOD FOR SUPERIMPOSING A PLURALITY OF PICTURES ON EACH OTHER

CROSS REFERENCES TO RELATED APPLICATIONS

The present application claims priority to Japanese Patent Application JP 2006-164209 filed with the Japan Patent Office on Jun. 14, 2006, the entire contents of which being incorporated herein by reference.

BACKGROUND

The present disclosure relates to an image processing device, an image processing method, an image pickup device, and an image pickup method that can correct a so-called hand movement component included in image information obtained by image pickup in an image pickup device such as a digital still camera or a video camera, for example, and thereby obtain an image free from the hand movement component.

Generally, when photographing is performed with an image pickup device such as a digital still camera, a video camera or the like held by hand, vibration of the image pickup device due to hand movement at the time of the photographing appears as a vibration in a picture unit of a picked-up image.

As methods for correcting the vibration of the picked-up image due to such hand movement, optical hand movement correction systems using a gyro (angular velocity) sensor have been dominant in the recent market with a reduction in cost, an improvement in performance, and a reduction in size of the gyro sensor.

Recently, a new problem has arose as a result of rapid spreading of digital still cameras and concurrent sharp increases in the number of pixels. The problem is that although hand movement correction is strongly desired also for still images at times of low illuminance (long exposure time), there is only a solution using a sensor such as a gyro sensor or the like, so that weak points and other problems of the gyro sensor, such for example as low detection precision of the gyro sensor itself, are being revealed.

Hand movement corrections used for still images in devices for consumer use currently available on the market all measure a hand movement vector using a gyro sensor or an acceleration sensor, and feed back the hand movement vector to a mechanism system to perform high-speed control so as to prevent blurring of an image projected on an image sensor such as a CCD (Charge Coupled Device) imager, a CMOS (Complementary Metal Oxide Semiconductor) imager or the like.

Proposed as the mechanism system referred to here is a lens, a prism, or an imager (or a module integral with the imager), and control of the lens, the prism, or the imager is referred to as a lens shift, a prism shift, or an imager shift, respectively.

As long as hand movement correction is made by such a method, it is simply not possible to make correction with a pixel precision because of an accumulation of not only precision errors of the gyro sensor itself as mentioned above but also a delay in feedback to the mechanism system or errors in prediction for avoiding a feedback delay and control errors of the mechanism system.

Even though as mentioned above, the hand movement corrections using sensors in the present situation have a serious problem of being unable to increase precision in principle, the hand movement corrections are valued highly in the market because the hand movement corrections are short of correcting hand movement but are able to reduce hand movement.

However, as the number of pixels is expected to be increasingly larger in the future and as pixel size is reduced, it is a matter of time before the market realizes that a gap between a correction limit and pixel precision will inevitably be widened increasingly.

On the other hand, as another method for correcting the vibration of a picked-up image due to hand movement, a sensorless hand movement correction method is known which calculates a motion vector of a picture unit of the picked-up image, and shifts reading positions of picked-up image data stored in an image memory on the basis of the motion vector, thereby making hand movement correction.

As a method for detecting a motion vector of a picture unit of the picked-up image from picked-up image information itself, block matching is known which determines correlation between picked-up images of two pictures. A sensorless hand movement correction method using this block matching also has advantages of being able to detect a hand movement vector with a pixel precision including a rotation component in a roll-axis direction in principle and making it possible to reduce size and weight of an image pickup device because a need for mechanical parts such as a gyro sensor and the like is eliminated.

FIG. 71 and FIG. 72 show a schematic representation of an outline of block matching. FIG. 73 is a typical example of a flowchart of a block matching process.

Block matching is a method that calculates a motion vector in a unit of one picture between a reference picture of picked-up images from an image pickup device unit as a picture of interest and an original picture as a picked-up image picture preceding the reference picture by one picture, for example, by calculating correlation between the reference picture and the original picture in blocks as rectangular regions of predetermined size.

Incidentally, while a picture in this case refers to an image formed by image data of one frame or one field, suppose in the present specification that for convenience of description, a picture is formed by one frame, and a picture is referred to as a frame. Thus, a reference picture is referred to as a reference frame, and an original picture will be referred to as an original frame (target frame).

For example, the image data of the reference frame is the image data of a present frame from the image pickup device unit, or image data obtained by storing the image data of a present frame in a frame memory and delaying the image data by one frame. The image data of the original frame is image data obtained by further storing the image data of the reference frame in a frame memory and delaying the image data by one frame.

In block matching, as shown in FIG. 71, a target block 103 formed by a rectangular region of a predetermined size including a plurality of pixels in a horizontal direction and a plurality of lines in a vertical direction is set at an arbitrary predetermined position in the original frame 101.

On the other hand, in the reference frame 102, a projected image block 104 (see a dotted line in FIG. 71) of the target block is assumed at the same position as the position of the target block 103 in the original frame, a search range 105 (see alternate long and short dash lines in FIG. 71) is set with the projected image block 104 of the target block as a center, and a reference block 106 having the same size as the target block 103 is considered.

Then, the reference block 106 is moved to positions within the search range 105 in the reference frame 102. Correlation between image contents included in the reference block 106 at each of the positions and image contents of the target block 103 is determined. The position of the reference block 106 at which position the correlation is strongest is detected as a position to which the target block 103 in the original frame is moved in the reference frame 102. Then, an amount of positional displacement between the detected position of the reference block 106 and the position of the target block is detected as a motion vector as a quantity including a direction component.

In this case, the reference block 106 is moved in the search range 105 by a unit of one pixel or a plurality of pixels in the horizontal direction and the vertical direction, for example. Hence, a plurality of reference blocks are set within the search range 105.

The correlation between the target block 103 and the reference block 106 moved within the search range 105 is detected by obtaining a sum total of absolute values of differences between the luminance values of all pixels within the target block 103 and the luminance values of corresponding pixels within the reference block 106 (the sum total of the absolute values of the differences will be referred to as a difference absolute value sum, and the difference absolute value sum will hereinafter be described as a SAD (Sum of Absolute Difference) value). That is, the reference block 106 at a position of a minimum SAD value is detected as a reference block having the strongest correlation, and an amount of positional displacement of the detected reference block 106 with respect to the position of the target block 103 is detected as a motion vector.

In block matching, an amount of positional displacement of each of a plurality of reference blocks 106 set within the search range 105 with respect to the position of the target block 103 is represented by a reference vector 107 (see FIG. 71) as a quantity including a direction component. The reference vector 107 of each reference block 106 has a value corresponding to the position of the reference block 106 in the reference frame 102. In the existing block matching, the reference vector of the reference block 106 from which a minimum SAD value is obtained is detected as a motion vector corresponding to the target block 103.

Generally, in the block matching, as shown in FIG. 72, SAD values between a plurality of respective reference blocks 106 set within the search range 105 and the target block 103 (the SAD values will hereinafter be referred to as SAD values of the reference blocks for simplicity of description) are stored in a memory in correspondence with respective reference vectors 107 corresponding to the positions of the respective reference blocks 106 within the search range 105. A reference block 106 having a minimum SAD value among the SAD values of all the reference blocks 106 which SAD values are stored in the memory is detected. Thereby the motion vector 110 corresponding to the target block 103 is detected.

A table in which the SAD values of the respective reference blocks 106 are stored in correspondence with the respective reference vectors 107 corresponding to the positions of the plurality of reference blocks 106 set within the search range 105 is referred to as a difference absolute value sum table (hereinafter referred to as a SAD table). A SAD table 108 in FIG. 72 illustrates this table. The SAD values of the respective reference blocks 106 in the SAD table 108 are referred to as SAD table elements 109.

Incidentally, in the above description, the positions of the target block 103 and the reference blocks 106 refer to arbitrary specific positions, for example central positions of the blocks. A reference vector 107 indicates an amount of displacement (including a direction) between the position of the projected image block 104 of the target block 103 and the position of the reference block 106 in the reference frame 102. In the example of FIG. 71 and FIG. 72, the target block 103 is situated at the central position of the frame.

The reference vectors 107 corresponding to the respective reference blocks 106 represent displacements of the positions of the respective reference blocks 106 with respect to the position corresponding to the target block 103 in the reference frame 102. Therefore, when the position of a reference block 106 is specified, the value of the reference vector corresponding to the position is also specified. Hence, when the address of the SAD table element of a reference block in the memory of the SAD table 108 is specified, the corresponding reference vector is specified.

The process of the existing block matching described above is described below with reference to a flowchart of FIG. 73 as follows.

First, one reference block Ii within the search range 105 is specified. This is equivalent to specifying the reference vector corresponding to the reference block Ii (step S1). In FIG. 73, (vx, vy) denotes a position indicated by the specified reference vector when the position of the target block in the frame is set as a reference position (0, 0). vx is a component of an amount of displacement by the specified reference vector from the reference position in the horizontal direction. vy is a component of an amount of displacement by the specified reference vector from the reference position in the vertical direction.

In this case, the amounts of displacement vx and vy are values in units of pixels. For example, vx=+1 indicates a position shifted by one pixel in the right direction of the horizontal direction with respect to the reference position (0, 0). vx=−1 indicates a position shifted by one pixel in the left direction of the horizontal direction with respect to the reference position (0, 0). For example, vy=+1 indicates a position shifted by one pixel in the downward direction of the vertical direction with respect to the reference position (0, 0). vy=−1 indicates a position shifted by one pixel in the upward direction of the vertical direction with respect to the reference position (0, 0).

As described above, (vx, vy) denotes the position indicated by a reference vector with respect to the reference position (hereinafter referred to as the position indicated by the reference vector for simplicity), and corresponds to each reference vector. That is, supposing that vx and vy are integers, (vx, vy) represents each reference vector. Hence, in the following description, a reference vector indicating the position (vx, vy) may be described as a reference vector (vx, vy).

With the central position of the search range set as the position of the target block, that is, the reference position (0, 0), when the search range is defined by ±Rx in the horizontal direction, and the search range is defined by ±Ry in the vertical direction, the search range is expressed as $$-Rx \leq vx \leq +Rx, -Ry \leq vy \leq +Ry$$

Next, coordinates (x, y) of one pixel within the target block Io are specified (step S2). Next, the absolute value α of a difference between a pixel value Io(x, y) at the specified coordinates (x, y) within the target block Io and a pixel value Ii(x+vx, y+vy) at a corresponding pixel position within the reference block Ii is calculated (step S3). That is, the difference absolute value α is calculated as $$\alpha = |Io(x,y) - Ii(x+vx, y+vy)| \quad \text{(Equation 1)}$$

Then, the calculated difference absolute value α is added to a previous SAD value at an address (table element) indicated by the reference vector (vx, vy) of the reference block Ii, and a SAD value as a result of the addition is written back to the address (step S4). That is, when the SAD value corresponding to the reference vector (vx, vy) is expressed as SAD(vx, vy), the SAD value is calculated as $$SAD(vx, vy) = \Sigma\alpha = \Sigma|Io(x,y) - Ii(x+vx, y+vy)| \quad \text{(Equation 2)}$$

The SAD value is then written to the address indicated by the reference vector (vx, vy).

Next, whether the above-described operation has been performed for pixels at all coordinates (x, y) within the target block Io is determined (step S5). When it is determined that the operation has not yet been completed for the pixels at all the coordinates (x, y) within the target block Io, the process returns to step S2 to specify a pixel position at next coordinates (x, y) within the target block Io and repeat the process from step S2 on down.

When it is determined in step S5 that the above-described operation has =been performed for the pixels at all the coordinates (x, y) within the target block Io, it is determined that the calculation of the SAD value for the reference block in question is completed. Then, whether the above-described operation process has been completed for all reference blocks, that is, all reference vectors (vx, vy) within the search range is determined (step S6).

When it is determined in step S6 that there is a reference vector (vx, vy) for which the above-described operation process has not yet been completed, the process returns to step S1 to set the next reference vector (vx, vy) for which the above-described operation process has not been completed, and the process repeats from step S1 on down.

Then, when it is determined in step S6 that there is no reference vector (vx, vy) for which the above-described operation process has not been completed within the search range, it is determined that a SAD table is completed. A minimum SAD value is detected in the completed SAD table (step S7). Then, a reference vector corresponding to an address of the minimum SAD value is detected as a motion vector corresponding to the target block Io (step S8). When the minimum SAD value is written as SAD (mx, my), the intended motion vector is calculated as a vector (mx, my) indicating a position (mx, my).

Thus the process of detecting the motion vector corresponding to one target block by block matching is ended.

In practice, it is difficult to obtain a high-precision hand movement vector of the reference frame with respect to the original frame from the motion vector corresponding to one target block. Therefore, in the original frame, a plurality of target blocks are set so as to cover the entire range of the original frame. On the other hand, in the reference frame, as shown in FIG. 74, search ranges 105, 105, . . . are set for projected images 104, 104, . . . of the plurality of target blocks, respectively, and motion vectors 110, 110, . . . corresponding to the target blocks are detected in the respective search ranges.

Then, the hand movement vector (global motion vector) of the reference frame with respect to the original frame is detected from the plurality of detected motion vectors 110, 110, . . . .

As a main method for detecting the hand movement vector (global motion vector) from the plurality of motion vectors 110, a method has been proposed which makes a majority decision based on the plurality of motion vectors, that is, which sets a maximum number of motion vectors that are equal to each other in direction and magnitude among the plurality of motion vectors 110 as global motion vector. In addition, a method combining the method of majority decision with reliability evaluation based on an amount of change (frequency) of the motion vector in a direction of a time axis has been proposed.

Most of sensorless hand movement corrections as existing art, as typified by Patent Document 1 (Japanese Patent Laid-Open No. 2003-78807), are targeted for moving images. As methods for implementing sensorless hand movement correction for still images, a few methods have been proposed, including Patent Document 2 (Japanese Patent Laid-Open No. Hei 7-283999). This Patent Document 2 is an algorithm of consecutively taking still images in short exposure times such that a hand movement component is not produced, obtaining hand movement vectors between the still images, adding together the plurality of still images taken consecutively while moving the still images according to the hand movement vectors, and finally obtaining a high picture quality (high resolution) still image free from hand movement components and low illuminance noise.

Patent Document 3 (Japanese Patent Laid-Open No. 2005-38396) can be recited as a practical proposal on a feasible level. A device disclosed in Patent Document 3 includes means for obtaining a motion vector in a size resulting from reducing conversion of an image and means for sharing an identical SAD table between a plurality of blocks. The reducing conversion of an image and the sharing of a SAD table between a plurality of blocks are a very good method for realizing reduction of SAD table size, and are used in other fields for motion vector detection and scene change detection in an MPEG (Moving Picture Experts Group) image compression system, for example.

However, the algorithm of Patent Document 3 has problems in that the reducing conversion of an image and memory (DRAM (Dynamic RAM (Random Access Memory))) access at the time of the reducing conversion consume time and memory space, and because the plurality of blocks make time-division access to the SAD table, memory access is greatly increased and this process also takes time. Real-time performance and reduction of a system delay time are both required in hand movement correction for moving images, and therefore the process time becomes a problem.

Further, the reducing conversion of an original image requires that a low-pass filter for removing aliasing (folding distortion) and low illuminance noise be implemented as preprocessing for the reduction process. However, characteristics of the low-pass filter are changed according to a reduction scaling factor, and especially when a low-pass filter in a vertical direction is a multiple-tap digital filter, many line memories and operation logics are required, thus presenting a problem of an increase in circuit scale.

In a hand movement correction system for moving images, rough real-time detection of a hand movement vector with importance attached to processing time rather than precision is desired, and even sensorless hand movement correction methods according to the existing art provide satisfactory results in most situations.

On the other hand, existing technology in hand movement correction systems for still images is often proposed on an idea level, and often does not assume that the number of pixels is on a level of 10 millions today. Therefore, consideration is not given to a rotation component of hand movement, or even if consideration is given to a rotation component of hand movement, a massive amount of calculation is required, for example. Thus there is a lack of practical consideration targeted for current mobile devices such as digital still cameras and the like.

As described above, however, it is expected that image pickup devices such as digital cameras and the like will become increasingly higher in pixel density and higher performance will be required thereof in the future. In such a situation, realization of sensorless hand movement correction at a time of photographing a still image without using a gyro (angular velocity) sensor is of great significance.

Accordingly, as described above, it is promising to calculate a hand movement motion vector on a sensorless basis using block matching and make hand movement correction using the detected motion vector. In addition, it is important to solve the above-described problems.

In view of the above, it is desirable to provide a method and a device for image processing that can solve the problems of the existing sensorless hand movement correction system described above, and provide images of high picture quality.

SUMMARY

According to an embodiment of the present invention, there is provided an image processing device including: per-block motion vector calculating means for calculating a motion vector between two pictures of an image input in picture units sequentially, performing block matching in each of divided regions obtained by dividing one picture into a plurality of regions, and calculating per-block motion vectors for the respective divided regions; translation amount calculating means for calculating an amount of translation of the other of the two pictures with respect to one of the two pictures from a plurality of the per-block motion vectors calculated by the per-block motion vector calculating means; rotation angle calculating means for calculating a rotation angle of the other of the two pictures with respect to one of the two pictures from the plurality of the per-block motion vectors calculated by the per-block motion vector calculating means; and rotation and translation adding means for superimposing a plurality of pictures on each other using the amount of translation calculated by the translation amount calculating means and the rotation angle calculated by the rotation angle calculating means.

In the image processing device according to the foregoing embodiment of the present invention, the amount of translation and the rotation angle of the reference picture with respect to the original picture are calculated from the plurality of per-block motion vectors calculated by the per-block motion vector calculating means. Then, using the calculated amount of translation and the calculated rotation angle, the plurality of pictures are superimposed sequentially. An image as a result of the superimposition is an image of high picture quality from which a hand movement component is removed when the image is a picked-up image, for example.

The image processing device according to the foregoing embodiment of the present invention further includes: global motion vector calculating means for calculating a global motion vector of a whole of the other of the two pictures with respect to one of the two pictures; and evaluating means for evaluating each of the plurality of per-block motion vectors obtained by the per-block motion vector calculating means, using the global motion vector; wherein the other of the two pictures in which picture a number of per-block motion vectors given a high evaluation value by the evaluating means is smaller than a predetermined threshold value is excluded from the pictures superimposed on each other by the rotation and translation adding means.

According to the foregoing embodiment of the present invention, each of the plurality of per-block motion vectors is evaluated using the global motion vector of the whole of the reference picture with respect to the original picture, and the reference picture of low reliability in which the number of per-block motion vectors given a high evaluation value is smaller than a predetermined threshold value is excluded from the pictures superimposed on each other by the rotation and translation adding means.

Thus, only reference pictures of high reliability are superimposed on each other by the rotation and translation adding means. It can be expected that an image of higher picture quality free from a hand movement component will be obtained.

The image processing device according to the foregoing embodiment of the present invention further includes: global motion vector calculating means for calculating a global motion vector of a whole of the other of the two pictures with respect to one of the two pictures; and evaluating means for evaluating each of the plurality of per-block motion vectors obtained by the per-block motion vector calculating means, using the global motion vector; wherein the translation amount calculating means and the rotation angle calculating means calculate the amount of translation and the rotation angle from only a plurality of per-block motion vectors given a high evaluation value by the evaluating means.

According to the foregoing embodiment of the present invention, the amount of translation and the rotation angle are calculated using only per-block motion vectors of high reliability among the per-block motion vectors calculated by the per-block motion vector calculating means, so that an accurate amount of translation and an accurate rotation angle are calculated.

Thus, the rotation and translation adding means superimposes reference pictures on each other using the accurate amount of translation and the accurate rotation angle. It can be expected that an image of higher picture quality free from a hand movement component will be obtained.

In the foregoing embodiment of the present invention, the amount of translation and the rotation angle of the reference picture with respect to the original picture are calculated from the plurality of per-block motion vectors of the reference picture, the per-block motion vectors being calculated by the per-block motion vector calculating means. Using the calculated amount of translation and the calculated rotation angle, the plurality of pictures are superimposed sequentially. An image as a result of the superimposition is an image of high picture quality from which a hand movement component is removed when the image is a picked-up image, for example.

Additional features and advantages are described herein, and will be apparent from, the following Detailed Description and the figures.

BRIEF DESCRIPTION OF THE FIGURES

FIG. 4 is a diagram of assistance in explaining the outline of the embodiment of the image processing method;

FIG. 5 is a diagram of assistance in explaining a process of calculating the hand movement translation component of a frame in the embodiment of the image processing method;

FIG. 6 is a diagram of assistance in explaining the process of calculating the hand movement translation component of the frame in the embodiment of the image processing method;

FIGS. 7A, 7B, 7C, and 7D are diagrams of assistance in explaining a process of calculating the hand movement rotation component of a frame in the embodiment of the image processing method;

FIGS. 8(A), 8(B), 8(C), 8(D), and 8(E) are diagrams of assistance in explaining the process of calculating the hand movement rotation component of the frame in the embodiment of the image processing method;

FIG. 10 is a diagram of assistance in explaining an outline of an embodiment of the image processing method;

FIG. 42 is a part of the flowchart of assistance in explaining the other example of the process of detecting the translation component and the rotation component of the hand movement in the first embodiment of the image processing device;

FIG. 43 is a diagram of assistance in explaining the other example of the process of detecting the translation component and the rotation component of the hand movement in the first embodiment of the image processing device;

FIG. 74 is a diagram of assistance in explaining the process of calculating the motion vector by block matching.

DETAILED DESCRIPTION

Embodiments of an image processing method and an image processing device will hereinafter be described with reference to the drawings by taking examples in which embodiments of an image processing method and an image processing device are applied to an image pickup device and an image pickup method.

[Outline of an Embodiment of an Image Processing Method]

An embodiment, described below, is applied to a hand movement correcting system mainly for still images.

This embodiment sets an input image frame as a reference frame, and detects a motion vector between the input image frame and an original frame preceding the input image frame, for example an original frame delayed by one frame. Then, hand movement correction for a still image in the present embodiment is performed by superimposing a plurality of images photographed consecutively, for example 3-fps images on each other while making the hand movement correction.

Thus, the present embodiment superimposes a plurality of images taken consecutively while making hand movement correction on the photographed still images, and therefore provides a precision close to a pixel precision (one-pixel precision). The present embodiment detects not only translation components in a horizontal direction and a vertical direction between frames as a hand movement motion vector but also a rotation component between the frames, and superimposes the plurality of frames on each other after translation and rotational movement of a frame.

It is to be noted that the embodiment to be described below is not limited to use for still images and is essentially applicable also to moving images. In the case of moving images, because of real time performance, there is an upper limit to the number of frames to be added (number of frames to be superimposed) as later described. However, the embodiment can be applied with identical means to a system generating a moving image resulting from a high degree of noise reduction effect, by using the method of the present embodiment for each frame.

Also in the embodiment to be described below, in calculating a motion vector between two frames using the above-described block matching, as described above, a plurality of target blocks are set in the original frame, and block matching is performed for each of the plurality of target blocks.

Figure 2:
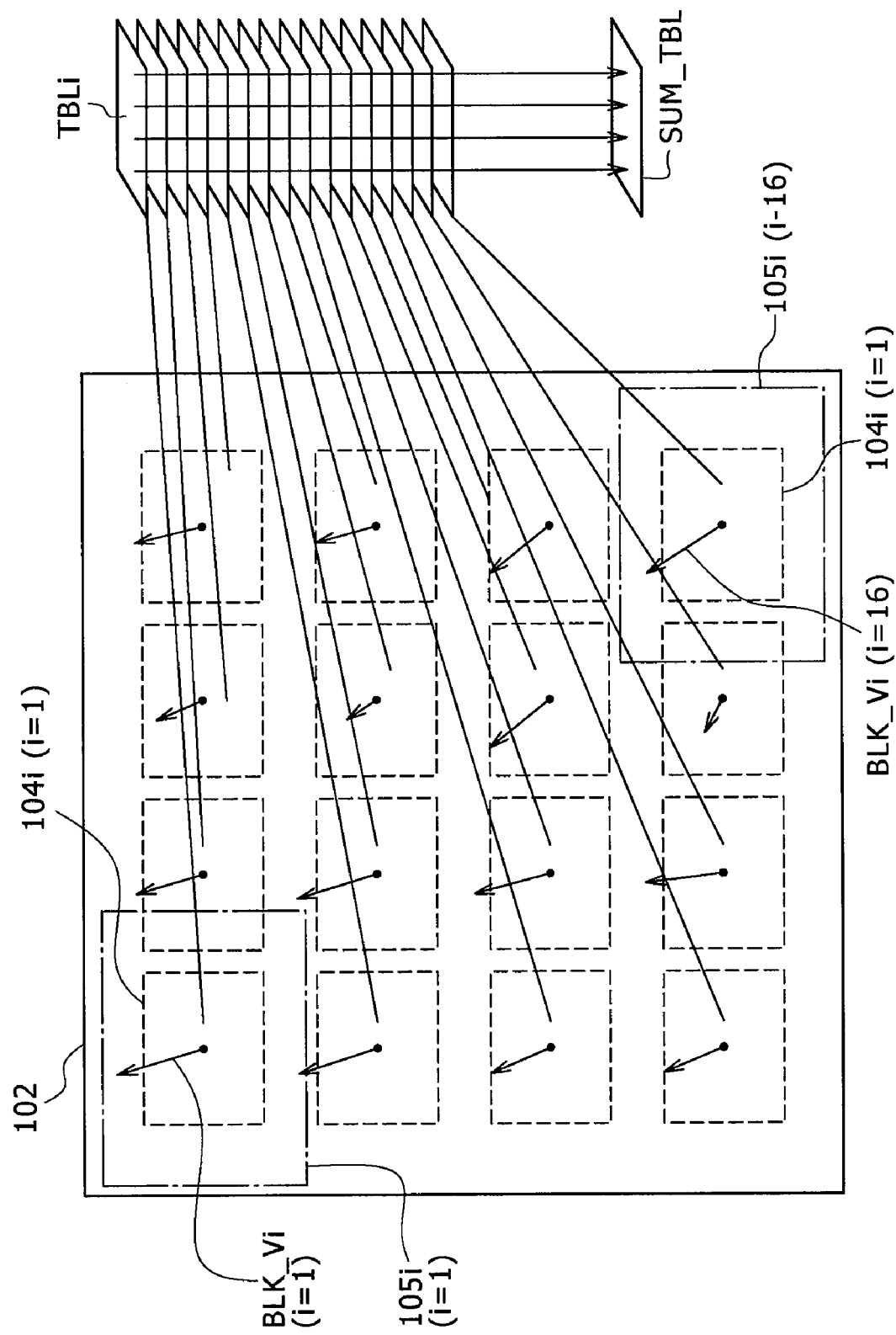
FIG. 2 is a diagram of assistance in explaining an outline of an embodiment of an image processing method.

The present embodiment to be described below sets for example 16 target blocks TGi (i=0, 1, 2, ..., 15) in the original frame, and sets, in the reference frame 102, 16 projected images 104$i$ (i=0, 1, 2, ..., 15) corresponding to the 16 target blocks TGi in the original frame, as shown in FIG. 2. Then, a search range 105$i$ (i=0, 1, 2, ..., 15) corresponding to each of the projected images is set, and a SAD table TBLi (i=0, 1, 2, ..., 15) for the corresponding target block is created in each search range 105$i$ (i=0, 1, 2, ..., 15).

Then, the present embodiment detects a motion vector for each target block, that is, a per-block motion vector BLK_Vi from each of the created SAD tables TBLi.

Then, a translation component and a rotation angle of the reference frame with respect to the original frame are calculated from the plurality of per-block motion vectors BLK_Vi, and the reference frame is superimposed on the original frame using the calculated translation component and the calculated rotation angle. When the original frame is sequentially updated to a next frame in each frame period, the above process is repeated to sequentially superimpose frames on each other, whereby an image of high quality from which effects of hand movement are eliminated can be obtained.

Figure 3:
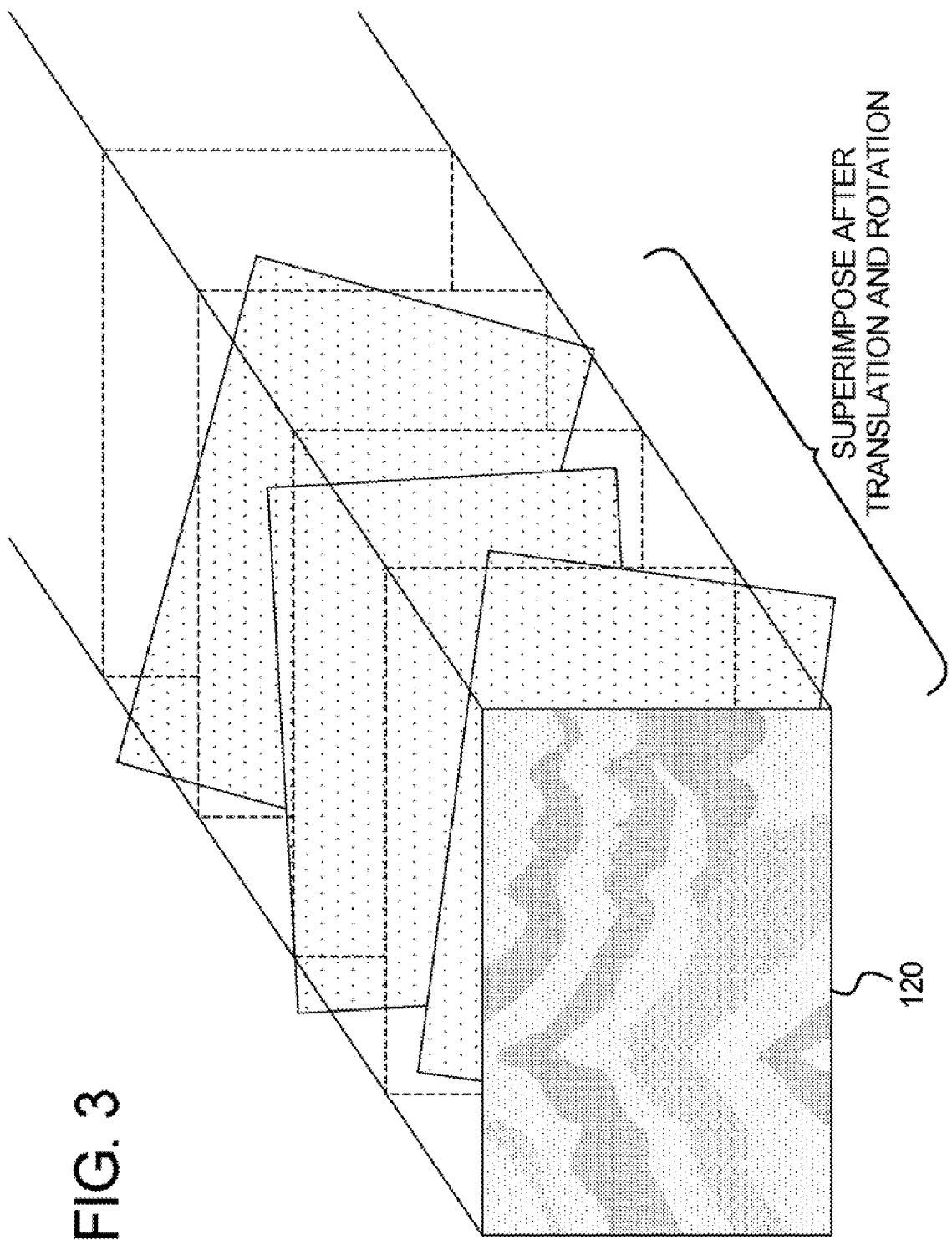
FIG. 3 is a diagram of assistance in explaining the outline of the embodiment of the image processing method.

In this case, when two or more frames are superimposed on each other, in practice, a first frame is set as a reference, and subsequent frames are superimposed on the first frame as shown in FIG. 3. Thus, amounts of translation and rotation angles between the second and subsequent frames to be superimposed and frames immediately preceding the second and subsequent frames to be superimposed are sequentially added up to result in an amount of translation and a rotation angle with respect to the first frame.

[First Example of Method of Calculating Amount of Translation and Rotation Angle]

One method of determining an amount of translation and a rotation angle between an original frame and a reference frame using block matching (block matching will be referred to as detection in the present specification) is a method of determining the amount of translation and the rotation angle from a global motion vector of the reference frame as a whole with respect to the original frame. That is, the global motion vector indicates a movement of the frame in question with respect to the preceding frame, and can thus be used as an amount of translation as it is.

Specifically, a component in a horizontal direction (x-direction) of the global motion vector is an amount of translation in the horizontal direction, and a component in a vertical direction (y-direction) of the global motion vector is an amount of translation in the vertical direction.

A relative rotation angle of a global motion vector obtained for a frame of interest this time (reference frame) with respect to a global motion vector obtained for a previous frame is a relative rotation angle of the frame of interest this time with respect to the previous frame.

As method for calculating the global motion vector in this case, a method can be employed which, as in the case of the existing block matching, makes a majority decision on the basis of per-block motion vectors BLK_Vi detected for 16 target blocks, and calculates, as the global motion vector, the per-block motion vector of a majority decision top (a maximum number of per-block motion vectors that are the same or equal to each other in magnitude and direction).

However, this method of calculating the per-block motion vector of the majority decision top as the global motion vector has a problem of detecting a wrong global motion vector (hand movement vector) when a moving image of a subject is taken and the subject during the taking of the moving image is for example a rippling water surface or a tree or grass bending before a wind. Because many of the recent digital cameras pick up and record not only still images but also moving images, the method of calculating the global motion vector by the majority decision system is not desirable in implementation.

Accordingly, the present embodiment calculates a global motion vector from an aggregate SAD table using aggregate SAD values to be described next.

Specifically, the present embodiment aggregates SAD values at reference block positions which values correspond to each other within a search range in which each of the SAD tables TBLi is obtained when the 16 SAD tables TBLi for the 16 target blocks created as described above are arranged in a vertical direction so as to be superimposed on each other as shown in FIG. 2, and thereby obtains aggregate sums of difference absolute values (referred to as aggregate SAD values). Then, an aggregate SAD table SUM_TBL for the plurality of reference block positions within one search range is created as a SAD table including the aggregate SAD values.

In this case, an aggregate SAD value SUM_TBL(x, y) at a coordinate position (x, y) in the aggregate SAD table SUM_TBL is, letting TBLi(x, y) be a SAD value at a corresponding coordinate position (x, y) in each SAD table TBLi, SUM_TBL(x, y)=TBL1(x, y)+TBL2(x, y)+ . . . +TBL16(x, y)=$\Sigma$TBLi(x, y) (see (Equation 3) in FIG. 4).

Then, the present embodiment detects a motion vector of the reference picture with respect to the original picture (global motion vector as a hand movement vector in the image pickup device) from the aggregate SAD table SUM_TBL.

As method for calculating the global motion vector from the aggregate SAD table SUM_TBL, a existing method can be used which detects the position of a minimum value of the aggregate SAD values in the aggregate SAD table SUM_TBL and detects a reference vector corresponding to the detected position of the minimum value of the aggregate SAD values as the global motion vector.

However, this method using the aggregate SAD value as the minimum value provides only a motion vector with a precision of a unit of one pixel. The present embodiment calculates the global motion vector by performing approximate surface interpolation using the aggregate SAD value at the position of the minimum value of the aggregate SAD values and a plurality of aggregate SAD values in the vicinity of the aggregate SAD value at the position of the minimum value of the aggregate SAD values. That is, the global motion vector can be calculated with a precision of less than a unit of one pixel by generating an approximate high-order surface using the aggregate SAD value at the position of the minimum value of the aggregate SAD values and a plurality of aggregate SAD values in the vicinity of the aggregate SAD value at the position of the minimum value of the aggregate SAD values, and detecting the position of a minimal value of the approximate high-order surface. A process of the approximate surface interpolation will be described later in detail.

Thus, because the aggregate SAD table including the aggregate SAD values is equivalent to a result of en bloc block matching of the entire frame, the global motion vector obtained from the aggregate SAD table is more accurate even in the case of a subject of a moving image as described above that is hard for the majority decision system to deal with.

It is accordingly possible to obtain an amount of translation and a rotation angle with respect to the original frame from the global motion vector obtained from the aggregate SAD table, and superimpose the frames on each other as described above.

Incidentally, the global motion vector obtained at this time is not limited to the aggregate motion vector obtained from the aggregate SAD table; for example, a per-block motion vector of a majority decision top obtained by the majority decision system may be set as global motion vector. However, the aggregate motion vector is desirable for reasons as described above.

[Second Example of Method of Calculating Amount of Translation and Rotation Angle]

As a method of calculating an amount of translation and a rotation angle, a method can be employed which determines the amount of translation and the rotation angle of a frame from a plurality of per-block motion vectors calculated for a reference frame, rather than calculating a global motion vector and calculating the amount of translation and the rotation angle using the calculated global motion vector.

The amount of translation of a frame is in principle obtained as average values of amounts of movement in a horizontal direction and a vertical direction of 16 per-block motion vectors. When search ranges for a plurality of projected images corresponding to a plurality of target blocks are referred to as detection frames, detection frame numbers i (=0, 1, 2, . . . , 15) can be given in one reference frame as shown in FIG. 5.

Then, letting Vxi be a horizontal direction component of a per-block motion vector of a detection frame number i, letting Vyi be a vertical direction component of the per-block motion vector of the detection frame number i, and expressing the per-block motion vector as (Vxi, Vyi), an amount of translation a in the horizontal direction (x-direction) and an amount of translation β in the vertical direction (y-direction) can be obtained as average values of horizontal direction components and vertical direction components of the 16 per-block motion vectors, as shown in (Equation 4) and (Equation 5) in FIG. 6.

The rotation angle γ of a frame can in principle be obtained using the 16 per-block motion vectors as follows.

First, as in FIG. 5, detection frame numbers for one reference frame are defined as shown in FIG. 7A. At this time, suppose that the size of one detection frame is 2a (horizontal direction) by 2b (vertical direction), as shown in FIG. 7A, where a =(Number of Horizontal Pixels of One Reference Block)+(Horizontal Interval (Number of Pixels) to Adjacent Reference Block)

b =(Number of Vertical Pixels of One Reference Block)+(Vertical Interval (Number of Pixels) to Adjacent Reference Block)

Next, a coordinate system is obtained as shown in FIG. 7B, with a center Oc of all the detection frames of the detection frame numbers 0 to 15 as an origin. Then, values Pxi and values Pyi corresponding to the detection frame numbers i are defined as shown in FIGS. 7C and 7D. The values Pxi and the values Pyi represent weights of distances in the horizontal direction (x-direction) and the vertical direction (y-direction) from the center Oc of all the detection frames to centers of the respective detection frames.

Using the values Pxi and the values Pyi, center coordinates of the detection frame of each detection frame number i can be expressed by (Pxi·a, Pyi·b).

Hence, letting (α, β) be the amount of translation of the frame and γ be the rotation angle of the frame, a theoretical per-block motion vector Wi of the detection frame number i can be expressed as in (Equation 6) shown in FIG. 8(A).

Incidentally, a measured rotation angle γ resulting from hand movement of a plurality of subjects in the case of 3 fps is $\gamma[\text{rad}] = \arctan \frac{1}{64} = 0.0156237$ It can therefore be assumed that $\cos\gamma \approx 1$ and $\sin\gamma \approx \gamma$. Thus the theoretical per-block motion vector Wi can be expressed as in (Equation 6).

Abbreviating an actually detected per-block motion vector BLK_Vi of the detection frame number i to Vi, an error $\epsilon i^2$ between the theoretical per-block motion vector Wi and the actually detected per-block motion vector Vi is expressed as in (Equation 7) in FIG. 8(B). Partial differentiation of the error with respect to the rotation angle γ is performed as in (Equation 8) in FIG. 8(C).

Incidentally, in FIG. 8(C), "δF/δγ" denotes the partial differentiation of a function F(γ) with respect to the rotation angle γ.

Assuming that the actually detected per-block motion vectors of the reference frame correctly include an actual rotation angle γ, a value obtained by partial differentiation with respect to the rotation angle γ of a sum total $\Sigma\epsilon i^2$ of errors of all of the plurality of per-block motion vectors Vi of the reference frame should be zero. Therefore the rotation angle γ is expressed as in (Equation 9) in FIG. 8(D).

Hence, the rotation angle γ to be determined of the reference frame can be determined from (Equation 10) shown in FIG. 8(E).

[Example of Method of Calculating Amount of Translation and Rotation Angle with Higher Precision]

In the case of a still image, even the amount of translation and the rotation angle obtained from the global motion vector or the plurality of per-block motion vectors may lack precision.

Accordingly, in view of this, the present embodiment calculates an amount of translation and a rotation angle with a higher precision, and superimposes a frame image using the high-precision amount of translation and the high-precision rotation angle.

As described above, due to a moving subject or the like, not all of a plurality of per-block motion vectors obtained for one reference frame are highly reliable from a viewpoint of detection of a hand movement vector.

Accordingly, the present embodiment determines reliability of a plurality of per-block motion vectors obtained for one reference frame as follows, and calculates an amount of translation and a rotation angle using only per-block motion vectors judged to be highly reliable. The precision of the calculated amount of translation and the calculated rotation angle is thereby improved.

That is, the present embodiment eliminates as much as possible motion vector components of a moving subject which components are not to be included in the motion vector of a picture as a whole which motion vector results from hand movement, so that the amount of translation and the rotation angle can be calculated with a higher precision.

For this, the present embodiment compares a global motion vector calculated for the reference frame in question, that is, a global motion vector obtained from an aggregate SAD table (this global motion vector will hereinafter be referred to as an aggregate motion vector) SUM_V in this example with a per-block motion vector BLK_Vi obtained from a SAD table TBLi (i=0, 1, 2, ..., 15) of each target block, and searches for highly reliable per-block motion vectors that are identical with or approximate to the global motion vector.

When the number of highly reliable per-block motion vectors is smaller than a predetermined threshold value, it is determined in the present embodiment that the frame in question is not to be used as a frame to be superimposed. Still image processing on the frame in question in the present embodiment is skipped to proceed to processing on a next frame.

When the number of highly reliable per-block motion vectors is larger than the threshold value, high-precision per-block motion vectors having a precision of less than one pixel as later described are calculated from SAD tables of target blocks corresponding to the calculated highly reliable per-block motion vectors. Then, the calculation of an amount of translation and the detection of a rotation angle as described above are performed using only the calculated high-precision per-block motion vectors.

In this case, the first example and the second example described above can be used in calculating the amount of translation.

When the above-described second example is used, for example, the amount of translation is calculated using high-precision per-block motion vectors obtained for only detection frames of highly reliable detection frame numbers i among the 16 detection frames shown in FIG. 5. In calculating the amount of translation, however, the present embodiment excludes, from objects for the calculation of the amount of translation, not only a detection frame of a detection frame number q that is low in reliability but also a per-block motion vector in a detection frame of a detection frame number (15−q) at a position symmetrical to the excluded detection frame number q with respect to the point of the center Oc of all the detection frames.

This is because in the present embodiment, consideration is given to frame rotation, and therefore when the per-block motion vector in one detection frame at a symmetric position with respect to the point of the center Oc is judged to be low in reliability and thus excluded from objects for the calculation of the amount of translation, an error is caused in a result of the calculation of the amount of translation unless the other per-block motion vector at the position symmetric to the one detection frame with respect to the point is excluded from objects for the calculation of the amount of translation.

At a time of calculating the rotation angle, on the other hand, only the per-block motion vector in the detection frame judged to be of low reliability is excluded from objects for the calculation of the rotation angle, and the high-precision per-block motion vector in the detection frame at the position symmetrical to the excluded detection frame with respect to the point is included in objects for the calculation of the rotation angle.

As described above, the amount of translation and the rotation angle of a frame are calculated using only detection frames of high reliability. It can thus be expected that the amount of translation and the rotation angle are calculated with high precision.

The determination of reliability in a frame unit as described above, that is, the determination of reliability of a plurality of per-block motion vectors within a frame is performed as follows.

Figure 9A:
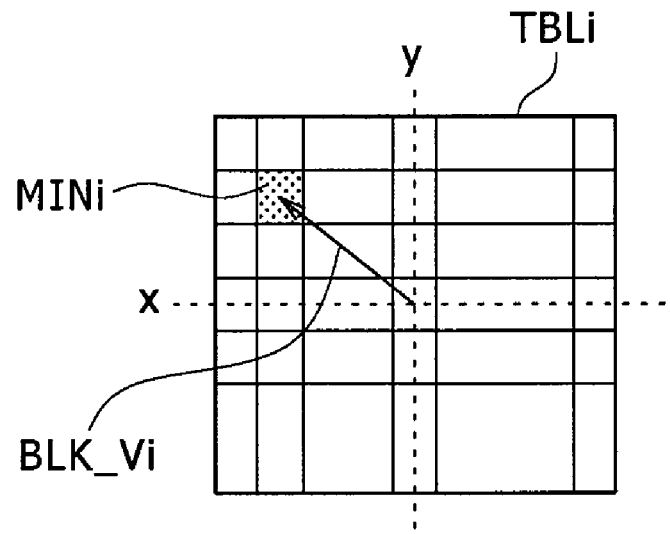
FIGS. 9A and 9B are diagrams of assistance in explaining an outline of an embodiment of the image processing method.
Figure 9B:
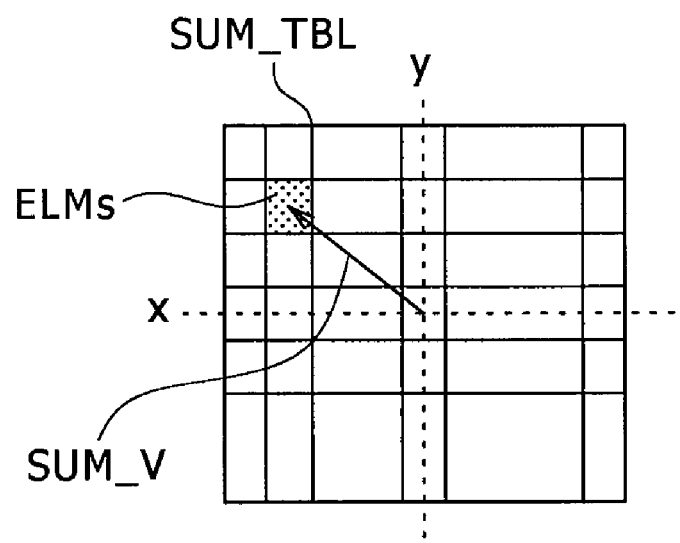

First, a SAD table TBLi corresponding to each of a plurality of target blocks, or 16 target blocks TGi (i=0, 1, 2, ..., 15) in this example which blocks are set in an original frame is obtained, and a per-block motion vector BLK_Vi (see FIG. 9A) is obtained from a coordinate position of a minimum SAD value MINi in the SAD table TBLi. Next, an aggregate SAD table SUM_TBL is obtained from 16 SAD tables TBLi according to (Equation 3) mentioned above, and an aggregate motion vector SUM_V (see FIG. 9B) is obtained from a coordinate position of a minimum SAD value MINs in the aggregate SAD table SUM_TBL.

Next, in the present embodiment, with the aggregate motion vector SUM_V, that is, the coordinate position of the minimum SAD value MINs in the aggregate SAD table SUM_TBL as a reference, condition judgment as shown in FIG. 10 is performed for each of the 16 target blocks on the basis of the per-block motion vector BLK_Vi (that is, the coordinate position of the minimum SAD value MINs in the aggregate SAD table SUM_TBL) and the SAD value of each of the 16 target blocks, and labeling and calculation of a score (evaluation score) as shown in FIG. 10 are performed.

Figure 11:
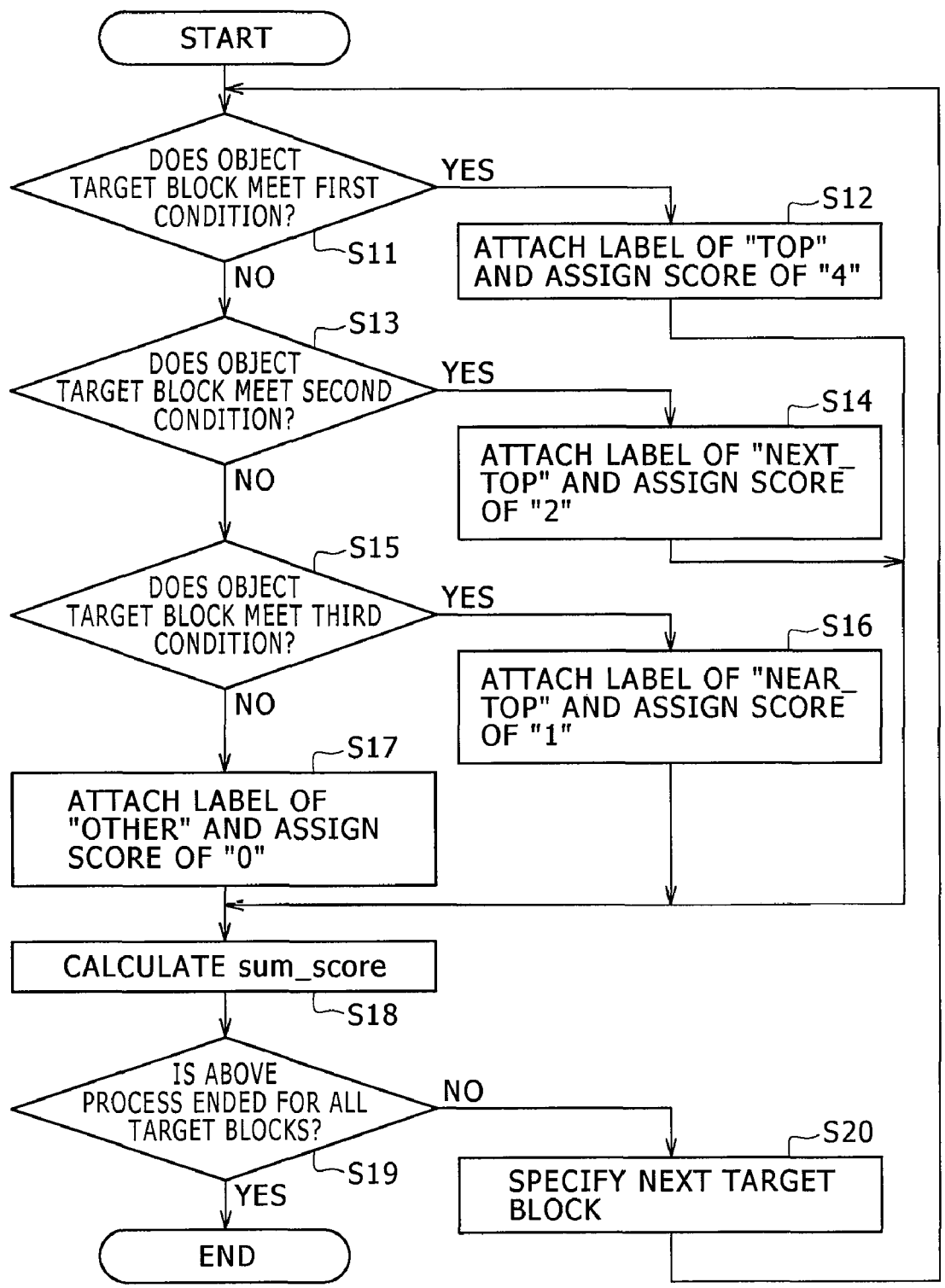
FIG. 11 is a flowchart of assistance in explaining the outline of the embodiment of the image processing method.

FIG. 11 is a flowchart representing an example of a process of the labeling and the score calculation. The process of FIG. 11 is for one reference frame, and thus the process of FIG. 11 is repeated for each frame.

First, a determination is made as to a first condition of whether a motion vector BLK_Vi obtained for an object target block for which labeling and score calculation are to be performed is equal to the aggregate motion vector SUM_V (step S11). This is equivalent to determining whether the coordinate position of a minimum SAD value MINi in the SAD table TBLi of the object target block is equal to the coordinate position of the minimum SAD value MINs in the aggregate SAD table SUM_TBL.

When it is determined that the object target block meets the first condition, the object target block is given a label of "TOP" and assigned a maximum score value of "4" in this example (step S12).

When it is determined that the object target block does not meet the first condition, whether the object target block meets a second condition is determined (step S13). The second condition is whether the motion vector BLK_Vi obtained for the object target block and the aggregate motion vector SUM_V are most adjacent vectors on the SAD table though the motion vector BLK_Vi and the aggregate motion vector SUM_V are not identical with each other. Specifically, the second condition is whether the coordinate position of the minimum SAD value MINi in the SAD table TBLi of the object target block and the coordinate position of the minimum SAD value MINs in the aggregate SAD table SUM_TBL are adjacent to each other and differ from each other by one coordinate value in a vertical direction, a horizontal direction, or a diagonal direction.

When it is determined that the object target block meets the second condition, the object target block is given a label of "NEXT_TOP" and assigned a score value of "2" in this example (step S14).

When it is determined that the object target block does not meet the second condition, whether the object target block meets a third condition is determined (step S15). The third condition is whether in the SAD table of the object target block, a difference between the SAD value (minimum SAD value MINi) at the coordinate position indicated by the per-block motion vector BLK_Vi and a SAD value at a coordinate position corresponding to the coordinate position (coordinate position of the minimum SAD value MINs) indicated by the aggregate motion vector SUM_V on the aggregate SAD table is equal to or smaller than a predetermined threshold value. In this case, it is desirable that the predetermined threshold value be converted to a threshold value for each pixel. This is because the present embodiment assumes hand movement correction with a precision of one pixel.

When it is determined that the object target block meets the third condition, the object target block is given a label of "NEAR_TOP" and assigned a score value of "1" in this example (step S16).

When it is determined that the object target block does not meet the third condition, the object target block is given a label of "OTHERS" and assigned a score value of "0" in this example (step S17).

After completion of the labeling and the score assignment in step S12, step S14, step S16, and step S17, the assigned score is cumulatively added to calculate a total score sum_score (step S18).

Next, whether the above process is completed for all of the 16 target blocks within one frame is determined (step S19). When the above process is not completed for all of the 16 target blocks, an instruction is given to perform the labeling and the score calculation for a next target block (step S20). Thereafter a return is made to step S11 to repeat the above-described process.

When it is determined that the above-described process is completed for all of the 16 target blocks within the one frame, the processing routine of the labeling and the score calculation for the 16 target blocks within the one frame is ended. At this time, the total score sum_score calculated in step S18 is a total of scores of all the 16 target blocks.

Incidentally, the flowchart of FIG. 11 is one example; the determination of whether the first condition is met, the determination of whether the second condition is met, and the determination of whether the third condition is met may be made in random order, and any of the determinations may be made first.

After the processing routine of the labeling and the score calculation for the 16 target blocks within the one frame as described above is ended, the calculated total score sum_score and a threshold value for reliability are compared with each other. At this time, when the total score sum_score is lower than the threshold value, it can be determined that the motion vectors obtained in the frame in question are of low reliability for detection of a global motion vector.

Alternatively, the number of per-block motion vectors of target blocks that meet the first condition and the second condition and are thus judged to be of high reliability and given the labels of "TOP" and "NEXT_TOP" is calculated. When the number is lower than a predetermined threshold value, it can be determined that the motion vectors obtained in the frame in question are of low reliability for detection of a global motion vector.

When the total score sum_score is the threshold value or higher, or when the number of per-block motion vectors of target blocks labeled "TOP" and "NEXT_TOP" is the predetermined threshold value or larger, it can be determined that the detection of a global motion vector obtained in the frame in question has a certain degree of reliability.

Thus, when the total score sum_score is the threshold value or higher, or when the number of per-block motion vectors of target blocks labeled "TOP" and "NEXT_TOP" is the predetermined threshold value or larger, the aggregate SAD table is re-generated using only SAD values of SAD tables of the highly reliable target blocks (labeled "TOP" and "NEXT_TOP") satisfying the first condition and the second condition. The aggregate motion vector as global motion vector is recalculated on the basis of the re-generated aggregate SAD table. The amount of translation and the rotation angle of the frame can be calculated from the recalculated aggregate motion vector.

The global motion vector obtained at this time is not limited to the aggregate motion vector obtained from the aggregate SAD table, and may be obtained by making a majority decision on the basis of highly reliable per-block motion vectors, for example.

In addition, instead of calculating the amount of translation and the rotation angle from the global motion vector, the amount of translation ($\alpha$, $\beta$) and the rotation angle $\gamma$ can be determined using only per-block motion vectors having the label of "TOP" and the label of "NEXT_TOP" indicating high reliability on the basis of (Equation 4) to (Equation 10) described with reference to FIGS. 6 to 8E.

As described above, the present embodiment employs a method of calculating the amount of translation ($\alpha$, $\beta$) and the rotation angle $\gamma$ using only per-block motion vectors having the label of "TOP" and the label of "NEXT_TOP" indicating high reliability.

In order to obtain higher reliability, however, the present embodiment performs the following process.

The present embodiment gradually narrows down a search range for each target block, and performs the block matching process (block matching for the whole of a reference frame will hereinafter be referred to as detection) in a plurality of stages. In the embodiment below, block matching (detection) is performed in two stages.

Figure 12A:
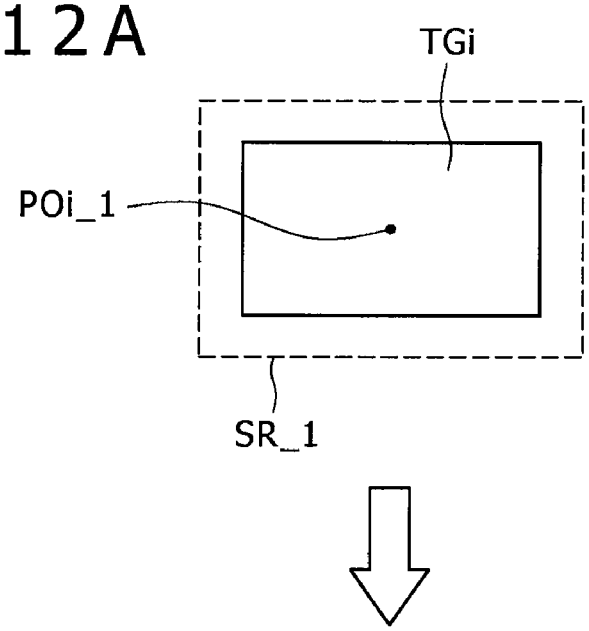
FIGS. 12A and 12B are diagrams of assistance in explaining an example of a process of calculating a per-block motion vector in a plurality of stages in an embodiment of the image processing method according.

As shown in FIG. 12A, a search range SR_1 for each target block TGi in a first detection is set to a maximum, and a plurality of per-block motion vectors BLK_Vi as described above are obtained. After the first detection is ended and per-block motion vectors of the plurality of target blocks are calculated, the plurality of per-block motion vectors are evaluated, and a search is made for per-block motion vectors having high evaluation values. (Equation 4) and (Equation 5) described above are performed using only the per-block motion vectors having the high evaluation values to obtain an amount of translation ($\alpha$, $\beta$) of the first detection. Then, a search range for each target block in a second detection is determined from the amount of translation of the first detection.

Alternatively, a global motion vector (hand movement vector) may be calculated from blocks having high evaluation values, so that the amount of translation of the first detection is calculated from the global motion vector and then the search range for each target block in the second detection is determined from the amount of translation of the first detection.

As shown in FIG. 12A, when the per-block motion vector BLK_Vi for each target block TGi is calculated in the search range SR_1 set in the first process, and the amount of translation is calculated from the plurality of per-block motion vectors or the amount of translation is calculated from the global motion vector, a block range in which there is correlation between the reference frame and the original frame can be roughly detected from the calculated amount of translation.

Figure 12B:
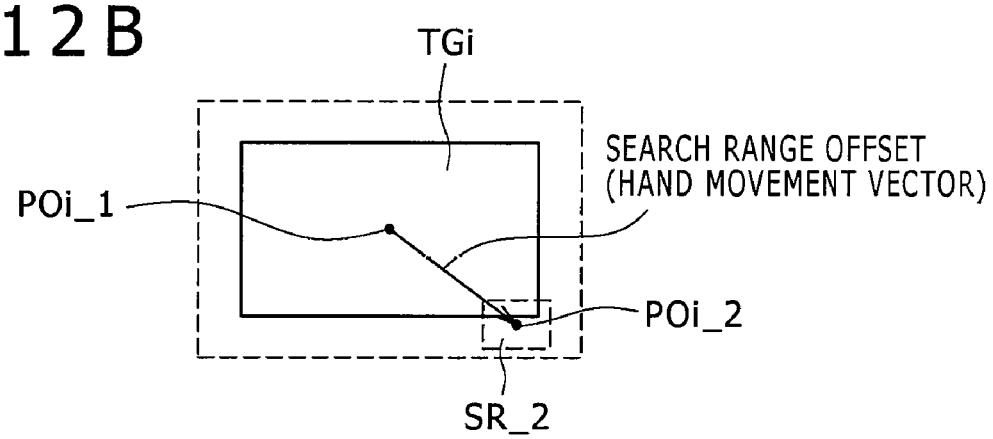

Accordingly, a search range narrower than the search range in the first detection with the block range in which there is correlation between the reference frame and the original frame as a center as shown in FIG. 12B can be set as a search range SR_2 for each target block in the second detection process. In this case, as shown in FIG. 12B, a positional displacement (search range offset) between a central position Poi_1 of the search range SR_1 in the first detection and a central position Poi_2 of the search range SR_2 in the second detection corresponds to the amount of translation (corresponding to the global motion vector) detected in the first detection.

Thus, the detection process using the narrowed search range SR_2 for each target block provides a result of block matching with a higher precision than in the first-stage detection process as a result of the second detection.

Accordingly, the present embodiment calculates the amount of translation and the rotation angle of the frame as described above using per-block motion vectors having high evaluation values among per-block motion vectors obtained in the second detection. Thereby the amount of translation and the rotation angle can be obtained with a high precision.

The aggregate SAD table used in the present embodiment is substantially equivalent to a result of en bloc block matching of the entire frame rather than the SAD table for each block. In the case of a normal subject, motion vectors surviving after the majority decision described in the existing art, that is, the motion vector of a majority decision top and the aggregate motion vector obtained from the aggregate SAD table are equal to each other. However, in a case where a plurality of frames are superimposed on each other, when the frames as a whole blink because another person sets off a flash bulb, or when the subject is waves of a water surface or the like, a result of majority decision is a near-random motion vector of low reliability. On the other hand, there is a strong possibility that the aggregate motion vector is derived as a result relatively close to a correct solution.

Thus, by comparing the results of the aggregate motion vector obtained from the aggregate SAD table and the global motion vector determined by the majority decision with each other, it is possible to quantitatively determine at least the reliability of the results of the present frame. The existing proposals are aimed principally at determining the reliability of a motion vector of each block. On the other hand, the present embodiment is characterized by realizing a stable hand movement correction system that provides a more natural image under a policy of attaching importance to a frame as a whole and excluding an unreliable frame from frames to be superimposed on each other.

In consideration of this point, as in the case of existing block matching, one method of the present embodiment makes a majority decision on the basis of per-block motion vectors BLK_Vi detected for 16 target blocks, and calculates the motion vector of a majority decision top (a maximum number of per-block motion vectors that are the same or equal to each other in magnitude and direction).

Then, using the detected motion vector of the majority decision top as a reference that supersedes the aggregate motion vector in FIG. 10, labeling and score assignment as shown in FIG. 10 are performed on the basis of the per-block motion vectors BLK_Vi detected for the 16 target blocks and the SAD values of the respective per-block motion vectors BLK_Vi.

This is equivalent to using the motion vector of the majority decision top in place of the aggregate motion vector SUM_V in FIG. 10.

Specifically, the first condition is whether a per-block motion vector BLK_Vi obtained for an object target block for which labeling and score calculation are to be performed and the motion vector of the majority decision top are equal to each other. That is, whether the coordinate position of a minimum SAD value MINi in a SAD table TBLi of the object target block is equal to the coordinate position of the motion vector of the majority decision top is determined.

The second condition is whether the motion vector BLK_Vi obtained for the object target block and the motion vector of the majority decision top are most adjacent vectors on the SAD table though the motion vector BLK_Vi and the motion vector of the majority decision top are not identical with each other. Specifically, the second condition is whether the coordinate position of the minimum SAD value MINi in the SAD table TBLi of the object target block and the coordinate position corresponding to the motion vector of the majority decision top are adjacent to each other and differ from each other by one coordinate value in a vertical direction, a horizontal direction, or a diagonal direction.

The third condition is whether in the SAD table of the object target block, a difference between the SAD value (minimum SAD value MINi) at the coordinate position indicated by the per-block motion vector BLK_Vi and a SAD value at the coordinate position on the SAD table which position corresponds to the motion vector of the majority decision top is equal to or smaller than a predetermined threshold value.

As described above, the labeling and the score assignment with the motion vector of the majority decision top as a reference are performed for the motion vectors of the 16 target blocks for one frame. Then, a total score many_score of assigned scores is calculated.

Then, the present embodiment determines that the motion vectors obtained for the frame in question are of high reliability when a difference between the coordinate position of the minimum SAD value corresponding to the aggregate motion vector SUM_V and the coordinate position of the SAD value corresponding to the motion vector of the majority decision top is within a predetermined value, for example when the difference is within one adjacent pixel, when the total score sum_score is equal to or higher than a predetermined threshold value, and when the total score many_score is equal to or higher than a predetermined threshold value.

On the other hand, when the difference between the coordinate position of the minimum SAD value corresponding to the aggregate motion vector SUM_V and the coordinate position of the SAD value corresponding to the motion vector of the majority decision top is not within the predetermined value, for example when the difference is not within one adjacent pixel, it is determined that a highly reliable hand movement vector cannot be obtained from the frame in question, and the frame in question is excluded from a plurality of frames to be superimposed on each other.

In addition, when the total score sum_score is lower than the predetermined threshold value, or when the total score many_score is lower than the predetermined threshold value, it is determined that a highly reliable hand movement vector cannot be obtained from the frame in question, and the frame in question is excluded from a plurality of frames to be superimposed on each other.

Then, only when it is determined that reliability is high as described above, a re-aggregate SAD table RSUM_TBL is generated using only SAD values of SAD tables of target blocks given the labels of "TOP" and "NEXT_TOP" among the labels of target blocks labeled with the aggregate motion vector as a reference in this example.

Then, a global motion vector (aggregate motion vector) is calculated by applying approximate surface interpolation to a minimum SAD value and SAD values at coordinate positions adjacent to the minimum SAD value in the re-aggregate SAD table RSUM_TBL. Then, using the calculated aggregate motion vector, a search range at the time of second detection is determined, or the amount of translation and the rotation angle are calculated.

Alternatively, using only per-block motion vectors of target blocks given the labels of "TOP" and "NEXT_TOP" and using the above-described (Equation 4) and (Equation 5), the amount of translation is calculated, and the search range at the time of the second detection is determined, or calculation based on the above-described (Equation 4) to (Equation 10) is performed, and the amount of translation and the rotation angle are calculated.

Incidentally, the existingly proposed method of predicting a motion vector (global motion vector) from frequency of the motion vector in a time axis direction and the method according to the embodiment of the present invention described above may be combined with each other to further improve reliability and precision.

As described above, the present embodiment generates a SAD table and calculates a per-block motion vector for each of a plurality of target blocks within one frame. In this case, when the present embodiment is to be applied to an image pickup device using an image pickup element currently having over five million pixels, it is difficult to realize the present embodiment on a practical circuit scale because the scale of the SAD table is increased in proportion to the number of pixels of one picture.

Practical proposals on a feasible level include the above-mentioned Patent Document 3 (Japanese Patent Laid-Open No. 2005-38396). A device disclosed in Patent Document 3 includes means for obtaining a motion vector in a size resulting from reducing conversion of an image and means for sharing an identical SAD table between a plurality of blocks. The reducing conversion of an image and the sharing of an identical SAD table between a plurality of blocks are a very good method for realizing reduction of SAD table size, and are used in other fields for motion vector detection and scene change detection in an MPEG (Moving Picture Experts Group) image compression system, for example.

However, the algorithm of Patent Document 3 has problems in that the reducing conversion of an image and memory (DRAM (Dynamic RAM (Random Access Memory))) access at the time of the reducing conversion consume time and memory space, and because the plurality of blocks make time-division access to the SAD table, memory access is greatly increased and this process also takes time. Real-time performance and reduction of a system delay time are both required in hand movement correction for moving images, and therefore the process time becomes a problem.

A result of evaluation on a large number of people indicates that a range of hand movement in the case of a still image of three frames/second (3 fps), for example, is about ±10% with an entire frame as 100. Assuming 12 million pixels of a high-end device already available on the market, it is estimated that a SAD table size required with the currently proposed technology used as it is about 80 megabits. In addition, when a practical processing speed is to be satisfied, a memory storing information of the SAD table needs to be a built-in SRAM (Static RAM (Random Access Memory)). Even though semiconductor process rules have progressed, this size is about three digits apart from a practical level.

Further, the reducing conversion of an image requires a low-pass filter for removing aliasing (folding distortion) and low illuminance noise to be implemented as preprocessing for the reduction process. However, characteristics of the low-pass filter are changed according to a reduction scaling factor, and especially when a low-pass filter in a vertical direction is a multiple-tap digital filter, many line memories and operation logics are required, thus presenting a problem of an increase in circuit scale.

Accordingly, in view of the above, the present embodiment uses a method and a device for image processing which can greatly reduce SAD table size when a global motion vector between two frames is calculated using block matching.

In addition, in relation to the method of reducing the SAD table by the reducing conversion of an image as described in Patent Document 3, the two problems are raised: an increase in processing time and consumption of memory space that are involved in the reducing conversion of an image and a circuit increase involved in implementing an appropriate low-pass filter for avoiding aliasing attendant on the reducing conversion of an image. The present embodiment can solve these problems.

Specifically, rather than storing a SAD value between a target block and a reference block in correspondence with a reference vector of the reference block, the present embodiment reduces the reference vector, distributes and adds the SAD value to a plurality of reference vectors corresponding to the reduced reference vector and adjoining the reference reduced vector, and thus stores the SAD value.

Thereby the present embodiment greatly reduces the size of the SAD table as compared with the existing SAD table, and solves the two problems of an increase in processing time and consumption of memory space that are involved in the reducing conversion of an image and a circuit increase involved in implementing an appropriate low-pass filter for avoiding aliasing attendant on the reducing conversion of an image.

Figure 13:
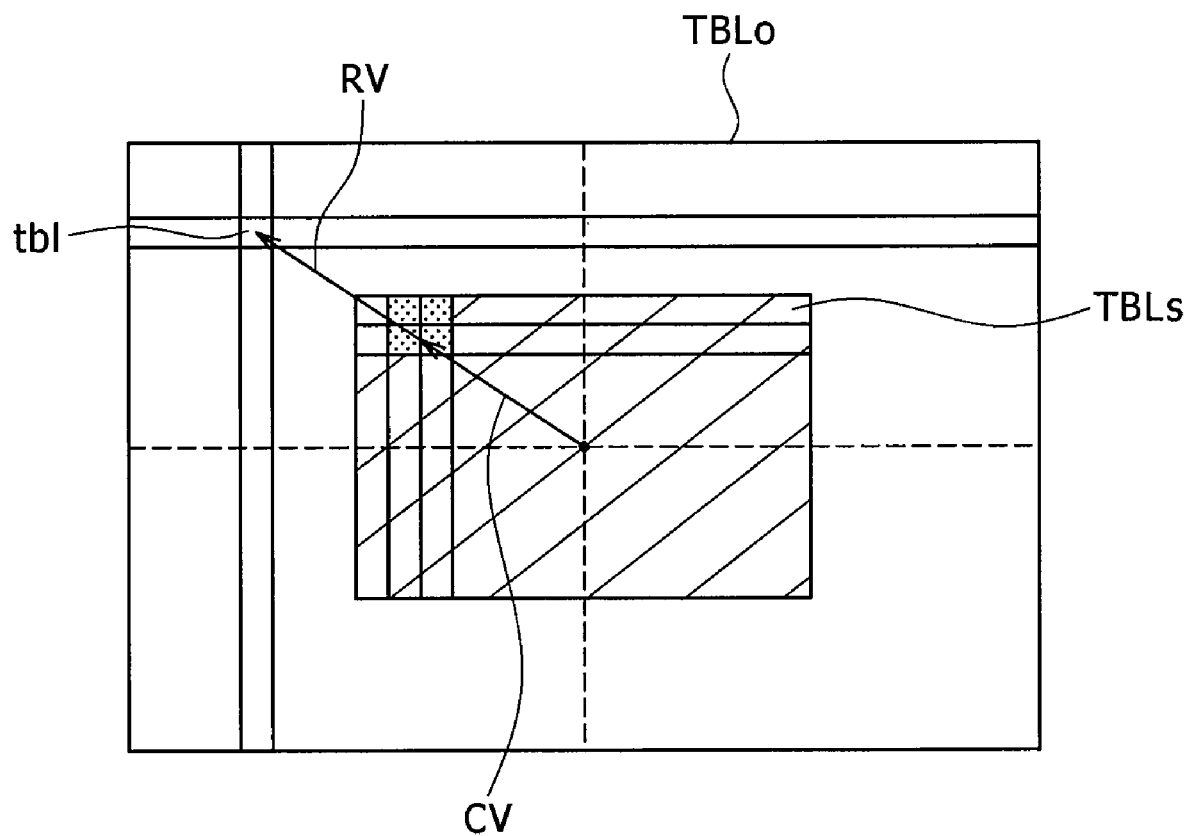
FIG. 13 is a diagram of assistance in explaining an example of a process of calculating a per-block motion vector in an embodiment of the image processing method.
Figure 14A:
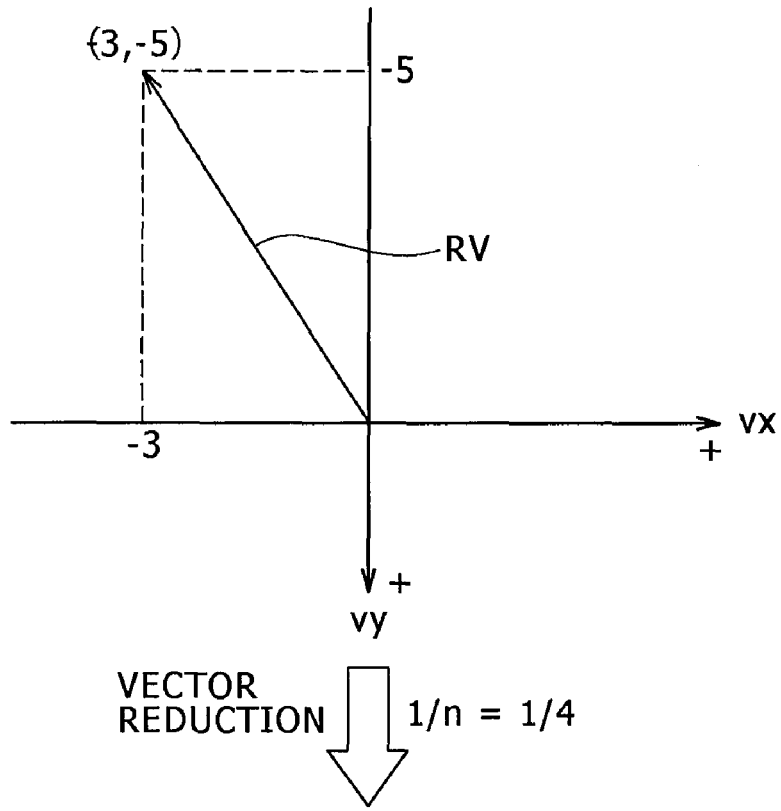
FIGS. 14A and 14B are diagrams of assistance in explaining an example of a process of calculating a per-block motion vector in an embodiment of the image processing method.
Figure 14B:
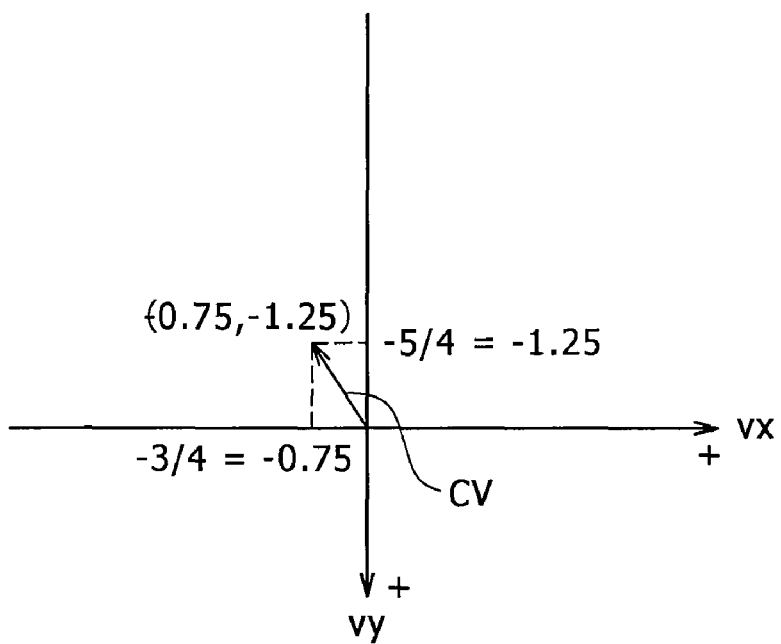
Figure 15:
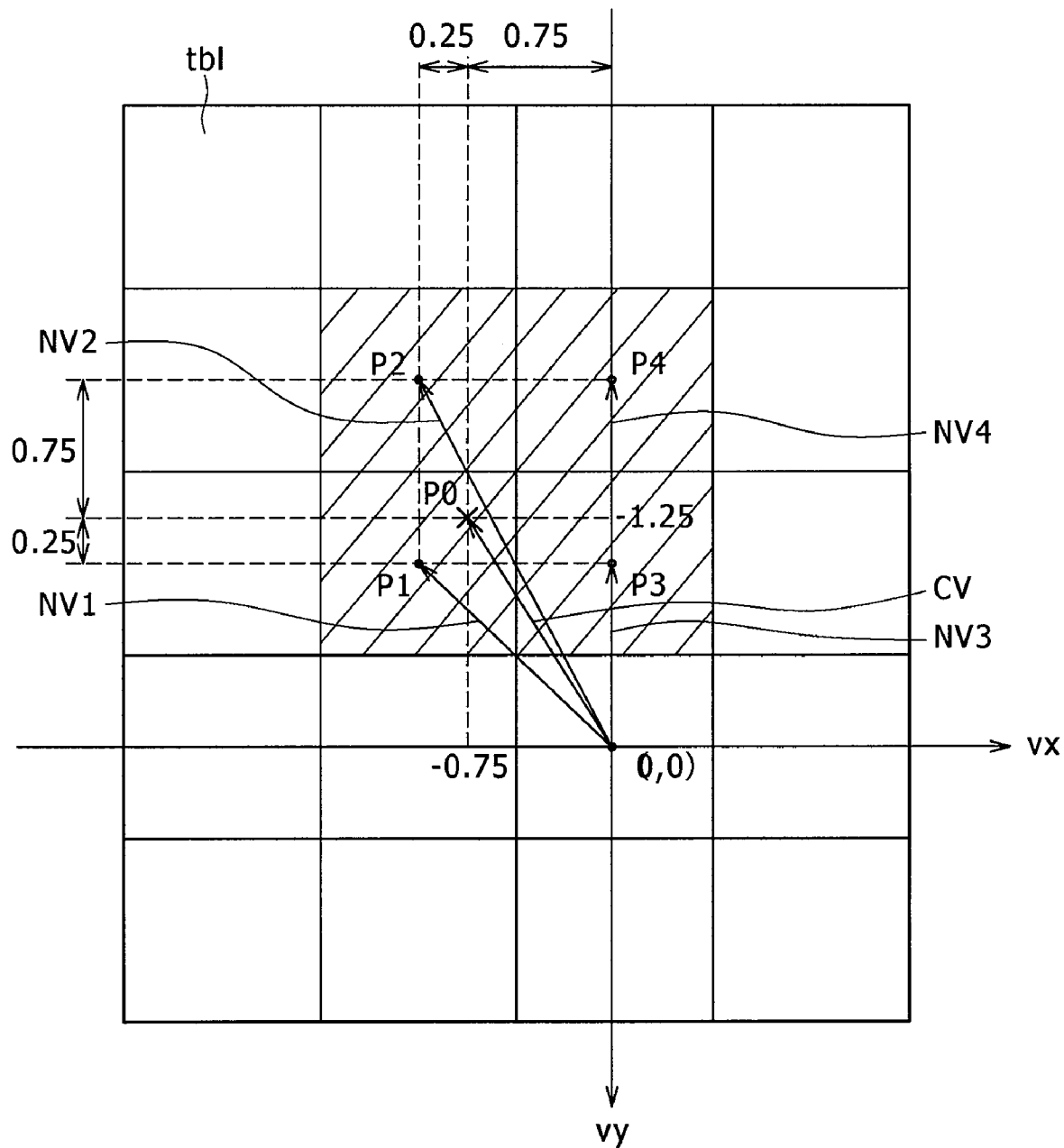
FIG. 15 is a diagram of assistance in explaining an example of a process of calculating a per-block motion vector in an embodiment of the image processing method.

FIGS. 13 to 15 are diagrams of assistance in explaining an outline of a new block matching method used in the present embodiment. FIG. 13 shows a relation between a existing SAD table TBLo and a reduced SAD table TBLs generated in the image processing method of the present embodiment.

In the present embodiment, as in the existing example shown in FIG. 74, a plurality of search ranges are set in a reference frame with the positions of a plurality of target blocks set in an original frame, or 16 target blocks in this example, as respective centers. Then, a plurality of reference blocks as described above are set in each of the plurality of search ranges, and a sum of absolute values of differences between luminance values of pixels within each reference block and luminance values of corresponding pixels within the target block, that is, a SAD value is obtained.

Existingly, as shown in FIG. 13, the obtained SAD value is written in the SAD table TBLo as a table element tbl at an address corresponding to a reference vector RV of the reference block in question.

Hence, in the existing block matching, a reference vector RV representing a positional displacement in the frame image between a target block and a reference block and the SAD value of the reference block as each table element of the SAD table TBLo are in one-to-one correspondence with each other. That is, the existing SAD table TBLo has a number of table elements of SAD values which number is equal to the number of reference vectors RV that can be obtained in a search range.

In block matching according to the present embodiment, on the other hand, as shown in FIG. 13 and FIGS. 14A and 14B, the reference vector RV of the reference block in question is reduced at a reduction ratio of 1/n (n is a natural number) into a reference reduced vector CV.

In the following description, a horizontal direction reduction scaling factor and a vertical direction reduction scaling factor are the same for convenience of the description. However, the horizontal direction reduction scaling factor and the vertical direction reduction scaling factor may be different values independent of each other. In addition, as will be described later, the horizontal direction reduction scaling factor and the vertical direction reduction scaling factor set as one divided by an arbitrary natural number independently of each other are more flexible and convenient.

Also in the present embodiment, as described above in the foregoing existing example, the position of a target block as center of a search range is set as a reference position (0, 0), reference vectors indicate displacements (vx, vy) (vx and vy are integers) in the horizontal direction and the vertical direction in pixel units from the reference position, and each of the reference vectors RV is expressed as a reference vector (vx, vy).

A position (vx/n, vy/n) indicated by a reference reduced vector (vx/n, vy/n) obtained by reducing a reference vector (vx, vy) to 1/n in each of the horizontal direction and the vertical direction may not be an integer and may include a decimal component. Therefore, in the present embodiment, when a SAD value obtained in correspondence with the original reference vector RV before the reduction is stored as a table element corresponding to one reference vector closest to the reference reduced vector CV, an error occurs.

Accordingly, in the present embodiment, a plurality of positions (table elements) indicated by a plurality of reference vectors in the vicinity of the position (vx/n, vy/n) indicated by the reference reduced vector CV are detected first. Then, the SAD value obtained for the reference block of the reference vector RV is distributed and added to SAD values corresponding to the plurality of adjacent reference vectors indicating the detected positions.

In this case, in the present embodiment, as values to be distributed and added as components to be written to table elements tbl corresponding to the positions indicated by the plurality of adjacent reference vectors around the position indicated by the reference reduced vector CV, the SAD values to be distributed and added in correspondence with the adjacent reference vectors are calculated from the SAD value obtained in correspondence with the original reference vector RV before the reduction, using a relation between the positions indicated by the reference reduced vector and each of the adjacent reference vectors. Each of the calculated SAD values is added as a table element component of the corresponding reference vector.

In this case, not only distributing but also adding the SAD values means that the plurality of reference vectors adjacent to the reference reduced vector are detected repeatedly for a plurality of different reference reduced vectors and thus a plurality of SAD values are added together for one reference vector.

Incidentally, when the position (vx/n, vy/n) indicated by the reference reduced vector CV matches the position indicated by a reference vector, that is, when the values of vx/n and vy/n are integers, it is not necessary to detect a plurality of adjacent reference vectors, and the SAD value obtained in correspondence with the original reference vector RV before the reduction is stored in correspondence with the reference vector indicating the position (vx/n, vy/n).

Figure 1:
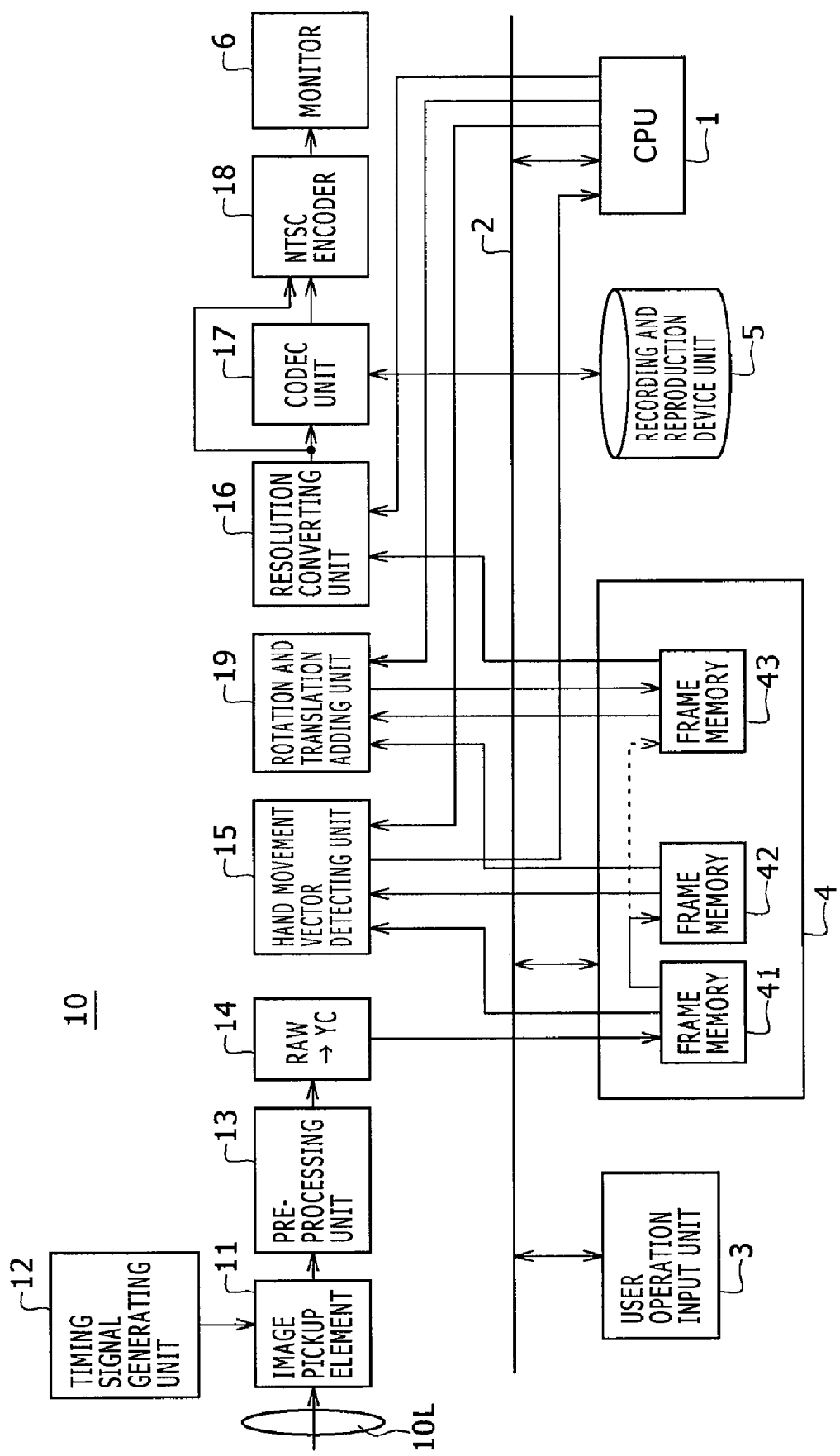
FIG. 1 is a block diagram showing an example of configuration of a first embodiment of an image processing device.

The above process will next be described by taking a concrete example. For example, when the position of a target block is set as a reference (0, 0), a reference reduced vector CV obtained by reducing a reference vector RV indicating a position (−3, −5) as shown in FIG. 14A to 1/n=¼ in the horizontal direction and the vertical direction indicates a position (−0.75, −1.25), as shown in FIG. 14B.

Thus, the position indicated by the reference reduced vector CV includes decimal components, and does not match a position indicated by a reference vector.

Accordingly, in this case, a plurality of adjacent reference vectors indicating positions adjacent to the position indicated by the reference reduced vector CV are detected, as shown in FIG. 15. In the example of FIG. 15, four adjacent reference vectors NV1, NV2, NV3, and NV4 are detected for the one reference reduced vector CV.

Then, as described above, in the present embodiment, a SAD value obtained for the reference block of the reference vector RV is distributed and added as SAD values corresponding to the four adjacent reference vectors NV1, NV2, NV3, and NV4.

In this case, in the present embodiment, the SAD values to be distributed and added to the four adjacent reference vectors NV1, NV2, NV3, and NV4 are calculated as linearly weighted distribution values using positional relations between a position P0 (shown as a cross mark in FIG. 15) indicated by the reference reduced vector CV and positions P1, P2, P3, and P4 (shown as circle marks in FIG. 15) indicated by the four adjacent reference vectors NV1, NV2, NV3, and NV4, respectively.

The position P0 indicated by the reference reduced vector CV in the example of FIG. 15 internally divides line segments defined by the positions P1, P2, P3, and P4 indicated by the four adjacent reference vectors NV1, NV2, NV3, and NV4, respectively, around the position P0 at 1:3 in the horizontal direction and at 3:1 in the vertical direction.

Accordingly, letting Sα be the SAD value obtained in correspondence with the reference vector RV before the reduction, values SADp1, SADp2, SADp3, and SADp4 to be distributed and added to SAD table elements corresponding to the positions P1, P2, P3, and P4 indicated by the four adjacent reference vectors NV1, NV2, NV3, and NV4, respectively, around the position P0 are $SADp1 = S\alpha \times 9/16$ $SADp2 = S\alpha \times 3/16$ $SADp3 = S\alpha \times 3/16$ $SADp4 = S\alpha \times 1/16$ Then, in the present embodiment, the obtained values SADp1, SADp2, SADp3, and SADp4 are added to the SAD table elements corresponding to the positions P1, P2, P3, and P4 indicated by the four adjacent reference vectors NV1, NV2, NV3, and NV4, respectively.

In the present embodiment, the above process is performed for all reference blocks within a search range.

Thus, in the present embodiment, when the reference vector RV is reduced to 1/n, it suffices to prepare the reduced SAD table TBLs obtained by reducing the SAD table TBLo of existing size which table has one-to-one correspondence with all reference vectors to 1/n in the horizontal direction and 1/n in the vertical direction, and determine the SAD values corresponding to the reference vectors adjacent to the reference vector RV as table elements in the reduced SAD table TBLs (see FIG. 13).

Hence, the number of table elements of the reduced SAD table TBLs in the present embodiment is $1/n^2$ of the number of table elements of the existing SAD table TBLo, so that table size can be greatly reduced.

Incidentally, in the above description of the embodiment, the four reference vectors adjacent to the reference reduced vector CV are detected, and the SAD values calculated for the reference block in question (reference vector RV) are added as linearly weighted distribution values to the SAD table elements corresponding to the four adjacent reference vectors. However, a method for selecting a plurality of reference vectors adjacent to the reference reduced vector CV and a method of the distribution and addition to the SAD table elements corresponding to the adjacent reference vectors are not limited to the above-described example.

For example, higher precision can be obtained by detecting nine or 16 reference vectors adjacent to the reference reduced vector CV and performing the distribution and addition to SAD table elements corresponding to the nine or 16 adjacent reference vectors on the basis of so-called cubic interpolation. When importance is attached to real-time performance and reduction of operation circuitry, linearly weighted distribution and addition to table elements corresponding to four adjacent reference vectors as described above is more effective.

In the present embodiment, as in the existing method, the reference block is moved to all positions within the search range, and the SAD values of all the reference blocks are assigned to the SAD table (reduced SAD table in the present embodiment).

However, existingly, reference vectors and the addresses of SAD table elements are in one-to-one correspondence with each other, and thus simple assignment to a SAD table suffices. In the method according to the present embodiment, the SAD values calculated for the reference blocks are distributed and added, and therefore the reference vectors (reduced reference vectors) and table addresses are not in one-to-one correspondence with each other in the reduced SAD table. Hence, the method according to the present embodiment needs so-called assignment addition in which assignment is performed by addition, rather than simple assignment to table addresses of SAD values. In addition, for this, each table element in the SAD table (reduced SAD table) needs to be initialized (cleared to zero) first.

In the existing block matching, detection of a motion vector is completed when a SAD table completed as described above is searched for a table element having a minimum SAD value and the table address of the table element having the minimum value is converted to a reference vector.

On the other hand, the SAD table in the method according to the present embodiment is a reduced SAD table corresponding to reduced reference vectors obtained by reducing reference vectors, and therefore a minimum value in the reduced SAD table does not correspond as it is to an accurate motion vector.

Of course, a device that tolerates errors to a certain degree may calculate a motion vector by converting the table address of the table element having the minimum value in the reduced SAD table to a reference vector and multiplying the reference vector by a reciprocal of the reduction ratio of 1/n, that is, by n.

However, when a more accurate motion vector is to be calculated, the accurate motion vector (per-block motion vector) is detected with the precision of the original vector by performing interpolation processing on table element values of the reduced SAD table as described below.

Incidentally, in the above description, SAD tables are obtained for a plurality of target blocks using the method of block matching utilizing existing reference vectors rather than reduced reference vectors, an aggregate SAD table is obtained by aggregating SAD values at corresponding coordinate positions in the plurality of obtained SAD tables, and a global motion vector is calculated by subjecting the aggregate SAD table to approximate surface interpolation. An interpolation process to be described below can also be used as the approximate surface interpolation in this case.

[First Example of Interpolation Process for Calculating Improved Accuracy Motion Vector]

A first example of an interpolation process for calculating a more accurate motion vector is a method of approximating a plurality of SAD table element values (SAD values) in a reduced SAD table by one quadric surface.

Specifically, a table element having a minimum SAD value (integer precision minimum value table element (integer precision table address)) and a plurality of integer precision table elements around the center of the integer precision minimum value table element are obtained in the reduced SAD table. Using the SAD values of these table elements, the quadric surface of SAD values is determined by a method of least squares. A minimum SAD value of the quadric surface is detected. A position corresponding to the detected minimum SAD value (a position shifted from the reference position in the reference frame) is detected. The detected position is set as a decimal precision minimum value table address (corresponding to a vector (minimum value vector) indicating the minimum SAD value in the reduced SAD table).

Figure 16A:
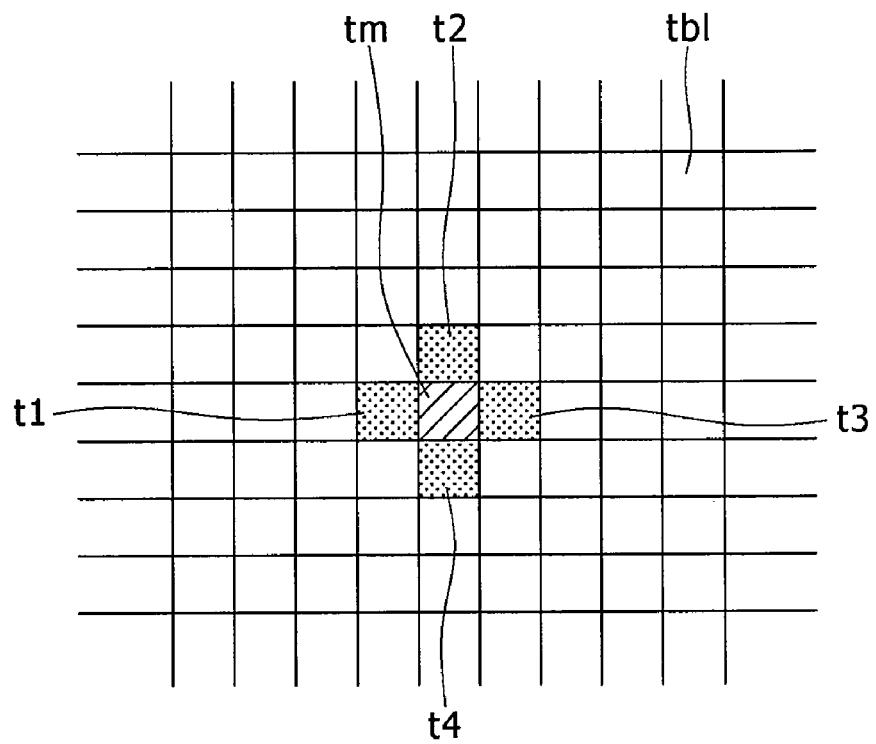
FIGS. 16A and 16B are diagrams of assistance in explaining an example of a process of calculating a per-block motion vector in an embodiment of the image processing method.
Figure 16B:
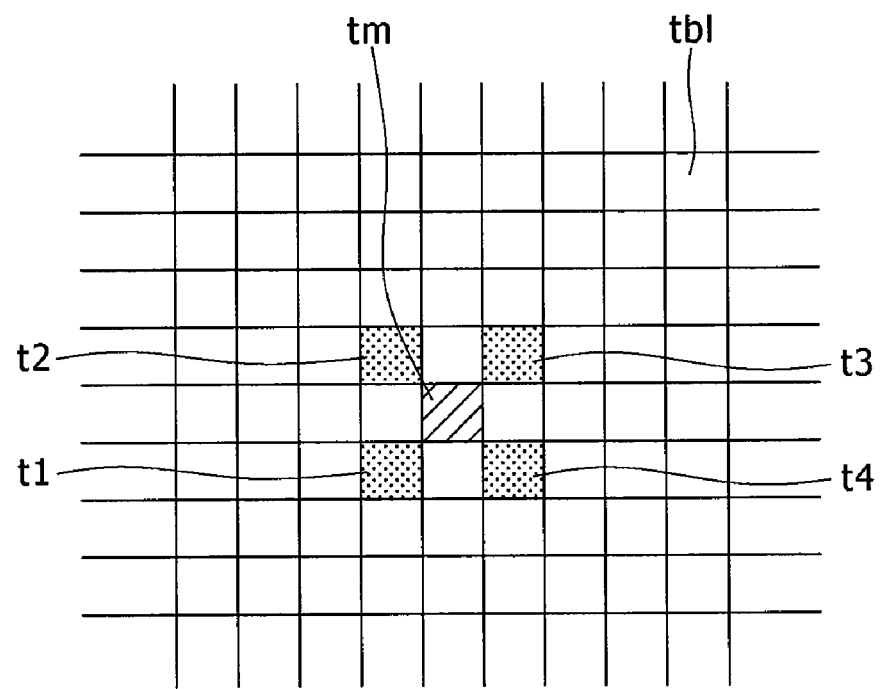

In this case, to set a unique quadric surface requires at least an integer precision minimum value table element tm and four integer precision table elements t1, t2, t3, and t4 adjacent to the table element tm, the four integer precision table elements t1, t2, t3, and t4 being at positions such that the table element tm is sandwiched from both sides between the integer precision table elements, as shown in FIG. 16A or 16B.

Figure 17:
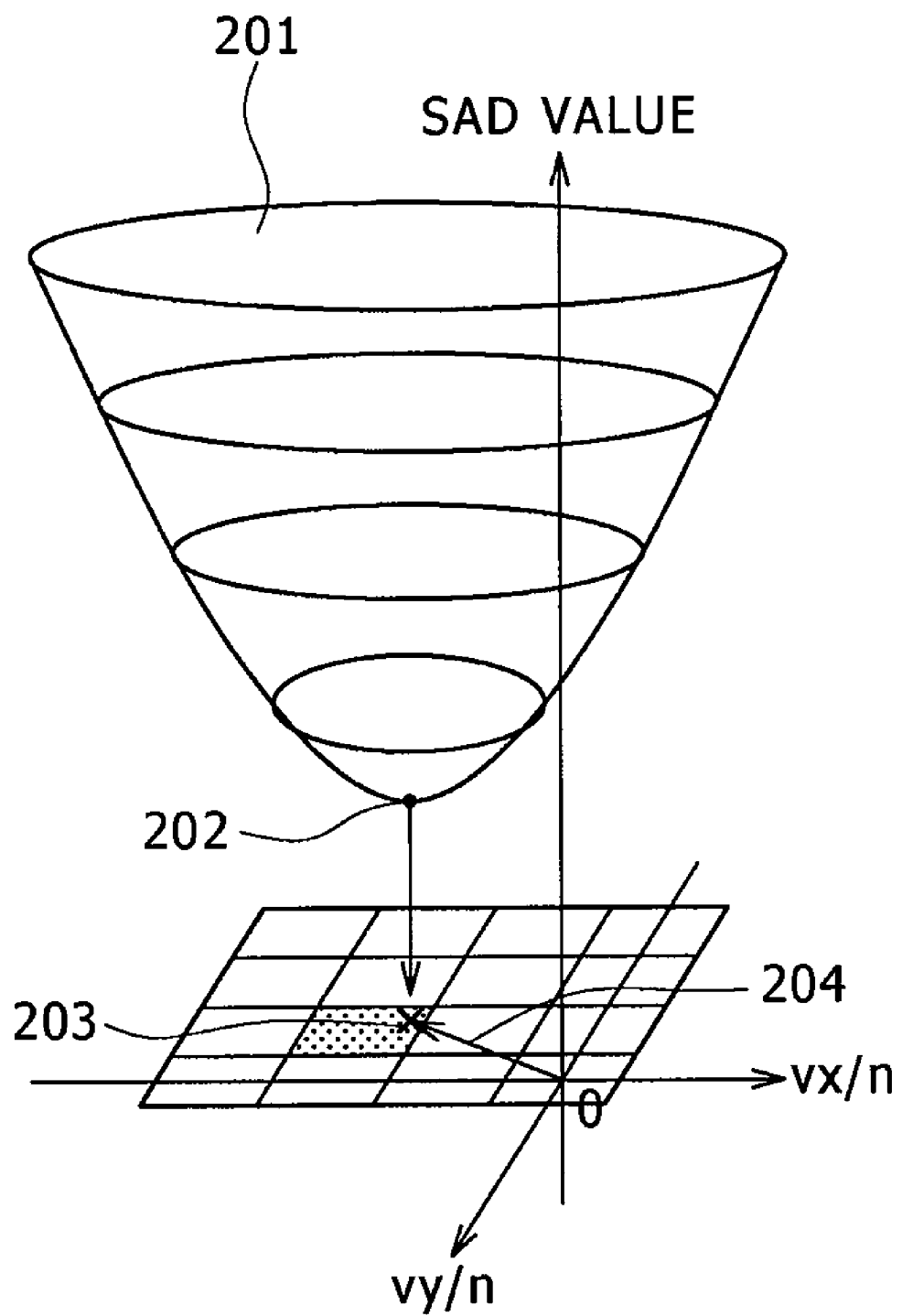
FIG. 17 is a diagram of assistance in explaining an example of a process of calculating a per-block motion vector in an embodiment of the image processing method.

Then, as shown in FIG. 17, within a range of reference reduced vectors corresponding to the reduced SAD table within a search range of the reference frame, with the position of a target frame as reference position (0, 0), an axis vx/n and an axis vy/n of amounts of displacement in the horizontal direction and the vertical direction (corresponding to the reference reduced vectors) are considered, a SAD value axis is considered as an axis perpendicular to the axis vx/n and the axis vy/n, and a coordinate space formed by the three axes is assumed.

Then, for example, a quadric curve is generated in the coordinate space in FIG. 17 from the SAD value of the integer precision minimum value table element tm and the SAD values of the two table elements t1 and t3 between which the integer precision minimum value table element tm is interposed. Another quadric curve is generated in the coordinate space in FIG. 17 from the SAD value of the integer precision minimum value table element tm and the SAD values of the other two table elements t2 and t4 between which the minimum value table element tm is interposed. Then, a quadric surface 201 including the two quadric curves is obtained by a method of least squares. The quadric surface 201 is generated in the coordinate space as shown in FIG. 17.

Then, a minimum value 202 of the generated quadric surface 201 of SAD values is detected. A position (vx/n, vy/n) corresponding to the minimum SAD value (a position 203 in FIG. 17) is detected. The detected position (vx/n, vy/n) is detected as a decimal precision table element (table address). Then, a vector (minimum value vector) 204 corresponding to the detected decimal precision table element is multiplied by n as shown in FIG. 18, whereby a motion vector 205 with an original magnitude precision is obtained.

Figure 18:
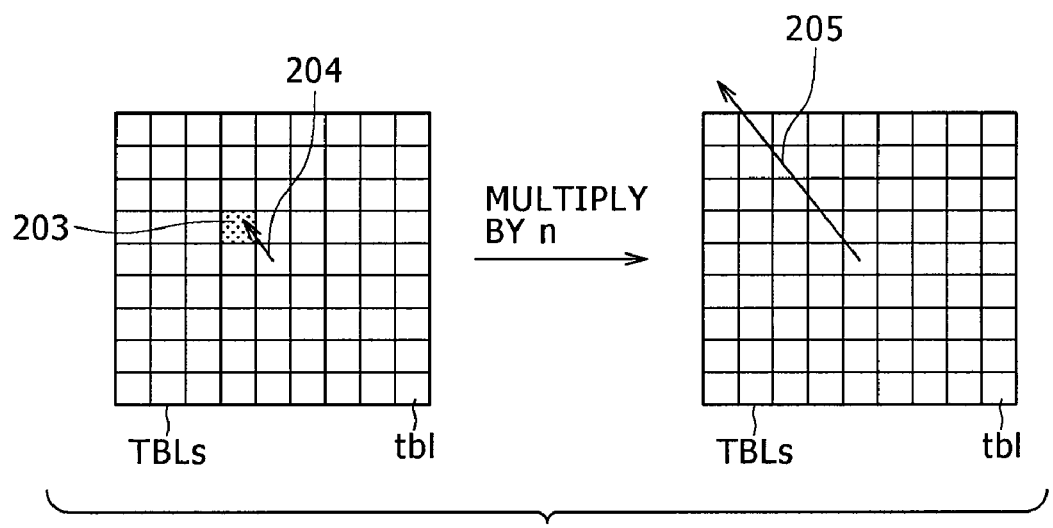
FIG. 18 is a diagram of assistance in explaining an example of a process of calculating a per-block motion vector in an embodiment of the image processing method.
Figure 19:
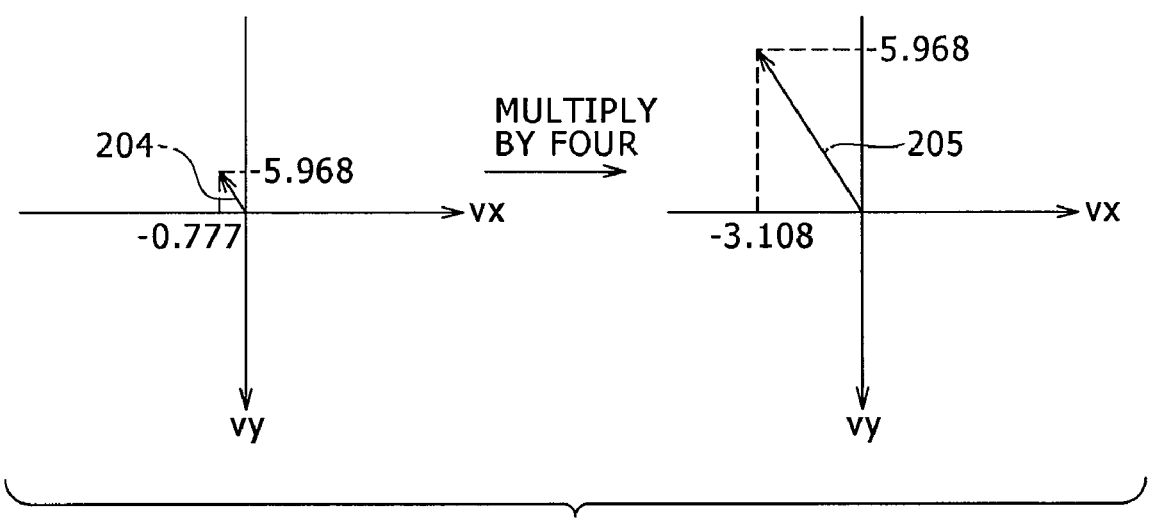
FIG. 19 is a diagram of assistance in explaining an example of a process of calculating a per-block motion vector in an embodiment of the image processing method.

For example, as shown in FIG. 18, in a case where the minimum value vector 204 obtained from the minimum value address of the decimal precision table element in the reduced SAD table TBLs when reference vectors are reduced to ¼ is (−0.777, −1.492), the motion vector 205 is (−3.108, −5.968), which is obtained by multiplying (−0.777, −1.492) by four.

This motion vector 205 is a reproduction of a motion vector on the scale of an original image.

While the above description has been made of a case where the integer precision minimum value table element tm and the four table elements adjacent to the integer precision minimum value table element tm are used, it is better to use more adjacent table elements in order to obtain the quadric surface of SAD values by the method of least squares. Accordingly, in general, table elements in a rectangular region of m (horizontal direction)×m (vertical direction) (m is an integer of three or more) table elements around the center of the integer precision minimum value table element tm are used.

However, it is not that the larger the number of adjacent table elements, the better. Using table elements in a wide range invites an increase in an amount of calculation and increases a possibility of using the false value of a local minimum dependent on an image pattern. Therefore table elements in a rectangular region of an appropriate number of adjacent table elements are used.

Description in the present embodiment will be made of, as examples of using table elements in a rectangular region of an appropriate number of adjacent table elements, an example of using table elements in a rectangular region of 3 (horizontal direction)×3 (vertical direction) table elements around the center of the integer precision minimum value table element tm and an example of using table elements in a rectangular region of 4 (horizontal direction)×4 (vertical direction) table elements around the center of the integer precision minimum value table element tm.

[Example of Using Table Elements in Rectangular Region of 3×3 Table Elements]

Figure 20A:
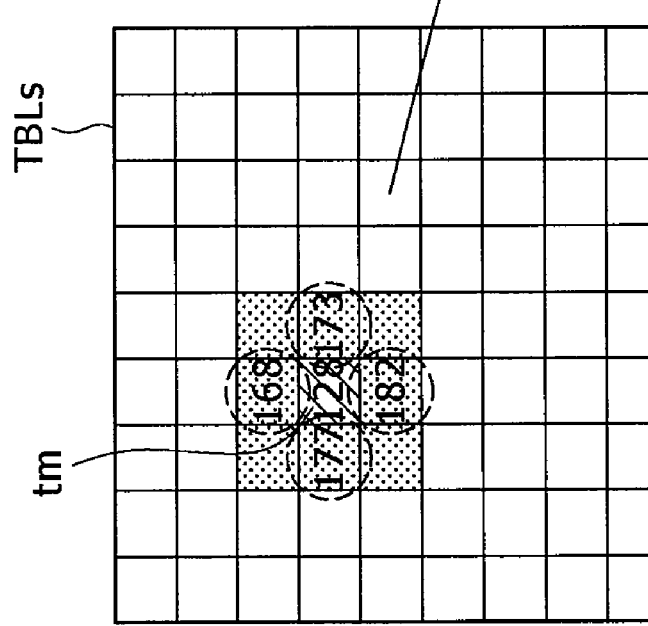
FIGS. 20A and 20B are diagrams of assistance in explaining an example of a process of calculating a per-block motion vector in an embodiment of the image processing method.
Figure 20B:
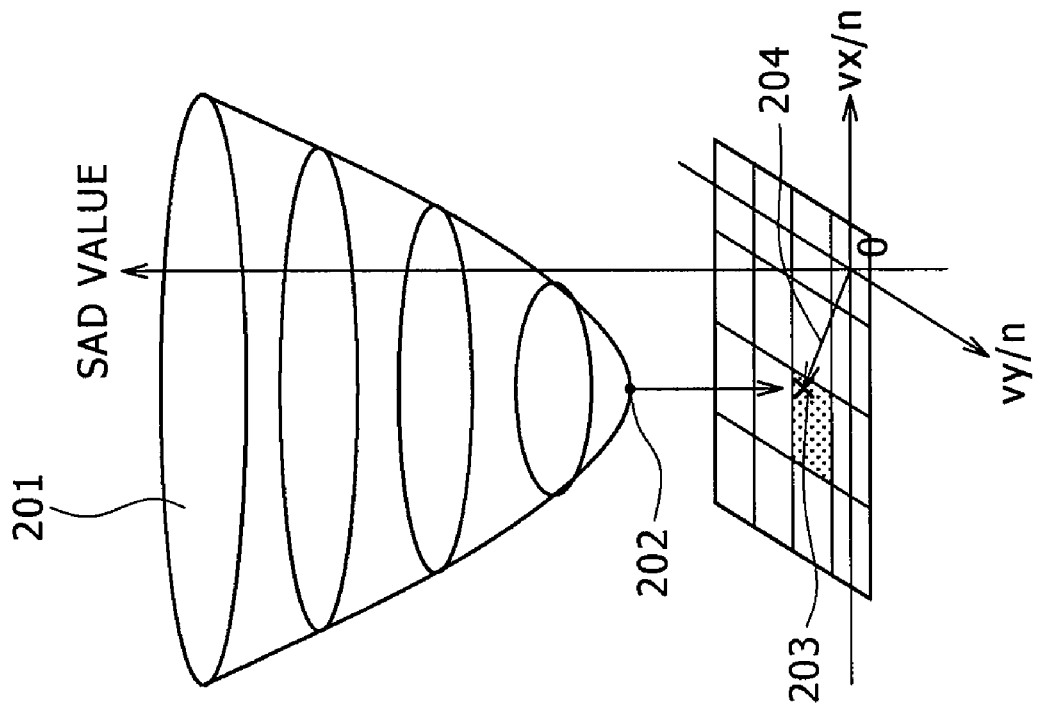

FIGS. 20A and 20B represent an example of using table elements in a rectangular region (filled in FIG. 20A) of 3 (horizontal direction)×3 (vertical direction) table elements around the center of the integer precision minimum value table element tm.

In the example of FIGS. 20A and 20B, a quadric surface 201 as shown in FIG. 20B is generated by the method of least squares, using the SAD values of the integer precision minimum value table element tm and eight adjacent table elements adjacent to the integer precision minimum value table element tm as shown in FIG. 20A. Then, a minimum value 202 of the generated quadric surface 201 of SAD values is detected. A position (vx/n, vy/n) corresponding to the minimum SAD value (a position 203 in FIG. 20B) is detected. The detected position 203 is detected as the position of a decimal precision minimum value table element (decimal precision minimum value table address).

Then, a vector (minimum value vector) 204 corresponding to the detected position 203 of the decimal precision table element is multiplied by n as shown in FIG. 18, whereby a motion vector 205 with an original magnitude precision is obtained.

Figures 21, 22:
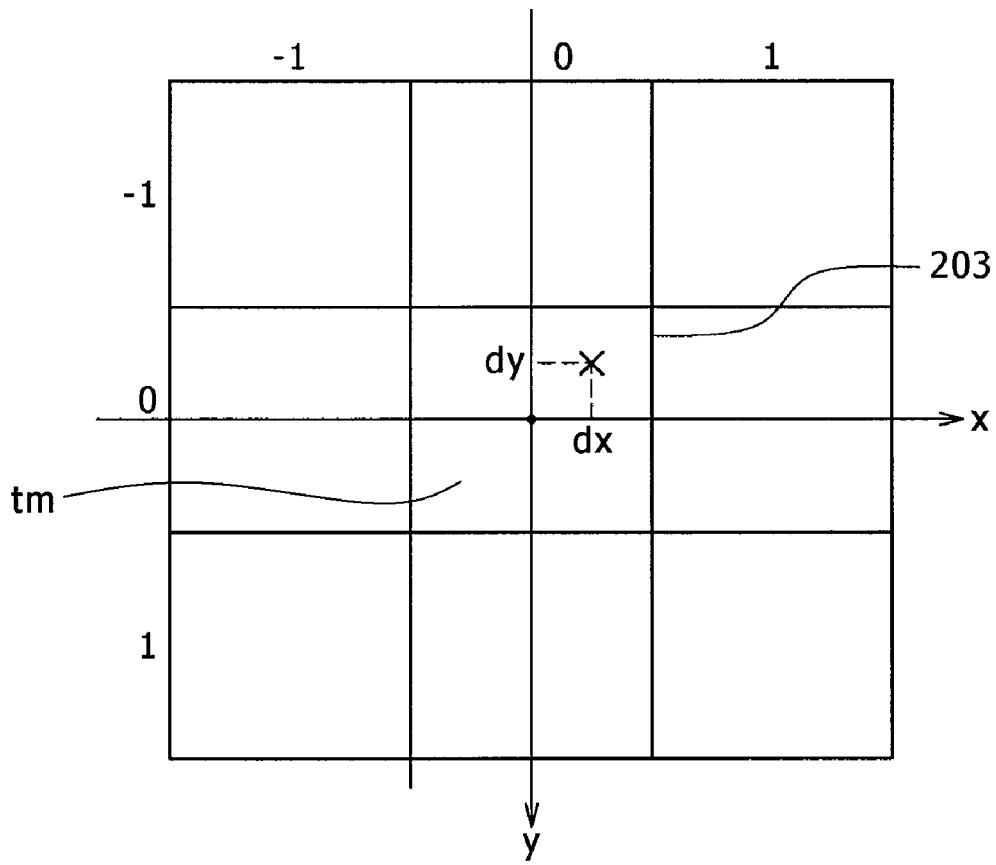
FIG. 21 is a diagram of assistance in explaining an example of a process of calculating a per-block motion vector in an embodiment of the image processing method.
FIG. 22 is a diagram of assistance in explaining an example of a process of calculating a per-block motion vector in an embodiment of the image processing method.

A method of calculating the position 203 corresponding to the minimum value 202 of the SAD value quadric surface 201 is as follows. As shown in FIG. 21, (x, y) coordinates with the position of the integer precision minimum value table element tm as an origin (0, 0) are considered. In this case, the positions of eight surrounding table elements are expressed by combinations of three positions in the direction of an x-axis, that is, x=−1, x=0, and x=1, and three positions in the direction of a y-axis, that is, y=−1, y=0, and y=1, and are thus eight positions (−1, −1), (0, −1), (1, −1), (−1, 0), (0, 1), (−1, 1), (0, 1), and (1, 1).

Suppose that the SAD value of each table element in a table of FIG. 21 is Sxy. Thus, for example, the SAD value of the integer precision minimum value table element tm (position (0, 0)) is expressed as $S_{00}$, and the SAD value of a table element at a lower right position (1, 1) is expressed as $S_{11}$.

Then, a decimal precision position (dx, dy) in (x, y) coordinates with the position of the integer precision minimum value table element tm as an origin (0, 0) can be obtained by (Equation A) and (Equation B) shown in FIG. 22.

In (Equation A) and (Equation B) of FIG. 22,
when x=−1, Kx=−1
when x=0, Kx=0
when x=0, Kx=1
In addition,
when y=−1, Ky=−1
when y=0, Ky=0
when y=0, Ky=1

The decimal precision position (dx, dy) is thus obtained with the position of the integer precision minimum value table element tm as origin (0, 0). Therefore the position 203 with respect to the central position of the search range can be detected from the decimal precision position (dx, dy) and the position of the integer precision minimum value table element tm.

[Example of Using Table Elements in Rectangular Region of 4×4 Table Elements]

Figure 23B:
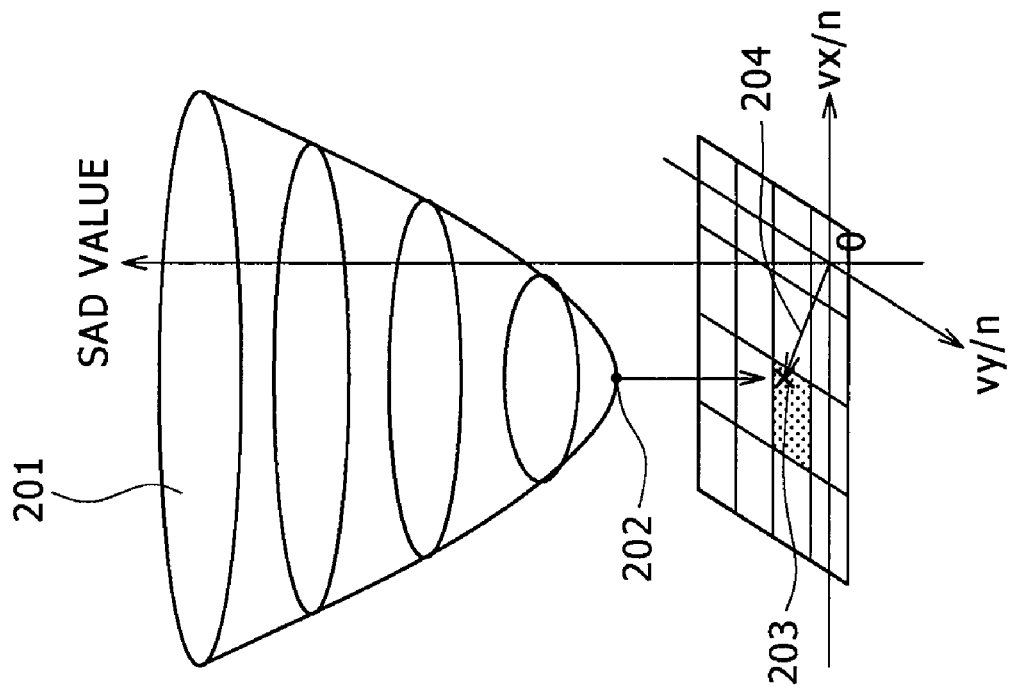
FIGS. 23A and 23B are diagrams of assistance in explaining an example of a process of calculating a per-block motion vector in an embodiment of the image processing method.
Figure 23A:
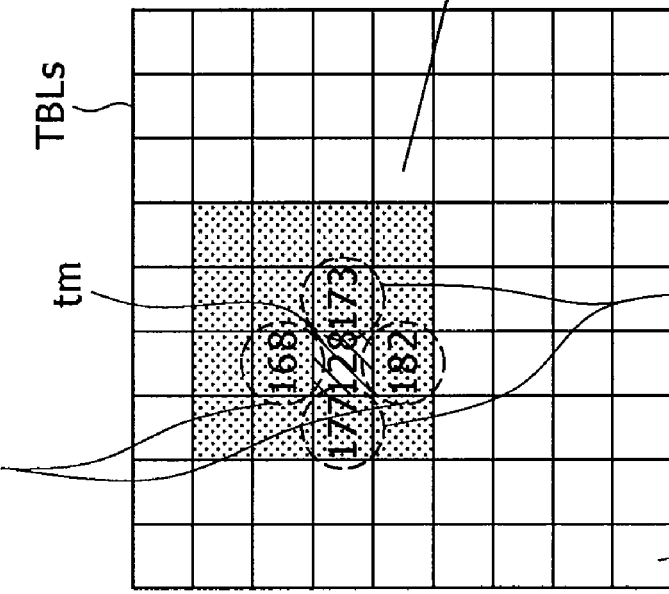

FIGS. 23A and 23B represent an example of using table elements in a rectangular region (filled in FIG. 23A) of 4 (horizontal direction)×4 (vertical direction) table elements with the integer precision minimum value table element tm substantially at a center.

As in a case of the integer precision minimum value table element tm and eight table elements adjacent to the integer precision minimum value table element tm (3×3) or as in a case of the integer precision minimum value table element tm and 24 table elements adjacent to the integer precision minimum value table element tm (5×5), when the value of m is an odd number, a table range to be used is determined simply because the integer precision minimum value table element tm is always at the center of the plurality of table elements of the rectangular region being used.

On the other hand, as in a case of the integer precision minimum value table element tm and 15 table elements adjacent to the integer precision minimum value table element tm (4×4), when the value of m is an even number, some device is needed because the integer precision minimum value table element tm is not situated at the center of the plurality of table elements of the rectangular region being used.

Specifically, the SAD values of a left adjacent table element and a right adjacent table element in the horizontal direction as viewed from the integer precision minimum value table element tm are compared with each other. A table element adjacent to the adjacent table element having a lower value in a direction of the adjacent table element having the lower value is employed as an adjacent table element in a fourth column. Similarly, the SAD values of an upper adjacent table element and a lower adjacent table element in the vertical direction as viewed from the integer precision minimum value table element tm are compared with each other. A table element adjacent to the adjacent table element having a lower value in a direction of the adjacent table element having the lower value is employed as an adjacent table element in a fourth row.

In the example of FIG. 23A, the SAD values of a left adjacent table element and a right adjacent table element in the horizontal direction of the integer precision minimum value table element tm are "177" and "173". Therefore a column adjacent on the right side to the right adjacent table element having the lower SAD value of "173" is employed as the fourth column. The SAD values of an upper adjacent table element and a lower adjacent table element in the vertical direction of the integer precision minimum value table element tm are "168" and "182". Therefore a row adjacent on the upper side to the upper adjacent table element having the lower SAD value of "168" is employed as the fourth row.

In the example of FIGS. 23A and 23B, a quadric surface 201 is generated by the method of least squares, using the SAD values of the integer precision minimum value table element tm and the 15 adjacent table elements adjacent to the integer precision minimum value table element tm. Then, a minimum value 202 of the generated quadric surface 201 of SAD values is detected. A position (vx/n, vy/n) corresponding to the minimum SAD value (position 203 in FIG. 23B) is detected. The detected position 203 is detected as the position of a decimal precision minimum value table element (decimal precision minimum value table address).

Then, a vector (minimum value vector) 204 corresponding to the detected position 203 of the decimal precision table element is multiplied by n as shown in FIG. 18 described above, whereby a motion vector 205 with an original magnitude precision is obtained.

A method of calculating the position 203 corresponding to the minimum value 202 of the SAD value quadric surface 201 in this example is as follows. As shown in FIGS. 24A, 24B, 24C, and 24D, (x, y) coordinates with the position of the integer precision minimum value table element tm as an origin (0, 0) are considered.

In this example, four table element arrangements as shown in FIGS. 24A, 24B, 24C, and 24D need to be considered according to the position of the integer precision minimum value table element tm in a rectangular region of 16 table elements.

In this case, as is understood from FIGS. 24A, 24B, 24C, and 24D, the positions of 15 surrounding table elements are 15 positions expressed by combinations of four positions in the direction of an x-axis, that is, x=−1, x=0, x=1, and x=2 or x=−2, and four positions in the direction of a y-axis, that is, y=−1, y=0, y=1, and y=2or y=−2.

Suppose that the SAD value of each table element in tables of FIGS. 24A, 24B, 24C, and 24D is Sxy. Thus, for example, the SAD value of the integer precision minimum value table element tm (position (0, 0)) is expressed as $S_{00}$, and the SAD value of a table element at a position (1, 1) is expressed as $S_{11}$.

Figures 25, 26:
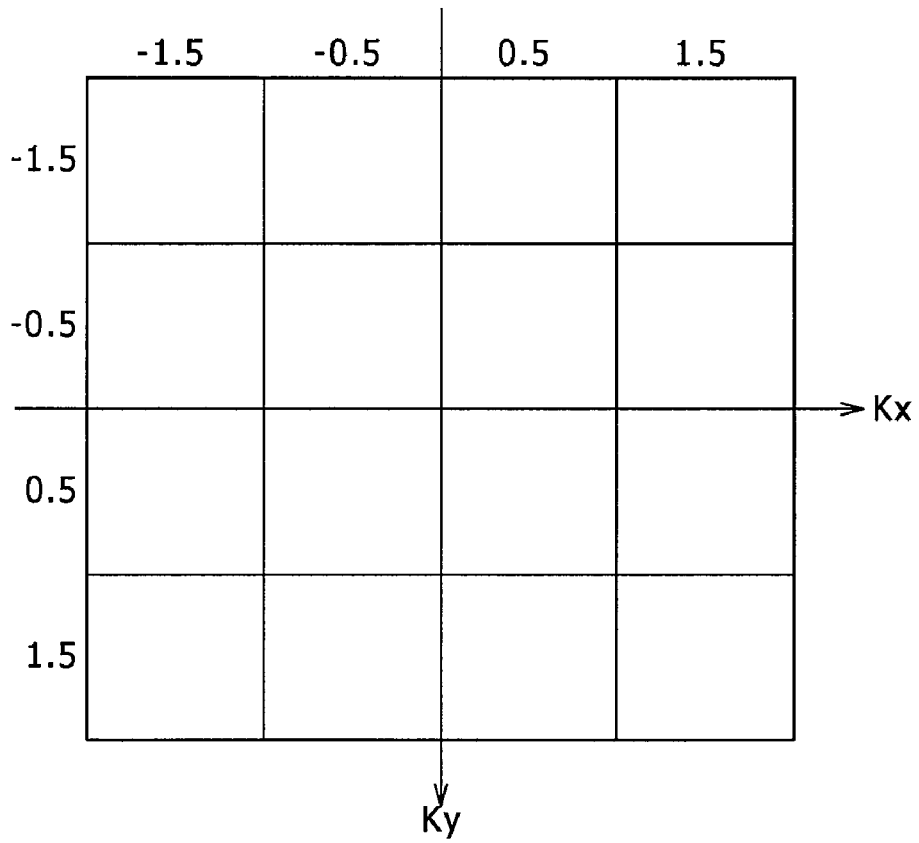
FIG. 25 is a diagram of assistance in explaining an example of a process of calculating a per-block motion vector in an embodiment of the image processing method.
FIG. 26 is a diagram of assistance in explaining an example of a process of calculating a per-block motion vector in an embodiment of the image processing method.

Then, a decimal precision position (dx, dy) in (x, y) coordinates with a central position in a rectangular region of the integer precision minimum value table element tm and 15 table elements surrounding the integer precision minimum value table element tm as an origin (0, 0) can be obtained by (Equation C) and (Equation D) shown in FIG. 25.

Kx and Ky in (Equation C) and (Equation D) of FIG. 25 are values corresponding to the four table element arrangements shown in FIGS. 24A, 24B, 24C, and 24D when (Kx, Ky) coordinates are considered with a central position in a rectangular region of the integer precision minimum value table element tm and 15 table elements surrounding the integer precision minimum value table element tm as an origin (0, 0), as shown in FIG. 26.

Figure 24A:
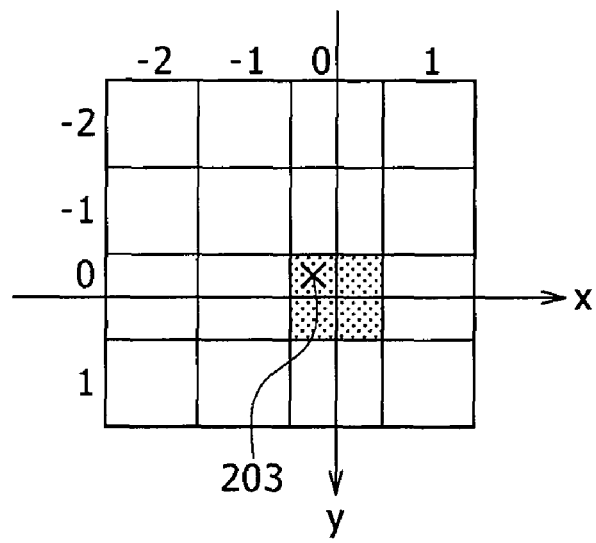
FIGS. 24A, 24B, 24C, and 24D are diagrams of assistance in explaining an example of a process of calculating a per-block motion vector in an embodiment of the image processing method.

Specifically, in the case corresponding to FIG. 24A,
when x=−2, Kx=−1.5
when x=−1, Kx=−0.5
when x=0, Kx=0.5
when x=1, Kx=1.5
In addition,
when y=−2, Ky=−1.5
when y=−1, Ky=−0.5
when y=0, Ky=0.5
when y=1, Ky=1.5

Figure 24B:
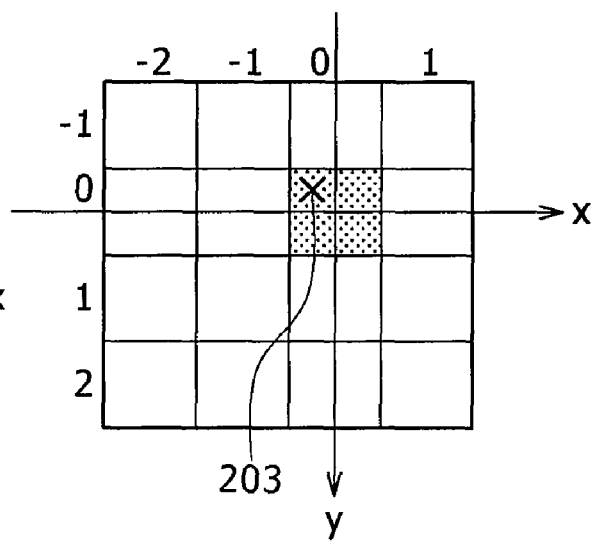

In the case corresponding to FIG. 24B,
when x=−2, Kx=−1.5
when x=−1, Kx=−0.5
when x=0, Kx=0.5
when x=1, Kx=1.5
In addition,
when y=−1, Ky=−1.5
when y=0, Ky=−0.5
when y=1, Ky=0.5
when y=2, Ky=1.5

Figure 24C:
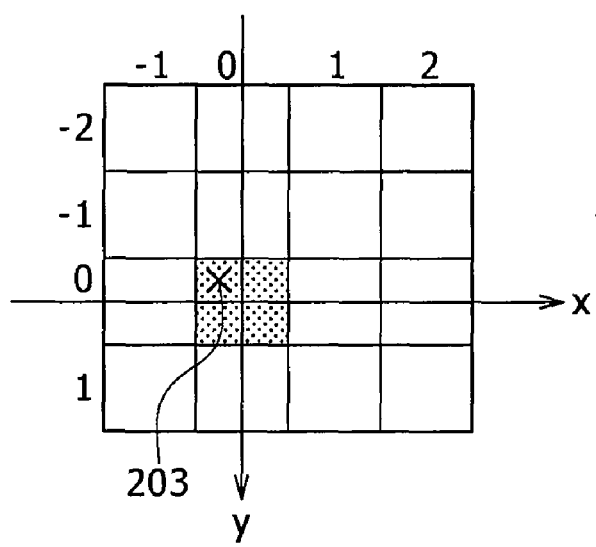

In the case corresponding to FIG. 24C,
when x=−1, Kx=−1.5
when x=0, Kx=−0.5
when x=1, Kx=0.5
when x=2, Kx=1.5
In addition,
when y=−2, Ky=−1.5
when y=−1, Ky=−0.5
when y=0, Ky=0.5
when y=1, Ky=1.5

Figure 24D:
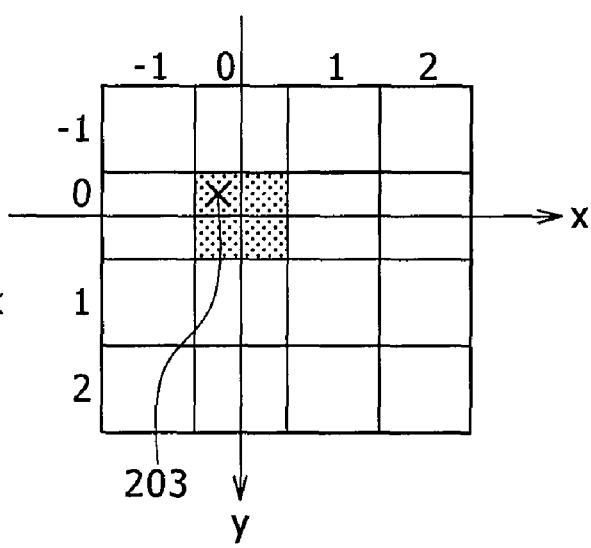

In the case corresponding to FIG. 24D,
when x=−1, Kx=−1.5
when x=0, Kx=−0.5
when x=1, Kx=0.5
when x=2, Kx=1.5
In addition,
when y=−1, Ky=−1.5
when y=0, Ky=−0.5
when y=1, Ky=0.5
when y=2, Ky=1.5

Further, Δx and Δy in (Equation C) and (Equation D) shown in FIG. 25 represent amounts of displacement of (Kx, Ky) coordinates with respect to (x, y) coordinates in each of the table element arrangements of FIGS. 24A, 24B, 24C, and 24D. As is understood from FIG. 26, in the case corresponding to FIG. 24A, Δx=−0.5 and Δy=−0.5, in the case corresponding to FIG. 24B, Δx=−0.5 and Δy=0.5, in the case corresponding to FIG. 24C, Δx=0.5 and Δy=−0.5, and in the case corresponding to FIG. 24D, Δx=0.5 and Δy=0.5.

The decimal precision position (dx, dy) is thus obtained with the position of the integer precision minimum value table element tm as origin (0, 0). Therefore the position 203 with respect to the central position of the search range can be detected from the decimal precision position (dx, dy) and the position of the integer precision minimum value table element tm.

[Second Example of Interpolation Process for Calculating More Accurate Motion Vector]

A second example of an interpolation process for calculating a more accurate motion vector generates a cubic curve in a horizontal direction using the SAD values of a plurality of table elements in the horizontal direction including an integer precision minimum value table element in a reduced SAD table and generates a cubic curve in a vertical direction using the SAD values of a plurality of table elements in the vertical direction including the integer precision minimum value table element, detects a position (vx, vy) of a minimal value of each of the cubic curves, and sets the detected position as a decimal precision minimum value address.

Figure 27B:
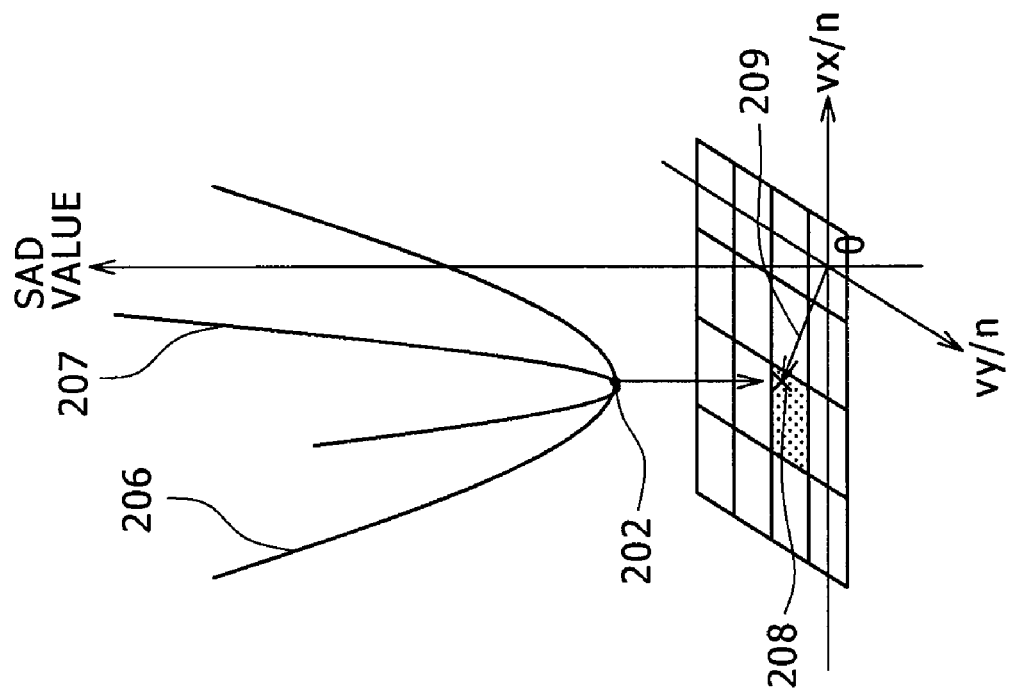
FIGS. 27A and 27B are diagrams of assistance in explaining an example of a process of calculating a per-block motion vector in an embodiment of the image processing method.
Figure 27A:
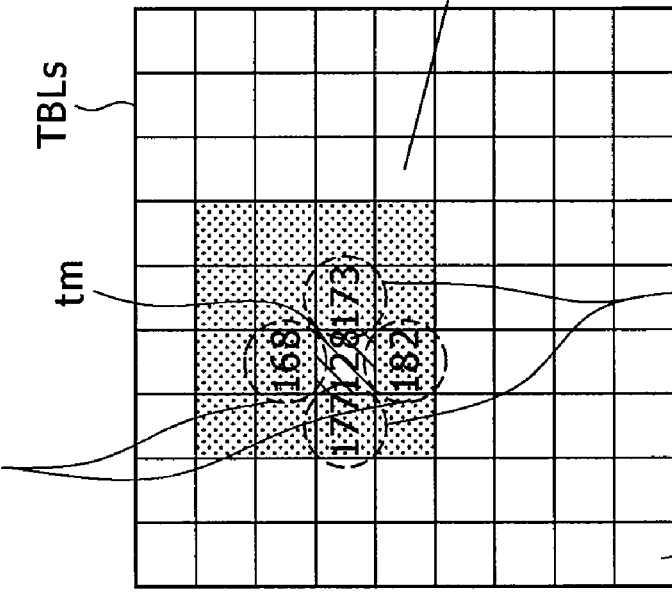

FIGS. 27A and 27B are diagrams of assistance in explaining the second example. As in the above-described first example, an integer precision minimum value table element tm and a plurality of integer precision table elements with the integer precision minimum value table element as a center, or 4×4=16 table elements in the example of FIGS. 27A and 27B are obtained (see a part filled in FIG. 27A).

Then, as in the first example, as shown in FIG. 27B, within a range of reference reduced vectors corresponding to the reduced SAD table within a search range of a reference frame, with the position of a target frame as a reference position (0, 0), an axis vx/n and an axis vy/n of amounts of displacement in the horizontal direction and the vertical direction (corresponding to the reference reduced vectors) are considered, a SAD value axis is considered as an axis perpendicular to the axis vx/n and the axis vy/n, and a coordinate space formed by the three axes is assumed.

Next, a cubic curve 206 in the horizontal direction is generated in the coordinate space using the SAD values of four table elements in the horizontal direction including the integer precision minimum value table element tm among the 16 table elements, the 16 table elements being the integer precision minimum value table element tm and the table elements surrounding the integer precision minimum value table element tm. A horizontal direction position of a decimal precision minimum value table element position is detected as a horizontal direction position vx/n corresponding to a minimal value of the cubic curve 206 in the horizontal direction.

Next, a cubic curve 207 in the vertical direction is generated in the coordinate space using the SAD values of four table elements in the vertical direction including the integer precision minimum value table element tm among the 16 table elements, the 16 table elements being the integer precision minimum value table element tm and the table elements surrounding the integer precision minimum value table element tm. A vertical direction position of the decimal precision minimum value table element position is detected as a vertical direction position vy/n corresponding to a minimal value of the cubic curve 207 in the vertical direction.

The decimal precision minimum value table element position (decimal precision minimum value table address) 208 is detected from the horizontal direction position and the vertical direction position obtained by the above process of the decimal precision minimum value table element position. Then, a vector (minimum value vector) 209 corresponding to the detected decimal precision table element position 208 is multiplied by n as shown in FIG. 18 described above, whereby a motion vector with an original magnitude precision is obtained.

That is, the second example is a method of determining four table elements in each of the horizontal direction and the vertical direction by the method described in the first example and uniquely determining the cubic curve in each of the horizontal direction and the vertical direction as shown in FIG. 27B.

In this case, a method of calculating the position 208 corresponding to the minimum value 202 of the SAD value cubic curves 206 and 207 is as follows. Letting SAD values at four points in the vicinity of the minimum value of the cubic curve in one of the horizontal direction and the vertical direction be $S_0$, $S_1$, $S_2$, and $S_3$ in order along one of the horizontal direction and the vertical direction, an equation for calculating a decimal component u to obtain the minimum value differs depending on which of three sections Ra, Rb, and Rc shown in FIG. 28 includes the decimal precision minimum value.

In this case, the section Ra is an interval between the position of the SAD value $S_0$ and the position of the SAD value $S_1$. The section Rb is an interval between the position of the SAD value $S_1$ and the position of the SAD value $S_2$. The section Rc is an interval between the position of the SAD value $S_2$ and the position of the SAD value $S_3$.

Figures 28, 29:
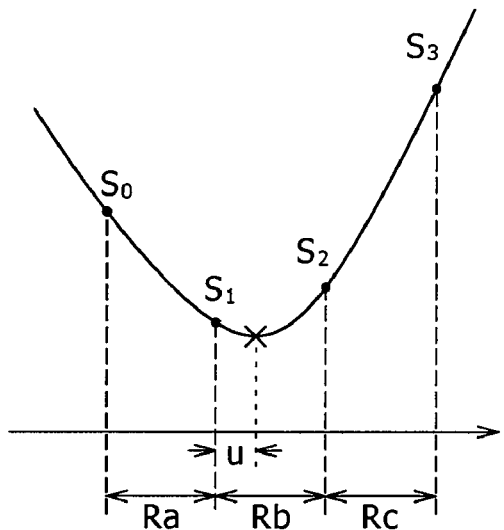
FIG. 28 is a diagram of assistance in explaining an example of a process of calculating a per-block motion vector in an embodiment of the image processing method.
FIG. 29 is a diagram of assistance in explaining an example of a process of calculating a per-block motion vector in an embodiment of the image processing method.

When the decimal precision minimum value is present in the section Ra shown in FIG. 28, the decimal component u as a displacement from the minimum value to an integer precision minimum value is calculated by (Equation E) in FIG. 29.

Similarly, when the decimal precision minimum value is present in the section Rb shown in FIG. 28, the decimal component u as a displacement from the minimum value to an integer precision minimum value is calculated by (Equation F) in FIG. 29.

Further, when the decimal precision minimum value is present in the section Rc shown in FIG. 28, the decimal component u as a displacement from the =minimum value to an integer precision minimum value is calculated by (Equation G) in FIG. 29.

Which of the three sections Ra, Rb, and Rc shown in FIG. 28 includes the decimal precision minimum value is determined as follows.

Figure 30A:
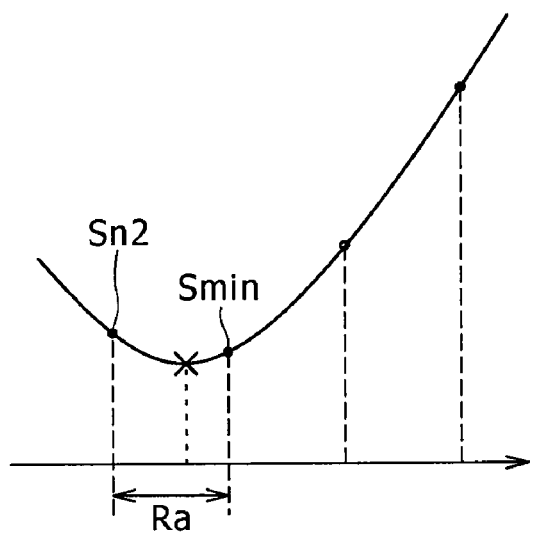
FIGS. 30A, 30B, 30C, and 30D are diagrams of assistance in explaining an example of a process of calculating a per-block motion vector in an embodiment of the image processing method.
Figure 30B:
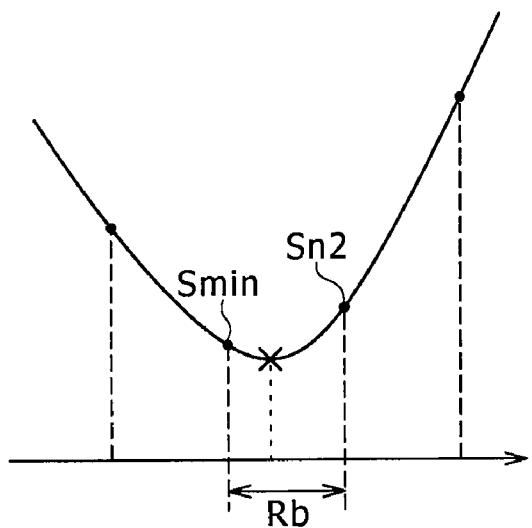
Figure 30C:
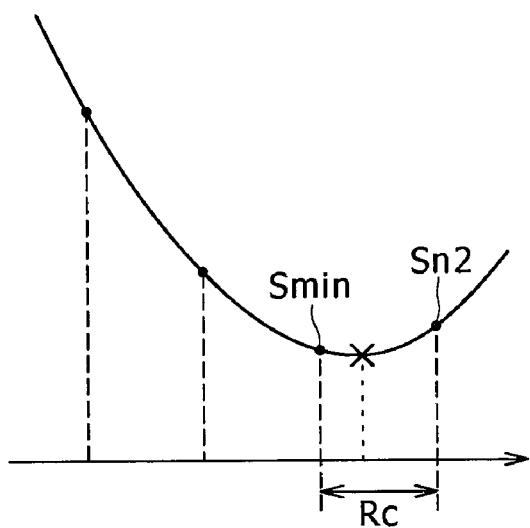

FIGS. 30A, 30B, 30C, and 30D are diagrams of assistance in explaining the determination. As shown in FIGS. 30A, 30B, and 30C, first, a minimum value Smin of integer precision SAD values and a second lowest integer precision SAD value Sn2 are detected, and the decimal precision minimum value is detected as value occurring between the position of the detected minimum value Smin of the integer precision SAD values and the position of the second lowest integer precision SAD value Sn2. Next, which of the sections Ra, Rb, and Rc is the detected section is determined according to positions taken by the integer precision minimum SAD value Smin and the second lowest integer precision SAD value Sn2 among the positions of the SAD values $S_0$, $S_1$, $S_2$, and $S_3$ shown in FIG. 28.

Figure 30D:
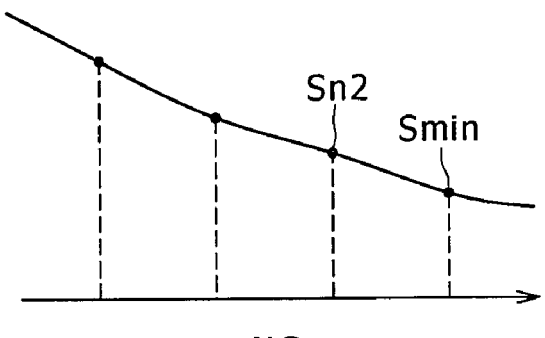

Incidentally, a case where the integer precision minimum SAD value Smin is at the position of a SAD value and situated at an end of the four table element values as shown in FIG. 30D, it is determined that a minimum position cannot be estimated. In the present embodiment, this case is treated as an error, and the calculation of a minimum value position is not performed. Of course, a minimum value position may be calculated even in the case of FIG. 30D.

Figure 31:
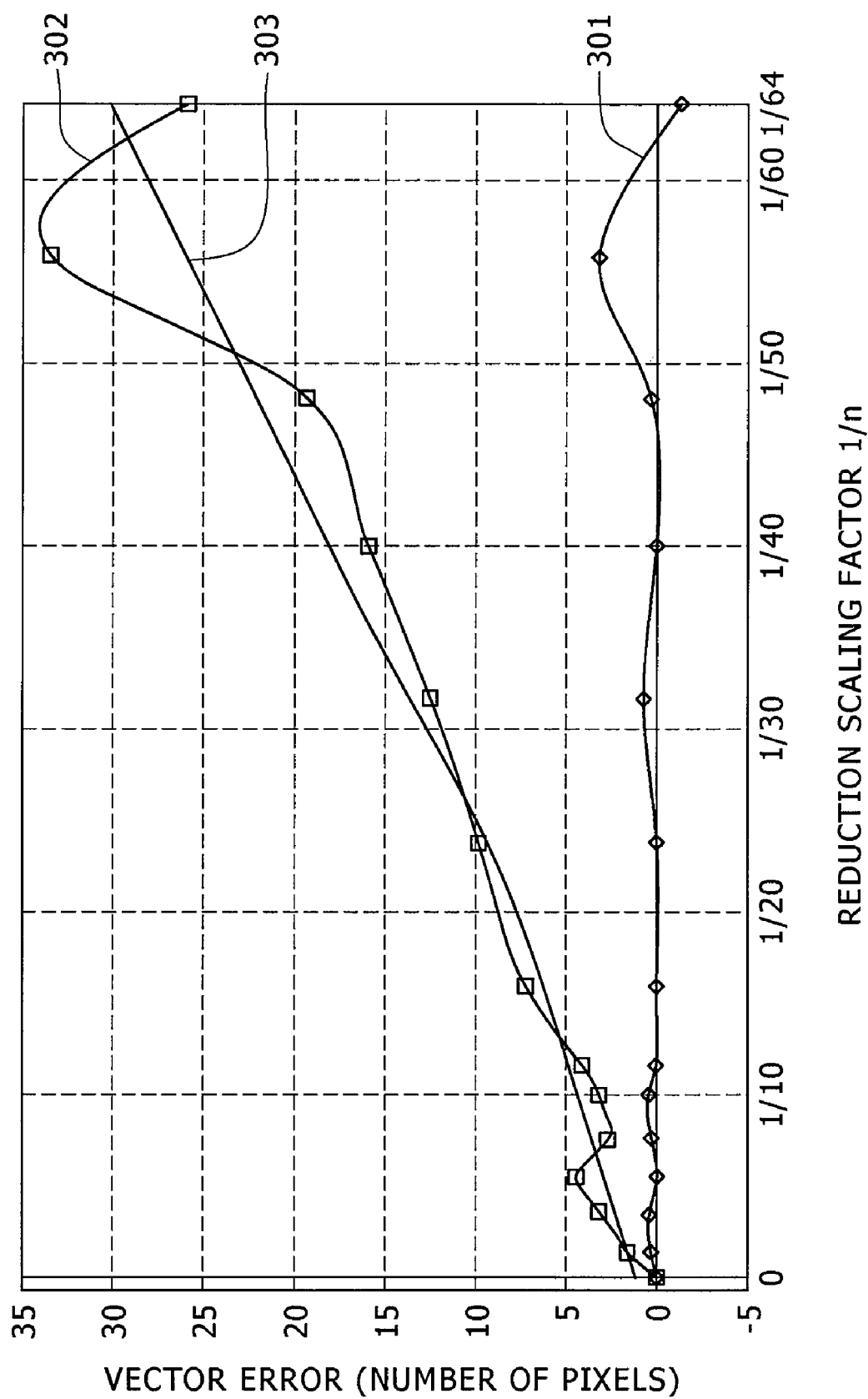
FIG. 31 is a diagram of assistance in explaining processing performance of an example of a process of calculating a per-block motion vector in an embodiment of the image processing method.

As described above, according to the present embodiment, a motion vector on an original image scale can be calculated using the reduced SAD table of small size which table is scaled down to $1/n^2$. FIG. 31 shows that a vector detection result substantially similar to a existing result is obtained in this case even though the reduced SAD table of small size which table is scaled down to $1/n^2$ is used.

An axis of abscissas in FIG. 31 indicates a reduction scaling factor n in a direction of one dimension as one of the horizontal direction and the vertical direction. An axis of ordinates indicates an error (vector error) of a detected motion vector. The numerical value of a vector error in FIG. 31 is expressed as a number of pixels.

In FIG. 31, a curve 301 represents average values of vector errors with respect to the reduction scaling factor. A curve 302 represents values ($3\sigma$ (99.7%)) three times variances $\sigma$ of vector errors with respect to the reduction scaling factor. A curve 303 is an approximate curve approximate to the curve 302.

FIG. 31 shows vector errors with respect to the reduction scaling factor n in the direction of one dimension. Because the SAD table is a two-dimensional table, the size of the table (number of table elements) is reduced at a rate of the square of the reduction scaling factor. On the other hand, the vector error increases only substantially linearly. Thus the usefulness of the method according to the present embodiment can be understood.

In addition, even at the reduction scaling factor n=64 (reduction ratio of 1/64), the vector error is small, and a failure in which a totally different motion vector is calculated and output does not occur. It can thus be said that the size of the SAD table can be effectively reduced to 1/4096.

In addition, as described above, in hand movement correction for moving images, real-time performance and reduction of a system delay are strongly desired, while as for precision, vector detection errors to a certain degree are tolerated except for the case of detecting a failed, totally different motion vector. It can therefore be said that the present embodiment, which can greatly reduce the size of the SAD table without causing a failure, is highly useful.

As described above, the present embodiment divides the reference frame 102 into a plurality of regions, or 16 regions in this example, and detects a motion vector (per-block motion vector) 205 in each of the divided regions. This is because, as described above, there is a strong possibility of a moving subject being included in a frame, so that 16 motion vectors 205 are detected within one reference frame 102 as in FIG. 32, for example, and are statistically processed while changes from such motion vectors 205 in past frames are taken into consideration, whereby one global motion vector for one frame, that is, a hand movement vector of the frame can be determined.

Figure 32:
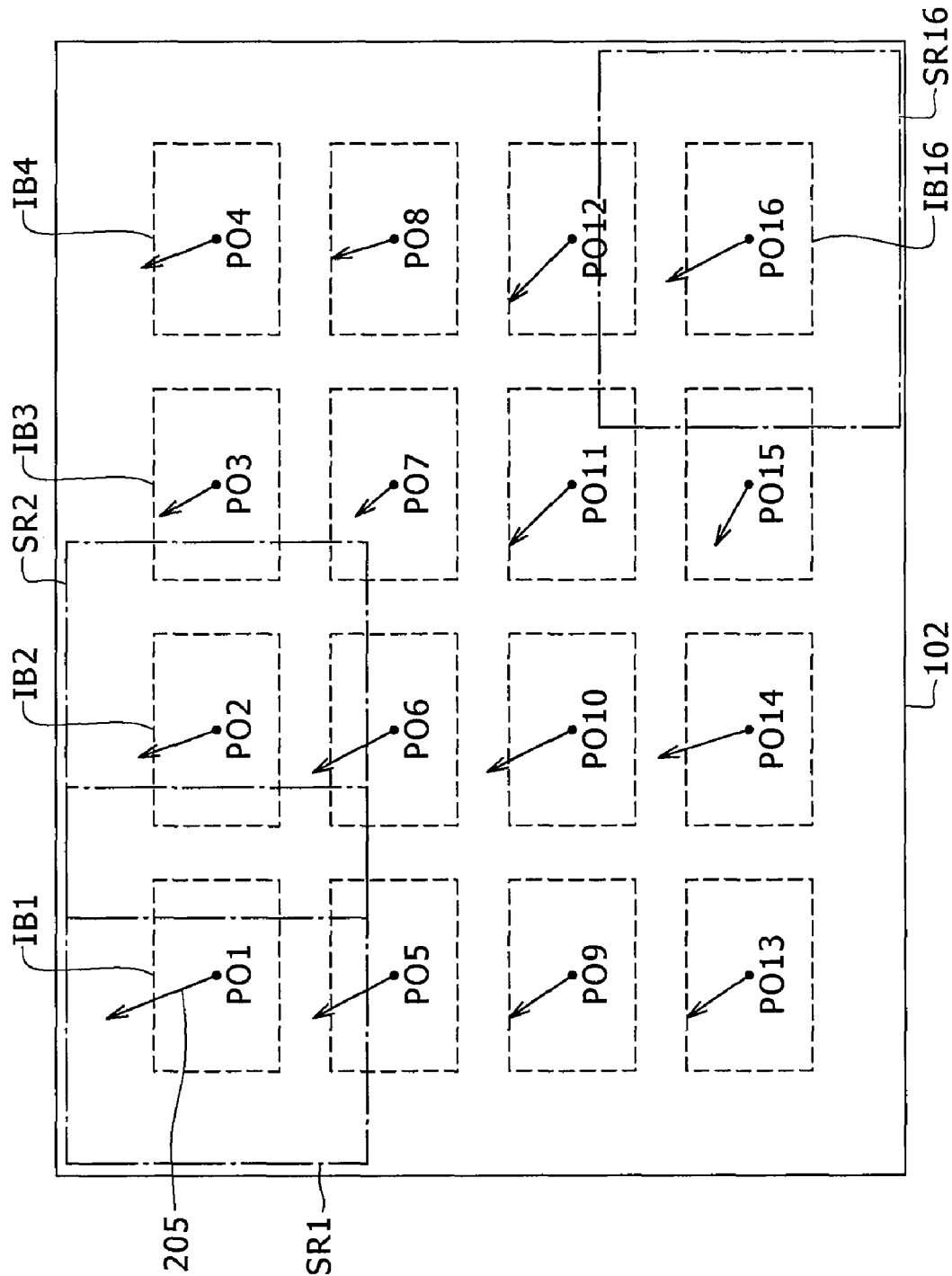
FIG. 32 is a diagram of assistance in explaining an outline of an embodiment of the image processing method.

In this case, as shown in FIG. 32, in a first detection, search ranges SR1, SR2, . . . , and SR16 having reference positions P0 to PO16 of the 16 motion vectors 205 desired to be detected as respective centers of the search ranges SR1, SR2, . . . , and SR16 are set, and projected image blocks IB1, IB2, . . . , and IB16 of target blocks are assumed in the respective search ranges.

Then, reference blocks having the same size as the projected image blocks IB1, IB2, . . . , and IB16 are set, the set reference blocks are moved within the respective search ranges SR1, SR2, . . . , and SR16, reduced SAD tables are generated as described above, and the motion vectors 205 in the respective search ranges SR1, SR2, . . . , and SR16 are detected. Hence, in the present embodiment, a SAD table TBLi has the configuration of a reduced SAD table.

Then, in the present embodiment, the 16 reduced SAD tables obtained for the target blocks in the 16 search ranges are arranged so as to be stacked, as shown in FIG. 2. The SAD values at reference block positions corresponding to each other within the search ranges, that is, same coordinate positions in the reduced SAD tables are aggregated to obtain aggregate SAD values. Then, an aggregate reduced SAD table for a plurality of reference block positions within one search range is generated as a SAD table including the aggregate SAD values. Hence, in the present embodiment, an aggregate SAD table SUM_TBL has the configuration of the aggregate reduced SAD table.

Then, in the present embodiment, using the reduced SAD tables TBLi, the motion vectors 205 obtained by subjecting the reduced SAD tables TBLi to an approximate interpolation process as described above, and the aggregate SAD table SUM_TBL, the reliability determining process as shown in FIG. 10 and FIG. 11, the generation of a re-aggregate SAD table RSUM_TBL of target blocks that obtain highly reliable per-block motion vectors, and a curve approximate interpolation process using a minimum SAD value and a plurality of SAD values adjacent to the minimum SAD value in the generated re-aggregate SAD table RSUM_TBL are performed, whereby a high-precision global motion vector is calculated.

The image processing method using the reduced SAD tables according to the present embodiment described above has the following two features that differ greatly as compared with the method of calculating a motion vector in a size resulting from the reducing conversion of an image as described in Patent Document 3, which has been described as a existing method.

First, the method according to the present embodiment does not require a process of reducing conversion of an image at all, unlike the existing method described in Patent Document 3. In the method according to the present embodiment, when a SAD value calculated for a reference block is assigned and added to a SAD table (reduced SAD table), an address conversion corresponding to a reduction scaling factor is performed at the same time.

Thus, the method according to the present embodiment has the feature of eliminating the need for a logic for the reducing conversion of an image as in the existing method described in Patent Document 3, a time and bandwidth consumption for storing a reduced image in a memory, and securing of an area in the memory where the reduced image is to be pasted.

Another problem in the existing method described in Patent Document 3 is the presence of a low-pass filter for removing aliasing (folding distortion) and low illuminance noise at the time of reducing conversion of an image, as described above. That is, when an image is reduced, the image needs to be re-sampled after being passed through an appropriate low-pass filter. Otherwise, undesired aliasing occurs, which greatly impairs the precision of a motion vector calculated using the reduced image.

It has been theoretically shown that the characteristic of an ideal low-pass filter in the reducing conversion is a function similar to a sinc function. The sinc function itself is an infinite tap FIR (Finite Impulse Response) filter with a cutoff frequency of f/2, which filter is expressed as $\sin(x\pi)/(x\pi)$. A low-pass filter with an ideal cutoff frequency of f/(2n) at a reduction scaling factor 1/n is expressed as $\sin(x\pi/n)/(x\pi/n)$. However, this may be regarded as one form of the sinc function.

Figure 33:
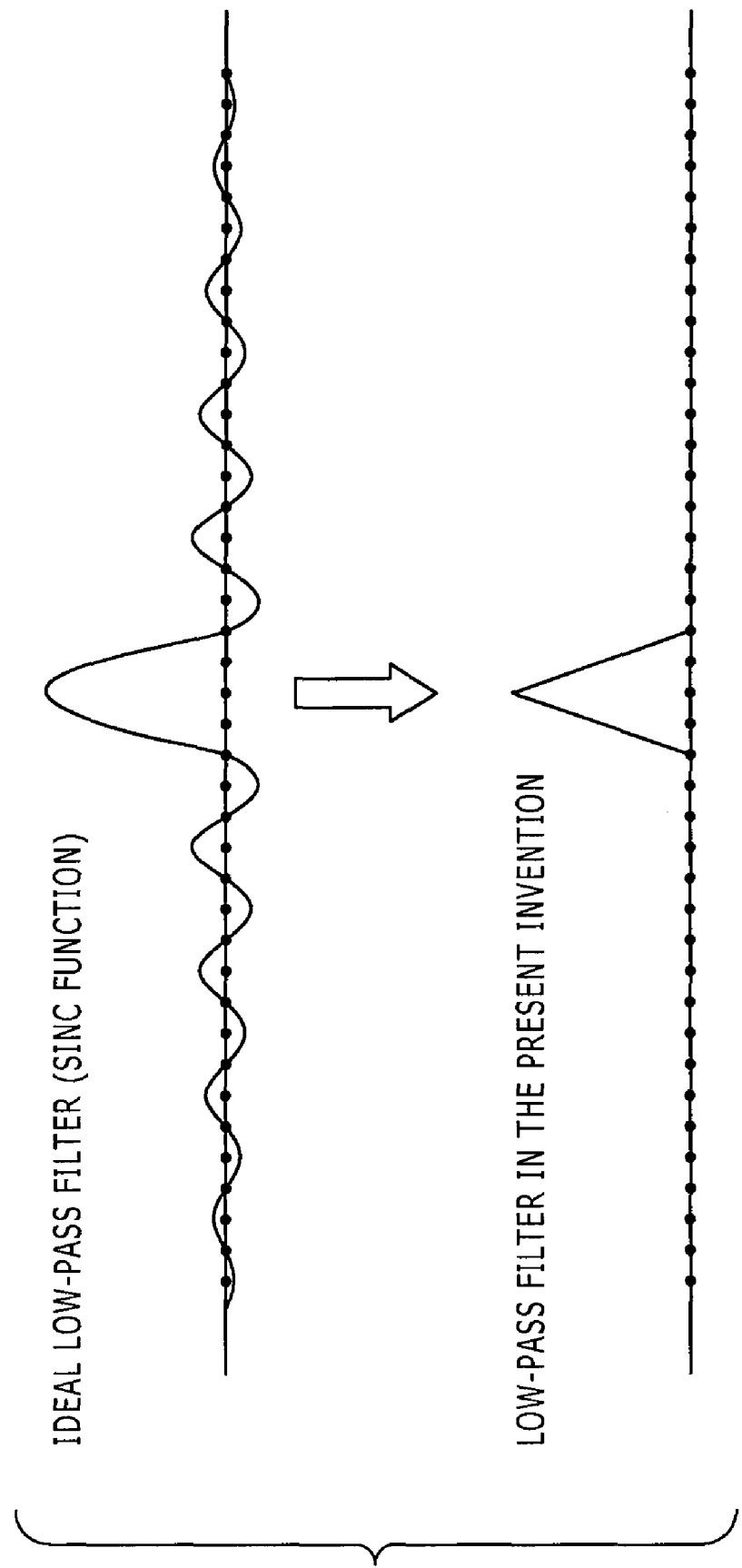
FIG. 33 is a diagram of assistance in explaining features of the image processing method according to an embodiment by comparison with a existing method.
Figure 34:
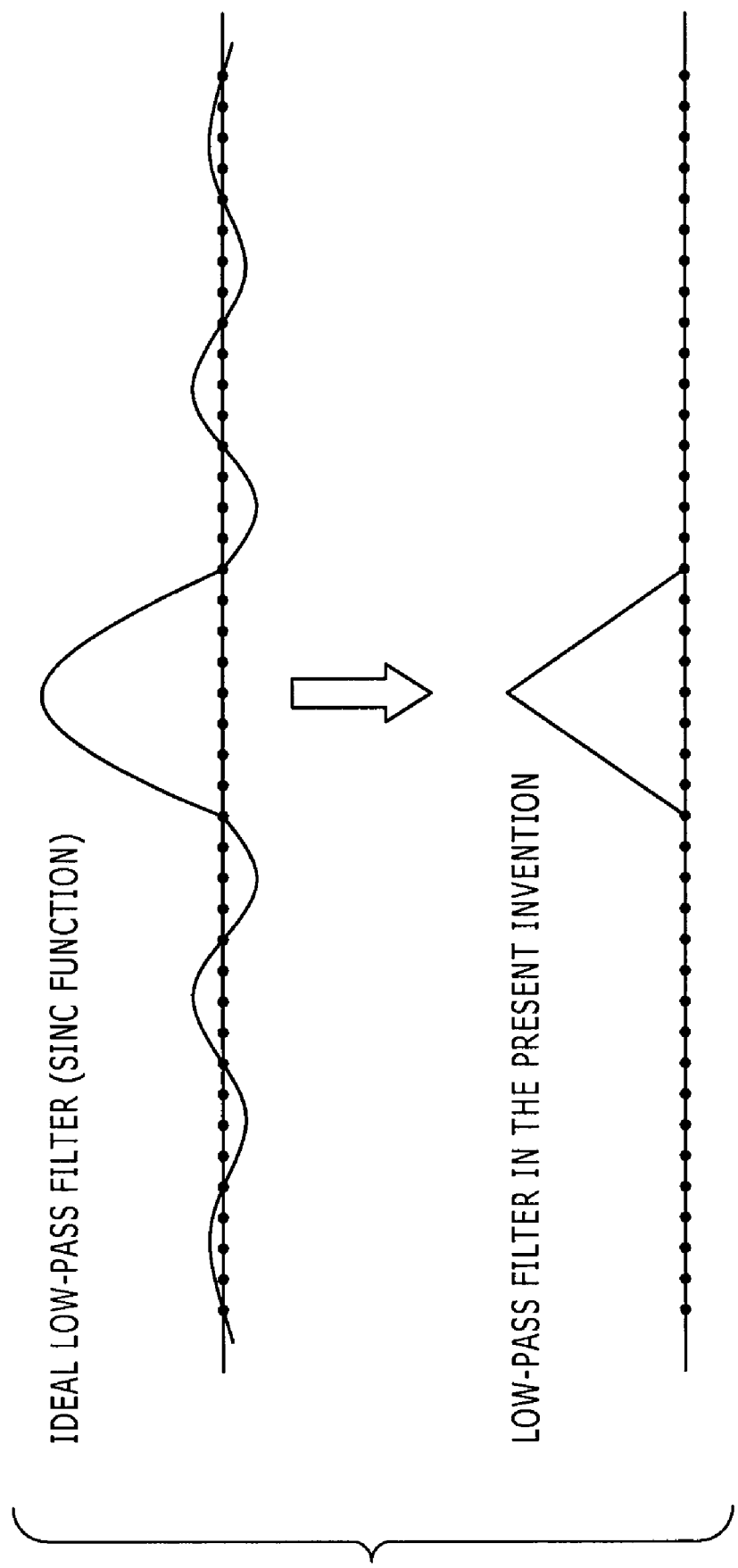
FIG. 34 is a diagram of assistance in explaining features of the image processing method according to an embodiment by comparison with a existing method.
Figure 35:
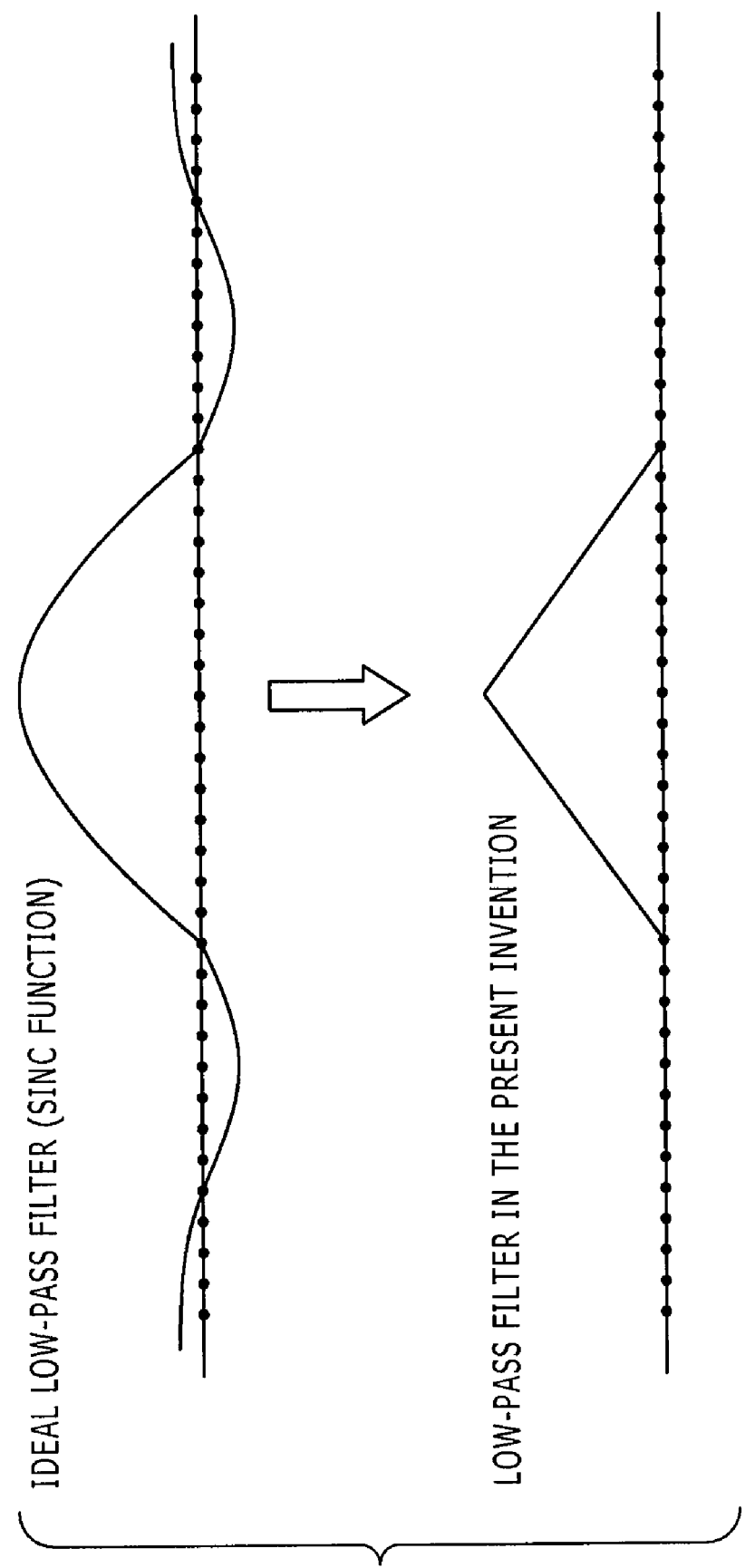
FIG. 35 is a diagram of assistance in explaining features of the image processing method according to an embodiment by comparison with a existing method.

Forms of the sinc function (ideal characteristics of a low-pass filter) when the reduction scaling factor is ½, ¼, and ⅛ are shown on upper sides of FIGS. 33 to 35, respectively. It is clear from FIGS. 33 to 35 that the function is expanded in a direction of a tap axis as the reduction scaling factor is increased. That is, it can be said that the number of taps of the FIR filter needs to be increased even when the infinite tap sinc function is approximated by only main coefficients.

In addition, it is generally known that the number of taps, rather than the filter form, of a filter realizing a cutoff frequency in a lower band has a dominant effect on performance of the filter.

Thus, the method of calculating the motion vector using the reduced image as the existing method described in Patent Document 3 also involves a trade-off in that although the higher the image reduction scaling factor, the greater the SAD table reducing effect of the method, the higher the reduction scaling factor, the higher the cost of the low-pass filter as a filter for preprocessing in generating an image.

In general, when a high-order tap FIR filter is implemented, the cost of an operation logic is increased in proportion to the square of the number of taps, thus presenting a problem. However, a greater problem is an increase in the number of line memories for implementing a vertical filter. In digital still cameras in recent years, so-called strip processing is performed to reduce the size of line memories as the number of pixels is increased. Even if the size per line is reduced, an increase in the number of line memories themselves pushes considerably higher a total cost calculated in terms of physical layout area.

As is understood from the above description, the image reduction approach of the existing method described in Patent Document 3 is confronted with a high barrier to implementation of a vertical low-pass filter in particular. On the other hand, the method according to the present embodiment solves this problem in a totally different manner.

Images of a low-pass filter in the method according to the present embodiment are shown on lower sides of FIGS. 33 to 35. The method according to the present embodiment does not involve an image reduction process. However, the images of the low-pass filter in a process of reduced SAD table generation and operation are shown in FIGS. 33 to 35.

As shown on the lower sides of FIGS. 33 to 35, while characteristics of the low-pass filter are simple filter characteristics in which a main coefficient part of the sinc function is approximated linearly, the number of taps is increased in such a manner as to be interlocked with the reduction scaling factor. This is suitable to the fact that the number of taps has a more dominant effect on performance of the low-pass filter as the cutoff frequency is lowered, as described above. That is, the process itself of distributing and adding SAD values in the present embodiment such for example as the process of performing linearly weighted distribution and addition according to the embodiment is equivalent to implementing a high-performance low-pass filter interlocked with the scaling factor with simple circuitry.

The existing method described in Patent Document 3 reduces an image by passing the image through a low-pass filter and re-sampling the image. At this time, a considerable amount of image information is lost. That is, in the operation of the low-pass filter, the word length of a luminance value of image information is greatly rounded and then stored in a memory, and less significant bits of most of image information do not have effect on an image after reduction.

On the other hand, the method according to the present embodiment calculates SAD values using all bit information of luminance values of all pixels equally, determines distribution and addition values of the SAD values, and adds the distribution and addition values to a reduced SAD table. If only the word length of each table element value in the reduced SAD table is increased, calculation can be performed with no rounding error included all the way to the output of final SAD values. Because the area of the reduced SAD table is smaller than that of a frame memory, increasing the word length of the reduced SAD table does not present a great problem. As a result, the reduced SAD table and motion vector detection can be realized with a high precision.

First Embodiment of Image Processing Device

A first embodiment of an image processing device using an image processing method is described below with reference to drawings by taking an image pickup device as an example. FIG. 1 is a block diagram showing an example of the image pickup device as the embodiment of the image processing device.

In the first embodiment of FIG. 1, the present invention is applied to a hand movement correction system for still images. Incidentally, the present embodiment is not limited to use for still images, and is essentially applicable to moving images. In the case of moving images, because of real time performance, there is an upper limit to the number of frames to be added together. However, the embodiment can be applied with identical means to a system generating a moving image resulting from a high degree of noise reduction effect, by using the present method for each frame.

The first embodiment sets an input image frame as a reference frame, and detects a motion vector between the input image frame and an image frame obtained by delaying an input image frame in a frame memory by one frame. Then, hand movement correction for a still image in the first embodiment is performed by superimposing a plurality of images photographed consecutively, for example 3-fps images on each other while making the hand movement correction.

Thus, the first embodiment superimposes a plurality of images taken consecutively while making the hand movement correction on the photographed still images, and therefore provides a precision close to a pixel precision (one-pixel precision). As described above, the first embodiment detects not only translation components in a horizontal direction and a vertical direction between frames as a hand movement motion vector but also a rotation component between the frames.

As shown in FIG. 1, the image pickup device according to the present embodiment is formed by connecting a CPU (Central Processing Unit) 1 to a system bus 2 and connecting an image pickup signal processing system 10, a user operation input unit 3, an image memory unit 4, a recording and reproduction device unit 5 and the like to the system bus 2. Incidentally, it is assumed in the present specification that the CPU 1 includes a ROM (Read Only Memory) for storing a program for performing various software processes, a RAM (Random Access Memory) for a work area, and the like.

In response to an image pickup recording start operation via the user operation input unit 3, the image pickup device in the example of FIG. 1 records picked-up image data as later described. In addition, in response to an operation for starting reproduction of a picked-up and recorded image which operation is performed via the user operation input unit 3, the image pickup device in the example of FIG. 1 reproduces the picked-up image data recorded on a recording medium of the recording and reproduction device unit 5.

As shown in FIG. 1, an image pickup element 11 is irradiated with incident light from a subject via a camera optical system (not shown) having an image pickup lens 10L, whereby image pickup is performed. In this example, the image pickup element 11 is formed by a CCD (Charge Coupled Device) imager. Incidentally, the image pickup element 11 may be formed by a CMOS (Complementary Metal Oxide Semiconductor) imager.

In the image pickup device in this example, when an image pickup and recording start operation is performed, sampling is performed according to a timing signal from a timing signal generating unit 12, and thereby an analog image pickup signal as a RAW signal in a Bayer arrangement of three primary colors, that is, red (R), green (G), and blue (B) is output from the image pickup element 11. The output analog image pickup signal is supplied to a preprocessing unit 13 to be subjected to preprocessing such as defect correction, γ correction and the like, and then the result is supplied to a data converting unit 14.

The data converting unit 14 converts the analog image pickup signal input to the data converting unit 14 into a digital image pickup signal (YC data) including a luminance signal component Y and a color-difference component Cb/Cr. The data converting unit 14 then supplies the digital image pickup signal to the image memory unit 4 via the system bus 2.

The image memory unit 4 in the example of FIG. 1 includes three frame memories 41, 42, and 43. The digital image pickup signal from the data converting unit 14 is first stored in the frame memory 41. Then, after the passage of one frame, the digital image pickup signal stored in the frame memory 41 is transferred to the frame memory 42, and a digital image pickup signal of a new frame from the data converting unit 14 is written to the frame memory 41. Thus, the frame memory 42 stores the frame image preceding the frame image stored in the frame memory 41 by one frame.

Then, a hand movement vector detecting unit 15 accesses the two frame memories 41 and 42 via the system bus 2 to read the data stored in the two frame memories 41 and 42. The hand movement vector detecting unit 15 performs processes such for example as the process of generating 16 SAD tables for one frame, the process of detecting per-block motion vectors, the process of generating an aggregate SAD table, the process of generating a re-aggregate SAD table, and the process of detecting a global motion vector, and performs the process of calculating an amount of translation and a rotation angle of the frame, as described above.

In this case, the frame image stored in the frame memory 42 is the image of an original frame, and the frame image stored in the frame memory 41 is the image of a reference frame. Incidentally, in practice, the frame memories 41 and 42 are subjected to rotation as double buffer.

As described above, the hand movement vector detecting unit 15 in the first embodiment repeats the motion vector detecting process using reduced SAD tables and an aggregate SAD table in two or more stages while narrowing down a search range and changing a reduction scaling factor as required.

In the detection of a hand movement vector and the hand movement correction process for a still image, in particular, there are less severe limitations for real-time performance, the number of pixels is large, and a high-precision motion vector needs to be detected, so that a hierarchical motion vector detecting process in a plurality of stages is very effective.

The image memory unit 4 in the first embodiment is provided with a frame memory 43 for storing a result of superimposing a plurality of frames on each other after rotating and translating the plurality of frames. As described above, image frames are superimposed on a first reference image (see the image frame 120 in FIG. 3).

The image data of the first reference frame on which a plurality of frames are superimposed after being rotated and translated is also written to the frame memory 43, as indicated by a broken line in FIG. 1.

After a second image frame or a subsequent image frame is stored in the frame memory 41, the hand movement vector detecting unit 15 detects a relative hand movement vector between the second image frame or the subsequent image frame and the image preceding the image frame by one frame at all times, using the image data stored in the frame memory 41. At this time, previous hand movement vectors are integrated to calculate a hand movement vector with respect to the first reference image. In addition, the hand movement vector detecting unit 15 detects a relative rotation angle of the second image frame or a subsequent image frame with respect to the first reference image frame.

The hand movement vector detecting unit 15 supplies the CPU 1 with the information of the detected relative hand movement vector and the detected relative rotation angle of each of the second and subsequent image frames with respect to the first image frame.

The second and subsequent images stored in the frame memory 42 are read from the frame memory 42 under control of the CPU 1 such that the calculated relative hand movement components (components of amounts of translation) with respect to the reference image of the first frame are cancelled out. The second and subsequent images stored in the frame memory 42 are then supplied to a rotation and translation adding unit 19. The second and subsequent images from which the amounts of translation by hand movement are removed by cutout according to the relative hand movement components are supplied from the frame memory 42 to the rotation and translation adding unit 19.

According to a control signal from the CPU 1, the rotation and translation adding unit 19 rotates each of the second and subsequent image frames read from the frame memory 42 according to the relative rotation angles with respect to the first reference image frame, and adds each of the second and subsequent image frames to the image frame read from the frame memory 43 or averages the image frames. An image frame as a result of the addition or the averaging is written back to the frame memory 43.

Then, the data of the image frame in the frame memory 43 is cut out so as to have a predetermined resolution and a predetermined image size according to a control instruction of the CPU 1. The result is supplied to a resolution converting unit 16. Under control of the CPU 1, the resolution converting unit 16 generates and outputs image data having the predetermined resolution and the predetermined image size according to the control instruction of the CPU 1.

An NTSC (National Television System Committee) encoder 18 converts the image data from the resolution converting unit 16 from which data the hand movement components are removed into a standard color video signal of an NTSC system. The video signal is supplied to a monitor display 6 forming an electronic viewfinder, so that the photographed image is displayed on the display screen of the monitor.

In parallel with the monitor display, the image data from the resolution converting unit 16 from which data the hand movement components are removed is subjected to a coding process such as recording modulation and the like in a codec unit 17, and then supplied to the recording and reproduction device unit 5 to be recorded on a recording medium such as an optical disk including for example a DVD (Digital Versatile Disk), a hard disk, or the like.

The picked-up image data recorded on the recording medium of the recording and reproduction device unit 5 is read according to a reproduction start operation via the user operation input unit 3, and then supplied to the codec unit 17 to be reproduction-decoded. The reproduction-decoded image data is supplied to the monitor display 6 via the NTSC encoder 18, so that a reproduced image is displayed on the display screen of the monitor display 6. Incidentally, though not shown in FIG. 1, an output video signal from the NTSC encoder 18 can be output to the outside via a video output terminal.

The hand movement vector detecting unit 15 described above can be formed by hardware or formed by using a DSP (Digital Signal Processor). Further, the hand movement vector detecting unit 15 can be software processing by the CPU 1. In addition, the hand movement vector detecting unit 15 can be a combination of hardware, DSP processing, and software processing by the CPU 1.

The hand movement vector detecting unit 15 may only calculate relative per-block motion vectors between frames and a global motion vector, and the processes of calculating a relative high-precision global motion vector, an amount of translation, and a rotation angle, and calculating an amount of translation and a rotation angle with respect to a first frame may be performed by the CPU 1.

Incidentally, the rotation and translation adding unit 19 in the present embodiment can perform three frame addition processing methods, that is, "simple addition", "average addition", and "tournament addition", as will be described later. The user operation input unit 3 has selection and specification operating means (not shown in FIG. 1) for specifying one of the three frame addition processing methods. The CPU 1 supplies a selection control signal corresponding to a selection and specification of a user via the selection and specification operating means to the rotation and translation adding unit 19. The rotation and translation adding unit 19 performs the frame addition processing method specified by the selection control signal from the CPU 1 among the three frame addition processing methods.

[Process Operation in Hand Movement Vector Detecting Unit 15]

First Example

A first example of a flow of process operation in the hand movement vector detecting unit 15 in the present embodiment is described below with reference to flowcharts of FIGS. 36 to 39. In the first example, an amount of translation and a rotation angle are calculated from a global motion vector for a reference frame.

Incidentally, FIGS. 36 to 39 represent a process for one reference frame, and the process routine of FIGS. 36 to 39 is performed for each reference frame. In this case, after a process of setting a search range in a first detection in step S31 is performed for a first reference frame, the process for subsequent reference frames can be omitted.

The first detection is described. A search range offset for 16 search ranges for 16 target blocks as shown in FIG. 32 described above is set to zero by setting central positions of the target blocks as centers of the respective search ranges, and the search ranges are set to a maximum range assumed in the present embodiment (step S31 in FIG. 36).

Next, a process of calculating reduced SAD tables and per-block motion vectors as described above is performed in the search ranges set respectively for the 16 target blocks (step S32). Details of the process routine of step S32 is described later.

After the generation of the reduced SAD tables for the 16 target blocks is completed, SAD values at reference block positions corresponding to each other in the search ranges are aggregated by (Equation 3) shown in FIG. 4 in the 16 reduced SAD tables, whereby an aggregate reduced SAD table for the plurality of reference block positions within one search range which table has the same size as the reduced SAD tables is generated (step S33).

Next, a minimum SAD value is detected in the generated aggregate reduced SAD table. An aggregate motion vector is calculated by performing a process of approximate surface interpolation as described above using the detected minimum SAD value and a plurality of SAD values adjacent to the minimum SAD value (step S34).

Next, with the aggregate motion vector calculated in step S34 as a reference, determination as to the conditions shown in FIG. 10 is made on the basis of SAD values and per-block motion vectors of the 16 reduced SAD tables. The reduced SAD table of each of the 16 target blocks is thereby labeled "TOP", "NEXT_TOP", "NEAR_TOP", or "OTHERS", as described above. In addition, a total score sum_score for the reference frame in question is calculated. Then, a result of the labeling and the calculated total score sum_score are retained (step S35). Incidentally, at this time, a mask flag is set to target blocks labeled "NEAR_TOP" and "OTHERS", the mask flag indicating that the target blocks labeled "NEAR_TOP" and "OTHERS" are of low reliability and thus are not to be used.

Next, a majority decision is made on the basis of the 16 per-block motion vectors calculated in step S32 (step S36). With the per-block motion vector of a majority decision top as a reference, determination as to the conditions shown in FIG. 10 is made on the basis of the SAD values and the per-block motion vectors of the 16 reduced SAD tables. The SAD table of each of the 16 target blocks is thereby labeled "TOP", "NEXT_TOP", "NEAR_TOP", or "OTHERS", as described above. In addition, a total score many_score for the reference frame in question is calculated. A result of the labeling and the calculated total score many_score are retained (step S37).

Then, the aggregate motion vector calculated in step S34 and the motion vector of the majority decision top detected as a result of the majority decision process in step S36 are compared with each other to determine whether the coordinate positions in the reduced SAD table of the two motion vectors coincide with each other or are immediately adjacent to each other (the coordinate positions are immediately adjacent to each other in a vertical direction, a horizontal direction, or a diagonal direction) (step S38).

When it is determined in step S38 that the aggregate motion vector and the motion vector of the majority decision top do not coincide with each other or are not immediately adjacent to each other, it is determined that the global motion vector of the reference frame in question is not reliable, the reference frame in question is excluded from frames to be subjected to a superimposition process for still image hand movement correction, and the following process is skipped (step S39). Then the process routine is ended.

Figure 37:
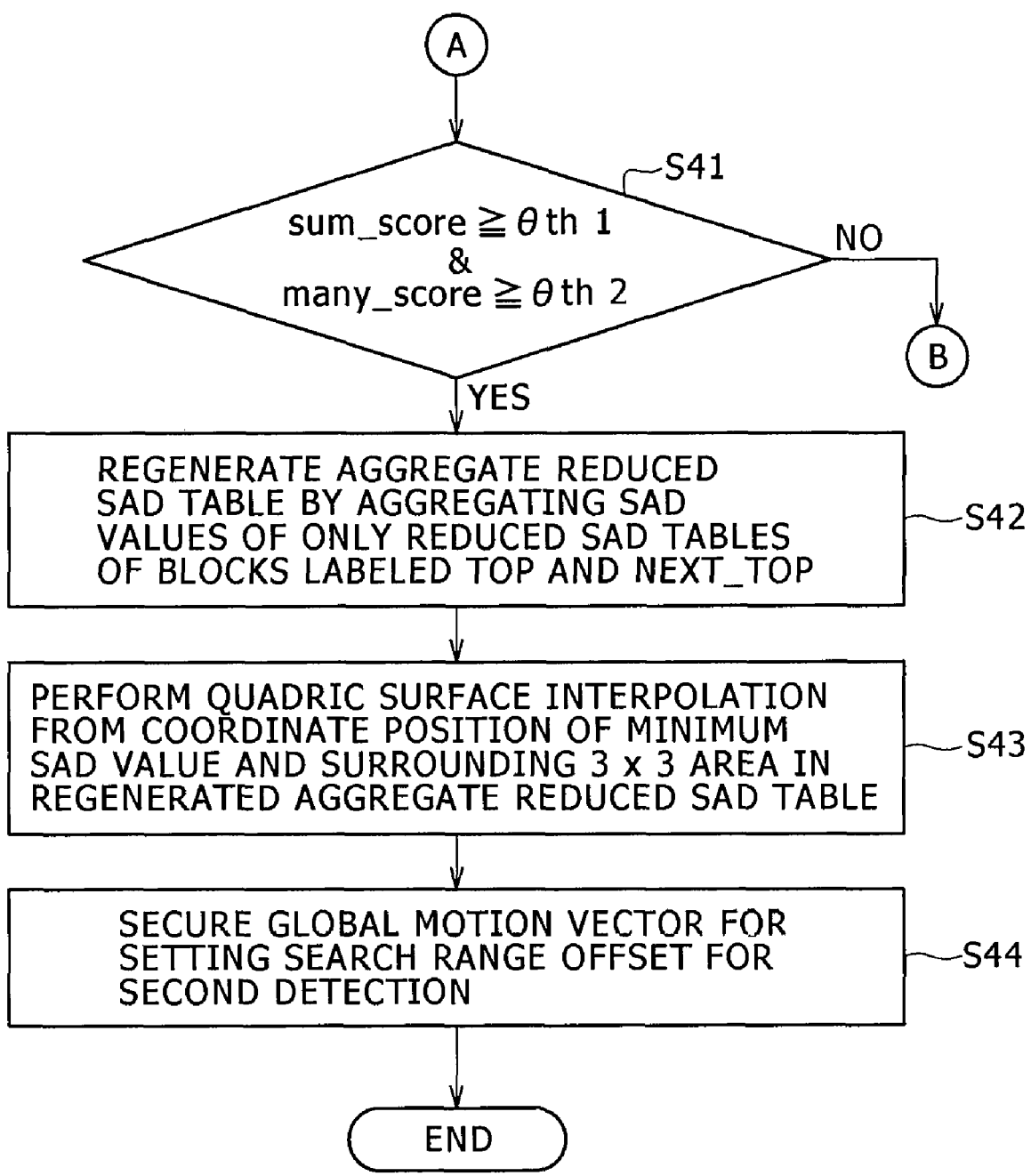
FIG. 37 is a part of the flowchart of assistance in explaining the example of the process of detecting the translation component and the rotation component of the hand movement in the first embodiment of the image processing device.

When it is determined in step S38 that the aggregate motion vector and the motion vector of the majority decision top coincide with each other or are immediately adjacent to each other, whether or not the total score sum_score obtained in step S35 is equal to or higher than a predetermined threshold value θth1 set in advance and the total score many_score obtained in step S37 is equal to or higher than a predetermined threshold value θth2 set in advance is determined (step S41 in FIG. 37).

When one or both of the conditions that the total score sum_score be equal to or higher than the threshold value θth1 and that the total score many_score be equal to or higher than the threshold value θth2 are not satisfied in step S41, the process proceeds to step S39, where the reference frame in question is excluded from frames to be subjected to the superimposition process for still image hand movement correction, and the following process is skipped. Then the process routine is ended.

When both of the conditions that the total score sum_score be equal to or higher than the threshold value θth1 and that the total score many_score be equal to or higher than the threshold value θth2 are satisfied in step S41, the aggregate SAD values are recalculated using only the SAD values of the SAD tables given the labels of "TOP" and "NEXT_TOP" among the SAD tables corresponding to the target blocks and labeled in step S35, and the aggregate reduced SAD table is recalculated (step S42).

Then, the process of approximate surface interpolation is performed using the coordinate position of a minimum SAD value and a plurality of SAD values at coordinate positions adjacent to the coordinate position of the minimum SAD value in a re-aggregate SAD table obtained by the recalculation (step S43). In this example, the process of approximate surface interpolation in step S43 is performed using table elements in a 3×3 rectangular region as described above with reference to FIG. 20A.

Then, a motion vector detected as a result of the process of approximate surface interpolation is secured as a global motion vector to be used for setting a search range offset in a second detection (step S44).

Figure 38:
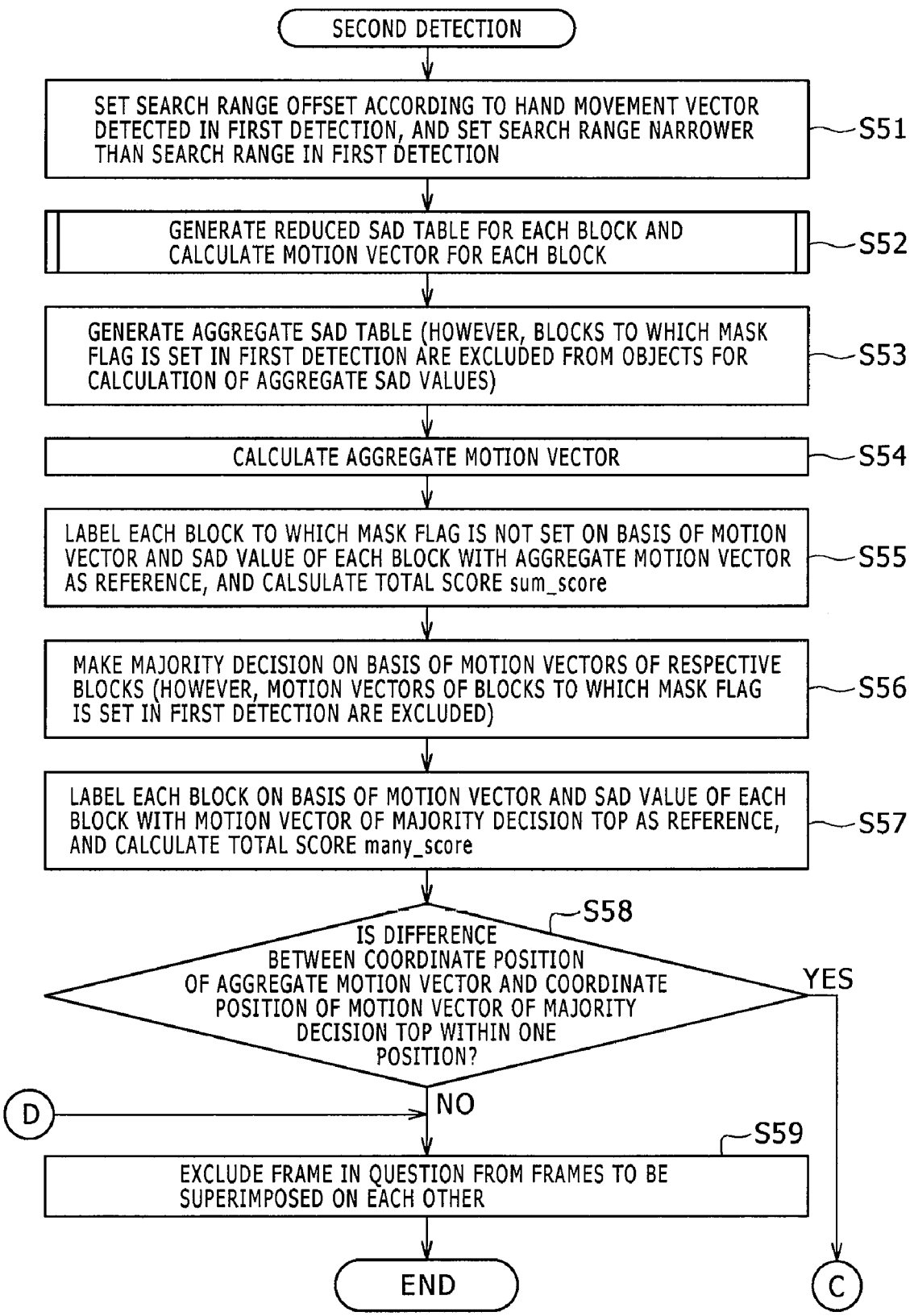
FIG. 38 is a part of the flowchart of assistance in explaining the example of the process of detecting the translation component and the rotation component of the hand movement in the first embodiment of the image processing device.
Figure 39:
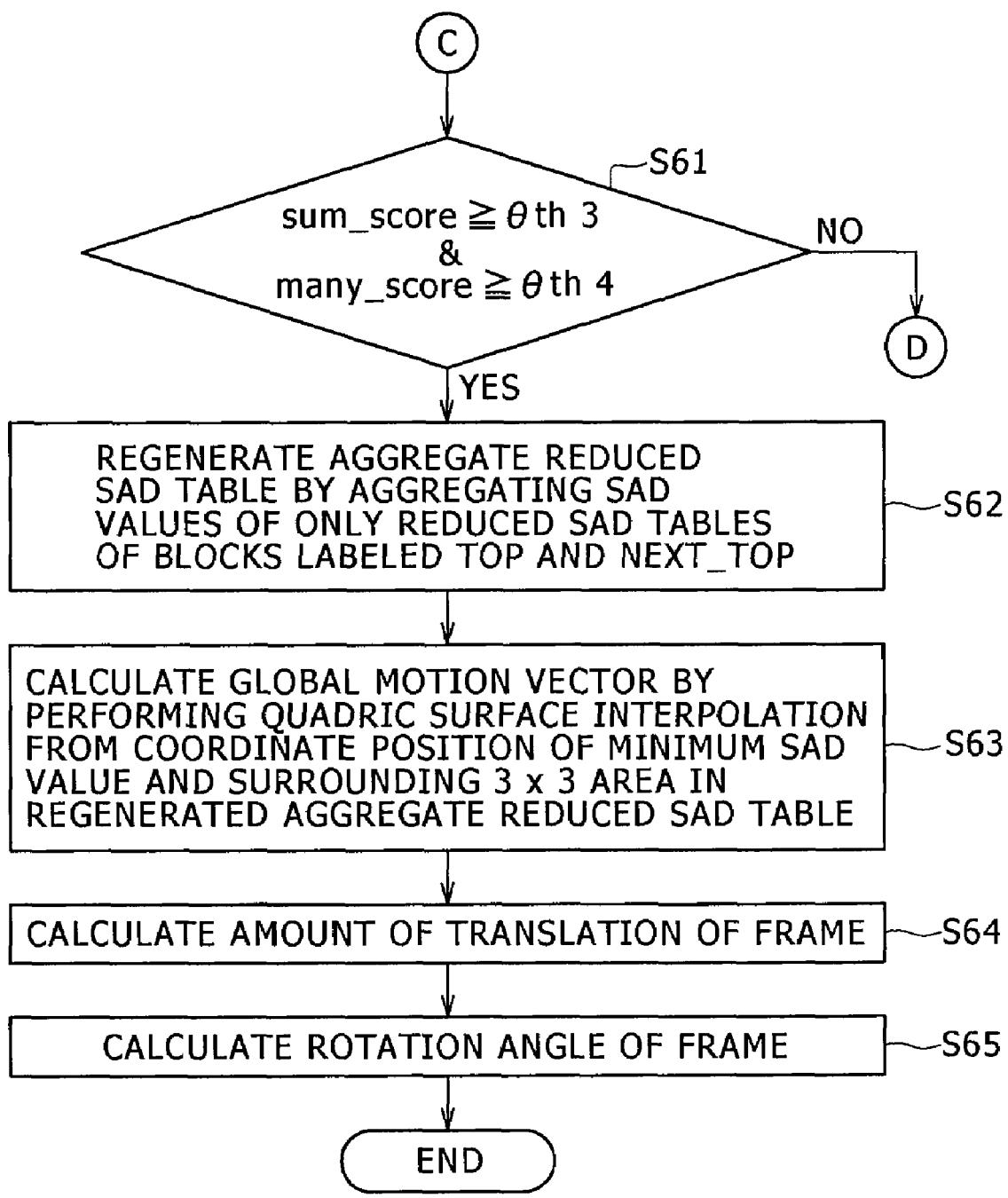
FIG. 39 is a part of the flowchart of assistance in explaining the example of the process of detecting the translation component and the rotation component of the hand movement in the first embodiment of the image processing device.

The hand movement vector detecting unit 15 next proceeds to perform the second detection represented in FIG. 38 and FIG. 39.

As shown in FIG. 12B, the 16 search ranges for the 16 target blocks are set as ranges that have, as a center thereof, a position offset by the global motion vector obtained in the first detection and secured in step S39, that is, by an amount of translation, and which ranges are narrower than in the first detection (step S51 in FIG. 38).

Next, a process of calculating reduced SAD tables and per-block motion vectors as described above is performed in the search ranges set respectively for the 16 target blocks (step S52).

After the generation of the reduced SAD tables for the plurality of target blocks in step S52 is completed, SAD values at reference block positions corresponding to each other in the search ranges are aggregated by (Equation 3) shown in FIG. 4 in the reduced SAD tables of the target blocks having the labels of "TOP" and "NEXT_TOP", excluding the target blocks to which the mask flag is set in the first detection, whereby an aggregate reduced SAD table for the plurality of reference block positions within one search range which table has the same size as the reduced SAD tables is generated (step S53). Incidentally, the process of calculating reduced SAD tables and per-block motion vectors in step S52 may be performed for only the target blocks having the labels of "TOP" and "NEXT_TOP", excluding the target blocks to which the mask flag is set in the first detection.

Next, a minimum SAD value is detected in the aggregate reduced SAD table generated in step S53. A decimal precision aggregate motion vector is calculated by performing a process of approximate surface interpolation as described above using the detected minimum SAD value and a plurality of SAD values adjacent to the minimum SAD value (step S54).

Next, with the aggregate motion vector calculated in step S54 as a reference, determination as to the conditions shown in FIG. 10 is made on the basis of SAD values and per-block motion vectors of the reduced SAD tables for the target blocks to which the mask flag is not set in the first detection. The reduced SAD table of each of the above target blocks is thereby labeled "TOP", "NEXT_TOP", "NEAR_TOP", or "OTHERS", as described above. In addition, the total score sum_score for the reference frame in question is recalculated. Then, a result of the labeling and the calculated total score sum_score are retained (step S55). Incidentally, also at this time, the mask flag is set to target blocks newly labeled "NEAR_TOP" and "OTHERS", the mask flag indicating that the target blocks labeled "NEAR_TOP" and "OTHERS" are of low reliability and thus are not to be used.

Next, a majority decision is made on the basis of the per-block motion vectors for the target blocks to which the mask flag is not set in the first detection among the per-block motion vectors calculated in step S52 (step S56). With the per-block motion vector of a majority decision top as a result of the majority decision as a reference, determination as to the conditions shown in FIG. 10 is made on the basis of the SAD values and the per-block motion vectors of the reduced SAD tables for the target blocks to which the mask flag is not set. The reduced SAD table of each of the above target blocks is thereby labeled "TOP", "NEXT_TOP", "NEAR_TOP", or "OTHERS", as described above. In addition, a total score many_score for the reference frame in question is calculated.

A result of the labeling and the calculated total score many_score are retained (step S57).

Then, the aggregate motion vector calculated in step S54 and the motion vector of the majority decision top detected as a result of the majority decision process in step S56 are compared with each other to determine whether the coordinate positions in the reduced SAD table of the two motion vectors coincide with each other or are immediately adjacent to each other (the coordinate positions are immediately adjacent to each other in a vertical direction, a horizontal direction, or a diagonal direction) (step S58).

When it is determined in step S58 that the aggregate motion vector and the motion vector of the majority decision top do not coincide with each other or are not immediately adjacent to each other, it is determined that the global motion vector of the reference frame in question is not reliable, the reference frame in question is excluded from frames to be subjected to the superimposition process for still image hand movement correction, and the following process is skipped (step S59). Then the process routine is ended.

When it is determined in step S58 that the aggregate motion vector and the motion vector of the majority decision top coincide with each other or are immediately adjacent to each other, whether or not the total score sum_score obtained in step S55 is equal to or higher than a predetermined threshold value θth3 set in advance and the total score many_score obtained in step S57 is equal to or higher than a predetermined threshold value θth4 set in advance is determined (step S61 in FIG. 39).

When one or both of the conditions that the total score sum_score be equal to or higher than the threshold value θth3 and that the total score many_score be equal to or higher than the threshold value θth4 are not satisfied in step S61, the process proceeds to step S59, where the reference frame in question is excluded from frames to be subjected to the superimposition process for still image hand movement correction, and the following process is skipped. Then the process routine is ended.

When both of the conditions that the total score sum_score be equal to or higher than the threshold value θth3 and that the total score many_score be equal to or higher than the threshold value θth4 are satisfied in step S61, the aggregate SAD values are recalculated using only the SAD values of the SAD tables given the labels of "TOP" and "NEXT_TOP" among the SAD tables corresponding to the target blocks and labeled in step S55, and the aggregate reduced SAD table is recalculated (step S62).

Then, the process of approximate surface interpolation is performed using the coordinate position of a minimum SAD value and a plurality of SAD values at coordinate positions adjacent to the coordinate position of the minimum SAD value in a re-aggregate SAD table obtained by the recalculation, and an aggregate motion vector as a global motion vector is calculated and retained (step S63). In this example, the process of approximate surface interpolation in step S63 is performed using table elements in a 3×3 rectangular region as described above with reference to FIG. 20A.

Then, a relative amount of translation of the still image of the frame in question with respect to an immediately preceding frame is determined on the basis of the calculated aggregate motion vector, and an amount of translation of the frame in question with respect to a first frame is calculated by adding the determined amount of translation (step S64).

Next, a relative rotation angle of the still image of the frame in question with respect to the immediately preceding frame is calculated as a rotation angle between an aggregate motion vector similarly detected and retained for the immediately preceding frame and the aggregate motion vector of the frame in question which aggregate motion vector is detected in step S63, and a rotation angle of the frame in question with respect to the first frame is calculated by adding the calculated rotation angle (step S65).

By completing the above process, the hand movement vector detecting unit 15 ends the process of calculating the amount of translation and the rotation angle in a frame unit due to hand movement, and then supplies the amount of translation and the rotation angle as a result of the calculation to the CPU 1. Then, using the amount of translation and the rotation angle as the result of the calculation, the rotation and translation adding unit 19 superimposes the frame in question on the first frame.

Incidentally, in the above description, the amount of translation and the rotation angle with respect to the first frame are also calculated in step S64 and step S65. However, only the calculation of the relative amount of translation and the relative rotation angle with respect to the immediately preceding frame may be performed in step S64 and step S65, and the CPU 1 may calculate the amount of translation and the rotation angle with respect to the first frame.

When the above process has been completed, the process operation in the hand movement vector detecting unit 15 for one reference frame is ended.

Figure 36:
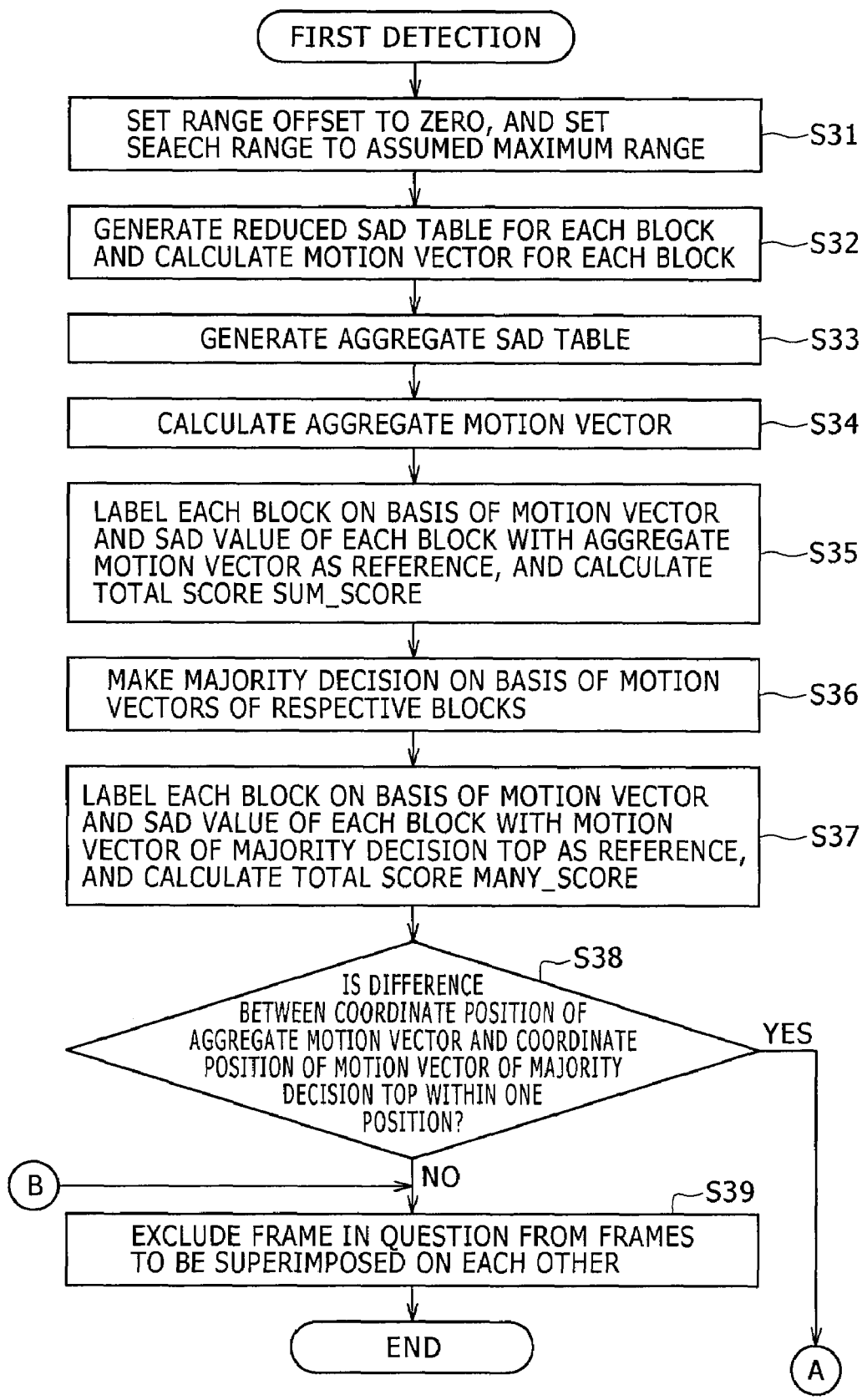
FIG. 36 is a part of a flowchart of assistance in explaining an example of a process of detecting a translation component and a rotation component of hand movement in a first embodiment of an image processing device.

A process from step S31 to step S34 and a process from step S51 to step S54 in the flowchart of FIG. 36 and FIG. 37 and the flowchart of FIG. 38 and FIG. 39 may be performed by the hand movement vector detecting unit 15, and the subsequent processes may be performed by the CPU 1 by software.

Further, in detecting the hand movement vector (global motion vector), the process method of securing the global motion vector as described above and the existingly proposed method of predicting the global motion vector from frequency of the motion vector in a time axis direction may be combined with each other to further improve reliability and precision.

In addition, in the above-described example, the re-aggregate SAD table is generated using only the SAD values of the reduced SAD tables of the blocks given the labels of "TOP" and "NEXT_TOP" among the blocks labeled in step S35 or step S55. However, the re-aggregate SAD table may be generated using only the SAD values of the reduced SAD tables of the blocks given the labels of "TOP" and "NEXT_TOP" among the blocks labeled in step S37 or step S57. Further, the re-aggregate SAD table may be generated using the SAD values of the reduced SAD tables of the blocks given the labels of "TOP" and "NEXT_TOP" among the blocks labeled in both of step S35 or step S55 and step S37 or step S57.

Further, in the above-described example, the total scores sum_score and many_score of scores corresponding to the labels given to the per-block motion vectors are used as one criterion for determining the evaluation of the global motion vector for the reference frame for which the motion vectors are calculated. In place of the total scores, however, whether or not the number of per-block motion vectors given the labels of "TOP" and "NEXT_TOP" is equal to or larger than a predetermined threshold value may be used as a criterion for determining the evaluation, so that it is determined that a high evaluation value is to be given to the global motion vector when the number of per-block motion vectors having the labels of "TOP" and "NEXT_TOP" is equal to or larger than the predetermined threshold value.

Second Example

A second example of a flow of process operation in the hand movement vector detecting unit 15 in the present embodiment is described below with reference to flowcharts of FIGS. 40 to 42. In the second example, an amount of translation and a rotation angle of a reference frame are calculated by the method described above with reference to FIGS. 5 to 8E, using only highly reliable per-block motion vectors among the per-block motion vectors of the reference frame.

Figure 40:
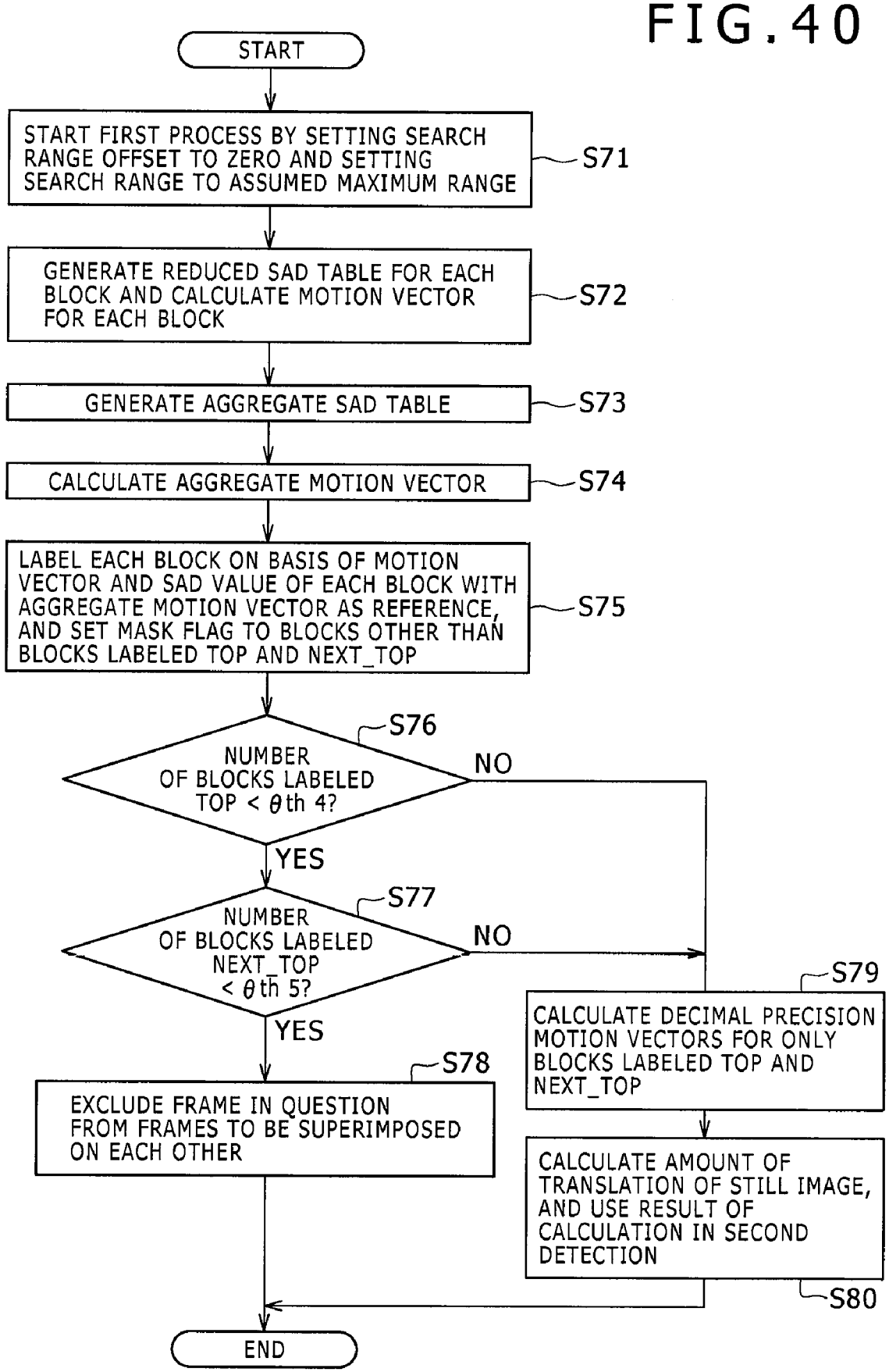
FIG. 40 is a part of a flowchart of assistance in explaining another example of a process of detecting a translation component and a rotation component of hand movement in the first embodiment of the image processing device.
Figure 41:
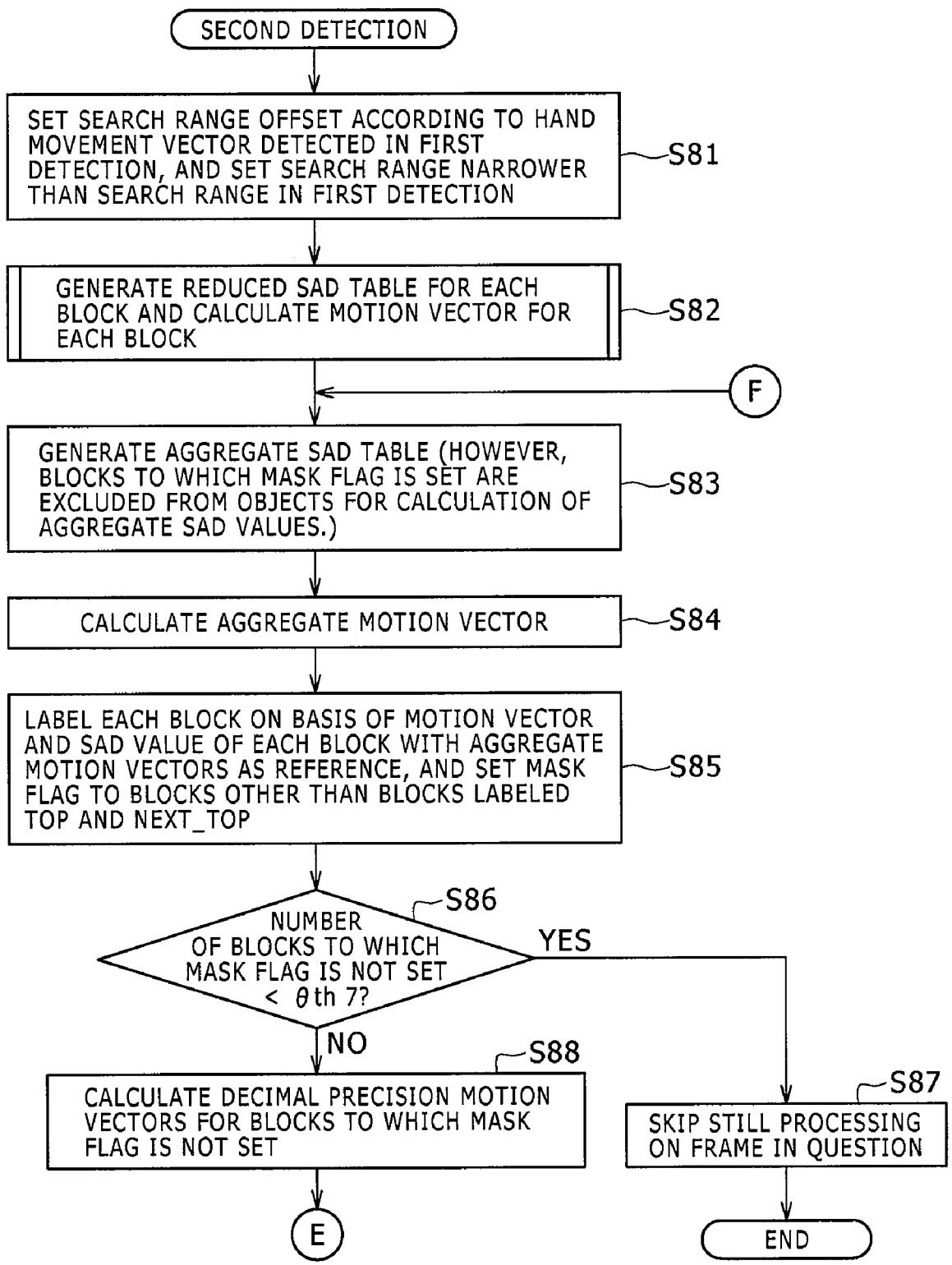
FIG. 41 is a part of the flowchart of assistance in explaining the other example of the process of detecting the translation component and the rotation component of the hand movement in the first embodiment of the image processing device.

The process of FIGS. 40 to 42 is also a process for one reference frame, and the process routine of FIGS. 40 to 42 is performed for each reference frame. In this case, after a process of setting a search range in a first detection in step S71 is performed for a first reference frame, the process for subsequent reference frames can be omitted.

The first detection will be described. A search range offset for 16 search ranges for 16 target blocks as shown in FIG. 32 described above is set to zero by setting central positions of the target blocks as centers of the respective search ranges, and the search ranges are set to a maximum range assumed in the present embodiment (step S71 in FIG. 40).

Next, a process of calculating reduced SAD tables and per-block motion vectors as described above is performed in the search ranges set respectively for the 16 target blocks (step S72). Details of the process routine of step S72 are described later.

After the generation of the reduced SAD tables for the 16 target blocks is completed, SAD values at reference block positions corresponding to each other in the search ranges are aggregated by (Equation 3) shown in FIG. 4 in the 16 reduced SAD tables, whereby an aggregate reduced SAD table for the plurality of reference block positions within one search range which table has the same size as the reduced SAD tables is generated (step S73).

Next, a minimum SAD value is detected in the generated aggregate reduced SAD table. An aggregate motion vector is calculated by performing a process of approximate surface interpolation as described above using the detected minimum SAD value and a plurality of SAD values adjacent to the minimum SAD value (step S74).

Next, with the aggregate motion vector calculated in step S74 as a reference, determination as to the conditions shown in FIG. 10 is made on the basis of SAD values and per-block motion vectors of the 16 reduced SAD tables. The reduced SAD table of each of the 16 target blocks is thereby labeled "TOP", "NEXT_TOP", "NEAR_TOP", or "OTHERS", as described above. At this time, a mask flag is set to target blocks labeled "NEAR_TOP" and "OTHERS", the mask flag indicating that the target blocks labeled "NEAR_TOP" and "OTHERS" are of low reliability and thus are not to be used (step S75).

Next, whether the number of target blocks given the label "TOP" is smaller than a predetermined threshold value θth5 set in advance is determined (step S76). When it is determined that the number of target blocks given the label "TOP" is smaller than the threshold value θth5, whether the number of target blocks given the label "NEXT_TOP" is smaller than a predetermined threshold value θth6 set in advance is determined (step S77).

When it is determined in step S77 that the number of target blocks given the label "NEXT_TOP" is smaller than the threshold value θth6, the reference frame in question is excluded from frames to be subjected to a superimposition process for still image hand movement correction, and the following process is skipped (step S78). Then the process routine is ended.

When it is determined in step S76 that the number of target blocks given the label "TOP" is equal to or larger than the threshold value $\theta th5$, or when it is determined in step S77 that the number of target blocks given the label "NEXT_TOP" is equal to or larger than the threshold value $\theta th6$, the process of approximate surface interpolation as described above with reference to FIG. 17, FIGS. 20A and 20B, FIGS. 23A and 23B, or FIGS. 27A and 27B is performed for the reduced SAD tables of the target blocks labeled "TOP" and "NEXT_TOP", to which blocks the mask flag is not set, whereby high-precision (decimal precision) per-block motion vectors are calculated (step S79).

Next, as described above with reference to FIG. 5 and FIG. 6, an amount of translation of the frame in question with respect to a previous frame is calculated using only the highly reliable per-block motion vectors calculated in step S79 (step S80). The amount of translation calculated in this step corresponds to the global motion vector in the foregoing first example. This amount of translation is used for setting a search range offset in a second detection. Thus the process of the first detection is ended.

The hand movement vector detecting unit 15 next proceeds to perform the second detection represented in FIG. 41 and FIG. 42.

As shown in FIG. 12B, the 16 search ranges for the 16 target blocks are set as ranges that have, as a center thereof, a position offset by the amount of translation obtained in the first detection and secured in step S80, and which ranges are narrower than in the first detection (step S81 in FIG. 41).

Next, a process of calculating reduced SAD tables and per-block motion vectors as described above is performed in the search ranges set respectively for the 16 target blocks (step S82).

After the generation of the reduced SAD tables for the plurality of target blocks in step S82 is completed, SAD values at reference block positions corresponding to each other in the search ranges are aggregated by (Equation 3) shown in FIG. 4 in the reduced SAD tables of the target blocks having the labels of "TOP" and "NEXT_TOP", excluding the target blocks to which the mask flag is set in the first detection, whereby an aggregate reduced SAD table for the plurality of reference block positions within one search range which table has the same size as the reduced SAD tables is generated (step S83). Incidentally, the process of calculating reduced SAD tables and per-block motion vectors in step S82 may be performed for only the target blocks having the labels of "TOP" and "NEXT_TOP", excluding the target blocks to which the mask flag is set in the first detection.

Next, a minimum SAD value is detected in the aggregate reduced SAD table generated in step S83. A decimal precision aggregate motion vector is calculated by performing a process of approximate surface interpolation as described above using the detected minimum SAD value and a plurality of SAD values adjacent to the minimum SAD value (step S84).

Next, with the aggregate motion vector calculated in step S84 as a reference, determination as to the conditions shown in FIG. 10 is made on the basis of SAD values and per-block motion vectors of the reduced SAD tables for the target blocks to which the mask flag is not set in the first detection. The reduced SAD table of each of the above target blocks is thereby labeled "TOP", "NEXT_TOP", "NEAR_TOP", or "OTHERS", as described above. In addition, the mask flag is set to target blocks labeled "NEAR_TOP" and "OTHERS", the mask flag indicating that the target blocks labeled "NEAR_TOP" and "OTHERS" are of low reliability and thus are not to be used (step S85).

Next, whether the number of target blocks to which the mask flag is not set is smaller than a predetermined threshold value $\theta th7$ set in advance is determined (step S86). When the number of target blocks to which the mask flag is not set is smaller than the predetermined threshold value $\theta th7$, the reference frame in question is excluded from frames to be subjected to the superimposition process for still image hand movement correction, and the following process is skipped (step S87). Then the process routine is ended.

When it is determined in step S86 that the number of target blocks to which the mask flag is not set is equal to or larger than the threshold value $\theta th7$ set in advance, the process of approximate surface interpolation as described above with reference to FIG. 17, FIGS. 20A and 20B, FIGS. 23A and 23B, or FIGS. 27A and 27B is performed for the reduced SAD tables of the target blocks labeled "TOP" and "NEXT_TOP", to which blocks the mask flag is not set, whereby high-precision (decimal precision) per-block motion vectors are calculated (step S88).

Next, as described above with reference to FIG. 5 and FIG. 6, an amount of translation ($\alpha$, $\beta$) of the frame in question with respect to the previous frame is calculated using only the highly reliable per-block motion vectors calculated in step S88 (step S91 in FIG. 42).

In addition, as described above with reference to FIGS. 6 to 8E, a rotation angle ($\gamma$) of the frame in question with respect to the previous frame is calculated using only the highly reliable per-block motion vectors calculated in step S88 (step S92).

Next, an ideal per-block motion vector for each target block is calculated on the basis of the amount of translation ($\alpha$, $\beta$) obtained in step S91 and the rotation angle ($\gamma$) obtained in step S92. Errors ERRi between the ideal per-block motion vector and the per-block motion vectors Vi actually calculated for the respective target blocks are calculated, and a sum total $\Sigma$ERRi of the errors is calculated (step S93). The errors ERRi can be calculated by (Equation H) in FIG. 43. The sum total $\Sigma$ERRi of the errors is the sum total of the errors of the frame in question.

Incidentally, as described above with respect to (Equation 6), it is confirmed that a measured value of the rotation angle resulting from hand movements of a plurality of subjects is very low, so that $\cos\gamma \approx 1$ and $\sin\gamma \approx \gamma$ for the rotating matrix R. Thus the errors ERRi can be expressed as in FIG. 43.

Next, whether the sum total $\Sigma$ERRi of the errors calculated in step S93 is smaller than a predetermined threshold value $\theta th8$ set in advance is determined (step S94). When it is determined that the sum total is not smaller than the predetermined threshold value $\theta th8$, a mask flag is set to a target block having a maximum value of the errors ERRi of the per-block motion vectors Vi for each target block which errors are calculated in step S93 (step S95).

Then, after step S95, the process returns to step S83 in FIG. 41, where SAD values at reference block positions corresponding to each other in the search ranges are aggregated by (Equation 3) shown in FIG. 4 in the reduced SAD tables of the target blocks excluding the target block to which the mask flag is set, whereby an aggregate reduced SAD table for the plurality of reference block positions within one search range which table has the same size as the reduced SAD tables is generated. Then the process from step S84 on down is repeated.

When it is determined in step S94 that the sum total ΣERRi of the errors calculated in step S93 is smaller than the predetermined threshold value θth8, the amount of translation (α, β) and the rotation angle (γ) calculated in step S91 and step S92 are set as hand movement components. Then the second detection process is ended.

Then, the hand movement vector detecting unit 15 supplies the amount of translation and the rotation angle as a result of the calculation to the CPU 1. The CPU 1 calculates an amount of translation and a rotation angle with respect to a first frame from the amount of translation and the rotation angle as the received result of the calculation. The CPU 1 sends the amount of translation and the rotation angle to the rotation and translation adding unit 19. Then, the rotation and translation adding unit 19 performs the process of superimposition on the first frame using the amount of translation and the rotation angle that are received.

Incidentally, also in the second example, the hand movement vector detecting unit 15 may calculate the amount of translation and the rotation angle with respect to the first frame.

Further, also in this example, a process from step S71 to step S74 in FIG. 40 and a process from step S81 to step S84 in FIG. 41 may be performed by the hand movement vector detecting unit 15, and the subsequent processes may be performed by the CPU 1 by software.

Further, in the above-described example, the aggregate motion vector is used as global motion vector to determine the reliability of the per-block motion vectors. However, the motion vector of a majority decision top may be used as the reference.

Incidentally, the method of the first example as represented in FIG. 35 described above may be used in the first detection to set a search range offset for the second detection on the basis of the aggregate motion vector as global motion vector, and the method of the second example as represented in FIG. 41 and FIG. 42 may be used in the second detection.

That is, because basically each per-block motion vector in the first detection cannot be expected to have a very high precision, the search range offset for the second detection may be determined on the basis of the global motion vector obtained from a result of block matching for the target blocks having the labels of "TOP" and "NEXT_TOP", without using the method of obtaining the amount of translation which method has been described above with reference to FIG. 5 and FIG. 6.

Generally, when hand movement includes a rotation component, the method described above with reference to FIG. 5 and FIG. 6 is effective as a method of calculating a translation component of the hand movement with a high precision. However, the best use of this method is made in the second or subsequent detection, in which high-precision per-block motion vectors are obtained.

Incidentally, rather than setting the search offset for the second detection on the basis of the global motion vector or the amount of translation after the first detection, a rotation angle between the global motion vector and a global motion vector of a previous frame or a rotation angle obtained by the rotation angle calculating method described above with reference to FIGS. 7A to 8E may also be calculated after the first detection so that the search range offset for the second detection is set for each target block independently with the rotation angle also taken into consideration. In such a case, the search range can be limited more, and thus improvements in precision and processing speed can be expected.

In the above description, in both of the first detection and the second detection, per-block motion vectors approximate to the aggregate motion vector are treated as valid per-block motion vectors. In the second detection, however, the per-block motion vectors of all target blocks except target blocks to which the mask flag is set in the first detection may be treated as valid per-block motion vectors. This is because the second detection provides per-block motion vectors with high precision and can detect even the rotation component of hand movement, and thus these per-block motion vectors may not necessarily be similar to the average aggregate motion vector.

The hand movement vector detecting process described above is very effective for still images because in the case of still images, a sufficient processing time is provided but high precision is required, as compared with moving images. For higher precision, three or more detections may be performed instead of the two detections as described above. In this case, the narrowing down of a search range with a search range offset and a search for per-block motion vectors of high reliability are performed before a last detection, and an amount of translation and a rotation angle are calculated as shown in FIG. 41 and FIG. 42, for example, in the last detection.

[Example of Process Routine in Steps S32, S52, S72, and S82]

Description will next be made of an example of a process routine for generating a reduced SAD table and calculating a per-block motion vector in each target block in step S32 in FIG. 36, step S52 in FIG. 38, step S72 in FIG. 40, and step S82 in FIG. 41.

First Example

Figure 44:
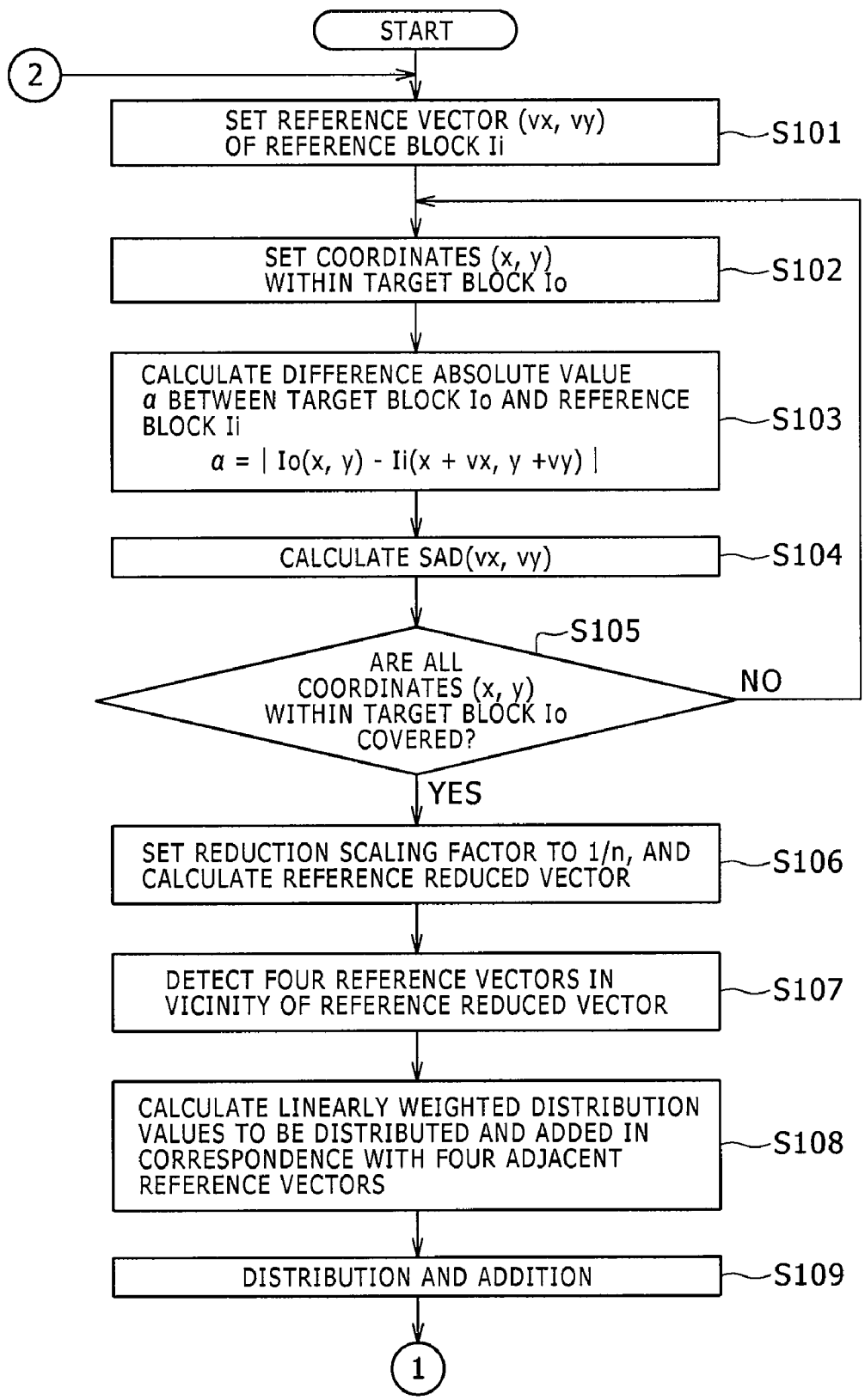
FIG. 44 is a part of a flowchart of assistance in explaining a first example of a per-block motion vector detecting process in the first embodiment of the image processing device.
Figure 45:
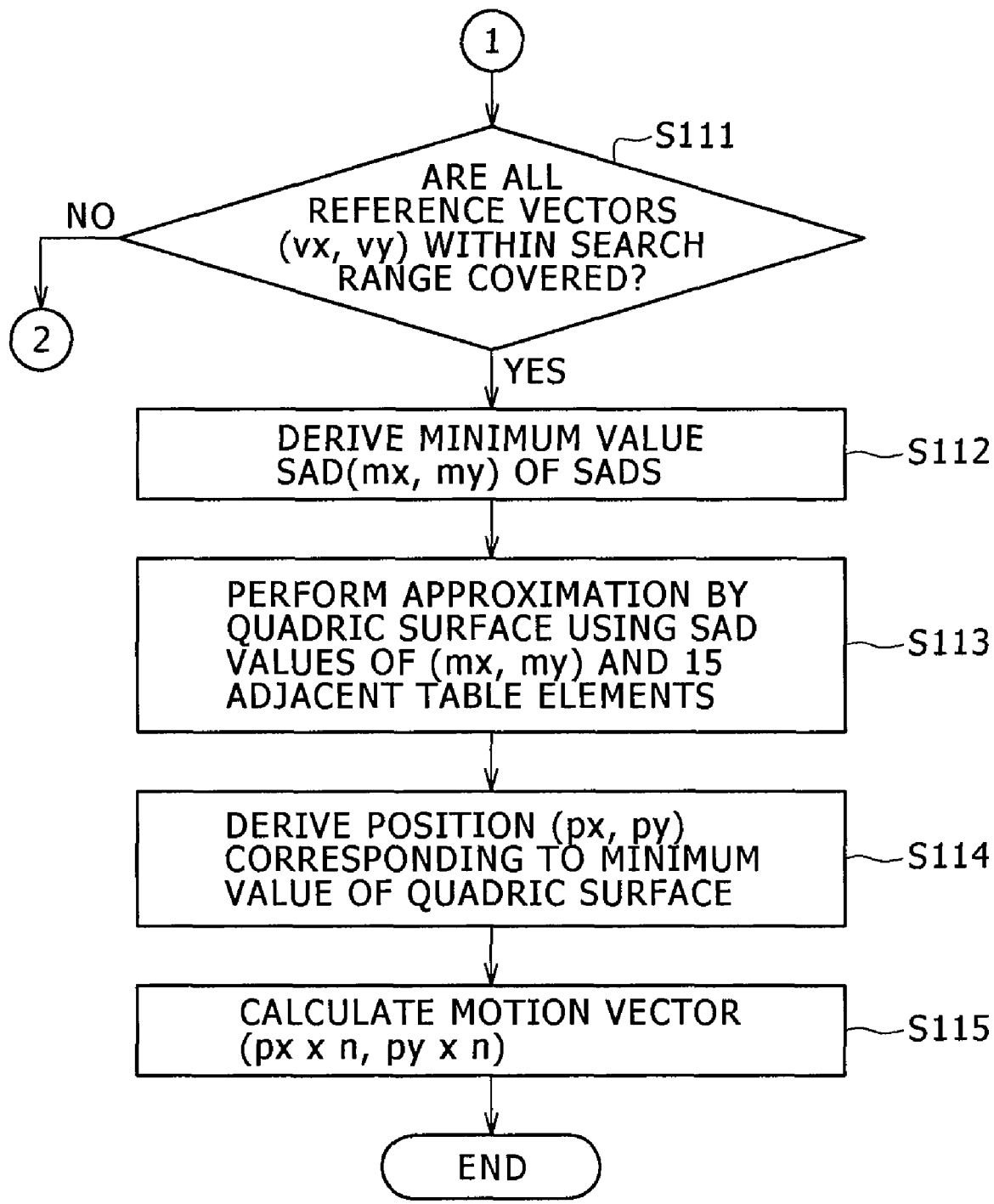
FIG. 45 is a part of the flowchart of assistance in explaining the first example of the per-block motion vector detecting process in the first embodiment of the image processing device.

FIG. 44 and FIG. 45 show a first example of a process routine for calculating a reduced SAD table and a per-block motion vector in each target block in steps S32, S52, S72, and S82.

First, a reference vector (vx, vy) corresponding to one reference block position within a search range SR as shown in FIG. 32 described above is specified (step S101). As described above, (vx, vy) denotes a position indicated by the specified reference vector when the position of a target block (the central position of the search range) in a frame is set as a reference position (0, 0). vx is a component of an amount of displacement by the specified reference vector from the reference position in a horizontal direction. vy is a component of an amount of displacement by the specified reference vector from the reference position in a vertical direction. As in the above-described existing example, the amounts of displacement vx and vy are values in units of pixels.

With the central position of the search range as the reference position (0, 0), when the search range in the horizontal direction is defined by ±Rx, and the search range in the vertical direction is defined by ±Ry, the search range is expressed as $$-Rx \leq vx \leq +Rx, -Ry \leq vy \leq +Ry$$

Next, coordinates (x, y) of one pixel within a target block Io are specified (step S102). Next, the absolute value α of a difference between a pixel value Io(x, y) at the specified coordinates (x, y) within the target block Io and a pixel value Ii(x+vx, y+vy) at a corresponding position within a reference block Ii is calculated as shown in the above-described (Equation 1) (step S103).

Then, the calculated difference absolute value α is added to a previous SAD value at an address (table element) indicated by the reference vector (vx, vy) of the reference block Ii, and a SAD value resulting from the addition is written back to the address (step S104). That is, letting SAD(vx, vy) be the SAD value corresponding to the reference vector (vx, vy), the SAD value is calculated by the above-described (Equation 2), that is, $$SAD(vx,vy)=\Sigma\alpha=\Sigma|Io(x,y)-Ii(x+vx,y+vy)| \quad (2)$$

The SAD value is then written to the address indicated by the reference vector (vx, vy).

Next, whether the above-described operation in steps S102 to S104 has been performed for pixels at all coordinates (x, y) within the target block Io is determined (step S105). When it is determined that the operation has not yet been completed for the pixels at all the coordinates (x, y) within the target block Io, the process returns to step S102 to specify a pixel position at next coordinates (x, y) within the target block Io and then repeat the process from step S102 on down.

Figure 73:
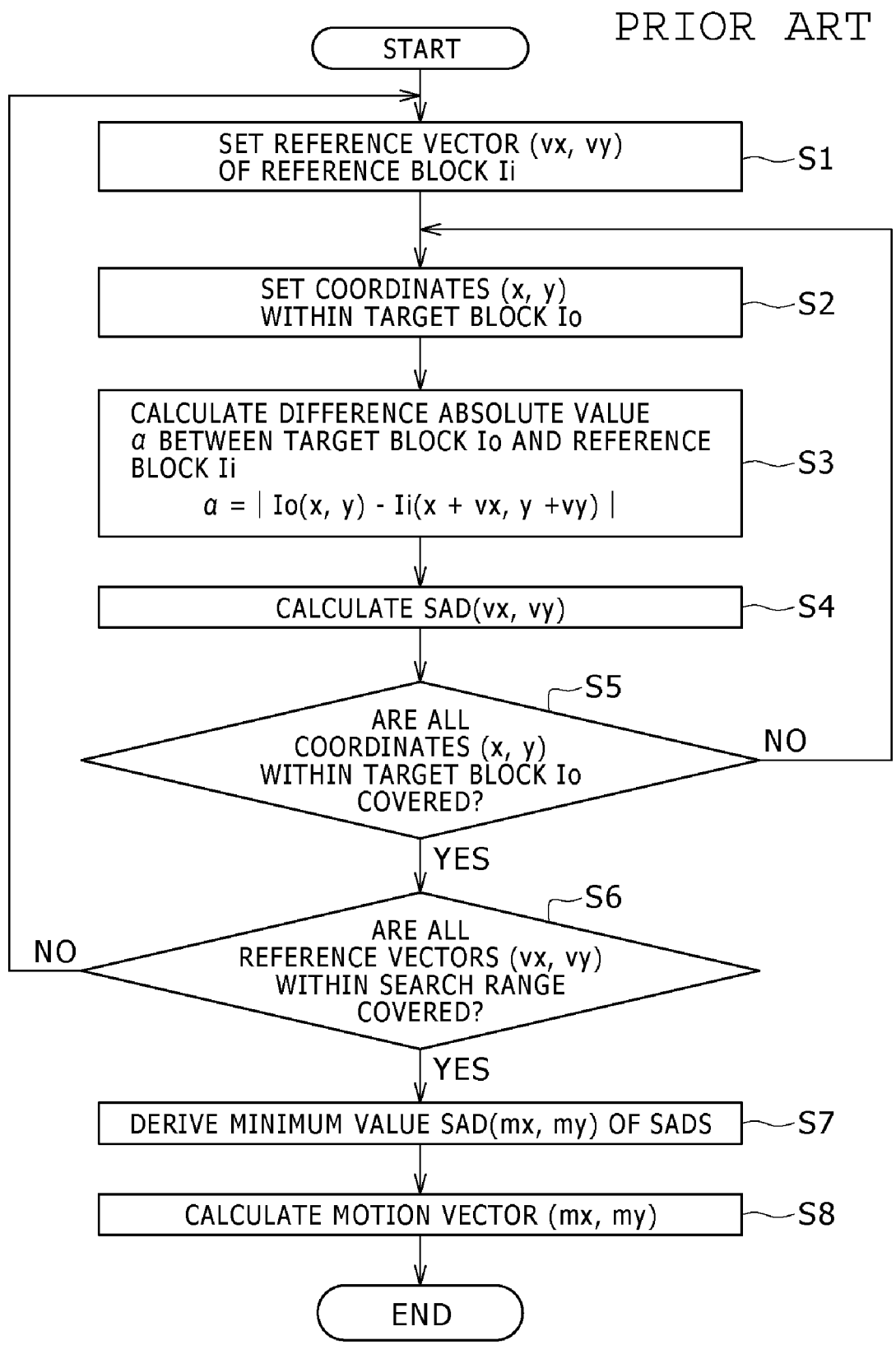
FIG. 73 is a diagram of assistance in explaining the process of calculating the motion vector by block matching.

The above-described process of steps S101 to S105 is exactly the same as steps S1 to S5 in the flowchart of FIG. 73.

In the present embodiment, when it is determined in step S105 that the above-described operation has been performed for the pixels at all the coordinates (x, y) within the target block Io, a reduction scaling factor is set to 1/n, and a reference reduced vector (vx/n, vy/n) obtained by reducing the reference vector (vx, vy) to 1/n is calculated (step S106).

Next, a plurality of reference vectors adjacent to the reference reduced vector (vx/n, vy/n), or four adjacent reference vectors as described above in this example, are detected (step S107). Then, values to be distributed and added as table elements corresponding to the four detected adjacent reference vectors are calculated as linearly weighted distribution values from the SAD value obtained in step S104 on the basis of relations between a position indicated by the reference reduced vector and positions indicated by the adjacent reference vectors, respectively, as described above (step S108). Then, the four linearly weighted distribution values obtained are added to the values of SAD table elements corresponding to the adjacent reference vectors, respectively (step S109).

When step S109 is completed, it is determined that the calculation of the SAD value for the reference block of interest is completed. Then, whether the above-described operation process of steps S101 to S109 is completed for all reference blocks, that is, all reference vectors (vx, vy) within the search range is determined (step S111 in FIG. 45).

When it is determined in step S111 that there is a reference vector (vx, vy) for which the above-described operation process has not yet been completed, the process returns to step S101 to set the next reference vector (vx, vy) for which the above-described operation process has not been completed, and repeat the process from step S101 on down.

Then, when it is determined in step S111 that there is no reference vector (vx, vy) for which the above-described operation process has not been completed within the search range, it is determined that a reduced SAD table is completed. A minimum SAD value is detected in the completed reduced SAD table (step S112).

Next, a quadric surface is generated using the minimum SAD value (minimum value) at a table element address (mx, my) and SAD values of a plurality of adjacent table elements or 15 adjacent table elements as described above in this example (step S113). A minimum value vector (px, py) indicating a decimal precision position corresponding to a minimum SAD value of the quadric surface is calculated (step S114). This minimum value vector (px, py) corresponds to a decimal precision minimum table element address.

Then, a motion vector (px×n, py×n) to be obtained is calculated by multiplying the calculated minimum value vector (px, py) indicating the decimal precision position by n (step S115).

Thus the process of motion vector detection by block matching for one target block in the present embodiment is ended. In the case of calculating reduced SAD tables and motion vectors for a plurality of target blocks, or 16 target blocks in this case, set for one frame, the search range and the reduction scaling factor 1/n are reset each time the object target block is changed, and the above-described process shown in FIG. 44 and FIG. 45 is repeated for each divided region.

Incidentally, it is needless to say that the method using the cubic curves in the horizontal direction and the vertical direction as described above may be used as the method for calculating the minimum value vector (px, py) indicating the decimal precision position.

Incidentally, a process from step S101 to step S111 in the flowcharts of FIG. 44 and FIG. 45 may be performed by the hand movement vector detecting unit 15, and the subsequent process may be performed by the CPU 1 by software.

Second Example

In the foregoing first example, a SAD value is obtained for one reference block (reference vector), distribution and addition values for a plurality of reference vectors adjacent to a reference reduced vector are obtained from the SAD value, and a distribution and addition process is performed.

On the other hand, in a second example, when a difference between each pixel within a reference block and a pixel in a target block has been detected, distribution and addition values (difference values rather than SAD values) for a plurality of reference vectors adjacent to a reference reduced vector are obtained from the difference value, and a process of distributing and adding the obtained difference values is performed. According to the second example, a reduced SAD table is generated when the difference operation is completed for all pixels within one reference block.

Figure 46:
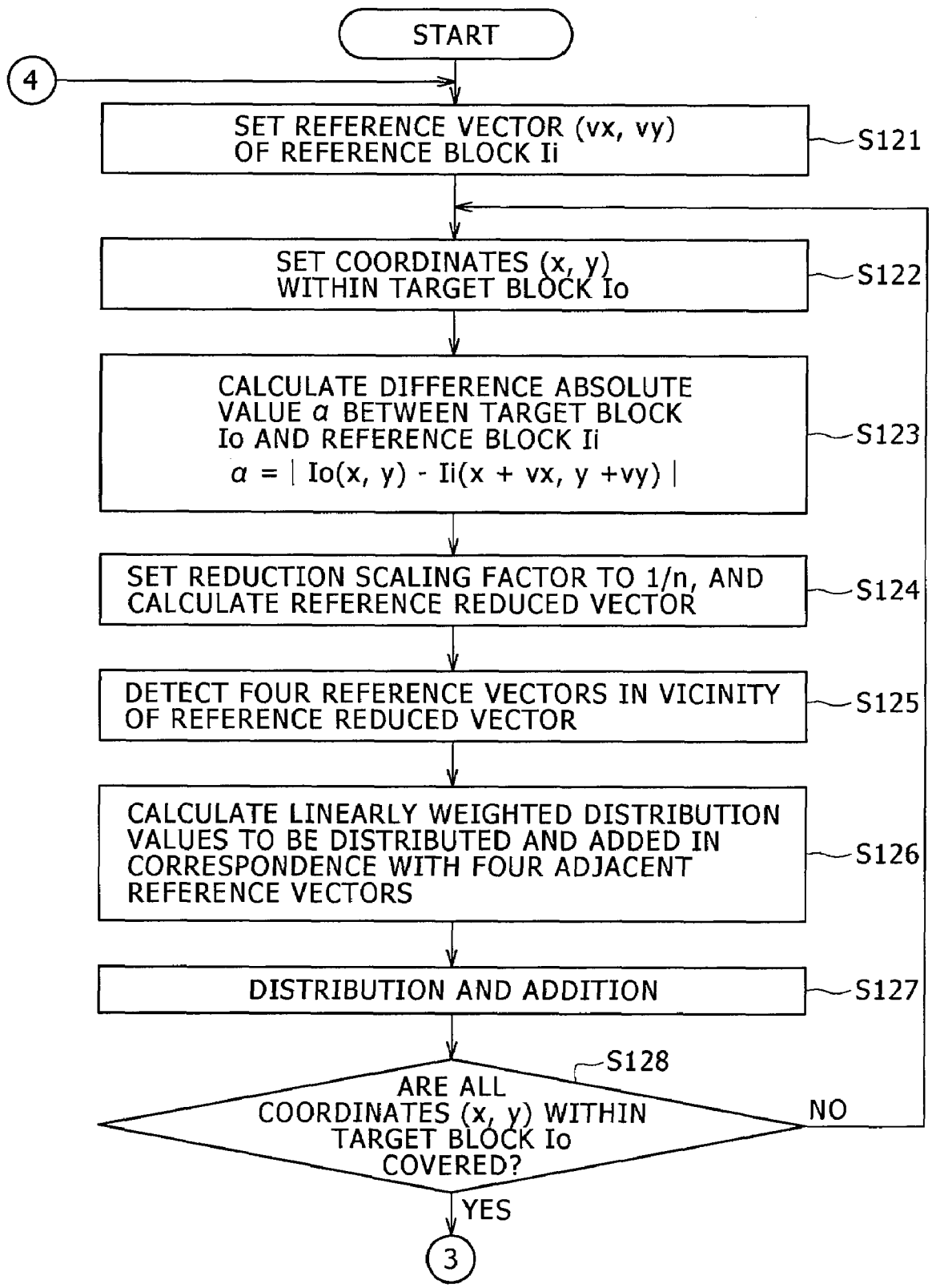
FIG. 46 is a part of a flowchart of assistance in explaining a second example of the per-block motion vector detecting process in the first embodiment of the image processing device.
Figure 47:
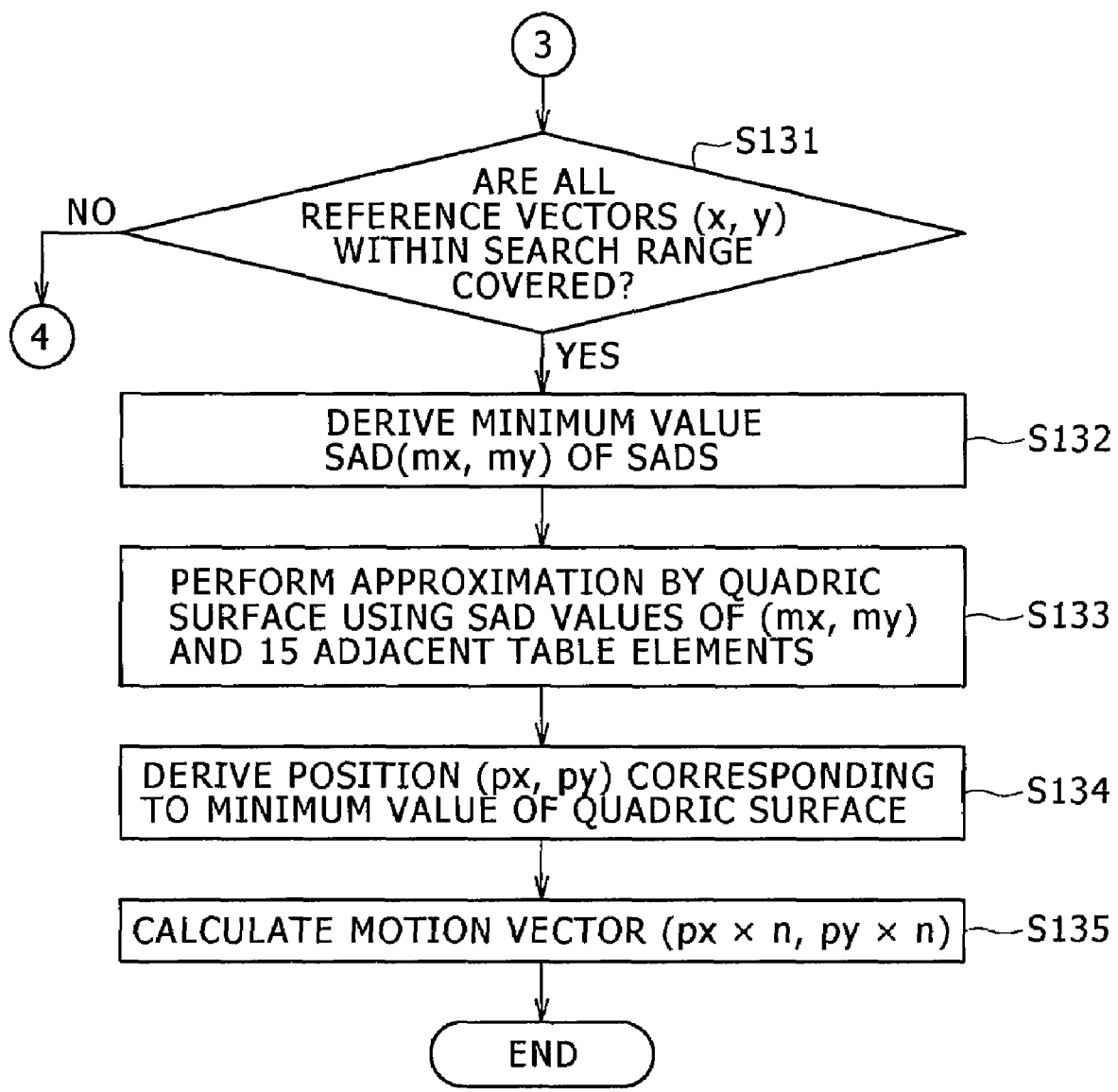
FIG. 47 is a part of the flowchart of assistance in explaining the second example of the per-block motion vector detecting process in the first embodiment of the image processing device.
Figure 48:
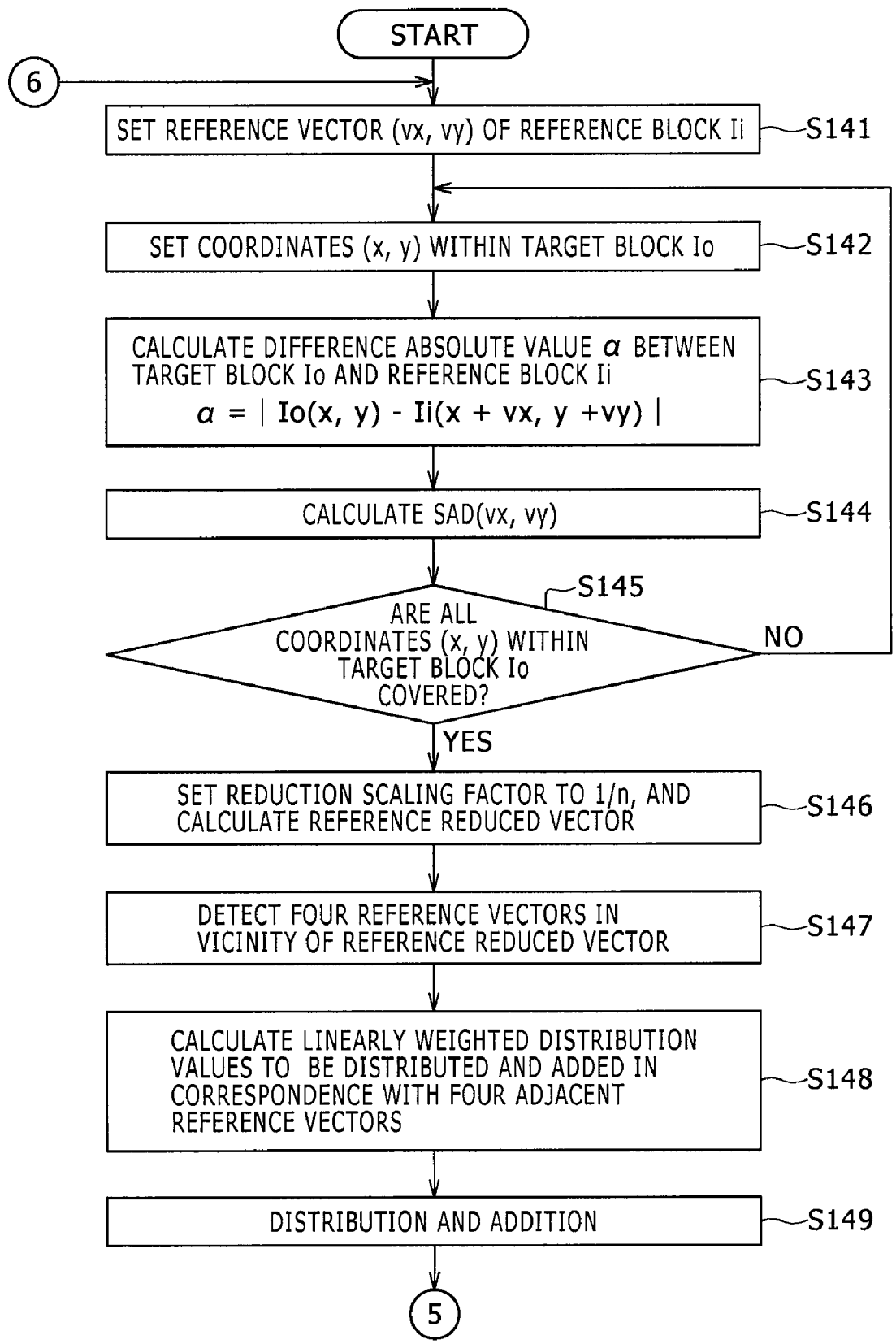
FIG. 48 is a part of a flowchart of assistance in explaining a third example of the per-block motion vector detecting process in the first embodiment of the image processing device according to the present invention.

FIG. 46 and FIG. 47 are flowcharts of the motion vector detecting process according to the second example.

A process from step S121 to step S123 in FIG. 46 is exactly the same as a process from step S101 to step S103 in FIG. 44, and therefore detailed description thereof is omitted.

In the second example, after a difference value α for a pixel at coordinates (x, y) between a reference block and a target block is calculated in step S123, a reduction scaling factor is set to 1/n, and a reference reduced vector (vx/n, vy/n) obtained by reducing a reference vector (vx, vy) to 1/n is calculated (step S124).

Next, a plurality of reference vectors adjacent to the reference reduced vector (vx/n, vy/n), or four adjacent reference vectors as described above in this example, are detected (step S125). Then, difference values to be distributed and added as table elements corresponding to the four detected adjacent reference vectors are obtained as linearly weighted distribution values (difference values) from the difference value α obtained in step S123 on the basis of relations between a position indicated by the reference reduced vector and positions indicated by the adjacent reference vectors, respectively, as described above (step S126).

Then, the four linearly weighted distribution values obtained are added to the values of table elements corresponding to the adjacent reference vectors, respectively (step S127).

After step S127 is completed, whether the above-described operation in steps S122 to S127 has been performed for pixels at all coordinates (x, y) within the target block Io is determined (step S128). When it is determined that the operation has not yet been completed for the pixels at all the coordinates (x, y) within the target block Io, the process returns to step S122 to specify a pixel position at next coordinates (x, y) within the target block Io and then repeat the process from step S122 on down.

When it is determined in step S128 that the above-described operation has been performed for the pixels at all the coordinates (x, y) within the target block Io, it is determined that the calculation of a SAD value for the reference block of interest is completed. Then, whether the above-described operation process of steps S121 to S128 is completed for all reference blocks, that is, all reference vectors (vx, vy) within the search range is determined (step S131 in FIG. 47).

When it is determined in step S131 that there is a reference vector (vx, vy) for which the above-described operation process has not yet been completed, the process returns to step S121 to set the next reference vector (vx, vy) for which the above-described operation process has not been completed, and repeat the process from step S121 on down.

Then, when it is determined in step S121 that there is no reference vector (vx, vy) for which the above-described operation process has not been completed within the search range, it is determined that a reduced SAD table is completed. A minimum SAD value is detected in the completed reduced SAD table (step S132).

Next, a quadric surface is generated using the minimum SAD value (minimum value) at a table element address (mx, my) and SAD values of a plurality of adjacent table elements or 15 adjacent table elements as described above in this example (step S133). A minimum value vector (px, py) indicating a decimal precision position corresponding to a minimum SAD value of the quadric surface is calculated (step S134). This minimum value vector (px, py) corresponds to a decimal precision minimum table element address.

Then, a motion vector (px×n, py×n) to be obtained is calculated by multiplying the calculated minimum value vector (px, py) indicating the decimal precision position by n (step S135).

Thus the process of motion vector detection by block matching for one target block in the second example is ended. In the case of calculating reduced SAD tables and motion vectors for a plurality of target blocks, or 16 target blocks in this case, set for one frame, the search range and the reduction scaling factor 1/n are reset each time the object target block is changed, and the above-described process shown in FIG. 46 and FIG. 47 is repeated for each divided region.

Incidentally, also in the second example, the method using the cubic curves in the horizontal direction and the vertical direction as described above may be used as the method for calculating the minimum value vector (px, py) indicating the decimal precision position.

Incidentally, a process from step S121 to step S131 in the flowcharts of FIG. 46 and FIG. 47 may be performed by the hand movement vector detecting unit 15, and the subsequent process may be performed by the CPU 1 by software.

Third Example

As shown in FIG. 31, in the case of using the motion vector detecting method according to the present embodiment, a failure in which a totally different motion vector is output does not occur even when the reduction scaling factor of reference vectors is 1/64. Therefore the size of the SAD table can be effectively reduced to 1/4096.

Specifically, a reduced SAD table reduced to 1/4096 is prepared, and a motion vector in a first detection is calculated with a reduction scaling factor of 1/64. Next, a search range is narrowed with a position indicated by the motion vector detected in the first detection as a center of the search range, and a second detection is performed with a reduction scaling factor of 1/8, for example, which is lower than that of the first detection. That is, when the reduction scaling factors of the first detection and the second detection are made different from each other, and the reduction scaling factor of the second detection is set so as to fall within a vector error range of the first detection, a motion vector can be detected with a considerably high precision.

A motion vector detecting process in this third example is described with reference to flowcharts of FIGS. 48 to 51.

Figure 49:
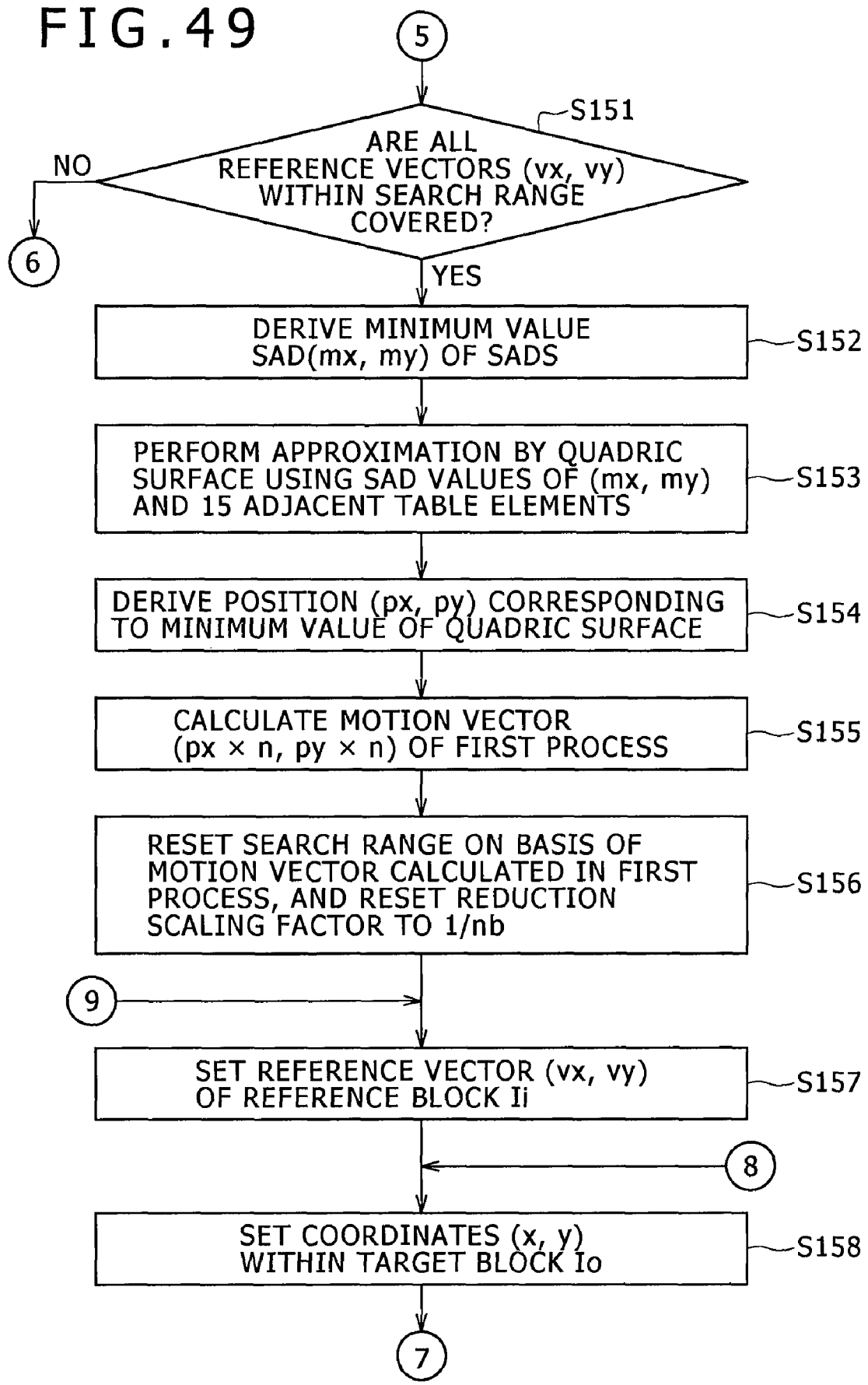
FIG. 49 is a part of the flowchart of assistance in explaining the third example of the per-block motion vector detecting process in the first embodiment of the image processing device.

The third example shown in FIGS. 48 to 51 uses the above-described first example as a basic motion vector detecting process. Thus, process steps S141 to S149 in FIG. 48 and process steps S151 to S155 in FIG. 49 are exactly the same as process steps S101 to S109 in FIG. 44 and process steps S111 to S115 in FIG. 45.

In the third example, rather than ending the process when calculating a motion vector in step S155 in FIG. 49, using the motion vector calculated in step S155 as the motion vector of the first detection, in next step S156, a search range is narrowed down within the same reference frame on the basis of the motion vector calculated in the first detection, and the reduction scaling factor for reference vectors is changed to a reduction scaling factor 1/na lower than the reduction scaling factor 1/na (where na>nb) of the first detection.

Figure 52:
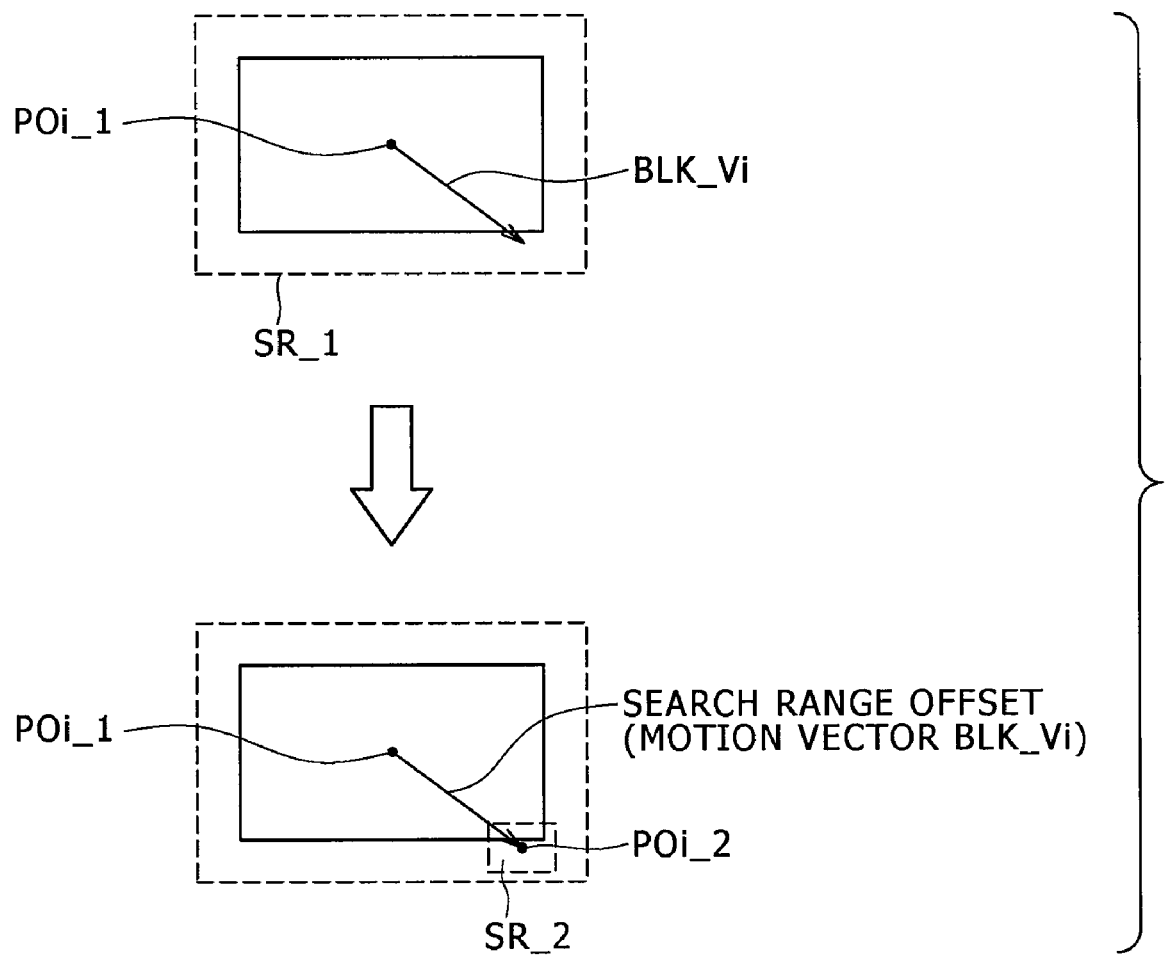
FIG. 52 is a diagram of assistance in explaining the third example of the per-block motion vector detecting process in the first embodiment of the image processing device.

Specifically, as shown in FIG. 52, when a motion vector BLK_Vi for a target block TB is calculated in a search range SR_1 set in the first process, a block range in which there is correlation between the reference frame and the original frame can be roughly detected from the calculated motion vector BLK_Vi. Accordingly, a narrower search range with the block range in which there is correlation between the reference frame and the original frame as a center as shown on a lower side of FIG. 52 can be set as a search range SR_2 in the second process. In this case, as shown in FIG. 52, a positional displacement (search range offset) between a central position Poi_1 of the search range SR_1 in the first process and a central position Poi_2 of the search range SR_2 in the second process corresponds to the motion vector BLK_Vi detected in the first process.

Further, in the present embodiment, the reduction scaling factor for reference vectors in the second detection is made lower than that of the first detection. It can thus be expected that a motion vector can be detected in the second detection with a smaller error.

Figure 50:
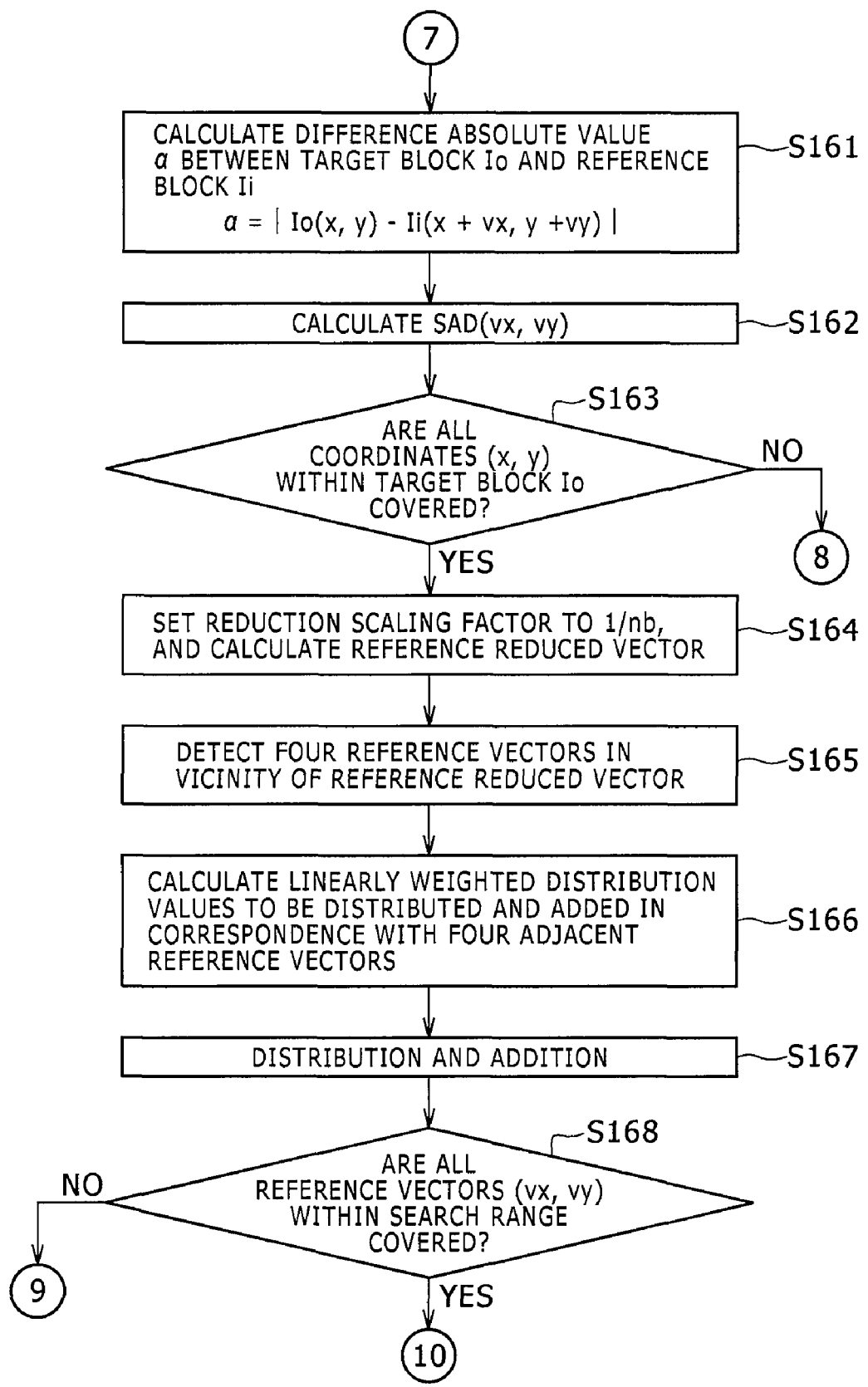
FIG. 50 is a part of the flowchart of assistance in explaining the third example of the per-block motion vector detecting process in the first embodiment of the image processing device.
Figure 51:
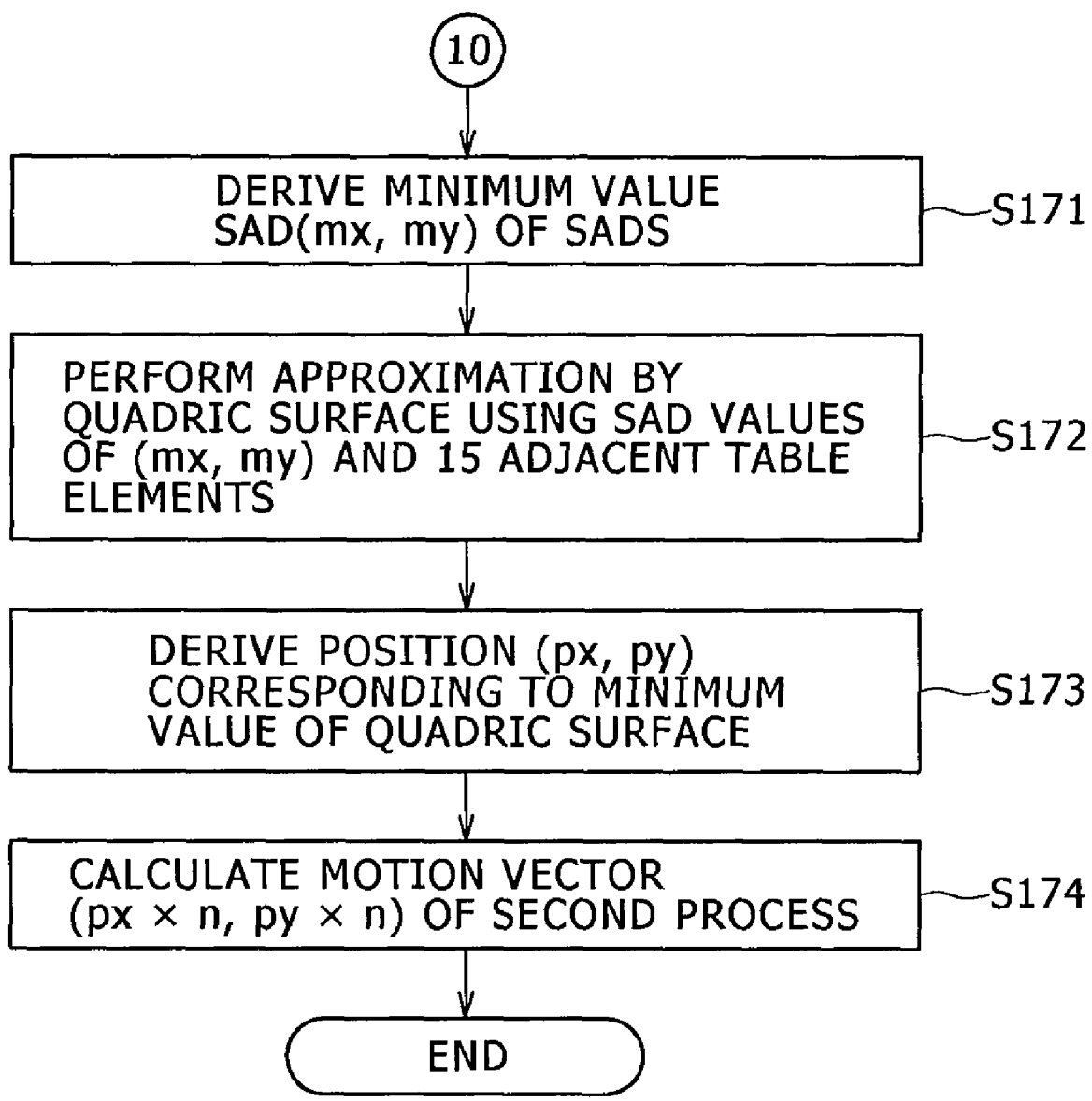
FIG. 51 is a part of the flowchart of assistance in explaining the third example of the per-block motion vector detecting process in the first embodiment of the image processing device.

After a narrower search range and a new reduction scaling factor are thus set in step S156, the motion vector detecting process of the second detection is performed in steps S157 and S158, steps S161 to S168 in FIG. 50, and steps S171 to S174 in FIG. 51 in exactly the same manner as the first detection. The process of these steps is exactly the same as that of process steps S101 to S109 in FIG. 44 and process steps S111 to S115 in FIG. 45.

Thus, finally, an intended per-block motion vector is obtained as the motion vector of the second detection in step S174.

The above example uses the foregoing first example as a per-block motion vector detecting method, and repeats the method in a second stage. Of course, however, the method may be repeated in the second and subsequent stages while further narrowing down the search range and changing the reduction scaling factor as required.

In addition, it is needless to say that the foregoing second example may be used as the per-block motion vector detecting method in place of the foregoing first example. Further, as in the foregoing example, the method using the cubic curves in the horizontal direction and the vertical direction as described above may be used as the method for calculating a minimum value vector (px, py) indicating a decimal precision position.

Incidentally, a process from step S141 to step S168 in the flowcharts of FIGS. 48 to 51 may be performed by the hand movement vector detecting unit 15, and the subsequent process may be performed by the CPU 1 by software.

[Addition Process in Rotation and Translation Adding Unit 19]

After a component of translation (amount of translation of a frame) and a component of rotation (rotation angle of the frame) due to hand movement are thus obtained in a unit of the frame of a still image, the rotation and translation adding unit 19 performs an addition (superimposition) process.

In the present embodiment, as described above, for a user to perform so-called picture making on various subjects as intended by the user, three addition methods are prepared in advance in the image pickup device in this example, so that the user can select an addition method according to intended picture making from among the three addition methods by performing a selecting operation via the user operation input unit 3.

It is to be noted that, as described above, the present embodiment is applied to only subjects of still images for simplicity of description, but is essentially applicable also to moving images. In the case of moving images, because of real time performance, there is an upper limit to the number of frames to be added. However, the present embodiment can be applied with identical means to a system generating a moving image resulting from a high degree of noise reduction effect, by using the method of the present embodiment for each frame.

In the present embodiment, the rotation and translation adding unit 19 of the image pickup device in the example of FIG. 1 is configured such that the three methods, that is, a simple addition method, an average addition method, and a tournament addition method can be selectively implemented as addition (superimposition) method. Details of the methods are below in order. Incidentally, in the present embodiment, the number of image frames to be superimposed is eight, for example.

Figure 53:
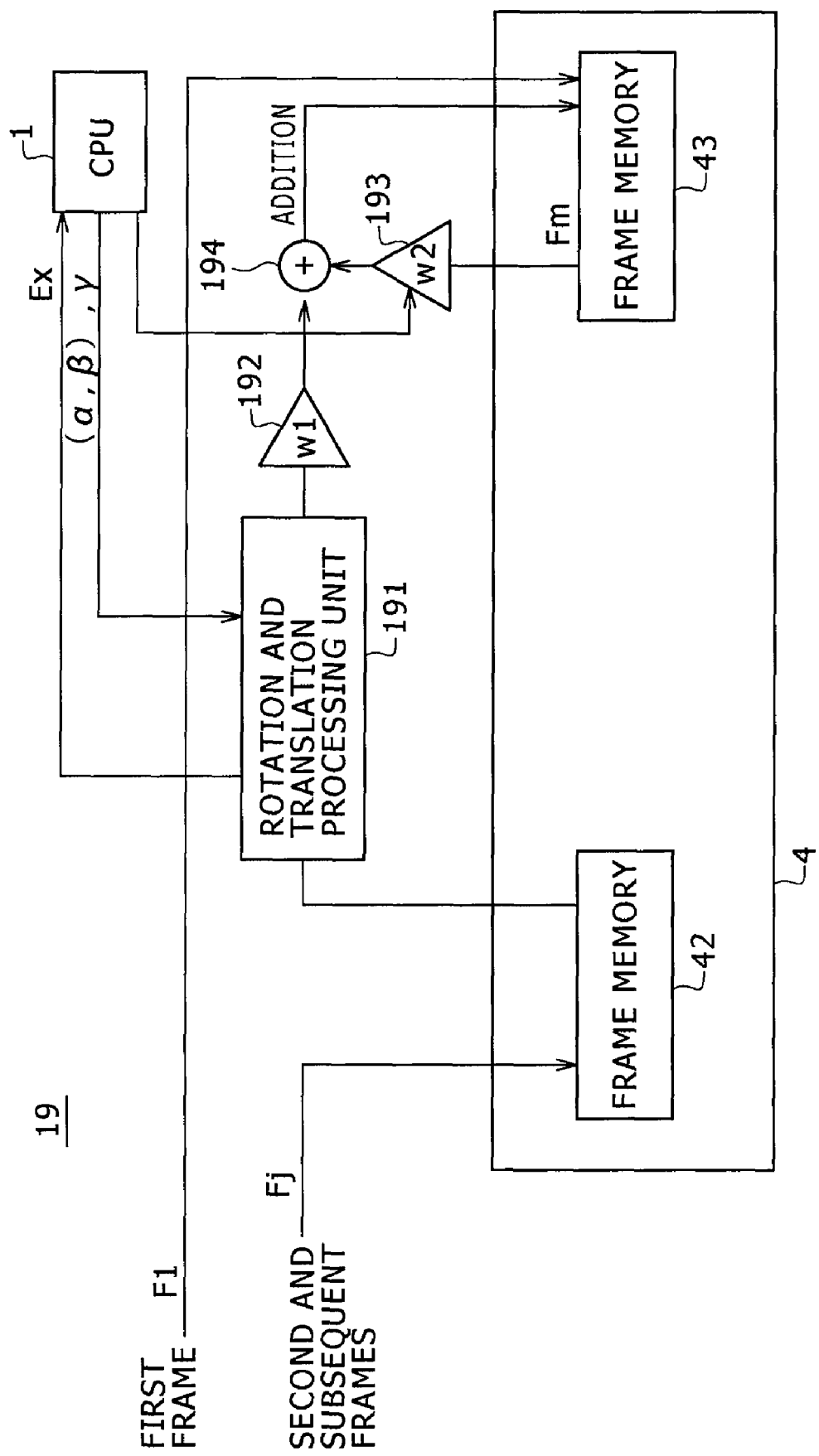
FIG. 53 is a block diagram showing an example of configuration of a rotation and translation adding unit 19 in the first embodiment of the image processing device.

FIG. 53 is a block diagram in which relations between the rotation and translation adding unit 19 and the image memory 4 in the case of the simple addition method are considered. In this case, the rotation and translation adding unit 19 has a rotation and translation processing unit 191, gain amplifiers 192 and 193, and an adder 194.

As described above, the frame memory 43 in the image memory 4 stores an image frame Fm after addition. However, when image frames are sequentially input, a first image frame F1 serves as a reference, and therefore the first image frame F1 is directly written to the frame memory 43. On the other hand, the second and subsequent image frames Fj (j=2, 3, 4 . . . ) are stored in the frame memory 42 of the image memory 4 and then supplied to the rotation and translation adding unit 19. Incidentally, because it is necessary to assume an image frame size for a result of addition of an image frame allowing for an amount of displacement corresponding to an amount of translation ($\alpha$, $\beta$) and a rotation angle ($\gamma$), at least the frame memory 43 in the image memory 4 has an area larger than an area of one frame by the allowed-for amount of displacement corresponding to the amount of translation ($\alpha$, $\beta$) and the rotation angle ($\gamma$).

Receiving information on an amount of translation ($\alpha$, $\beta$) and a rotation angle ($\gamma$) of a second or subsequent image frame Fj with respect to the first image frame F1 from the CPU 1, the rotation and translation processing unit 191 translates and rotates the second or subsequent image frame Fj. The rotation and translation processing unit 191 translates and rotates the second or subsequent image frame Fj by reading the second or subsequent image frame Fj from the frame memory 42 in such a manner as to cancel a relative hand movement with respect to the first image frame F1.

Specifically, the rotation and translation processing unit 191 calculates the address of a pixel in the second or subsequent image frame Fj from the frame memory 42 which pixel is to be superimposed on a pixel in the first image frame or the image frame Fm after addition from the frame memory 43, from the information from the CPU 1 on the amount of translation ($\alpha$, $\beta$) and the rotation angle ($\gamma$) of the image frame Fj with respect to the first image frame. The rotation and translation processing unit 191 reads pixel data of the image frame Fj from the address of the frame memory 42, the address being a result of the calculation.

Incidentally, in the present embodiment, when the second or subsequent image frame from the frame memory 42 is added, pixel data at address positions where the first image frame is written is sequentially read from the frame memory 43. Then, the rotation and translation processing unit 191 sequentially calculates pixel addresses in the frame memory 42 for the second or subsequent image frame, the pixel addresses corresponding to the read address positions in the frame memory 43.

The gain amplifier 192 multiplies, by a gain (multiplication coefficient) w1, each piece of pixel data (luminance signal components and color-difference components) of the translated and rotated second or subsequent image frame Fj from the rotation and translation processing unit 191. The gain amplifier 192 supplies the result to the adder 194. The gain amplifier 193 multiplies, by a gain (multiplication coefficient) w2, each piece of pixel data of the first image frame or the image frame Fm after addition from the frame memory 43. The gain amplifier 193 supplies the result to the adder 194.

The adder 194 writes back (rewrites) each piece of pixel data of an image frame Fm after addition to the same address in the frame memory 43.

In the present embodiment, the gain w1 of the gain amplifier 192 for the pixel data of the read second or subsequent image frame Fj (referred to as an addend image) is w1=1 at all times.

On the other hand, the gain w2 of the gain amplifier 193 for the pixel data of the first image frame or the image frame Fm as a result of addition (referred to as an augend image) from the frame memory 43 differs between a case where the second or subsequent image frame Fj has a corresponding pixel to be added and a case where the second or subsequent image frame Fj does not have a corresponding pixel to be added (in a region where the two image frames are not superimposed on each other as a result of translation and rotation).

That is, as a result of rotation and translation of the addend image, there always occurs a region without pixels of the addend image which pixels are to be added to the augend image. When there is a pixel to be added, the gain w2 is w2=1. When there is no pixel to be added, the gain w2 assumes a different value depending on what number frame the addend image frame Fj to be superimposed is, and the gain w2 for a jth image frame is w2=j/(j−1).

The present embodiment thus reduces perceived difference at a boundary part between a region that has pixels to be added and a region that does not have pixels to be added in an image as a result of addition.

In order to control such a gain, the rotation and translation processing unit 191 in the present embodiment supplies the CPU 1 with information EX indicating whether the frame memory 42 has the address of a pixel in the second or subsequent image frame which pixel is to be superimposed on a pixel in the image frame Fm, that is, whether the frame memory 42 has the pixel to be added. Receiving this information, the CPU 1 controls the gain w2 of the gain amplifier 193.

Incidentally, instead of the CPU 1 controlling the gain w2 of the gain amplifier 193, the rotation and translation processing unit 191 may supply the gain amplifier 193 with the gain w2 according to whether the frame memory 42 has the address of a pixel in the second or subsequent image frame which pixel is to be superimposed on a pixel in the image frame Fm.

Figure 54:
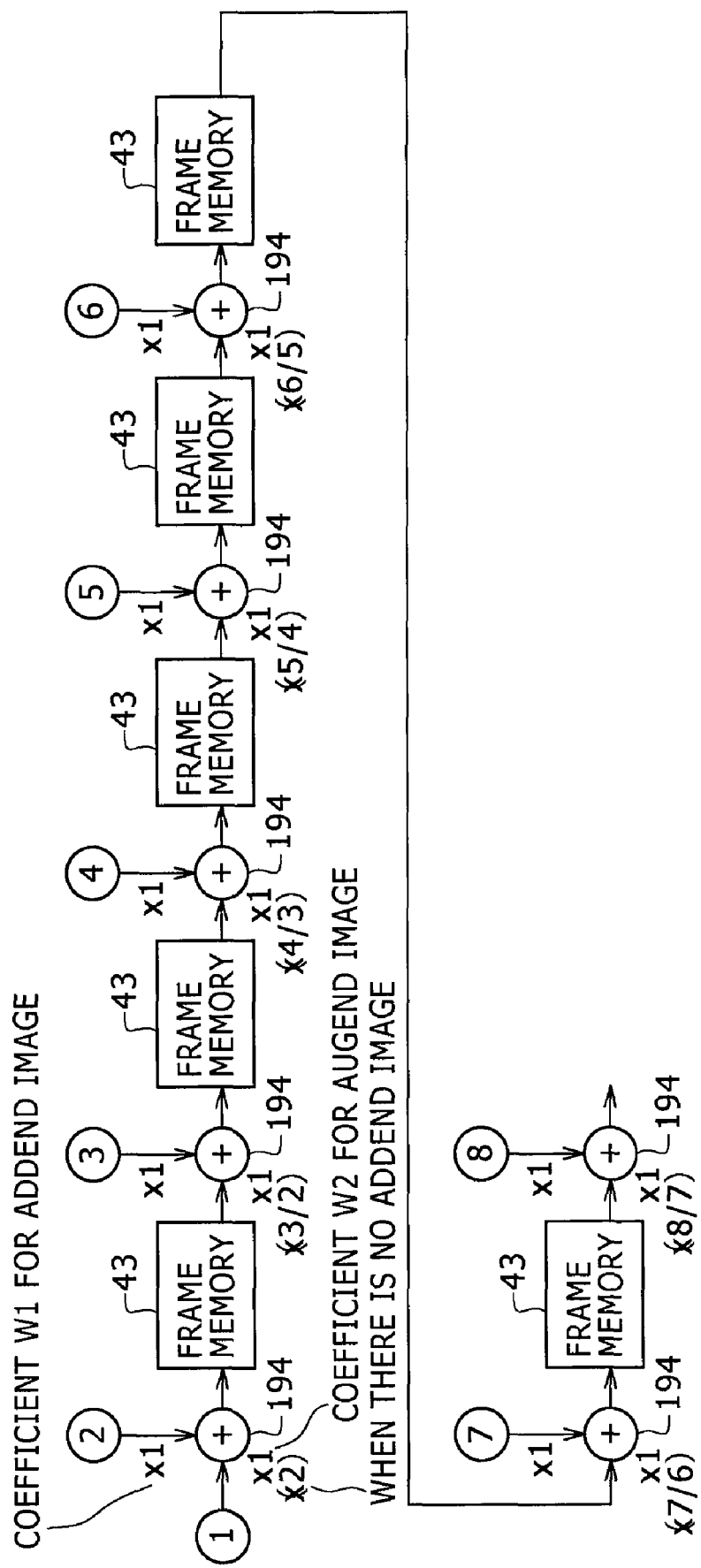
FIG. 54 is a diagram of assistance in explaining the example of configuration of the rotation and translation adding unit 19 in the first embodiment of the image processing device.

FIG. 54 shows an addition of each jth image frame in the case of the simple addition method. FIG. 54 shows that the adder 194 and the frame memory 43 are used repeatedly to superimpose a plurality of image frames, or eight image frames in the example of FIG. 54, on each other. In FIG. 54, a number in a circle indicates the number of an image frame, and of values of the gain (multiplication coefficient) w2 for the augend image, a value in parentheses corresponds to a case where there is no addend pixel.

Figure 55:
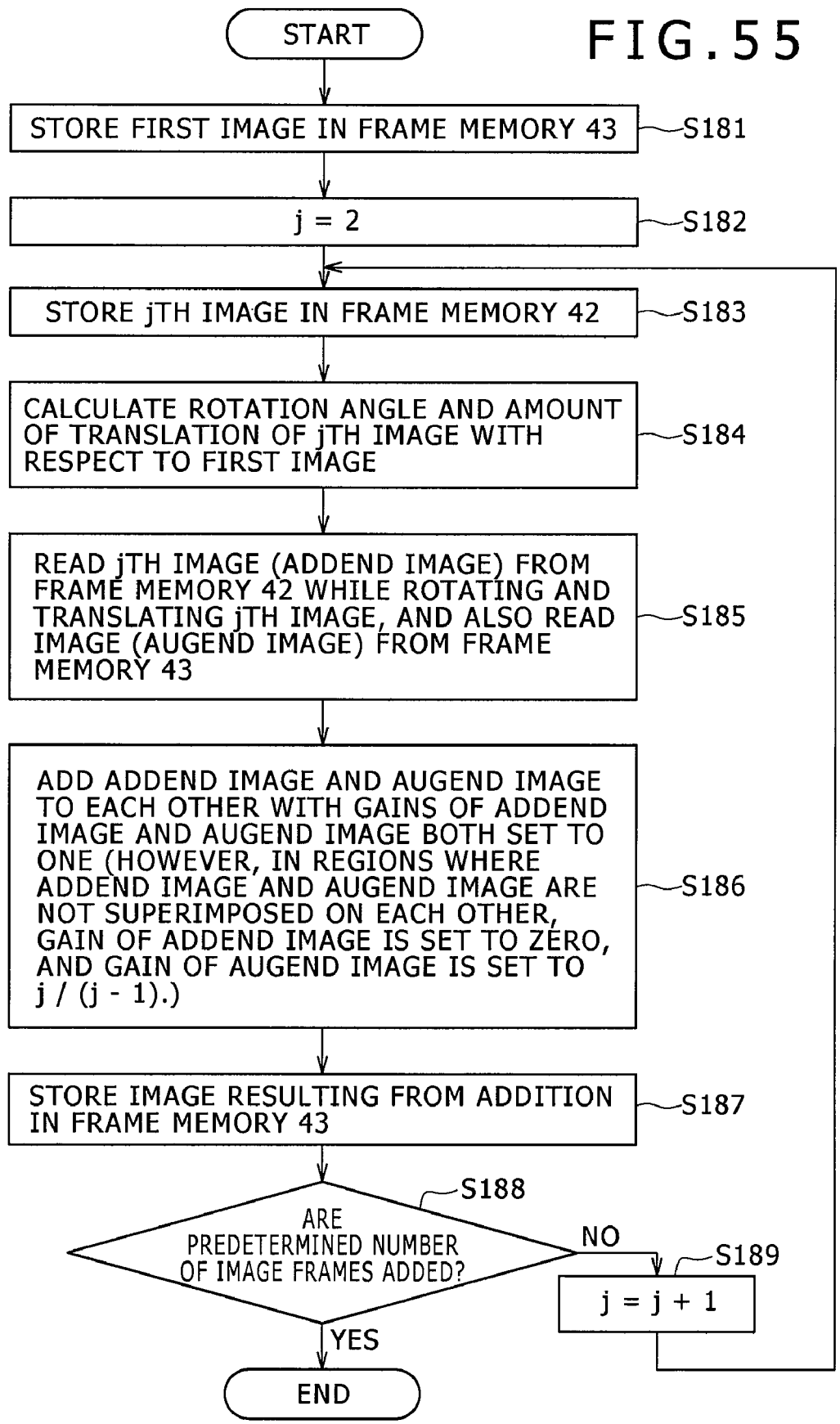
FIG. 55 is a flowchart of assistance in explaining an example of processing of the rotation and translation adding unit 19 in the first embodiment of the image processing device.

FIG. 55 is a flowchart of assistance in explaining a process procedure when the simple addition method is performed by the rotation and translation adding unit 19 in the image pickup device according to the present embodiment. Incidentally, each step in the flowchart of FIG. 55 is mainly performed under control of the CPU 1.

First, the CPU 1 performs control to store a first image frame in the frame memory 43 (step S181). Next, the CPU 1 sets a variable j indicating the number of image frames to be processed to j=2, which indicates a second frame (step S182).

Then, the CPU 1 performs control to store the jth image frame in the frame memory 42 (step S183). Next, as described above, under control and instructions of the CPU 1, the hand movement vector detecting unit 15 calculates a global motion vector or an amount of translation and a rotation angle of the jth image frame with respect to the first image frame, and then sends the calculated amount of translation and the calculated rotation angle to the CPU 1 (step S184).

Next, receiving the amount of translation and the rotation angle from the CPU 1, the rotation and translation adding unit 19 reads the jth image frame from the frame memory 42 while rotating and translating the jth image frame. At the same time, the rotation and translation adding unit 19 reads the first image frame or an image frame as a result of addition from the frame memory 43 (step S185). Incidentally, the image read from the frame memory 42 is referred to as an addend image, and the image read from the frame memory 42 is referred to as an augend image.

Next, the rotation and translation adding unit 19 adds together pixel data of the addend image and pixel data of the augend image with the gains w1 and w2 both set at "1". However, for a region of the augend image on which region the addend image is not superimposed, that is, when pixel data of the addend image which pixel data is to be added to pixel data of the augend image do not exist, the gain w1 for the pixel data of the addend image is set at w1=0, and the gain w2 for the pixel data of the augend image is set at w2=j/(j−1) (step S186).

Then, the rotation and translation adding unit 19 writes image data as a result of the addition back to the frame memory 43 (step S187).

Next, the CPU 1 determines whether a predetermined number of image frames are superimposed on each other (step S188). When the CPU 1 determines that the superimposition of the predetermined number of image frames is not completed, the CPU 1 increments the variable j indicating the number of image frames to be processed to j=j+1 (step S189). Then, the process returns to step S183 to repeat the process from step S183 on down.

When the CPU 1 determines in step S188 that the superimposition of the predetermined number of image frames is completed, the CPU 1 ends the process routine of FIG. 55.

The simple addition method adds the augend image and the addend image with each other with the gains for both the augend image and the addend image set at "1" at all times, except for regions where addend pixels do not exist, without a distinction between a luminance signal and a color-difference signal. Therefore the image resulting from the addition gradually becomes brighter.

Thus, when the simple addition method is used, a photographing mode can be realized in which mode a result of addition in progress (augend image) is displayed on the monitor while consecutive photographing is performed, and a user stops the consecutive photographing when the image reaches a desired brightness.

Because a low-illuminance subject basically requiring exposure for a long time is photographed consecutively while the ISO speed of the camera is held low, the user can check that the image resulting from the addition gradually becomes brighter. This corresponds to the image of long exposure. It is better to be able to monitor not only the image resulting from the addition in progress but also a histogram thereof. In addition, of course, the image pickup device may automatically determine the number of frames to be added together.

(2) Average Addition Method

This average addition method is similar to the above-described simple addition method, but is different from the simple addition method in terms of the values of the gains w1 and w2 for the addend image and the augend image. Specifically, in the average addition method, when a second image is added to a first image, the first image and the second image are multiplied by gains w1 and w2 both having a value of ½, and then added together, while a jth image is added with the gain w1 for the addend image set at w1=1/j, and the gain w2 for the augend image set at w2=(j−1)/j.

That is, the brightness of the augend image as a result of addition is held constant irrespective of the number of frames added together, and respective weights of j addend images are made equal to each other. When a pixel of an addend image which pixel is to be added to a pixel of an augend image does not exist as a result of translation and rotation, the gain w2 for the pixel data of the augend image is set to one, whereby the brightness of the addition result is maintained over the entire frame.

Figure 56:
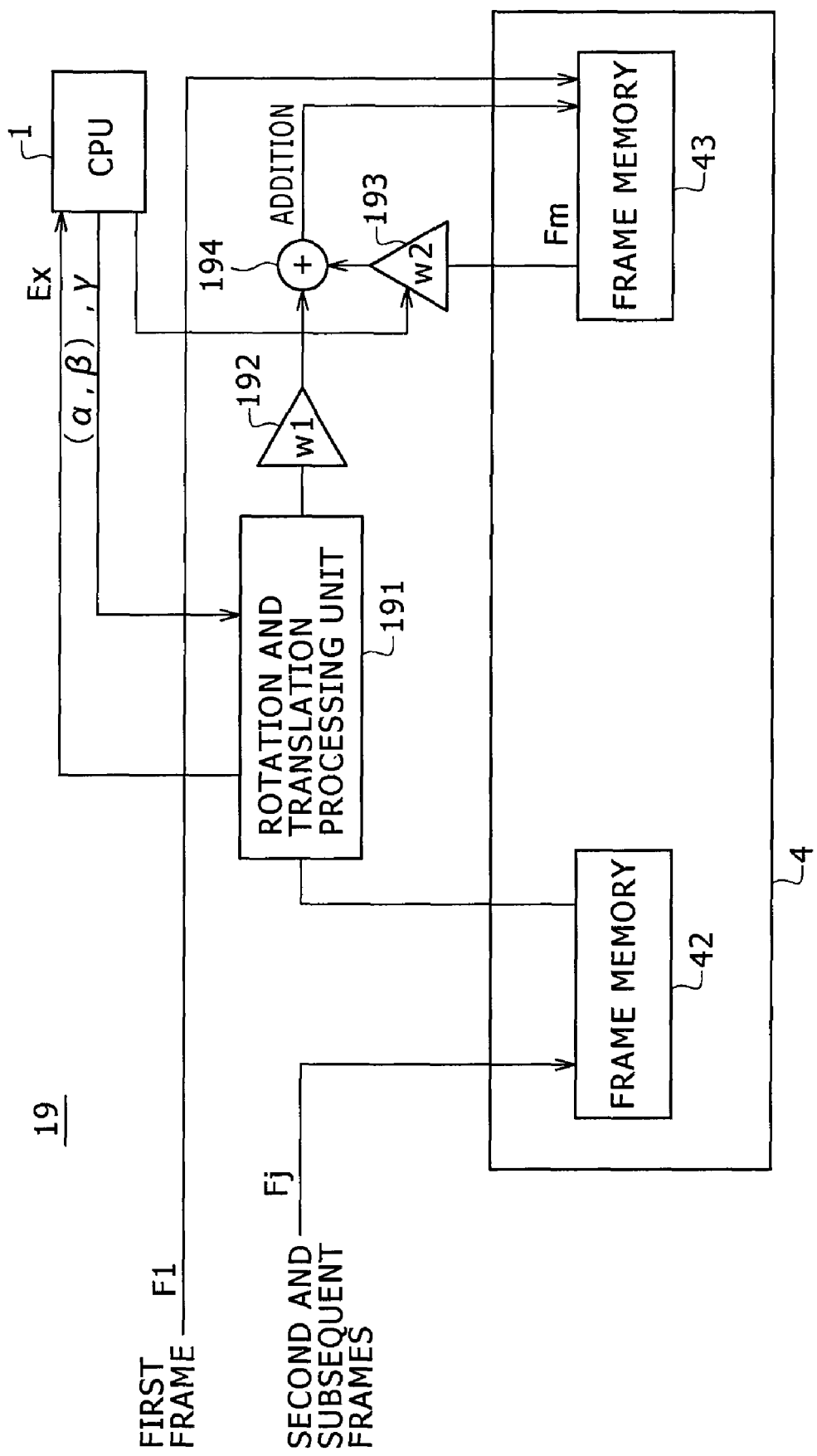
FIG. 56 is a block diagram showing an example of configuration of the rotation and translation adding unit 19 in the first embodiment of the image processing device.

FIG. 56 is a block diagram in which relations between the rotation and translation adding unit 19 and the image memory 4 in the case of the average addition method are considered. In this case, as in the case of the simple addition method shown in FIG. 53, the rotation and translation adding unit 19 has a rotation and translation processing unit 191, gain amplifiers 192 and 193, and an adder 194. The average addition method is different from the simple addition method in that gains w1 and w2 of the gain amplifiers 192 and 193 differ depending on which number frames image frames to be added are, and thus the values of the gains w1 and w2 are supplied from the CPU 1.

Figure 57:
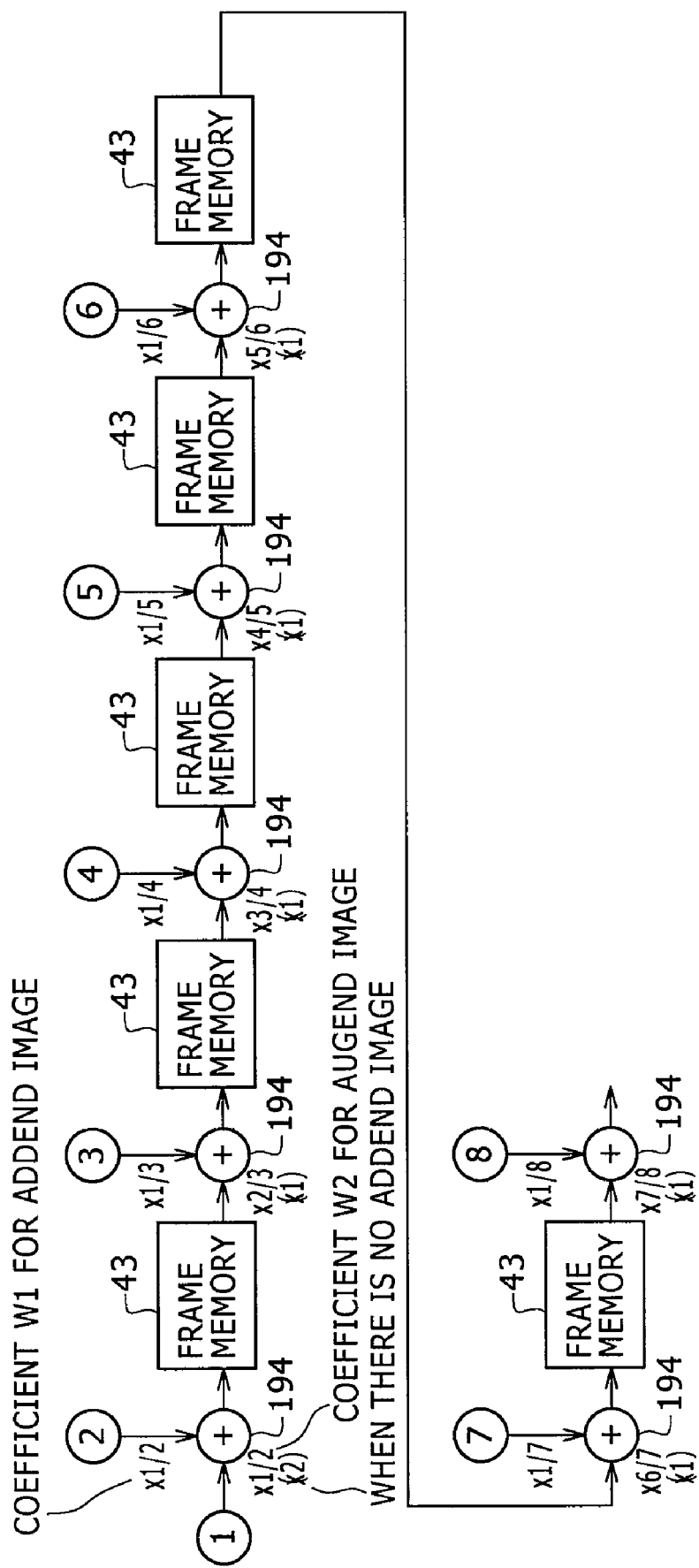
FIG. 57 is a diagram of assistance in explaining the example of configuration of the rotation and translation adding unit 19 in the first embodiment of the image processing device.

FIG. 57 shows an addition of each jth image frame in the case of the average addition method. FIG. 57 shows that the adder 194 and the frame memory 43 are used repeatedly to superimpose a plurality of image frames, or eight image frames in the example of FIG. 57, on each other. In FIG. 57, a number in a circle indicates the number of an image frame, and of values of the gain (multiplication coefficient) w2 for an augend image, a value in parentheses corresponds to a case where there is no addend pixel.

As shown in FIG. 57, the gain w1 for a jth addend image is w1=1/j, and the gain w2 for the augend image in the addition of the jth image is w2=(j−1)/j.

Figure 58:
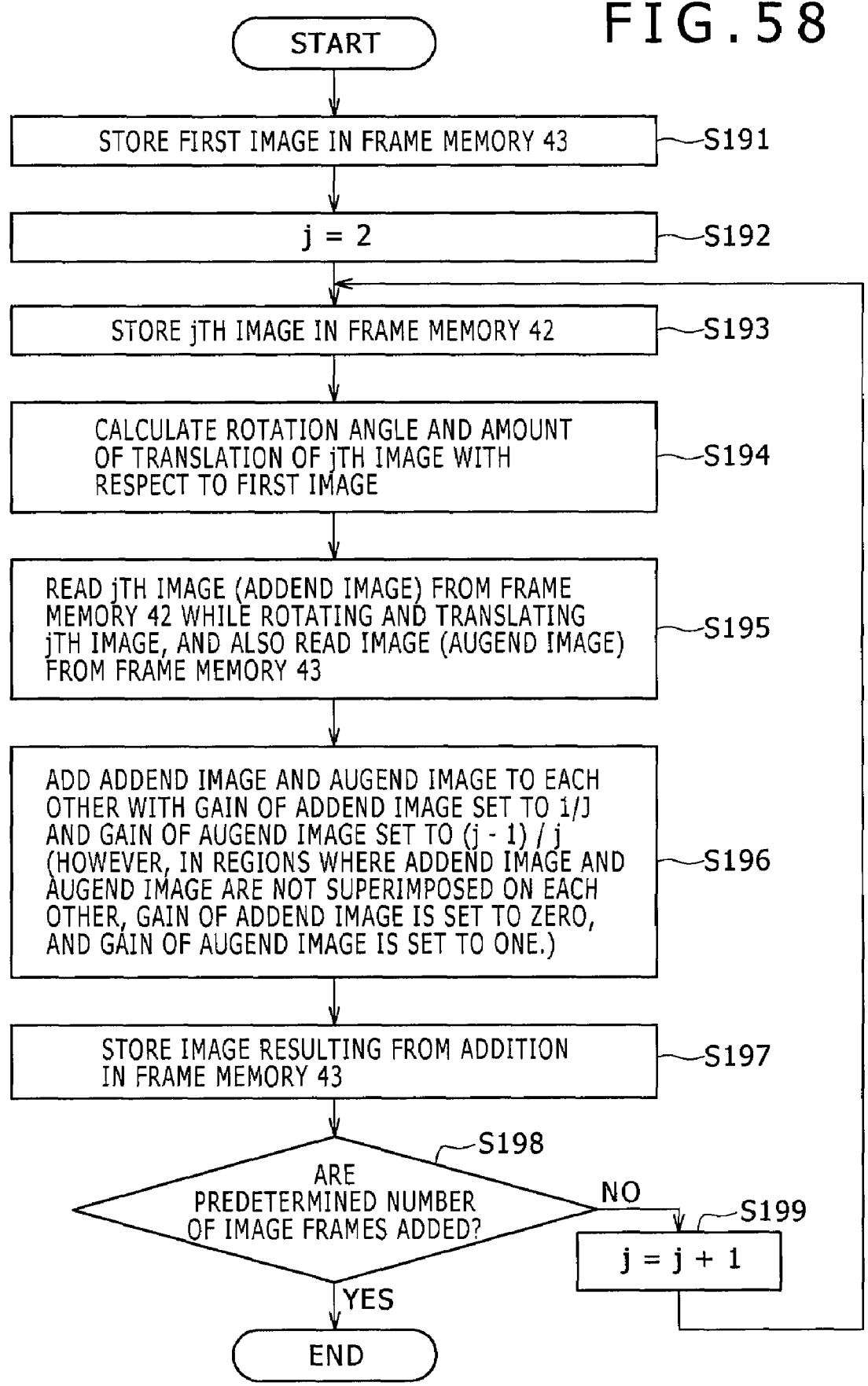
FIG. 58 is a flowchart of assistance in explaining an example of processing of the rotation and translation adding unit 19 in the first embodiment of the image processing device.

FIG. 58 is a flowchart of assistance in explaining a process procedure when the average addition method is performed by the rotation and translation adding unit 19 in the image pickup device according to the present embodiment. Incidentally, each step in the flowchart of FIG. 58 is mainly performed under control of the CPU 1.

First, the CPU 1 performs control to store a first image frame in the frame memory 43 (step S191). Next, the CPU 1 sets a variable j indicating the number of image frames to be processed to j=2, which indicates a second frame (step S192).

Then, the CPU 1 performs control to store the jth image frame in the frame memory 42 (step S193). Next, as described above, under control and instructions of the CPU 1, the hand movement vector detecting unit 15 calculates a global motion vector or an amount of translation and a rotation angle of the jth image frame with respect to the first image frame, and then sends the calculated amount of translation and the calculated rotation angle to the CPU 1 (step S194).

Next, receiving the amount of translation and the rotation angle from the CPU 1, the rotation and translation adding unit 19 reads the jth image frame from the frame memory 42 while rotating and translating the jth image frame. At the same time, the rotation and translation adding unit 19 reads the first image frame or an image frame as a result of addition from the frame memory 43 (step S195). Incidentally, the image read from the frame memory 42 will be referred to as an addend image, and the image read from the frame memory 42 will be referred to as an augend image.

Next, the rotation and translation adding unit 19 adds together pixel data of the addend image and pixel data of the augend image with the gain w1 for the pixel data of the addend image set at w1=1/j and the gain w2 for the pixel data of the augend image set at w2=(j−1)/j. However, for a region of the augend image on which region the addend image is not superimposed, that is, when pixel data of the addend image which pixel data is to be added to pixel data of the augend image do not exist, the gain w1 for the pixel data of the addend image is set at w1=0, and the gain w2 for the pixel data of the augend image is set at w2=1 (step S196).

Then, the rotation and translation adding unit 19 writes image data as a result of the addition back to the frame memory 43 (step S197).

Next, the CPU 1 determines whether a predetermined number of image frames are superimposed on each other (step S198). When the CPU 1 determines that the superimposition of the predetermined number of image frames is not completed, the CPU 1 increments the variable j indicating the number of image frames to be processed to j=j+1 (step S199). Then, the process returns to step S193 to repeat the process from step S193 on down.

When the CPU 1 determines in step S198 that the superimposition of the predetermined number of image frames is completed, the CPU 1 ends the process routine of FIG. 58.

As an application using the average addition method, the image pickup device according to the present embodiment has a function of a gimmick (special effects) in which a moving subject is fading away. That is, the average addition method can realize a new photographing mode in which a moving part within an image frame is gradually blurred and fades away as consecutive photographing is performed, though the brightness of the image at the time of addition of the first frame is unchanged. Incidentally, noise within an image frame also fades away each time an image frame is added as an effect of the addition, which is a secondary effect.

(3) Tournament Addition Method

The simple addition method and the average addition method always set a first image as a reference image, position a second image and subsequent images with respect to the first image, and then add the second and subsequent images to the first image. On the other hand, a tournament addition method treats all images equally. Therefore, the set reference image is not limited to the first image, and may be any of the images. However, each of two images to be added together needs to be translated and rotated.

Figure 59:
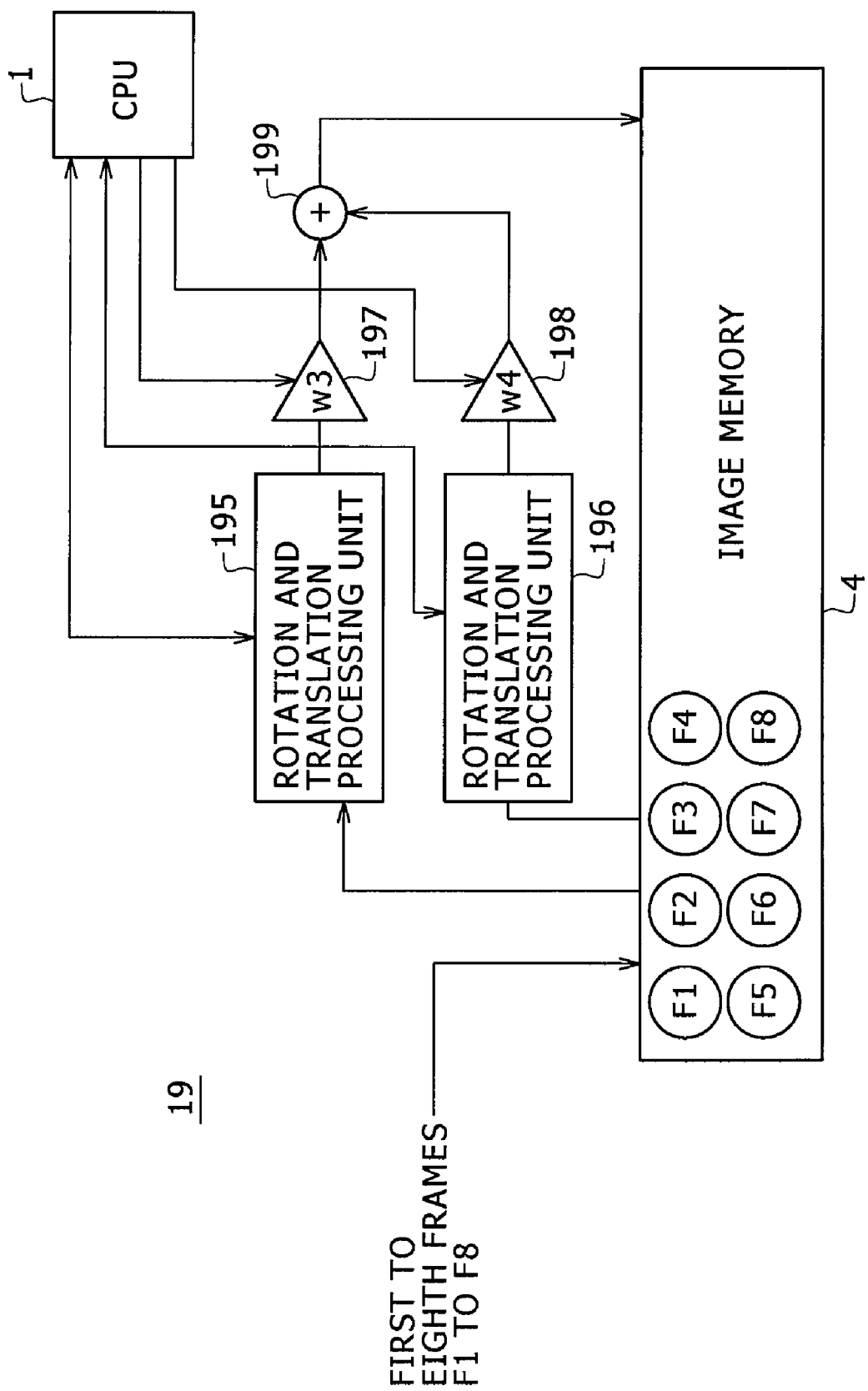
FIG. 59 is a block diagram showing an example of configuration of the rotation and translation adding unit 19 in the first embodiment of the image processing device.

FIG. 59 is a block diagram in which relations between the rotation and translation adding unit 19 and the image memory 4 in the case of the tournament addition method are considered. In this case, the rotation and translation adding unit 19 has two rotation and translation processing units 195 and 196, gain amplifiers 197 and 198, and an adder 199.

As described above, the image memory 4 has at least the two frame memories 41 and 42 for the process of detecting a hand movement vector in the hand movement vector detecting unit 15 as well as the frame memory 43 for storing an image frame as a result of image addition. For this tournament addition method, the frame memory 43 can further store a number of image frames to be added.

That is, when the tournament addition method is selected, the image pickup device consecutively takes a number of image frames to be added together, and stores all the image frames in the image memory 4. Then, the image pickup device sets one of the image frames as a reference image, and starts the addition process.

In an example to be described below, tournament addition is performed using eight image frames. References F1 to F8 in circles within the image memory 4 in FIG. 59 indicate eight image frames taken consecutively and stored.

It is assumed that per-block motion vectors, global motion vectors and the like for the eight image frames are all already calculated by the hand movement vector detecting unit 15 at a time of starting the addition process.

However, as described above, the hand movement vector detecting unit 15 can detect only a relative motion vector with respect to an immediately preceding frame or a motion vector with a first frame as a reference. It is therefore necessary to allow a cumulative error or perform detection again using the set reference image.

Figure 60:
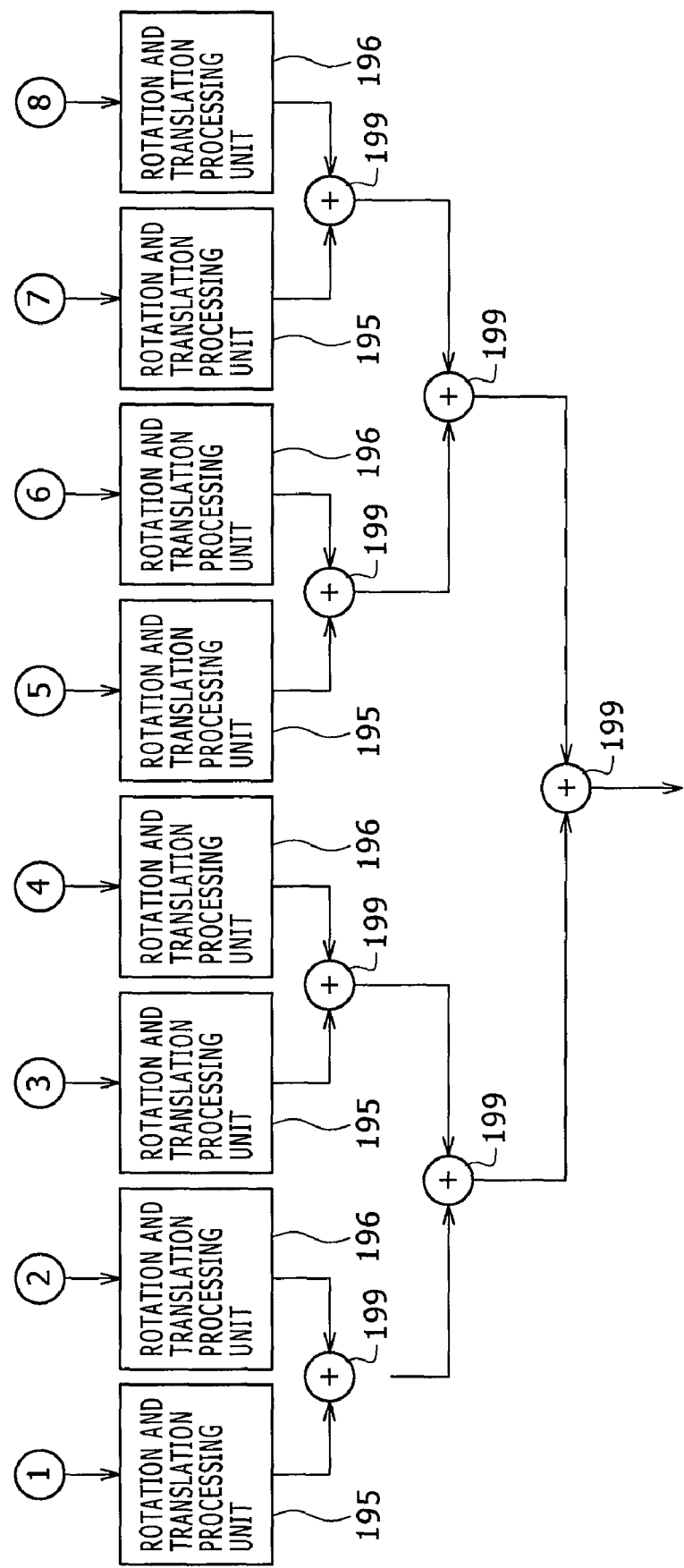
FIG. 60 is a diagram of assistance in explaining the example of configuration of the rotation and translation adding unit 19 in the first embodiment of the image processing device.

FIG. 60 shows an outline of the tournament addition method. Numbers in circles in FIG. 60 correspond to the eight image frames F1 to F8. In this example, as an addition in a first stage, the image frames F1 and F2, the image frames F3 and F4, the image frames F5 and F6, and the image frames F7 and F8 are added to each other.

In the addition in the first stage, the rotation and translation processing units 195 and 196 translate and rotate two respective image frames to be added to each other by amounts corresponding to relative hand movements with respect to the set reference image.

After the addition in the first stage is completed, images as a result of the addition in the first stage are subjected to an addition in a second stage. As the addition in the second stage, in the example of FIG. 60, a result of the addition of the image frames F1 and F2 and a result of the addition of the image frames F3 and F4 are added to each other, and a result of the addition of the image frames F5 and F6 and a result of the addition of the image frames F7 and F8 are added to each other. In the addition in the second stage, each of the image frames to be added coincides with the reference image, and therefore the process of translation and rotation in the rotation and translation processing units 195 and 196 is not necessary.

After the addition in the second stage is completed, images as a result of the addition in the second stage are subjected to an addition in a third stage. As the addition in the third stage, in the example of FIG. 60, a result of the addition of the image frames F1, F2, F3, and F4 and a result of the addition of the image frames F5, F6, F7, and F8 are added to each other. In the addition in the third stage, each of the image frames to be added coincides with the reference image, and therefore the process of translation and rotation in the rotation and translation processing units 195 and 196 is not necessary.

Returning to FIG. 59, when the addition process is started, the CPU 1 first sets two image frames to be added to each other in the first stage, and supplies the amounts of translation and the rotation angles of the set image frames with respect to the reference image, for example, to the rotation and translation processing units 195 and 196.

The rotation and translation processing units 195 and 196 respectively read the image data of the two corresponding image frames from the image memory 4 while translating and rotating the image frames using the amounts of translation and the rotation angles of the image frames, which information is received from the CPU 1, such that relative hand movements with respect to the reference image are cancelled out.

Then, the two image frames from the rotation and translation processing units 195 and 196 are multiplied by a gain w3 and a gain w4 by the gain amplifiers 197 and 198, and thereafter added to each other in the adder 199. Then, image data after the addition is written to a buffer memory of the image memory 4.

The CPU 1 performs the same process as described above for two other image frames to be subjected to the addition in the first stage shown in FIG. 60. Hence, in correspondence with this, the rotation and translation processing units 195 and 196 add the two other image frames specified to each other while translating and rotating the image frames in the same manner as described above. A result of the addition is stored in the image memory 4.

After the addition in the first stage is completed, in order to perform the addition in the second stage, the CPU 1 sets image frames as the results of the addition in the first stage as image frames to be read from the image memory 4, sets the amounts of translation and the rotation angles to zero, and gives an instruction to read the image frames to the rotation and translation processing units 195 and 196.

The rotation and translation processing units 195 and 196 read the image data of the image frames as the results of the addition in the first stage according to information and the instruction from the CPU 1, and perform the addition process in the second stage shown in FIG. 60.

After the addition in the second stage is completed, in order to perform the addition in the third stage, the CPU 1 sets image frames as the results of the addition in the second stage as image frames to be read from the image memory 4, sets the amounts of translation and the rotation angles to zero, and gives an instruction to read the image frames to the rotation and translation processing units 195 and 196.

The rotation and translation processing units 195 and 196 read the image data of the image frames as the results of the addition in the second stage according to information and the instruction from the CPU 1, and perform the addition process in the third stage shown in FIG. 60. Thus the tournament addition in this example is ended.

Figure 61:
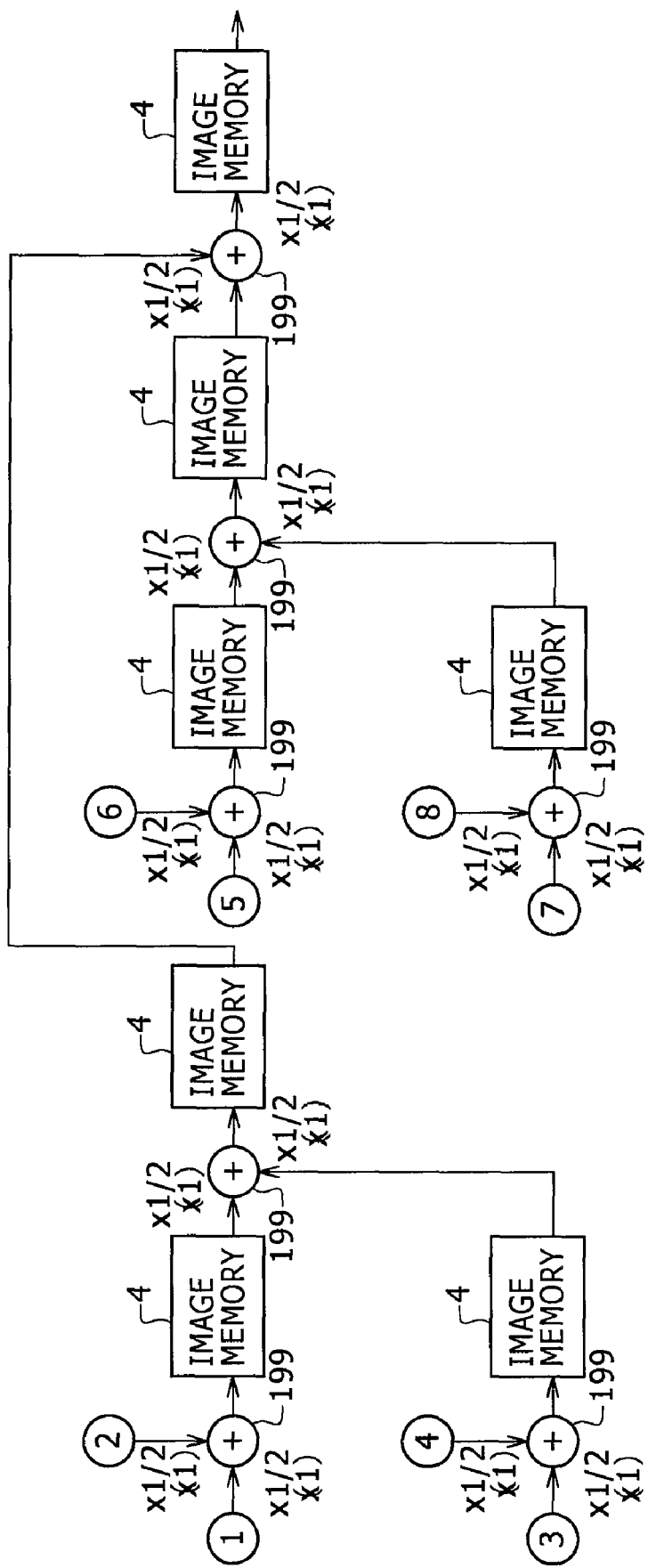
FIG. 61 is a diagram of assistance in explaining the example of configuration of the rotation and translation adding unit 19 in the first embodiment of the image processing device.

FIG. 61 shows the gains (multiplication coefficients) w3 and w4 of the gain amplifiers 197 and 198 in the addition of the eight image frames in the case of the tournament addition method as well as a flow of the addition process.

The multiplication coefficients w3 and w4 shown in FIG. 61 are an example based on the above-described average addition method. The multiplication coefficients are w3=w4=½ in a region where the two image frames are superimposed on each other, and are w3=1 and w4=1 in a region where the two image frames are not superimposed on each other.

Incidentally, the multiplication coefficients w3 and w4 are not limited to the values based on the average addition method, and values based on the simple addition method may be used.

Though omitted in the above description, because two images to be added in the first layer are translated and rotated with respect to the reference image, the tournament addition method according to the present embodiment has a mechanism for determining pixel positions where neither of the two images has a corresponding pixel in a region of the reference image in the additions in the second and subsequent layers.

Specifically, at the time of the addition in the first layer, "0" as a pixel value of a luminance component Y of a result of the addition is replaced with a value "1". Then, instead, a pixel value of a luminance component Y of the result of the addition at a pixel position where neither of the two images added to each other in the first stage has a corresponding pixel as a result of translation and rotation is set to "0".

Then, in the addition in the second and subsequent layers, when pixel values of luminance components Y of two frames are both "0", a luminance component Y after the addition is also set to "0". When all the images are added together, all pixels always include effective pixels (pixels of the reference image), and thus a pixel having a luminance value of "0" is replaced with a pixel value of the reference image.

Thus, by using the pixel value "0" of a luminance component Y as an ineffective pixel flag, it is possible to provide a flag for determining a pixel position where there are no effective pixels at the time of superimposition while retaining the format of image data without an increase in capacity.

Of course, one bit may be separately provided as ineffective pixel flag for a pixel position where there are no effective pixels at the time of superimposition as described above, and any pixel value may be used as a flag regardless of whether the pixel value is that of a luminance component Y or a color-difference component Cb/Cr. In view of effects on cost and picture quality, however, the method using the ineffective pixel flag according to the present embodiment as described above is considered to be an optimum method.

Figure 62:
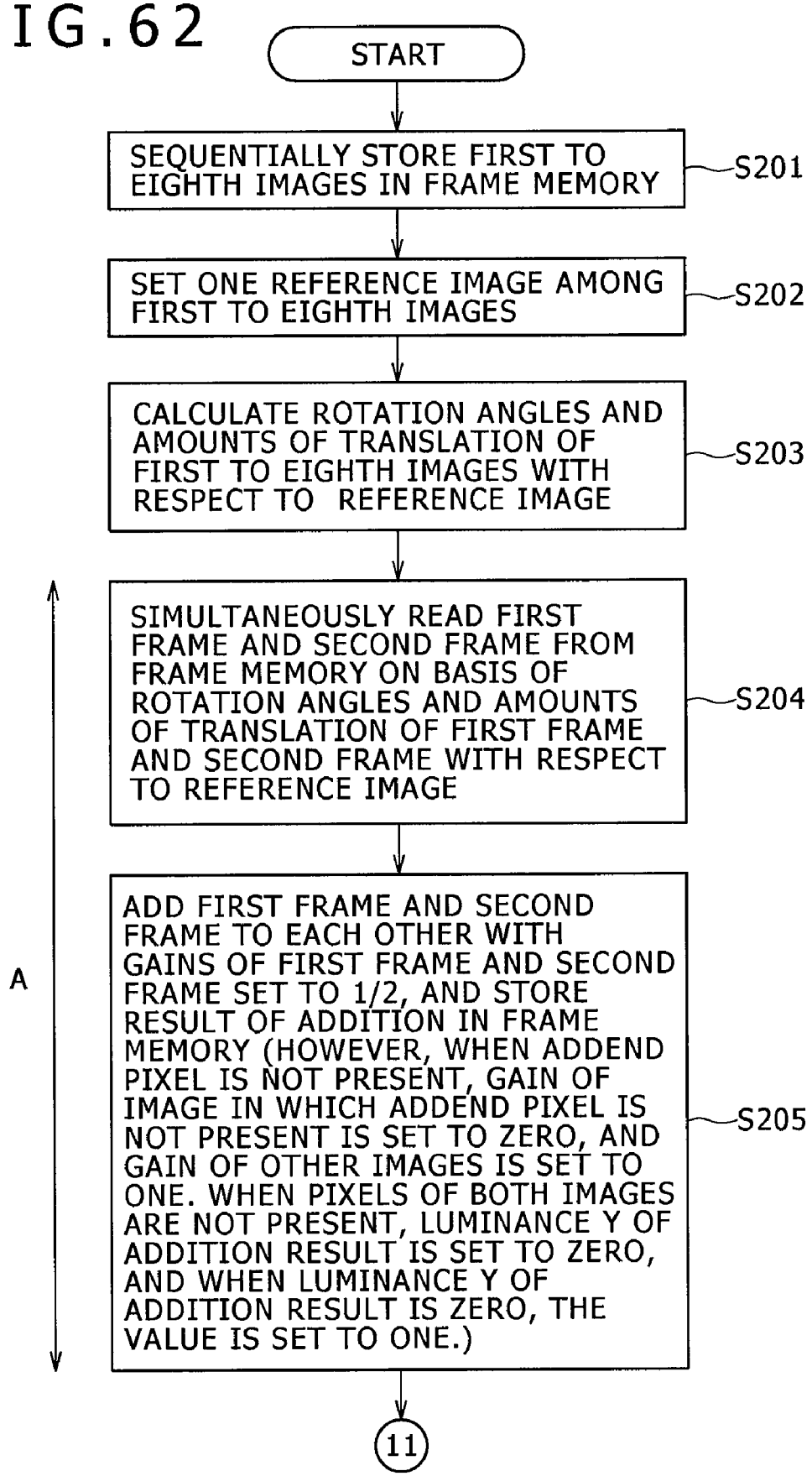
FIG. 62 is a part of a flowchart of assistance in explaining an example of processing of the rotation and translation adding unit 19 in the first embodiment of the image processing device.
Figure 63:
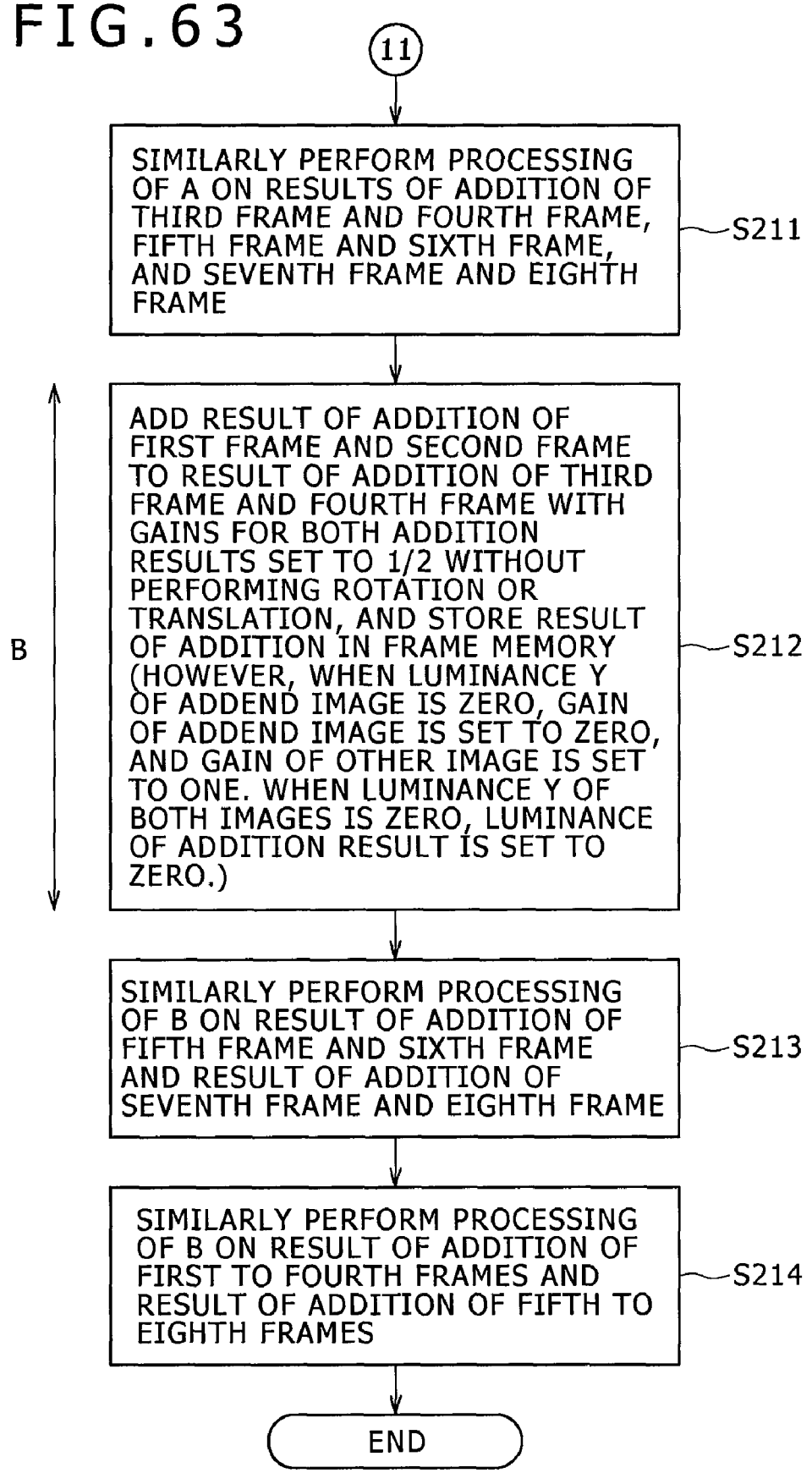
FIG. 63 is a part of the flowchart of assistance in explaining the example of processing of the rotation and translation adding unit 19 in the first embodiment of the image processing device.

FIG. 62 and FIG. 63 are flowcharts of assistance in explaining a process procedure when the above-described tournament addition method is performed by the rotation and translation adding unit 19 in the image pickup device according to the present embodiment. Incidentally, each step in the flowcharts of FIG. 62 and FIG. 63 is mainly performed under control of the CPU 1.

First, the CPU 1 sequentially writes and stores the image data of a first to an eighth image frame in the frame memory of the image memory 4 (step S201). Next, the CPU 1 sets one reference image among the first to eighth image frames (step S202). Then, the CPU 1 calculates amounts of translation and rotation angles of the first to eighth image frames with respect to the image frame as the reference image in advance (step S203).

Next, the CPU 1 starts the addition process in the first stage. The CPU 1 supplies the rotation and translation adding unit 19 with information on the amounts of translation and the rotation angles of the first image frame and the second image frame with respect to the reference image frame. The rotation and translation adding unit 19 reads the image data of the first image frame and the second image frame simultaneously from the corresponding frame memory of the image memory 4 in such a manner as to cancel out the amounts of translation and the rotation angles of the first image frame and the second image frame with respect to the image frame as the reference image on the basis of the information from the CPU 1 on the amounts of translation and the rotation angles of the two image frames (step S204).

Then, under control of the CPU 1, the rotation and translation adding unit 19 adds together the image data of the first image frame and the image data of the second image frame with the gain w3=½ and the gain w4=½ while reading the image data of the first image frame and the image data of the second image frame, and then writes a result of the addition to the frame memory of the image memory 4 (step S205).

In step S205, a pixel position within the image frame of the reference image (pixel position to which pixel data after the addition is written) is sequentially set, the image data of the first image frame and the second image frame is searched for pixels corresponding to each set pixel position, and the pixels are read and added together. When one of the pixels of the first image frame and the second image frame does not exist, the gain for the image data of the image frame in which the pixel does not exist is set to "0", and the gain for the image data of the image frame in which the pixel exists is set to "1".

Further, in step S205, when neither of the first image frame and the second image frame has a corresponding pixel, the pixel value of a luminance component Y as a result of the addition is set to "0". In addition, in a case where a result of the addition of the image data when the corresponding pixels exist is "0", the pixel value is changed to "1".

Next, the CPU 1 supplies the rotation and translation adding unit 19 with an instruction to perform the process of step S204 and step S205 for the third image frame and the fourth image frame, the fifth image frame and the sixth image frame, and the seventh image frame and the eighth image frame, and the rotation and translation adding unit 19 performs the process (step S211 in FIG. 63).

Next, the CPU 1 supplies the rotation and translation adding unit 19 with an instruction to start the addition process in the second stage. According to the instruction from the CPU 1, the rotation and translation adding unit 19 reads image data as the result of the addition of the first image and the second image and image data as the result of the addition of the third image and the fourth image from the image memory 4 without performing translation and rotation. Then, with the gains w3 and w4 both set at ½, the two pieces of image data are added to each other (step S212).

In step S212, when one of the luminance component Y of pixel data of the result of the addition of the first image and the second image and the luminance component Y of pixel data of the result of the addition of the third image and the fourth image which pixel data is to be added together is "0", the gain for the pixel data of an image having the luminance component Y of "0" of two images to be used for addition is set to "0", and the gain for the pixel data of the other image is set to "1".

Further, in step S212, when the luminance components Y of the pixel data of the two images to be added together are both "0", the pixel value of a luminance component Y as a result of the addition is also set to "0".

Next, the CPU 1 supplies the rotation and translation adding unit 19 with an instruction to perform the above-described process of step S212 for image data as the result of the addition of the fifth image and the sixth image and image data as the result of the addition of the seventh image and the eighth image, and the rotation and translation adding unit 19 performs the process (step S213).

Next, the CPU 1 supplies the rotation and translation adding unit 19 with an instruction to perform the addition in the third stage, that is, the above-described process of step S212 for a result of the addition of the first to fourth images and a result of the addition of the fifth to eighth images, and the rotation and translation adding unit 19 performs the process (step S214).

Thus, the process of adding together a plurality of image frames by the tournament addition method according to the present embodiment is ended.

The above-described tournament addition method according to the present embodiment has two points. One point is that each of two addition images is added while translated and rotated except the reference image in the first stage of the tournament addition method, whereas each of two images is added without being translated or rotated in the second and subsequent stages. The addition in the first stage corresponds to the process of A in FIG. 62, and the addition in the second and subsequent stages corresponds to the process of B in FIG. 63.

The other point of the tournament addition method according to the present embodiment is that a mechanism is provided to be able to determine a pixel position at which neither of two images in the first stage does not have a pixel in the addition in the second and subsequent stages.

Incidentally, in the above-described example, eight image frames are subjected to tournament addition. In the tournament addition method according to the present embodiment, it is important to store images consecutively taken in advance in the image memory 4, but the number of images consecutively taken in advance is not important. In consideration of the nature of the tournament addition method, however, it is desirable that the number of images to be added together be expressed as a power of two.

The tournament addition method according to the present embodiment has two advantages. One advantage is that, as described above, an arbitrary reference image can be selected after all images to be added together are taken. When motion vectors are determined while consecutive photographing is performed, and a frame situated at a center of a locus of hand movement during the consecutive photographing is selected as the reference image, an effective area of an addition result image can be made widest.

The other advantage is that each frame image can be treated perfectly equally. For example, in the case of the already explained average addition method, addition coefficients are changed according to the number of frames so that weights of respective frames in a result of addition are equal to each other, but a digital rounding error inevitably occurs. As a result, the weights of the respective frames are not exactly the same. In the case of the tournament addition method according to the present embodiment, on the other hand, the frames are added after being multiplied by exactly the same coefficients, so that effects of rounding errors are not imbalanced.

However, in the tournament addition method, because all images are stored in memory in advance, a large amount of memory is required, and hence there is an upper limit to the number of frames taken consecutively, so that it is not possible to continue addition infinitely as in the simple addition method and the average addition method described above.

It is possible, however, to avoid the above problem when employing an architecture that temporarily stores images taken consecutively in an external storage whose bit unit price is very low such for example as a hard disk.

Recently, as a method for preventing not only effects of hand movement but also blurring of a moving subject, high-speed photographing, which is performed at high speed in a short exposure time of about 1/60 of a second and does not allow effects of hand movement and blurring of a moving subject to occur easily, has been drawing attention of the market.

A problem in this case is the value of the ISO speed for which provision can be made while noise level is kept low. Because improving the speed generally makes image noise more noticeable at the same time, manufacturers of digital cameras reduce the noise by using various methods, and boast the numerical value of a highest ISO speed at which a certain S/N level can be maintained as performance.

One objective of hand movement correction for still images as a subject of the present embodiment is noise reduction. When a plurality of images are added together, by detecting a part of a moving subject and not performing addition, or separately searching only for the part and performing tracking addition, it is possible to achieve a noise reduction with an apparently high speed that deals also with the moving subject.

In a case of random noise, when N images are added together, the noise component is statistically reduced at a ratio of a square root of N. That is, when a digital camera having a real performance value corresponding to ISO3200 adds 16 images together with a provision made for a moving subject, the ISO speed of the set can be boasted as four times the value, that is, ISO12800.

A system of addition desired in this case may take a certain processing time even when a fixed number of images are added together, but is to provide as high picture quality as possible. The tournament addition method according to the present embodiment meets this requirement. In other words, applications suitable for the tournament addition method include an improvement in ISO speed at the time of high-speed photographing.

As described above, the image pickup device according to the present embodiment has three addition methods, that is, the simple addition method, the average addition method, and the tournament addition method. Each of the three addition methods has an optimum digital camera application, as has been described above.

The image pickup device according to the present embodiment allows a user to select which of the three addition methods to use via the user operation input unit 3. Therefore the user can select an addition method according to an addition result desired by the user.

Incidentally, instead of the user directly selecting one of the three addition methods, the image pickup device can be configured to have the optimum applications for the three addition methods as selectable functions, so that when the user selects one of the applications, the CPU 1 automatically selects the optimum addition method for the application.

Then, one digital camera can simultaneously implement three new applications of handhold long-exposure photographing, a gimmick in which a moving subject fades away, and photographing at a high speed exceeding a real performance value.

Second Embodiment of Image Processing Device

The hand movement vector detecting unit 15 in the image pickup device as the first embodiment of an image processing device as described above assumes that two images, that is, an image of an original frame and an image of a reference frame are both stored in the frame memories of the image memory unit 4, as shown in FIG. 1. Therefore timing of detection of a motion vector is delayed by one frame.

On the other hand, the second embodiment uses streaming image data from an image pickup element 11 as a reference frame, and is able to perform real-time calculation of SAD values for raster-scan stream data.

Figure 64:
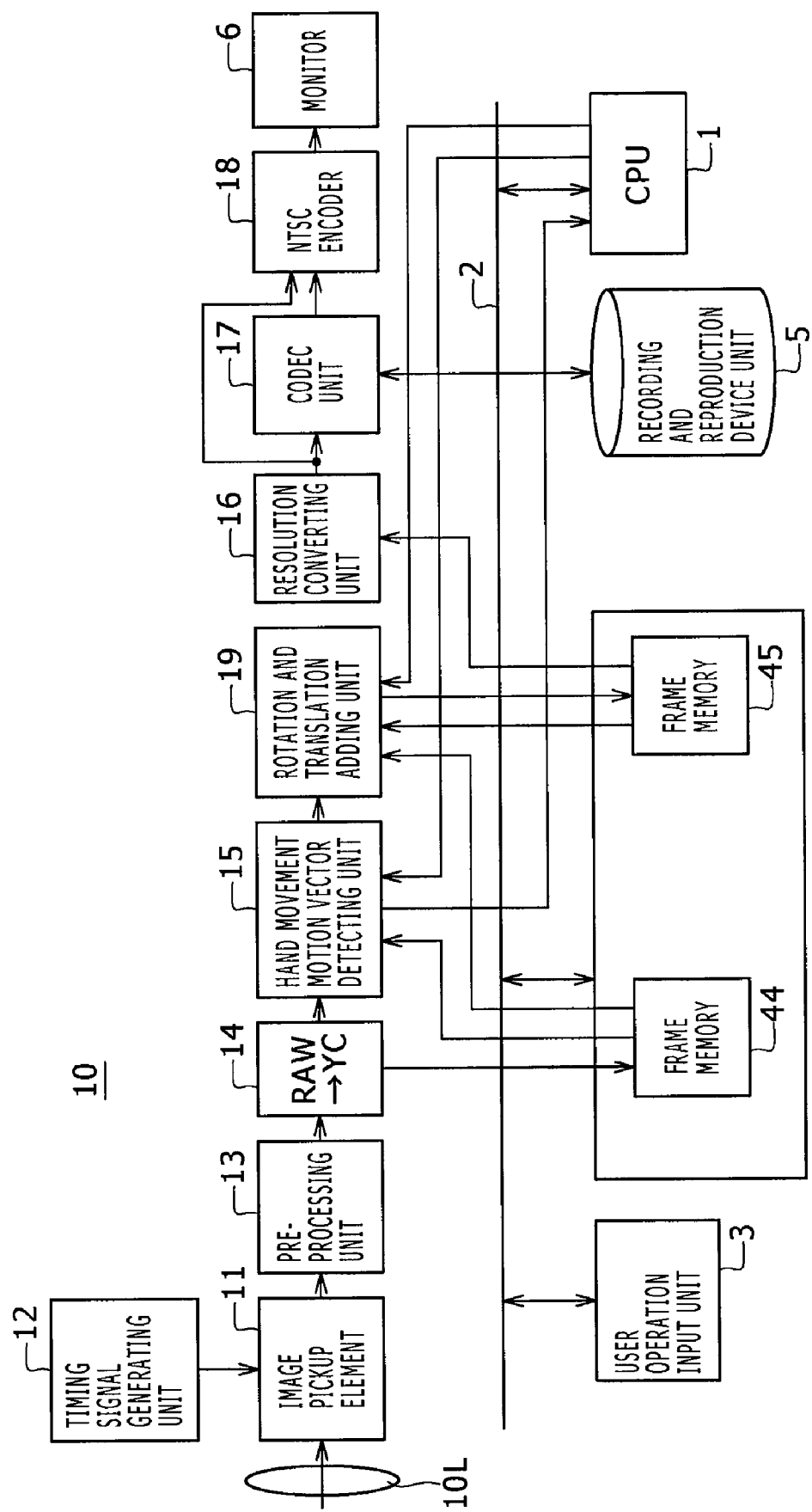
FIG. 64 is a block diagram showing an example of configuration of a second embodiment of the image processing device.

FIG. 64 is a block diagram showing an example of configuration of an image pickup device according to the second embodiment. As is understood from FIG. 64, configuration blocks of an image pickup signal processing system 10 and other configuration blocks are exactly the same as those of the first embodiment shown in FIG. 1. However, an image memory unit 4 in the second embodiment is formed by two frame memories 44 and 45. The frame memory 44 is for motion vector detection. The frame memory 45 is for frame image superimposition.

Incidentally, in practice, when frame memories that cannot be written and read simultaneously are used, the frame memory 44 alternately switches two frame memories between writing and reading in each frame and uses the two frame memories, as is well known.

As described later, using input pixel data from a data converting unit 14 as pixel data of a reference frame, and using data stored in the frame memory 44 as data of an original frame, a hand movement vector detecting unit 15 performs a process of generating reduced SAD tables, a process of detecting per-block motion vectors, a process of generating an aggregate SAD table, and a process of generating a global motion vector (hand movement vector). In the second embodiment, as in the above, the hand movement vector detecting unit 15 detects a rotation angle γ of the reference frame with respect to the original frame in addition to the global motion vector (translation component of hand movement) and an amount of translation (α, β).

Incidentally, in this example, the hand movement vector detecting unit 15 always obtains a relative hand movement vector with respect to an immediately preceding image. Thus, in order to calculate a relative hand movement with respect to a first reference image (see the image frame 120 in FIG. 3), hand movement components from the first image to a present image are integrated.

Then, after a one-frame delay, a rotation and translation adding unit 19 adds the image frame stored in the frame memory 44 to an image in the frame memory 45 or averages the image frames while cutting out and simultaneously rotating the image frame stored in the frame memory 44 according to the detected translation component of hand movement and the detected rotation angle in exactly the same manner as in the foregoing first embodiment. By repeating this process, the image frame 120 of a still image with a higher S/N ratio and a higher resolution without effects of hand movement is generated in the frame memory 45 (see FIG. 3).

Then, a resolution converting unit 16 cuts out an image having a predetermined resolution and a predetermined image size from the frame image in the frame memory 45 according to a control instruction from the CPU 1. As described above, the resolution converting unit 16 supplies the image as recording picked-up image data to a codec unit 17, and supplies the image as monitor image data to an NTSC encoder 18.

In the second embodiment, the original frame is stored in the frame memory 44, and the reference frame is input as a stream from the data converting unit 14. The hand movement vector detecting unit 15 in the first embodiment determines SAD values for reference blocks using two pieces of image data stored in the two frame memories 41 and 42. On the other hand, as shown in FIG. 64, the hand movement vector detecting unit 15 in the second embodiment determines SAD values for reference blocks using the stream image data from the data converting unit 14 as the image data of the reference frame and the image data stored in the frame memory 44 as the image data of the original frame.

Figure 65:
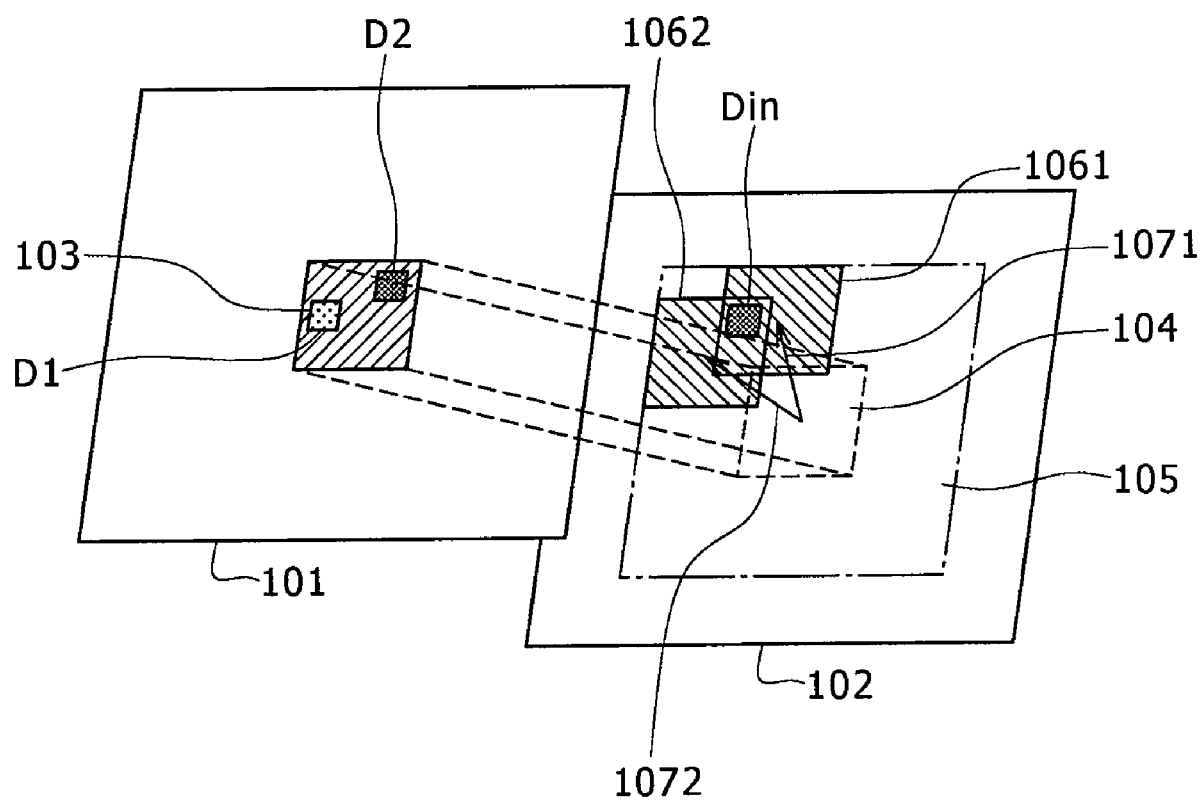
FIG. 65 is a diagram of assistance in explaining a per-block motion vector detecting process in the second embodiment of the image processing device.

As described above, the second embodiment uses the stream image data from the data converting unit 14 as the image data of the reference frame. Thus, a plurality of reference blocks having an input pixel as an element are simultaneously present in the reference frame. FIG. 65 is a diagram of assistance in explaining this.

Specifically, FIG. 65 shows that an input pixel Din in a search range 105 in the reference frame 102 is for example a pixel situated on a left side of a reference block 1061 corresponding to a reference vector 1071 and a pixel situated at an upper right of a reference block 1062 corresponding to a reference vector 1072.

Thus, when the input pixel Din is regarded as belonging to the reference block 1061, it is necessary to read a pixel D1 in a target block 103 and calculate a difference of the pixel D1. When the input pixel Din is regarded as belonging to the reference block 1062, it is necessary to read a pixel D2 in the target block 103 and calculate a difference of the pixel D2.

While only two reference blocks are shown for simplicity in FIG. 65 and FIG. 66 to be described later, there are a large number of reference blocks having the input pixel Din as an element within the reference blocks in practice.

SAD calculation in the second embodiment is performed by calculating difference absolute values between the luminance value Y of the input pixel Din and the luminance values Y of pixels within the target block which pixels correspond to the positions of the input pixel Din within respective reference blocks, and adding the calculated difference absolute values to a SAD table according to the reference vectors corresponding to the respective reference blocks.

Figure 66:
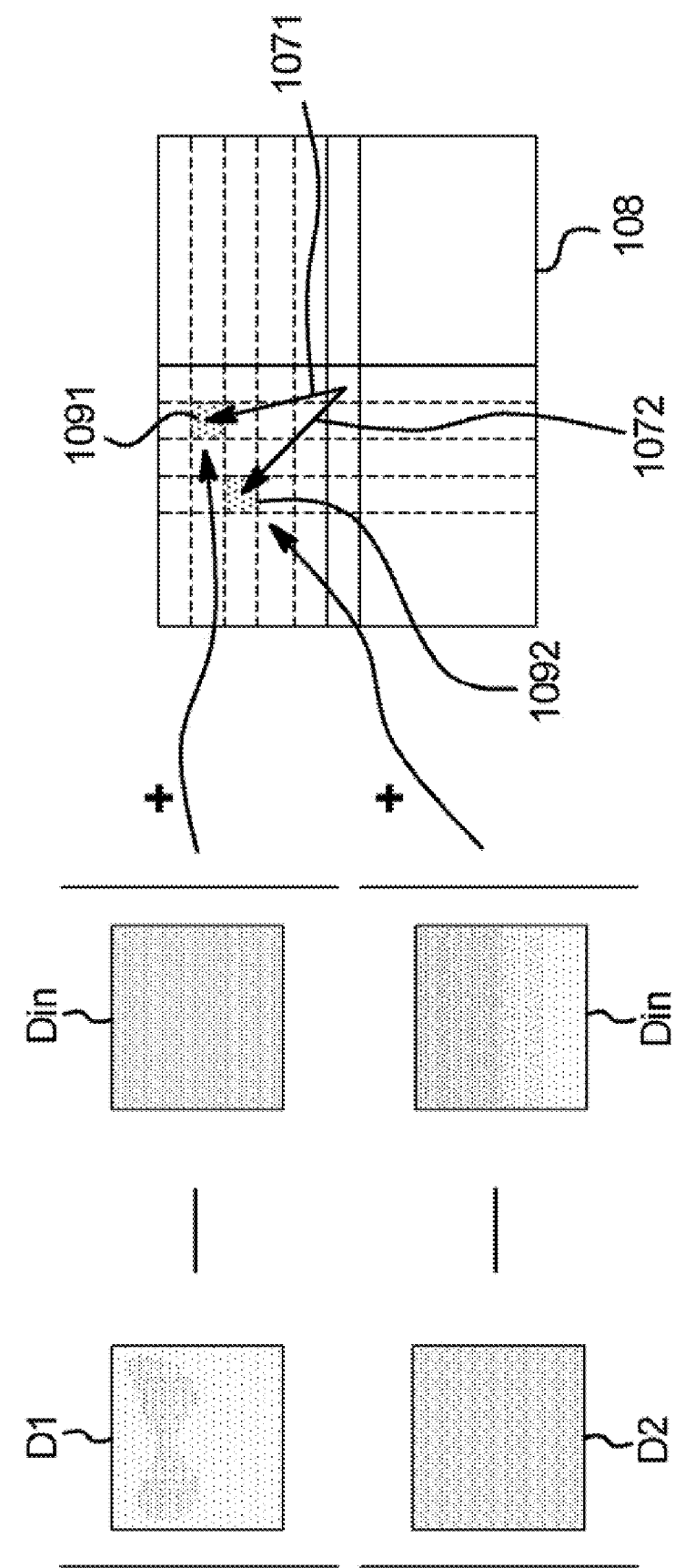
FIG. 66 is a diagram of assistance in explaining the per-block motion vector detecting process in the second embodiment of the image processing device.

For example, a difference absolute value between the pixel D1 within the target block 103 and the input pixel Din when the input pixel Din is regarded as belonging to the reference block 1061 is written by being added to a SAD value of a SAD table element 1091 corresponding to the reference vector 1071 of the SAD table 108, as shown in FIG. 66. A difference absolute value between the pixel D2 within the target block 103 and the input pixel Din when the input pixel Din is regarded as belonging to the reference block 1062 is written by being added to a SAD value of a SAD table element 1092 corresponding to the reference vector 1072 of the SAD table 108, as shown in FIG. 66.

Thus, the SAD table is completed when input pixels of all areas within the search range are input and the process is ended.

FIG. 66 is a diagram of assistance in explaining a case where a real-time SAD calculation process is applied to a existing method. In the second embodiment, in FIG. 65, instead of adding and writing the difference absolute value calculated as a SAD value for the SAD table element 1091 or 1092 corresponding to the reference vector 1071 or 1072 of the SAD table 108, a reference reduced vector obtained by reducing the reference vector 1071 or 1072 by a reduction scaling factor of 1/n is calculated, distribution and addition values to be distributed and added to SAD values corresponding to a plurality of reference vectors adjacent to the reference reduced vector are determined from the calculated difference absolute value, and the obtained distribution and addition values are added to the SAD values corresponding to the plurality of adjacent reference vectors, as in the first embodiment.

For calculation of an accurate motion vector after the SAD table (reduced SAD table) is completed, the second embodiment can also employ the methods using a quadric surface and cubic curves in a horizontal direction and a vertical direction, which methods are exactly the same as the methods described in the foregoing first embodiment.

Figure 67:
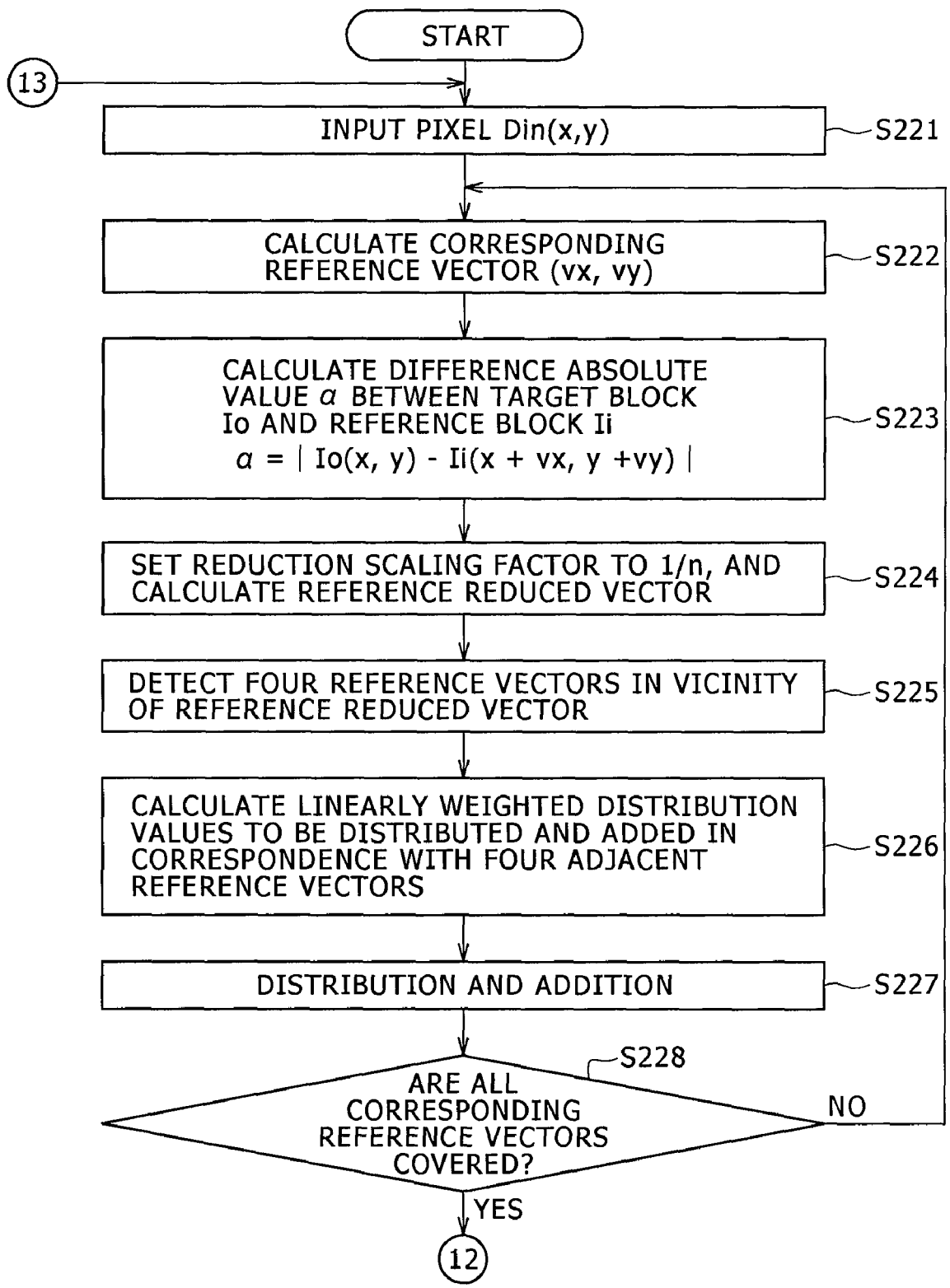
FIG. 67 is a part of a flowchart of assistance in explaining an example of the per-block motion vector detecting process in the second embodiment of the image processing device.
Figure 68:
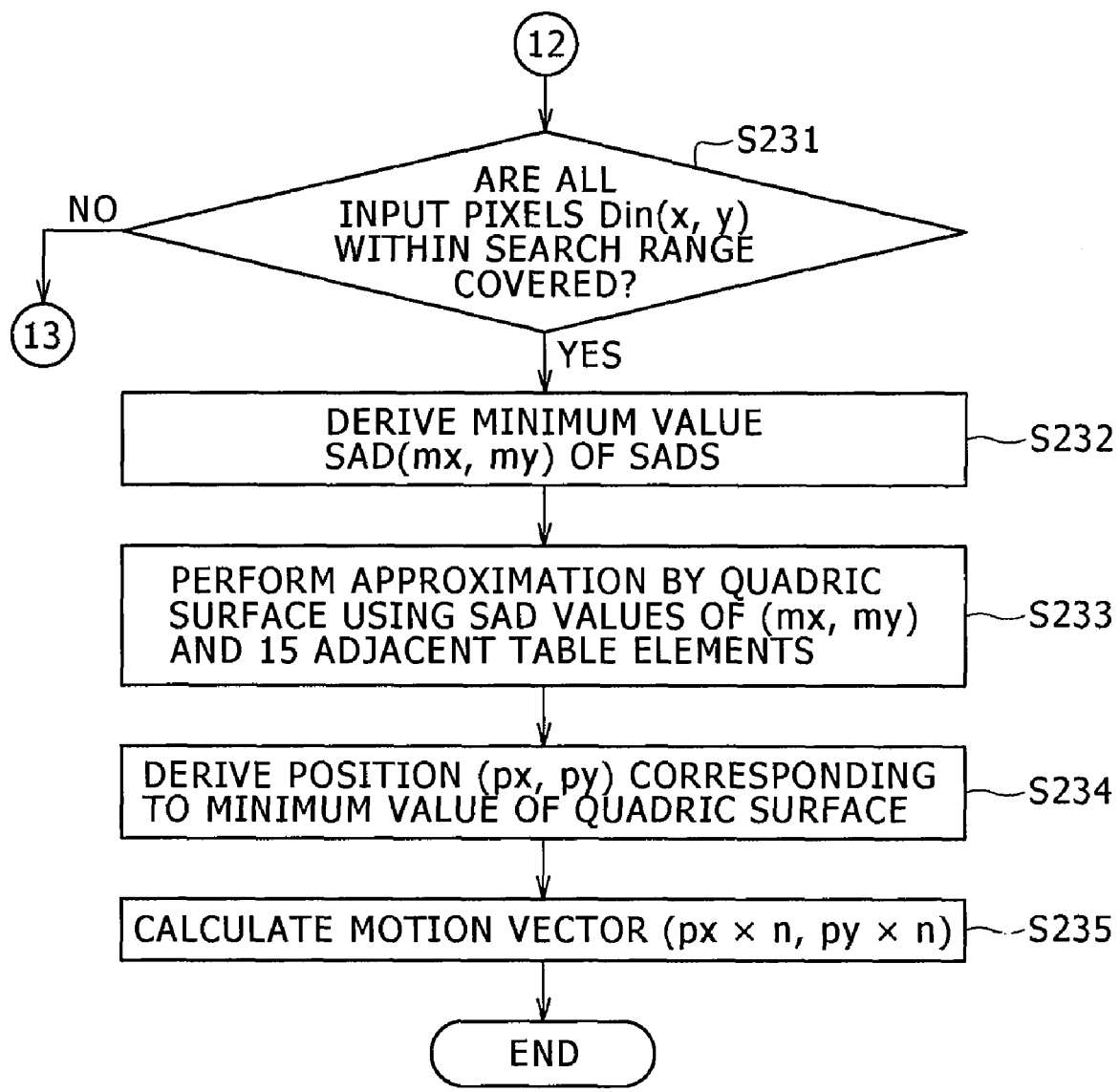
FIG. 68 is a part of the flowchart of assistance in explaining the example of the per-block motion vector detecting process in the second embodiment of the image processing device.

FIG. 67 and FIG. 68 are flowcharts of operation of a reduced SAD table generating process and a per-block motion vector detecting process for each target block in step S32 in FIG. 36, step S52 in FIG. 38, step S72 in FIG. 40, and step S82 in FIG. 41 in the hand movement vector detecting unit 15 in the case of the second embodiment.

First, the hand movement vector detecting unit 15 receives pixel data Din(x, y) at an arbitrary position (x, y) of an input image frame (reference frame) (step S221). Next, a reference vector (vx, vy) corresponding to one of a plurality of reference blocks including the position (x, y) of the pixel is set (step S222).

Next, an absolute value α of a difference between the value Ii(x, y) of the pixel in the reference block Ii of the set reference vector (vx, vy) and a pixel value Io(x−vx, y−vy) within a target block Io, the pixel value Io(x−vx, y−vy) corresponding to the pixel value Ii(x, y), is calculated (step S223). That is, the difference absolute value α is calculated as $$\alpha = |Io(x-vx, y-vy) - Ii(x,y)| \quad \text{(Equation 4)}$$

Next, the reduction scaling factor is set to 1/n, and a reference reduced vector (vx/n, vy/n) obtained by reducing the reference vector (vx, vy) to 1/n is calculated (step S224).

Next, a plurality of reference vectors adjacent to the reference reduced vector (vx/n, vy/n), or four adjacent reference vectors as described above in this example, are detected (step S225). Then, values (difference absolute values) to be distributed and added as table elements corresponding to the four detected adjacent reference vectors are calculated as linearly weighted distribution values from the difference absolute value α obtained in step S223 on the basis of relations between a position indicated by the reference reduced vector and positions indicated by the adjacent reference vectors, respectively, as described above (step S226). Then, the four linearly weighted distribution values obtained are added to the values of SAD table elements corresponding to the adjacent reference vectors, respectively (step S227).

Next, whether the operation of steps S222 to S227 has been performed for all the reference blocks including the pixel data Din(x, y) is determined (step S228). When it is determined that the operation has not been performed for another reference block including the pixel data Din(x, y), the process returns to step S222 to set the other reference block (vx, vy) including the pixel data Din and repeat the process from step S222 to step S227.

When it is determined in step S228 that the operation of steps S222 to S227 has been performed for all the reference blocks including the pixel data Din(x, y), whether the process of the above operation steps has been completed for all input pixels Din within a search range is determined (step S231 in FIG. 68). When it is determined that the process of the above operation steps has not been completed for all the input pixels Din within the search range, the process returns to step S221 to capture a next input pixel Din within the search range and repeat the process from step S221 on down.

When it is determined in step S231 that the process of the above operation steps has been completed for all the input pixels Din within the search range, it is determined that a reduced SAD table is completed. A minimum SAD value is detected in the completed reduced SAD table (step S232).

Next, a quadric surface is generated using the minimum SAD value (minimum value) at a table element address (mx, my) and SAD values of a plurality of adjacent table elements or 15 adjacent table elements as described above in this example (step S233). A minimum value vector (px, py) indicating a decimal precision position corresponding to a minimum SAD value of the quadric surface is calculated (step S234). This minimum value vector (px, py) corresponds to a decimal precision minimum table element address.

Then, a motion vector (px×n, py×n) to be obtained is calculated by multiplying the calculated minimum value vector (px, py) indicating the decimal precision position by n (step S235).

Incidentally, also in this example, as in the above-described example, the method using cubic curves in a horizontal direction and a vertical direction as described above may be used as the method for calculating the minimum value vector (px, py) indicating the decimal precision position.

In addition, also in the second embodiment, as in the third example described with reference to the flowcharts of FIGS. 48 to 51 in the foregoing first embodiment, the motion vector detecting process using a reduced SAD table may of course be repeated in two or more stages while narrowing down the search range and changing the reduction scaling factor as required.

The second embodiment has advantages in that frame memory can be reduced by an amount corresponding to one frame as compared with the first embodiment and a time taken to store an input image in the frame memory can be shortened. Aside from the effects of memory reduction, greater importance has recently been attached to the shortening of a processing time.

Third Embodiment

The second embodiment described above determines a hand movement vector and a rotation angle of an input image by always comparing the input image with an immediately preceding image. As described above, in practice, as shown in FIG. 3, a first frame is set as a reference, and subsequent frames are added to the first frame, so that an error in detecting a motion vector is reduced when the first frame is set as reference. This is taken into account in a third embodiment.

Figure 69:
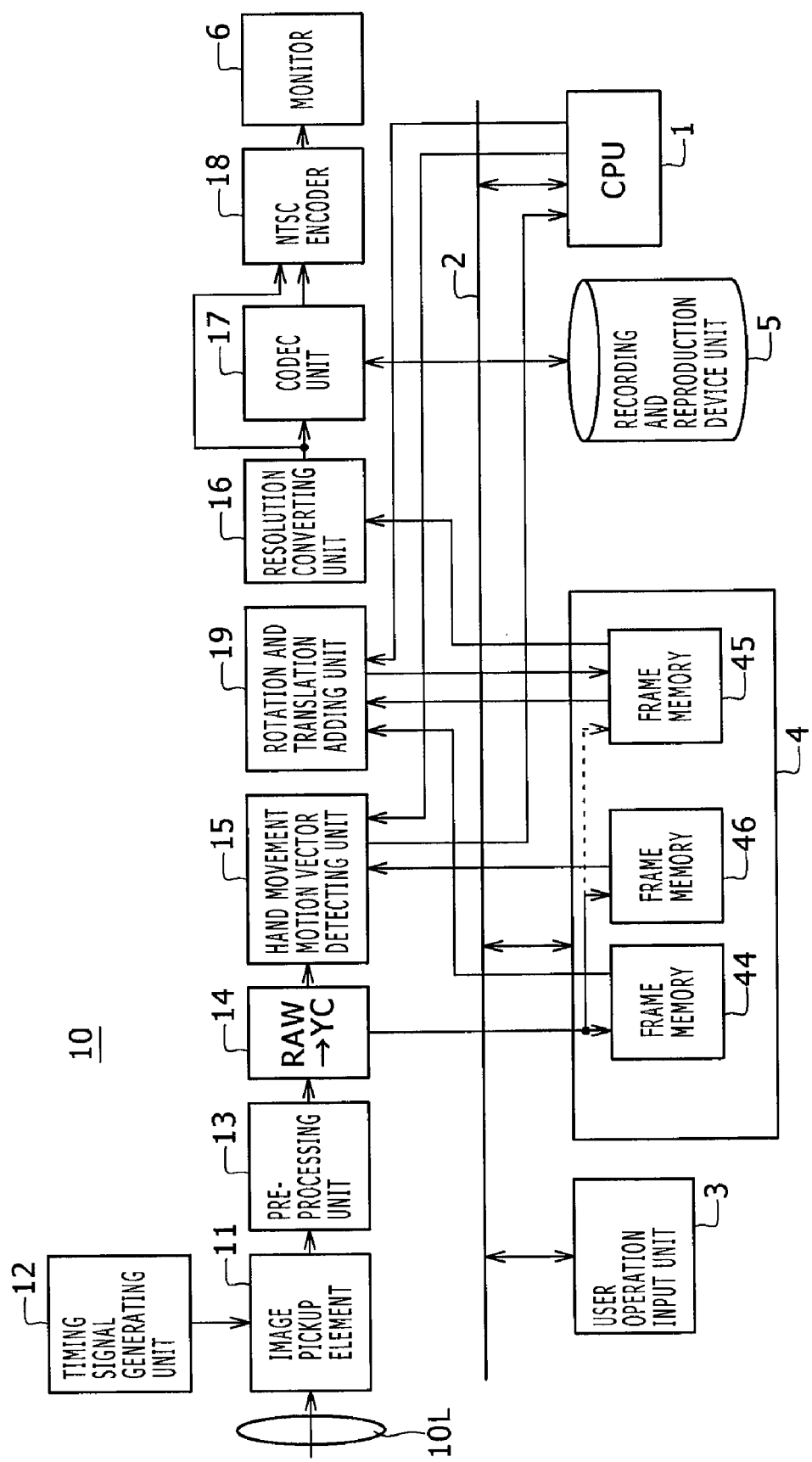
FIG. 69 is a block diagram showing an example of configuration of a third embodiment of the image processing device.

FIG. 69 is a block diagram showing an example of configuration of an image pickup device according to the third embodiment.

In an example of FIG. 69, an image memory unit 4 has a frame memory 46 in addition to the frame memory 44 and the frame memory 45 in the second embodiment of FIG. 64. Image data from a data converting unit 14 is written to the frame memory 44 and the frame memory 46.

In the third embodiment, the configuration of a system is shown which uses the frame memory 46 as a memory for storing a first frame serving as a target (an original frame and a reference image frame) and always calculates a reference vector of an input image with respect to the first image. Also in this configuration, an addition image result is stored in the frame memory 45.

Also in this example, the image data of the first frame as reference is also written to the frame memory 45 as indicated by a broken line in FIG. 69.

Then, a second image frame and subsequent image frames are written to the frame memory 44 and also supplied to a hand movement vector detecting unit 15. The hand movement vector detecting unit 15 detects a relative hand movement vector and a rotation angle between each of the second and subsequent image frames from the data converting unit 14 and the image data of the first frame read from the frame memory 46.

The hand movement vector detecting unit 15 supplies a CPU 1 with information on the detected relative hand movement vector and the detected rotation angle of each of the second and subsequent image frames with respect to the first image frame.

The second and subsequent images stored in the frame memory 44 are read from the frame memory 44 under control of the CPU 1 such that the calculated relative hand movement components between the second and subsequent images and the reference image of the first frame are cancelled out. The second and subsequent images are then supplied to a rotation and translation adding unit 19. According to a control signal from the CPU 1, the rotation and translation adding unit 19 rotates each of the second and subsequent image frames according to the relative rotation angle with respect to the first reference image frame, and adds each of the second and subsequent image frames to the image frame read from the frame memory 46 or averages the image frames. An image frame as a result of the addition or the averaging is written to the frame memory 45.

Then, the data of the image frame in the frame memory 45 is cut out so as to have a predetermined resolution and a predetermined image size according to a control instruction of the CPU 1. The result is supplied to a resolution converting unit 16. Then, as described above, the resolution converting unit 16 supplies the image as recording picked-up image data to a codec unit 17, and supplies the image as monitor image data to an NTSC encoder 18.

Incidentally, in the third embodiment described above, the system allowing infinite addition or infinite averaging addition with a first frame of input images as a reference image has been illustrated. However, when there is an abundant memory capacity, or when images are allowed to be temporarily saved to a recording and reproduction device unit 5, a method of storing all images to be added together in advance and adding together the images by the tournament addition method or the average addition method may be employed.

Sixth Embodiment

More enhanced effects are obtained by combining sensorless hand movement corrections according to the first to third embodiments described above with optical hand movement correction as existing technology.

This is because as described at the beginning, optical hand movement correction using a gyro sensor excels in rough correction but has difficulty in correcting rotation, whereas sensorless hand movement correction using block matching has high precision, including rotation correction, but sharply increases cost for SAD tables when a search range becomes wider and takes a processing time in the case of motion detection processing in a plurality of stages even when the method according to the embodiment is used.

Thus, by making rough correction by optical hand movement correction to narrow down a search range for motion vector detection for sensorless hand movement correction, and calculating a motion vector within the search range and then making sensorless hand movement correction, a low-cost, high-precision, and high-speed hand movement correction system can be realized.

Effect of Embodiments

The sensorless hand movement correction methods using block matching according to the foregoing first to third embodiments are superior to heretofore proposed sensorless still image hand movement correction techniques in all of cost, precision, processing time, and robustness.

All of still image hand movement corrections currently available on the market provide systems using a gyro sensor and an optical correction such as a lens shift or the like in combination, but cause large errors and do not offer satisfactory picture quality. On the other hand, methods according to the present embodiments realize low-cost and high-precision hand movement correction with sensor and mechanism parts removed.

Examples of Modification

While in the description of the foregoing embodiments, the reduction scaling factors in the horizontal direction and the vertical direction for reference vectors are the same, the reduction scaling factors in the horizontal direction and the vertical direction may be different from each other, as described above.

In addition, while in the foregoing embodiments, SAD values are obtained for all pixels within a reference block and a target block, SAD values may be obtained using only every kth (k is a natural number) pixel, for example.

Systems for motion vector detection by real-time processing often perform a SAD operation in which a search is made within a reference block for only a representative point within a target block in order to reduce operation cost and processing time.

Figure 70:
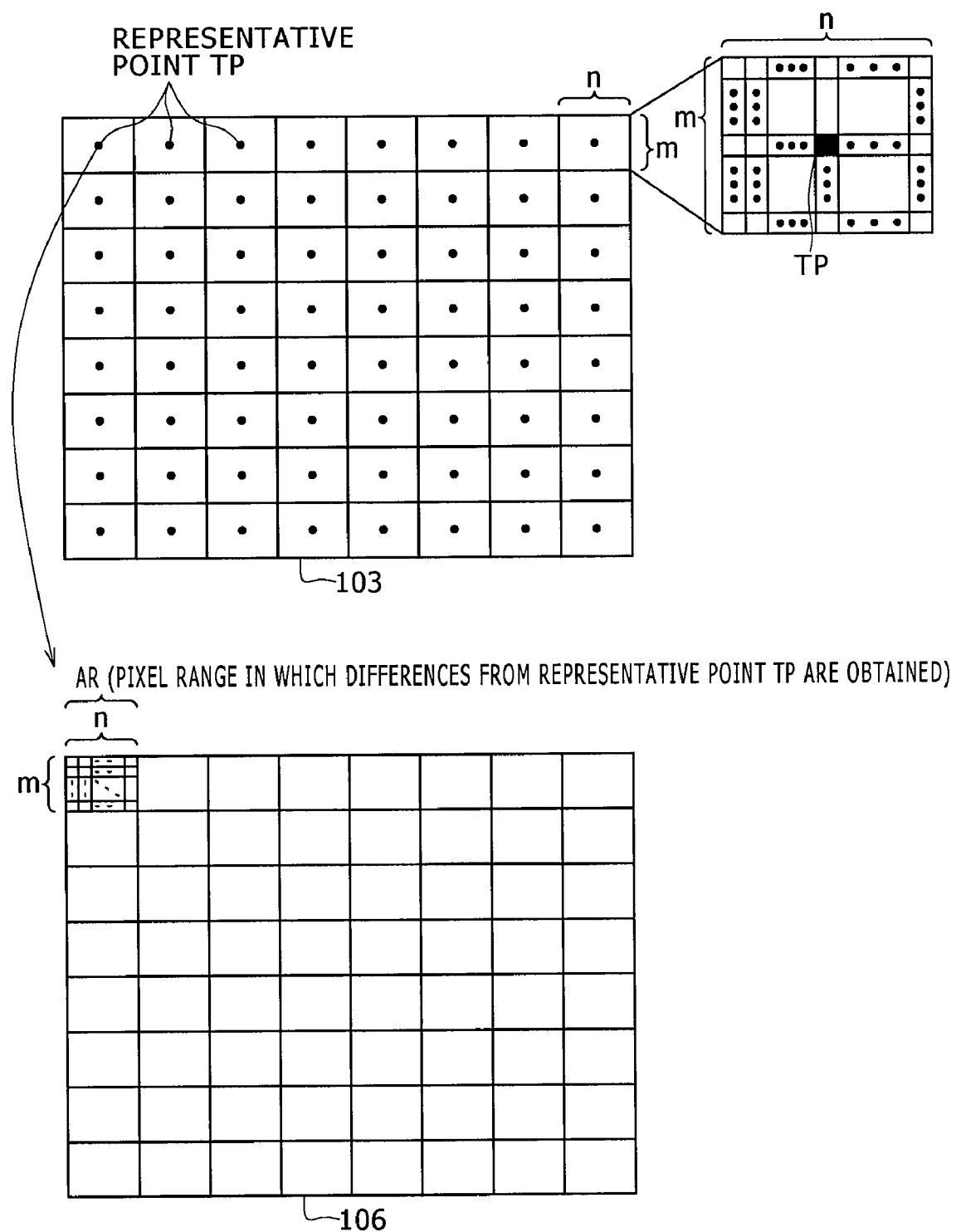
FIG. 70 is a diagram of assistance in explaining another example of the image processing method.

Specifically, as shown in FIG. 70, a target block 103 is divided into units each formed by a plurality of n (horizontal direction)×m (vertical direction) pixels (n and m are integers of one or more), for example, and one pixel among the plurality of pixels as a divided unit is set as a representative point TP. Then, in the SAD operation, only a plurality of representative points TP thus set for the target block 103 are used.

On the other hand, all pixels in a reference block 106 are subjected to the SAD value operation. For one representative point TP in the target block 103, all pixels included in a range AR formed by a plurality of n×m pixels as a divided unit in which the representative point TP is set in one reference block 106 are used.

Then, between the target block 103 and one reference block 106, a sum of differences between the pixel value of each representative point TP in the reference frame 102 and the pixel values of a plurality of n×m pixels included in each range AR corresponding to each representative point in the reference block 106 is obtained. Then, the obtained sums of differences for all the representative points TP in the target block 103 are added together. This result is one element value in a SAD table.

Then, the difference calculation using representative points TP similar to those described above is performed for all reference blocks within a search range for the target block 103, whereby the SAD table is generated. In this example, however, the plurality of reference blocks set in the search range are displaced from each other by a plurality of n×m pixels as a divided unit as described above or by an integral multiple of the plurality of pixels.

When representative points are used for a target block as described above, only one memory access suffices for one representative point TP in the target block in calculating a SAD value while memory access is made for a plurality of pixels in a range AR in the reference block. Therefore the number of memory accesses can be greatly reduced.

In addition, when only representative points TP are used, it suffices to store only pixel data of the representative points TP among all pixels within target blocks as data of the target blocks. Therefore the capacity of a frame memory storing the data of the target blocks of an original frame (target frame) can be reduced.

Further, the band of the image memory 4 (DRAM) may be reduced by having a small-scale representative point memory (SRAM) as a local memory separate from frame memories and retaining the data of the target blocks of the original frame (target frame) in the local memory.

Figure 71:
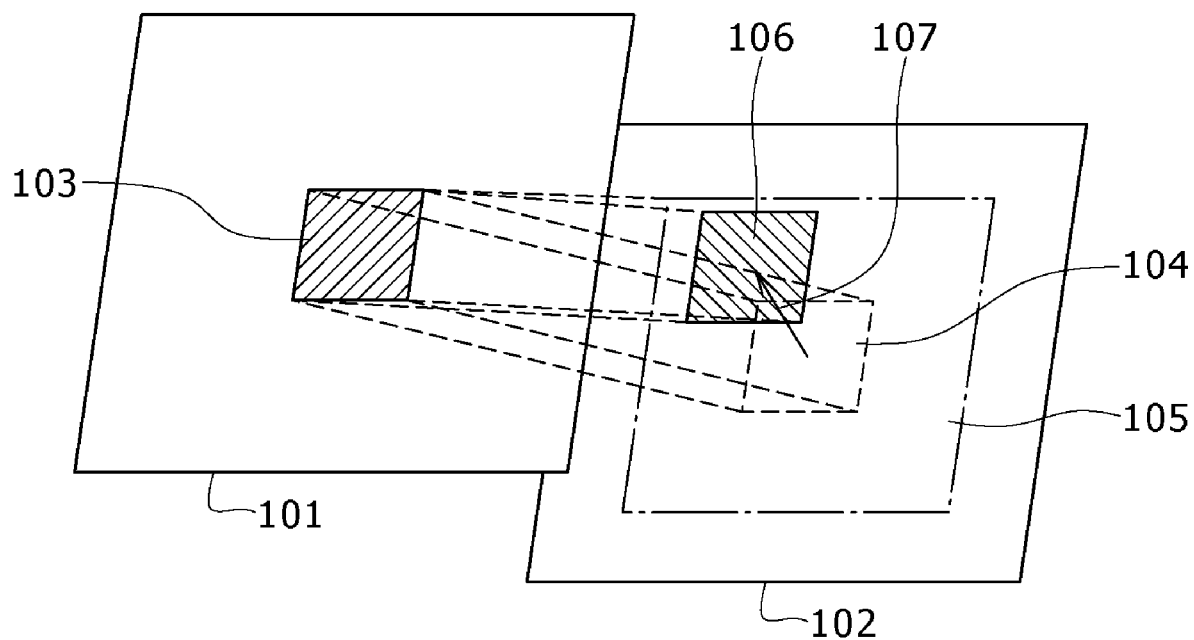
FIG. 71 is a diagram of assistance in explaining a process of calculating a motion vector by block matching.
Figure 72:
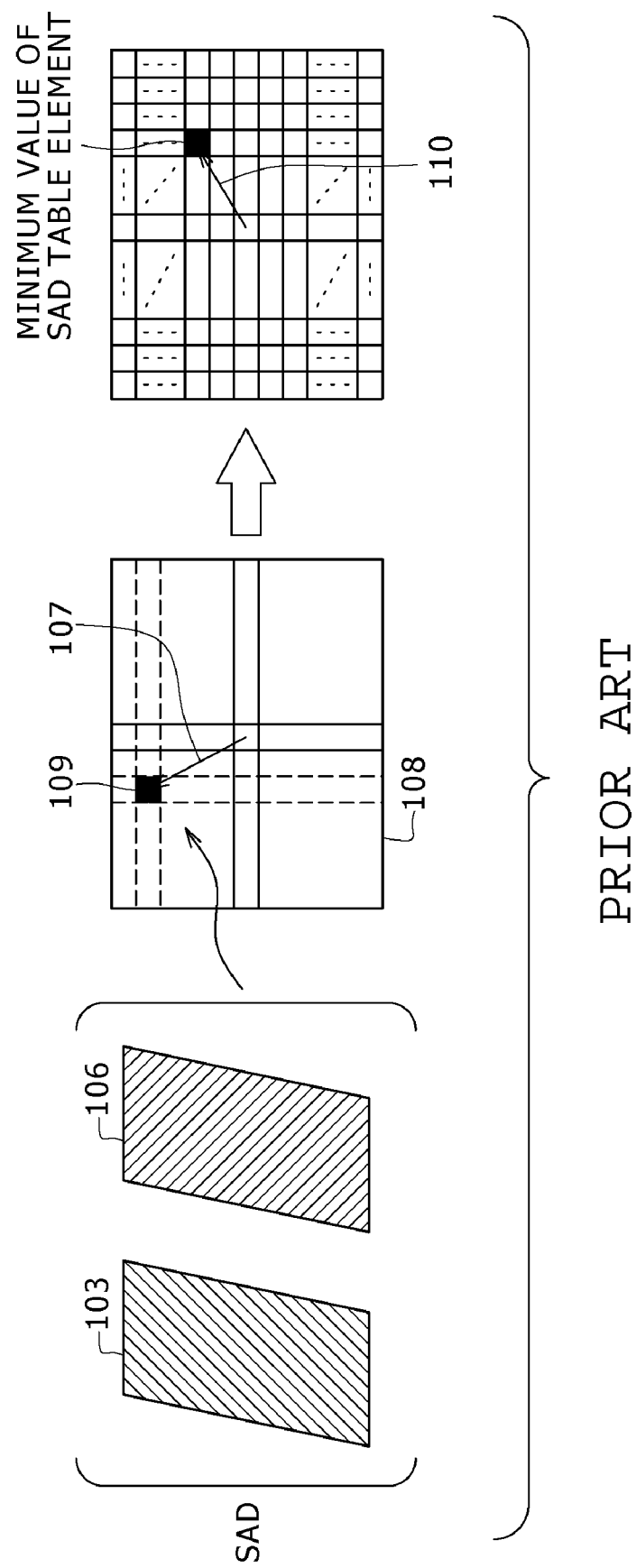
FIG. 72 is a diagram of assistance in explaining the process of calculating the motion vector by block matching.

While the above description of processing using representative points of target blocks is based on the method described with reference to FIGS. 71 to 73, it is needless to say that the above description is also applicable to the method according to the second embodiment described with reference to FIGS. 65 to 68.

When only representative points TP of a target block are used in the method according to the second embodiment, for each input pixel of a reference frame, all reference blocks having a range AR including the input pixel (the position of the pixel is not the same in the ranges AR) are detected in the entire search range, and a representative point in the target block which representative point corresponds to the range AR in each of all the detected reference blocks is determined.

Then, the pixel values of a plurality of representative points obtained as a result of the determination are each read from a memory storing the image data of the original frame (target frame), differences between the pixel values of the representative points and the input pixel are each calculated, and results of the calculation are accumulated at coordinate positions of the corresponding reference blocks (reference vectors) in a SAD table.

In this case, memory access is made to read only the representative points in the target block, and therefore the number of memory accesses can be reduced greatly.

Incidentally, the process using representative points can be applied to cases where reduced SAD tables as described above are used.

In the foregoing embodiments, difference values and SAD values of pixels are calculated using only luminance values Y of the pixels. However, not only the luminance values Y but also color-difference components Cb/Cr may be used for motion vector detection. In addition, motion vector detection processing may be performed on RAW data before being converted into the luminance values Y and the color-difference components Cb/Cr by the data converting unit 14.

Further, as described above, the hand movement vector detecting unit 15 is not limited to a configuration based on hardware processing, and may be implemented by software.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing device comprising:
    per-block motion vector calculating means for calculating a motion vector between two pictures of an image input in picture units sequentially, performing block matching in each of divided regions obtained by dividing one picture into a plurality of regions, and calculating a per-block motion vector for each of said divided regions;

translation amount calculating means for calculating an amount of translation of the other of said two pictures with respect to one of said two pictures from a plurality of said per-block motion vectors calculated by said per-block motion vector calculating means;

rotation angle calculating means for calculating a rotation angle of the other of said two pictures with respect to one of said two pictures from the plurality of said per-block motion vectors calculated by said per-block motion vector calculating means; and rotation and translation adding means for superimposing a plurality of pictures on each other using the amount of translation calculated by said translation amount calculating means and the rotation angle calculated by said rotation angle calculating means, wherein said rotation and translation adding means subjects said plurality of pictures to at least one of average value addition and tournament addition.

2. The image processing device according to claim 1, wherein said one picture is divided in a form of a matrix.

3. The image processing device according to claim 1, wherein said translation amount calculating means calculates said amount of translation by taking a simple average of components of said plurality of per-block motion vectors in a direction in which to obtain said amount of translation.

4. The image processing device according to claim 1, wherein using said per-block motion vectors calculated by said per-block motion vector calculating means and said amount of translation for each of said divided regions, said amount of translation being obtained from said per-block motion vectors, said rotation angle calculating means calculates said rotation angle as said rotation angle that minimizes a sum total of errors between said per-block motion vectors and theoretical per-block motion vectors calculated as a function of an unknown rotation angle for said plurality of divided regions.

5. An image processing device comprising:

per-block motion vector calculating means for calculating a motion vector between two pictures of an image input in picture units sequentially, performing block matching in each of divided regions obtained by dividing one picture into a plurality of regions, and calculating a per-block motion vector for each of said divided regions;

translation amount calculating means for calculating an amount of translation of the other of said two pictures with respect to one of said two pictures from a plurality of said per-block motion vectors calculated by said per-block motion vector calculating means;

rotation angle calculating means for calculating a rotation angle of the other of said two pictures with respect to one of said two pictures from the plurality of said per-block motion vectors calculated by said per-block motion vector calculating means;

rotation and translation adding means for superimposing a plurality of pictures on each other using the amount of translation calculated by said translation amount calculating means and the rotation angle calculated by said rotation angle calculating means;

global motion vector calculating means for calculating a global motion vector of a whole of the other of said two pictures with respect to one of said two pictures; and evaluating means for evaluating each of said plurality of per-block motion vectors obtained by said per-block motion vector calculating means, using said global motion vector;

wherein the other of said two pictures in which picture a number of said per-block motion vectors given a high evaluation value by said evaluating means is smaller than a predetermined threshold value is excluded from the pictures superimposed on each other by said rotation and translation adding means.

6. An image processing device comprising:

per-block motion vector calculating means for calculating a motion vector between two pictures of an image input in picture units sequentially, performing block matching in each of divided regions obtained by dividing one picture into a plurality of regions, and calculating a per-block motion vector for each of said divided regions;

translation amount calculating means for calculating an amount of translation of the other of said two pictures with respect to one of said two pictures from a plurality of said per-block motion vectors calculated by said per-block motion vector calculating means;

rotation angle calculating means for calculating a rotation angle of the other of said two pictures with respect to one of said two pictures from the plurality of said per-block motion vectors calculated by said per-block motion vector calculating means;

rotation and translation adding means for superimposing a plurality of pictures on each other using the amount of translation calculated by said translation amount calculating means and the rotation angle calculated by said rotation angle calculating means;

global motion vector calculating means for calculating a global motion vector of a whole of the other of said two pictures with respect to one of said two pictures; and evaluating means for evaluating each of said plurality of per-block motion vectors obtained by said per-block motion vector calculating means, using said global motion vector;

wherein said translation amount calculating means and said rotation angle calculating means calculate said amount of translation and said rotation angle from only a plurality of said per-block motion vectors given a high evaluation value by said evaluating means.

7. An image processing device comprising:

per-block motion vector calculating means for calculating a motion vector between two pictures of an image input in picture units sequentially, performing block matching in each of divided regions obtained by dividing one picture into a plurality of regions, and calculating a per-block motion vector for each of said divided regions;

translation amount calculating means for calculating an amount of translation of the other of said two pictures with respect to one of said two pictures from a plurality of said per-block motion vectors calculated by said per-block motion vector calculating means;

rotation angle calculating means for calculating a rotation angle of the other of said two pictures with respect to one of said two pictures from the plurality of said per-block motion vectors calculated by said per-block motion vector calculating means;

rotation and translation adding means for superimposing a plurality of pictures on each other using the amount of translation calculated by said translation amount calculating means and the rotation angle calculated by said rotation angle calculating means;

global motion vector calculating means for calculating a global motion vector for a whole of the other of said two pictures from a result of said block matching by said per-block motion vector calculating means, wherein said per-block motion vector calculating means performs a process of said block matching for the other of said two pictures a plurality of times, a search range for each time being offset according to said global motion vector obtained from a result of block matching for a previous time, said global motion vector being calculated by said global motion vector calculating means, and said search range for each time being made narrower than a search range for the previous time, and said translation amount calculating means and said rotation angle calculating means calculate said amount of translation and said rotation angle from a plurality of per-block motion vectors obtained by block matching for a last time by said per-block motion vector calculating means.

8. The image processing device according to claim 7, further comprising evaluating means for evaluating each of per-block motion vectors obtained by block matching for each time, using a global motion vector for the whole of the other of said two pictures, said global motion vector being obtained from a result of the block matching for the time, wherein said global motion vector calculating means excludes a target block for which a per-block motion vector judged to be of low reliability by evaluation of said evaluating means is obtained from calculation objects in calculating a global motion vector next time, and said translation amount calculating means and said rotation angle calculating means calculate said amount of translation and said rotation angle from only per-block motion vectors for target blocks other than a target block excluded from said calculation objects among a plurality of per-block motion vectors obtained by block matching for a last time by said per-block motion vector calculating means.

9. The image processing device according to claim 7, further comprising evaluating means for evaluating each of a plurality of per-block motion vectors obtained by block matching for each time, using a global motion vector for the whole of the other of said two pictures, said global motion vector being obtained from a result of the block matching for the time, wherein the other of said two pictures in which picture a number of said per-block motion vectors given a high evaluation value by said evaluating means is smaller than a predetermined threshold value is excluded from the pictures superimposed on each other by said rotation and translation adding means.

10. The image processing device according to claim 7, further comprising evaluating means for evaluating each of a plurality of per-block motion vectors obtained by block matching for each time, using a global motion vector for the whole of the other of said two pictures, said global motion vector being obtained from a result of the block matching for the time, wherein when a number of said per-block motion vectors given a high evaluation value by said evaluating means is equal to or larger than a predetermined number, the global motion vector for the time is recalculated from said per-block motion vectors given the high evaluation value, and said offset for a search range for a next time is determined on a basis of the recalculated global motion vector.

11. An image processing device comprising:

per-block motion vector calculating means for calculating a motion vector between two pictures of an image input in picture units sequentially, performing block matching in each of divided regions obtained by dividing one picture into a plurality of regions, and calculating a per-block motion vector for each of said divided regions;

translation amount calculating means for calculating an amount of translation of the other of said two pictures with respect to one of said two pictures from a plurality of said per-block motion vectors calculated by said per-block motion vector calculating means;

rotation angle calculating means for calculating a rotation angle of the other of said two pictures with respect to one of said two pictures from the plurality of said per-block motion vectors calculated by said per-block motion vector calculating means;

rotation and translation adding means for superimposing a plurality of pictures on each other using the amount of translation calculated by said translation amount calculating means and the rotation angle calculated by said rotation angle calculating means;

error calculating means for obtaining an error of an amount of translation and a rotation angle indicated by each of said per-block motion vectors with respect to said amount of translation calculated by said translation amount calculating means and said rotation angle calculated by said rotation angle calculating means;

determining means for determining whether a sum total of said errors obtained by said error calculating means for said plurality of per-block motion vectors is smaller than a predetermined threshold value; and controlling means for performing a control so that processing in said rotation and translation adding means is performed when said determining means determines that the sum total of said errors for said plurality of per-block motion vectors is smaller than the predetermined threshold value.

12. The image processing device according to claim 11, wherein when said determining means determines that the sum total for said plurality of per-block motion vectors is equal to or larger than the predetermined threshold value, said per-block motion vector corresponding to a maximum error obtained by said error calculating means is excluded, and said amount of translation calculated by said translation amount calculating means and said rotation angle calculated by said rotation angle calculating means are recalculated.

13. An image pickup device comprising:

an image pickup unit;

per-block motion vector calculating means for calculating a motion vector between two pictures of a picked-up image from said image pickup unit, performing block matching in each of divided regions obtained by dividing one picture into a plurality of regions, and calculating a per-block motion vector for each of said divided regions;

translation amount calculating means for calculating an amount of translation of the other of said two pictures with respect to one of said two pictures from a plurality of said per-block motion vectors calculated by said per-block motion vector calculating means;

rotation angle calculating means for calculating a rotation angle of the other of said two pictures with respect to one of said two pictures from the plurality of said per-block motion vectors calculated by said per-block motion vector calculating means;

rotation and translation adding means for superimposing a plurality of pictures of said picked-up image from said image pickup unit on each other using the amount of translation calculated by said translation amount calculating means and the rotation angle calculated by said rotation angle calculating means; and recording means for recording data of said picked-up image obtained by superimposing the plurality of pictures on each other by said rotation and translation adding means onto a recording medium, wherein said rotation and translation adding means includes simple addition means for subjecting said plurality of pictures to simple addition, average value addition means for subjecting said plurality of pictures to average value addition, tournament addition means for subjecting said plurality of pictures to tournament addition, and selecting means for selecting one of said simple addition means, said average value addition means, and said tournament addition means, and wherein said image pickup device further includes user input receiving means for receiving a user selection operating input for specifying which of said simple addition means, said average value addition means, and said tournament addition means is to be used by said rotation and translation adding means, and controlling means for controlling said selecting means according to the user selection operating input received by said user input receiving means.

14. An image processing method comprising:

calculating a motion vector between two pictures of an image input in picture units sequentially;

performing block matching in each of divided regions obtained by dividing one picture into a plurality of regions, and calculating a per-block motion vector for each of said divided regions;

calculating an amount of translation of the other of said two pictures with respect to one of said two pictures from a plurality of said per-block motion vectors calculated in said per-block motion vector calculating step;

calculating a rotation angle of the other of said two pictures with respect to one of said two pictures from the plurality of said per-block motion vectors calculated in said per-block motion vector calculating step; and superimposing a plurality of pictures on each other using the amount of translation calculated in said translation amount calculating step and the rotation angle calculated in said rotation angle calculating step, wherein said plurality of pictures are subjected to at least one of average value addition and tournament addition.

15. An image pickup method comprising:

calculating a motion vector between two pictures of a picked-up image from an image pickup unit;

performing block matching in each of divided regions obtained by dividing one picture into a plurality of regions;

calculating a per-block motion vector for each of said divided regions;

calculating an amount of translation of the other of said two pictures with respect to one of said two pictures from a plurality of said per-block motion vectors calculated in said per-block motion vector calculating step;

calculating a rotation angle of the other of said two pictures with respect to one of said two pictures from the plurality of said per-block motion vectors calculated in said per-block motion vector calculating step;

superimposing a plurality of pictures of said picked-up image from said image pickup unit on each other using the amount of translation calculated in said translation amount calculating step and the rotation angle calculated in said rotation angle calculating step, wherein said superimposing step includes subjecting the plurality of pictures to one of average value addition and tournament addition;

receiving a user selection operating input for specifying which of said average value addition and tournament addition is to be used in said superimposing step; and recording data of said picked-up image obtained by superimposing the plurality of pictures on each other in said superimposing step onto a recording medium.

16. An image processing method comprising:

calculating a motion vector between two pictures of an image input in picture units sequentially;

performing block matching in each of divided regions obtained by dividing one picture into a plurality of regions, and calculating a per-block motion vector for each of said divided regions;

calculating an amount of translation of the other of said two pictures with respect to one of said two pictures from a plurality of said per-block motion vectors calculated in said per-block motion vector calculating step;

calculating a rotation angle of the other of said two pictures with respect to one of said two pictures from the plurality of said per-block motion vectors calculated in said per-block motion vector calculating step;

superimposing a plurality of pictures on each other using the amount of translation calculated in said translation amount calculating step and the rotation angle calculated in said rotation angle calculating step;

calculating a global motion vector of a whole of the other of said two pictures with respect to one of said two pictures; and evaluating each of said plurality of per-block motion vectors obtained using said global motion vector;

wherein the other of said two pictures in which picture a number of said per-block motion vectors given a high evaluation value in said evaluating step is smaller than a predetermined threshold value is excluded from the pictures superimposed on each other in said superimposing step.

17. An image processing method comprising:

calculating a motion vector between two pictures of an image input in picture units sequentially;

performing block matching in each of divided regions obtained by dividing one picture into a plurality of regions, and calculating a per-block motion vector for each of said divided regions;

calculating an amount of translation of the other of said two pictures with respect to one of said two pictures from a plurality of said per-block motion vectors calculated in said per-block motion vector calculating step;

calculating a rotation angle of the other of said two pictures with respect to one of said two pictures from the plurality of said per-block motion vectors calculated in said per-block motion vector calculating step;

superimposing a plurality of pictures on each other using the amount of translation calculated in said translation amount calculating step and the rotation angle calculated in said rotation angle calculating step;

calculating a global motion vector of a whole of the other of said two pictures with respect to one of said two pictures; and evaluating each of said plurality of per-block motion vectors using said global motion vector;

wherein said translation amount calculating step and said rotation angle calculating step calculate said amount of translation and said rotation angle from only a plurality of said per-block motion vectors given a high evaluation value by said evaluating step.

18. An image processing method comprising:

calculating a motion vector between two pictures of an image input in picture units sequentially;

performing block matching in each of divided regions obtained by dividing one picture into a plurality of regions, and calculating a per-block motion vector for each of said divided regions;

calculating an amount of translation of the other of said two pictures with respect to one of said two pictures from a plurality of said per-block motion vectors calculated in said per-block motion vector calculating step;

calculating a rotation angle of the other of said two pictures with respect to one of said two pictures from the plurality of said per-block motion vectors calculated in said per-block motion vector calculating step;

superimposing a plurality of pictures on each other using the amount of translation calculated in said translation amount calculating step and the rotation angle calculated in said rotation angle calculating step;

calculating a global motion vector for a whole of the other of said two pictures from a result of said block matching in said per-block motion vector calculating step, wherein said per-block motion vector calculating step performs a process of said block matching for the other of said two pictures a plurality of times, a search range for each time being offset according to said global motion vector obtained from a result of block matching for a previous time, said global motion vector being calculated by said global motion vector calculating step, and said search range for each time being made narrower than a search range for the previous time, and said translation amount calculating step and said rotation angle calculating step calculate said amount of translation and said rotation angle from a plurality of per-block motion vectors obtained by block matching for a last time by said per-block motion vector calculating step.

19. An image processing method comprising:

calculating a motion vector between two pictures of an image input in picture units sequentially;

performing block matching in each of divided regions obtained by dividing one picture into a plurality of regions, and calculating a per-block motion vector for each of said divided regions;

calculating an amount of translation of the other of said two pictures with respect to one of said two pictures from a plurality of said per-block motion vectors calculated in said per-block motion vector calculating step;

calculating a rotation angle of the other of said two pictures with respect to one of said two pictures from the plurality of said per-block motion vectors calculated in said per-block motion vector calculating step;

superimposing a plurality of pictures on each other using the amount of translation calculated in said translation amount calculating step and the rotation angle calculated in said rotation angle calculating step;

obtaining an error of an amount of translation and a rotation angle indicated by each of said per-block motion vectors with respect to said amount of translation calculated in said translation amount calculating step and said rotation angle calculated by said rotation angle calculating step; and determining whether a sum total of said errors obtained by said error obtaining step for said plurality of per-block motion vectors is smaller than a predetermined threshold value;

wherein said superimposing step is performed when said determining step determines that the sum total of said errors for said plurality of per-block motion vectors is smaller than the predetermined threshold value.

* * * * *